US011976498B2

(12) United States Patent
Seiders et al.

(10) Patent No.: US 11,976,498 B2
(45) **Date of Patent: *May 7, 2024**

(54) CONTAINER AND LATCHING SYSTEM

(71) Applicant: YETI Coolers, LLC, Austin, TX (US)

(72) Inventors: Roy Joseph Seiders, Austin, TX (US); Steve Charles Nichols, Austin, TX (US); Kyle Ellison, Austin, TX (US); Andy Bondhus, Austin, TX (US); Tobias Hotchkiss, Austin, TX (US); Liza Morris, Austin, TX (US); Dennis Zuck, Austin, TX (US); Ryan Nixon, Austin, TX (US); Mark Carlson Rane, Austin, TX (US); Walter T. Blanchard, Manor, TX (US); Nicholas James Lombardi, Austin, TX (US); Dustin Bullock, Austin, TX (US); Michael Christopher Cieszko, Austin, TX (US); Derek G. Sullivan, Austin, TX (US)

(73) Assignee: YETI Coolers, LLC, Austin, TX (US)

( * ) Notice: Subject to any disclaimer, the term of this patent is extended or adjusted under 35 U.S.C. 154(b) by 431 days.

This patent is subject to a terminal disclaimer.

(21) Appl. No.: 17/123,746

(22) Filed: Dec. 16, 2020

(65) Prior Publication Data

US 2021/0102409 A1 Apr. 8, 2021

Related U.S. Application Data

(63) Continuation-in-part of application No. 16/839,311, filed on Apr. 3, 2020, and a continuation-in-part of (Continued)

(51) Int. Cl.

*E05B 65/52* (2006.01)
*A45C 11/20* (2006.01)

(Continued)

(52) U.S. Cl.

CPC .......... *E05B 65/5269* (2013.01); *A45C 11/20* (2013.01); *A45C 13/1084* (2013.01);

(Continued)

(58) Field of Classification Search

CPC .. B65D 43/165; B65D 25/2841; B65D 43/22; B65D 45/24; A45C 13/262; A45C 11/20

See application file for complete search history.

(56) References Cited

U.S. PATENT DOCUMENTS 286,909 A 10/1883 Commander
674,820 A * 5/1901 Wilhite (Continued)

FOREIGN PATENT DOCUMENTS

BE 1013040 8/2001
BE 1016429 10/2006

(Continued)

OTHER PUBLICATIONS

Jul. 13, 2022—(CN) First Office Action—App. No. 202080025625.7.

(Continued)

*Primary Examiner* — Anthony D Stashick
*Assistant Examiner* — Blaine G Neway
(74) *Attorney, Agent, or Firm* — Banner & Witcoff, Ltd.

(57) ABSTRACT

A container having a base and a lid is provided. The lid may be rotatable about a hinge from a closed configuration to an open configuration and may be secured, via one or more latching assemblies. The latching assembly may comprise a latch body, a locking member, a biasing member, and an activating member. Additional features of the container may include handles and strength increasing features. The base and lid may also feature attachment points for various accessories. A carry strap may attach to the base of the container to allow a user to lift and carry the container. The (Continued)

container may also have a wheels attached to the bottom portion and/or across the bottom portion to one side of the sidewall structure. In addition, in exemplary containers with wheels, a pull handle may be attached to a side opposite the wheels. The lid may include a lid support member that can act as a molle board to releasably secure items to the lid support member while also providing structural support to the lid.

9 Claims, 68 Drawing Sheets

Related U.S. Application Data application No. 16/828,282, filed on Mar. 24, 2020, now Pat. No. 11,685,573, said application No. 16/839,311 is a continuation-in-part of application No. 16/735,013, filed on Jan. 6, 2020, now Pat. No. 11,517,086, said application No. 16/828,282 is a continuation-in-part of application No. 16/006,344, filed on Jun. 12, 2018, now Pat. No. 11,203,465.

(60) Provisional application No. 62/830,203, filed on Apr. 5, 2019, provisional application No. 62/788,886, filed on Jan. 6, 2019, provisional application No. 62/788,888, filed on Jan. 6, 2019, provisional application No. 62/518,358, filed on Jun. 12, 2017.

(51) Int. Cl.

| | |
|---|---|
| ***A45C 13/10*** | (2006.01) |
| ***B65D 25/28*** | (2006.01) |
| ***B65D 43/16*** | (2006.01) |
| ***B65D 43/22*** | (2006.01) |
| ***B65D 45/24*** | (2006.01) |
| ***B65D 55/02*** | (2006.01) |
| ***B65D 81/38*** | (2006.01) |

(52) U.S. Cl.

CPC ..... *B65D 25/2841* (2013.01); *B65D 25/2873* (2013.01); *B65D 25/2891* (2013.01); *B65D 43/165* (2013.01); *B65D 43/22* (2013.01); *B65D 45/24* (2013.01); *B65D 55/02* (2013.01); *B65D 81/3813* (2013.01); *B65D 2525/287* (2013.01); *B65D 2543/00194* (2013.01); *B65D 2543/00296* (2013.01); *B65D 2543/00518* (2013.01); *B65D 2543/00537* (2013.01); *B65D 2543/00555* (2013.01); *B65D 2543/0087* (2013.01); *B65D 2543/00972* (2013.01); *B65D 2577/043* (2013.01)

(56) References Cited

U.S. PATENT DOCUMENTS

| | | | |
|---|---|---|---|
| 749,959 | A | 1/1904 | Curtiss |
| 1,008,041 | A | 11/1911 | Leonard |
| 1,056,648 | A | 3/1913 | Earley |
| 2,028,339 | A | 1/1936 | Levine et al. |
| 2,101,337 | A | 12/1937 | Komenak |
| 2,109,928 | A | 3/1938 | Passalaqua |
| 2,183,121 | A | 12/1939 | Levine |
| 2,439,660 | A | 4/1948 | Keil |
| 2,455,069 | A | 11/1948 | Launder |
| 2,472,491 | A | 6/1949 | Quinton |
| 2,510,643 | A | 6/1950 | Long |
| 2,565,939 | A | 8/1951 | Wriston |
| 2,574,089 | A | 11/1951 | Cochran |
| 2,577,951 | A | 12/1951 | Cortsen |
| 2,581,417 | A | 1/1952 | Jones |
| 2,604,961 | A | 7/1952 | Koch |
| 2,647,653 | A | 8/1953 | Dube |
| 2,717,093 | A | 9/1955 | Mautner |
| 2,747,732 | A | 5/1956 | Fischer |
| 2,803,956 | A | 8/1957 | Womer |
| 2,874,401 | A | 2/1959 | Kotkins |
| 2,912,080 | A | 11/1959 | Ikelheimer |
| 2,931,205 | A | 4/1960 | Schmitz |
| 2,936,189 | A | 5/1960 | Pearson |
| 3,009,193 | A | 11/1961 | Lifton |
| 3,057,636 | A | 10/1962 | D'Ettorre |
| 3,141,680 | A | 7/1964 | McCord |
| 3,191,244 | A | 6/1965 | Burke |
| 3,202,310 | A | 8/1965 | Tibbets |
| 3,225,983 | A | 12/1965 | Majka |
| 3,250,558 | A | 5/1966 | McClintock |
| 3,259,412 | A | 7/1966 | Wheeler |
| 3,416,701 | A | 12/1968 | Kramer et al. |
| 3,432,025 | A | 3/1969 | Luhe |
| 3,464,579 | A | 9/1969 | Asenbauer |
| 3,519,298 | A | 7/1970 | Gley |
| 3,565,305 | A | 2/1971 | Belokin, Jr. |
| 3,642,168 | A | 2/1972 | Wiley, Jr. et al. |
| 3,656,650 | A | 4/1972 | Frater |
| 3,661,410 | A | 5/1972 | Larson et al. |
| 3,688,942 | A | 9/1972 | Mitchell et al. |
| 3,690,708 | A | 9/1972 | Worley et al. |
| 3,741,433 | A | 6/1973 | Bentley et al. |
| 3,831,224 | A | 8/1974 | MacMaster et al. |
| 3,847,423 | A | 11/1974 | Gley |
| 3,861,504 | A | 1/1975 | McGraw |
| 3,882,914 | A | 5/1975 | Strutz |
| 3,886,625 | A | 6/1975 | Rollband |
| 3,902,628 | A | 9/1975 | Schurman |
| 3,915,362 | A | 10/1975 | Hart |
| 3,917,038 | A | 11/1975 | Foge et al. |
| 3,933,269 | A | 1/1976 | Mastrovito |
| 3,955,656 | A | 5/1976 | Kashinski |
| 3,987,829 | A | 10/1976 | Leone |
| 3,991,921 | A | 11/1976 | Hirsch |
| 4,094,392 | A | 6/1978 | Gregg et al. |
| 4,095,711 | A | 6/1978 | Conley |
| 4,116,479 | A | 9/1978 | Poe |
| 4,143,442 | A | 3/1979 | Harlang |
| 4,153,178 | A | 5/1979 | Weavers |
| 4,184,705 | A | 1/1980 | Little |
| D256,630 | S | 9/1980 | Maney |
| D257,218 | S | 10/1980 | Eriksson |
| 4,249,760 | A | 2/1981 | Conley |
| 4,254,850 | A | 3/1981 | Knowles |
| 4,273,223 | A | 6/1981 | Tomlinson |
| 4,343,412 | A | 8/1982 | Wilcox et al. |
| 4,351,165 | A | 9/1982 | Gottsegen et al. |
| 4,446,705 | A | 5/1984 | Loucks |
| 4,465,189 | A | 8/1984 | Molzan |
| 4,476,988 | A | 10/1984 | Tanner |
| 4,509,622 | A | 4/1985 | Morszeck |
| 4,515,421 | A | 5/1985 | Steffes |
| 4,516,686 | A | 5/1985 | Chaussepied |
| 4,522,312 | A | 6/1985 | Rathgeber et al. |
| 4,523,692 | A | 6/1985 | Lemkin |
| 4,550,813 | A | 11/1985 | Browning |
| 4,561,526 | A | 12/1985 | Winter et al. |
| 4,573,202 | A | 2/1986 | Lee |
| 4,575,109 | A | 3/1986 | Cowdery |
| D283,666 | S | 5/1986 | Holzkopf |
| 4,592,482 | A | 6/1986 | Seager |
| 4,615,464 | A | 10/1986 | Byrns |
| 4,662,188 | A | 5/1987 | Hullihan |
| 4,673,207 | A | 6/1987 | Reynolds et al. |
| D290,908 | S | 7/1987 | Thomas |
| 4,706,344 | A | 11/1987 | Tanaka et al. |
| 4,707,011 | A | 11/1987 | McKim, Jr. |
| 4,712,657 | A | 12/1987 | Myers et al. |
| 4,746,008 | A | 5/1988 | Heverly et al. |
| 4,768,815 | A | 9/1988 | Harmon |
| 4,775,072 | A | 10/1988 | Lundblade et al. |
| 4,792,024 | A | 12/1988 | Morton et al. |
| 4,802,344 | A | 2/1989 | Livingston et al. |
| 4,805,272 | A | 2/1989 | Yamaguchi |

(56) References Cited

U.S. PATENT DOCUMENTS

| | | | |
|---|---|---|---|
| 4,826,060 | A | 5/1989 | Hollingsworth |
| 4,858,444 | A | 8/1989 | Scott |
| 4,873,841 | A | 10/1989 | Bradshaw et al. |
| 4,899,904 | A | 2/1990 | Dooley et al. |
| 4,904,007 | A | 2/1990 | Woodruff |
| 4,917,261 | A | 4/1990 | Borst |
| 4,928,800 | A | 5/1990 | Green et al. |
| 4,930,649 | A | 6/1990 | Moser |
| 4,975,073 | A | 12/1990 | Weisman |
| 4,982,863 | A | 1/1991 | Skillius |
| 5,011,013 | A | 4/1991 | Meisner et al. |
| 5,011,020 | A | 4/1991 | Stevens et al. |
| 5,014,830 | A | 5/1991 | Seynhaeve |
| 5,024,471 | A | 6/1991 | Kahl et al. |
| 5,040,834 | A | 8/1991 | Kahl et al. |
| 5,044,513 | A | 9/1991 | Van Berne |
| 5,062,557 | A | 11/1991 | Mahvi et al. |
| 5,075,925 | A | 12/1991 | Maloney |
| 5,080,250 | A | 1/1992 | Dickinson et al. |
| 5,096,030 | A | 3/1992 | Espinosa et al. |
| 5,101,541 | A | 4/1992 | Watanabe |
| 5,105,920 | A | 4/1992 | Grebenstein |
| 5,111,920 | A | 5/1992 | Castelli et al. |
| D327,427 | S | 6/1992 | McCooey |
| 5,117,952 | A | 6/1992 | Suh |
| D328,186 | S | 7/1992 | Hanke |
| 5,139,294 | A | 8/1992 | Ward et al. |
| D329,135 | S | 9/1992 | Embree |
| 5,153,561 | A | 10/1992 | Johnson |
| 5,165,583 | A | 11/1992 | Kouwenberg |
| 5,167,433 | A | 12/1992 | Ryan |
| 5,169,018 | A | 12/1992 | Fiore |
| D333,775 | S | 3/1993 | Krape |
| D334,870 | S | 4/1993 | Griffin |
| D335,030 | S | 4/1993 | Alfonso |
| 5,205,413 | A | 4/1993 | Cautereels et al. |
| 5,213,381 | A | 5/1993 | Anderson |
| 5,216,905 | A | 6/1993 | Sersch et al. |
| 5,235,830 | A | 8/1993 | Benge |
| D340,167 | S | 10/1993 | Kahl |
| D342,609 | S | 12/1993 | Brightbill |
| 5,269,157 | A | 12/1993 | Ciminelli et al. |
| 5,282,706 | A | 2/1994 | Anthony et al. |
| 5,295,369 | A | 3/1994 | Garcia |
| D347,114 | S | 5/1994 | Tengvall |
| 5,313,817 | A | 5/1994 | Meinders |
| D347,971 | S | 6/1994 | Krugman |
| D348,343 | S | 6/1994 | Lang-Ree et al. |
| 5,319,937 | A | 6/1994 | Fritsch et al. |
| 5,322,178 | A | 6/1994 | Foos |
| 5,335,451 | A | 8/1994 | Druzynski |
| D351,533 | S | 10/1994 | Lynam, Jr. |
| D351,726 | S | 10/1994 | Lin |
| 5,353,946 | A | 10/1994 | Behrend |
| 5,358,082 | A | 10/1994 | Armstrong, IV |
| D353,265 | S | 12/1994 | Newby, Sr. |
| 5,373,708 | A | 12/1994 | Dumoulin, Jr. |
| D355,568 | S | 2/1995 | Paulin et al. |
| 5,390,811 | A | 2/1995 | Ogino et al. |
| 5,398,807 | A | 3/1995 | Plath |
| 5,402,557 | A | 4/1995 | Dalen |
| D358,765 | S | 5/1995 | Dickinson et al. |
| 5,419,432 | A | 5/1995 | Ingram |
| 5,423,644 | A | 6/1995 | First, Sr. |
| 5,427,308 | A | 6/1995 | Swift et al. |
| D359,836 | S | 7/1995 | Shuler |
| 5,431,263 | A | 7/1995 | Nordstrom |
| 5,435,256 | A | 7/1995 | Svehaug |
| D361,664 | S | 8/1995 | Brown |
| D361,888 | S | 9/1995 | Kahl et al. |
| 5,454,477 | A | 10/1995 | Bomhorst et al. |
| D364,426 | S | 11/1995 | Bucaccio |
| 5,465,985 | A | 11/1995 | Devan et al. |
| 5,474,162 | A | 12/1995 | Shyr et al. |
| 5,478,097 | A | 12/1995 | Forma |
| D367,360 | S | 2/1996 | Wolff |
| D368,161 | S | 3/1996 | Miller |
| D369,342 | S | 4/1996 | Williams |
| D369,695 | S | 5/1996 | Imotani |
| 5,518,139 | A | 5/1996 | Trower et al. |
| 5,519,919 | A | 5/1996 | Lee |
| D370,619 | S | 6/1996 | Hall et al. |
| D371,051 | S | 6/1996 | Melk |
| D371,052 | S | 6/1996 | Melk |
| 5,524,737 | A | 6/1996 | Wang |
| 5,526,953 | A | 6/1996 | Chieng |
| D371,724 | S | 7/1996 | Melk |
| D371,942 | S | 7/1996 | Lippincott et al. |
| 5,533,231 | A | 7/1996 | Bai |
| D373,514 | S | 9/1996 | Melk |
| D373,515 | S | 9/1996 | Melk |
| 5,564,805 | A | 10/1996 | Dickinson |
| 5,568,848 | A | 10/1996 | Liang |
| 5,570,915 | A | 11/1996 | Asadurian |
| 5,575,362 | A | 11/1996 | Franklin et al. |
| 5,590,891 | A | 1/1997 | Kazmark, Jr. |
| 5,603,545 | A | 2/1997 | Benson et al. |
| 5,620,212 | A | 4/1997 | Bourne et al. |
| 5,620,213 | A | 4/1997 | Ellis |
| 5,626,373 | A | 5/1997 | Chambers et al. |
| 5,630,630 | A | 5/1997 | Price et al. |
| D380,369 | S | 7/1997 | Antonucci |
| D381,512 | S | 7/1997 | Green |
| D381,562 | S | 7/1997 | Westcott |
| D381,871 | S | 8/1997 | Melk |
| D382,114 | S | 8/1997 | Dickinson et al. |
| D383,306 | S | 9/1997 | Pennoyer |
| D383,603 | S | 9/1997 | Pedlar |
| 5,662,223 | A | 9/1997 | Sylegaard |
| 5,683,097 | A | 11/1997 | Fenton et al. |
| 5,688,001 | A | 11/1997 | Klein et al. |
| D387,249 | S | 12/1997 | Mogil |
| D387,558 | S | 12/1997 | Mann et al. |
| D387,626 | S | 12/1997 | Melk |
| 5,704,158 | A | 1/1998 | Whiteaker |
| 5,718,350 | A | 2/1998 | Williams |
| D392,510 | S | 3/1998 | Perez |
| 5,727,844 | A | 3/1998 | O'Quinn et al. |
| 5,732,987 | A | 3/1998 | Wright et al. |
| 5,755,311 | A | 5/1998 | Younessian et al. |
| 5,762,242 | A | 6/1998 | Yost |
| 5,762,411 | A | 6/1998 | Yemini |
| 5,769,194 | A | 6/1998 | Chang |
| 5,797,488 | A | 8/1998 | Yemini |
| 5,797,617 | A | 8/1998 | Lin |
| 5,803,472 | A | 9/1998 | Lien |
| 5,813,503 | A | 9/1998 | Chang |
| 5,816,185 | A | 10/1998 | Ruthrford |
| 5,823,550 | A | 10/1998 | Bennett et al. |
| 5,826,718 | A | 10/1998 | Ahern, Jr. et al. |
| 5,826,770 | A | 10/1998 | Chuang |
| 5,829,558 | A | 11/1998 | Cheng |
| 5,839,553 | A | 11/1998 | Dorsam |
| 5,860,281 | A | 1/1999 | Coffee et al. |
| 5,865,281 | A | 2/1999 | Wang |
| 5,875,948 | A | 3/1999 | Sadler |
| 5,876,048 | A | 3/1999 | Lee |
| 5,887,745 | A | 3/1999 | Wood |
| 5,896,962 | A | 4/1999 | Smith et al. |
| 5,901,571 | A | 5/1999 | Whaley |
| 5,904,269 | A | 5/1999 | Wolff |
| D410,387 | S | 6/1999 | Jacques |
| 5,924,303 | A | 7/1999 | Hodosh |
| 5,933,929 | A | 8/1999 | Kawakami et al. |
| 5,934,716 | A | 8/1999 | Koveal et al. |
| 5,940,940 | A | 8/1999 | Tanikoshi et al. |
| 5,950,368 | A | 9/1999 | Bradford |
| 5,956,805 | A | 9/1999 | Huang |
| 5,957,321 | A | 9/1999 | Jones |
| D414,673 | S | 10/1999 | Dickinson et al. |
| 5,971,218 | A | 10/1999 | Le |
| 5,975,334 | A | 11/1999 | Mayo |
| 5,984,064 | A | 11/1999 | Byington |
| 5,984,326 | A | 11/1999 | Abraham et al. |

(56) References Cited

U.S. PATENT DOCUMENTS

| | | | |
|---|---|---|---|
| 5,984,382 | A | 11/1999 | Bourne et al. |
| 5,988,658 | A | 11/1999 | Ritchie et al. |
| 6,015,072 | A | 1/2000 | Young |
| D419,767 | S | 2/2000 | Richardson et al. |
| D419,768 | S | 2/2000 | Richardson et al. |
| D420,221 | S | 2/2000 | Williams et al. |
| 6,039,205 | A | 3/2000 | Flink |
| 6,047,976 | A | 4/2000 | Wang |
| 6,050,373 | A | 4/2000 | Wonka et al. |
| D425,301 | S | 5/2000 | Sagol |
| 6,070,888 | A | 6/2000 | Wang |
| 6,079,083 | A | 6/2000 | Akashi |
| 6,079,754 | A | 6/2000 | Alexy |
| D427,767 | S | 7/2000 | Young |
| D427,882 | S | 7/2000 | Wytcherley et al. |
| D428,254 | S | 7/2000 | Alexander-Katz |
| D428,698 | S | 8/2000 | Cheng |
| 6,105,767 | A | 8/2000 | Vasudeva |
| 6,129,231 | A | 10/2000 | Hsiao et al. |
| 6,135,253 | A | 10/2000 | Weissman et al. |
| 6,152,501 | A | 11/2000 | Magi et al. |
| D435,780 | S | 1/2001 | Tieu |
| 6,167,994 | B1 | 1/2001 | Kuo et al. |
| 6,170,122 | B1 | 1/2001 | Kuo |
| 6,176,499 | B1 | 1/2001 | Conrado et al. |
| 6,176,559 | B1 | 1/2001 | Tiramani et al. |
| 6,179,176 | B1 | 1/2001 | Saggese et al. |
| D440,118 | S | 4/2001 | Claffy et al. |
| D441,954 | S | 5/2001 | Parker |
| 6,224,258 | B1 | 5/2001 | Dodson |
| 6,234,287 | B1 | 5/2001 | Pfeiffer |
| 6,244,064 | B1 | 6/2001 | Powell et al. |
| 6,244,066 | B1 | 6/2001 | LaRose |
| 6,244,458 | B1 | 6/2001 | Frysinger et al. |
| 6,247,203 | B1 | 6/2001 | Kuo |
| 6,247,328 | B1 | 6/2001 | Mogil |
| 6,260,240 | B1 | 7/2001 | Akashi et al. |
| 6,279,971 | B1 | 8/2001 | Dessenberger, Jr. |
| 6,289,554 | B1 | 9/2001 | Wang |
| 6,289,684 | B1 | 9/2001 | Guidry, II et al. |
| D449,163 | S | 10/2001 | Dahlen et al. |
| 6,305,185 | B1 | 10/2001 | Sloan |
| D451,278 | S | 12/2001 | Cooper |
| 6,338,586 | B1 | 1/2002 | Kuo |
| 6,343,815 | B1 | 2/2002 | Poe |
| D454,292 | S | 3/2002 | Plummer et al. |
| 6,353,978 | B1 | 3/2002 | Kawahara et al. |
| 6,357,080 | B1 | 3/2002 | Tsai |
| 6,360,400 | B1 | 3/2002 | Chang |
| 6,363,739 | B1 | 4/2002 | Hodosh et al. |
| 6,367,602 | B1 | 4/2002 | Chang |
| 6,371,320 | B2 | 4/2002 | Sagol |
| 6,371,346 | B1 | 4/2002 | Sharma |
| 6,375,237 | B1 | 4/2002 | Koenig |
| D457,724 | S | 5/2002 | Och |
| D457,725 | S | 5/2002 | Parsons |
| 6,389,645 | B1 | 5/2002 | Polidoro |
| 6,398,272 | B1 | 6/2002 | Plummer et al. |
| 6,401,308 | B1 | 6/2002 | Kawahara |
| 6,422,386 | B1 | 7/2002 | Wiese et al. |
| 6,427,475 | B1 | 8/2002 | DeFelice et al. |
| 6,427,501 | B2 | 8/2002 | Ramsauer |
| D462,519 | S | 9/2002 | Gaydos et al. |
| 6,446,382 | B1 | 9/2002 | Cloutier et al. |
| 6,446,988 | B1 | 9/2002 | Kho |
| D464,196 | S | 10/2002 | Parker |
| D464,485 | S | 10/2002 | Sward et al. |
| 6,467,779 | B1 | 10/2002 | Mills |
| 6,478,463 | B2 | 11/2002 | Snider |
| 6,481,239 | B2 | 11/2002 | Hodosh et al. |
| D466,439 | S | 12/2002 | Wagner et al. |
| D467,424 | S | 12/2002 | Hardigg et al. |
| D467,425 | S | 12/2002 | Hardigg et al. |
| D467,426 | S | 12/2002 | Hardigg et al. |
| 6,497,311 | B2 | 12/2002 | Tiramani et al. |
| 6,497,438 | B1 | 12/2002 | Holub et al. |
| 6,499,574 | B1 | 12/2002 | Anthony |
| 6,502,677 | B1 | 1/2003 | Tiramani et al. |
| 6,508,389 | B1 | 1/2003 | Ripoyla et al. |
| 6,520,514 | B2 | 2/2003 | Clegg |
| D471,711 | S | 3/2003 | Addison |
| 6,527,309 | B1 | 3/2003 | Gaydos et al. |
| 6,532,624 | B1 | 3/2003 | Yang |
| D472,431 | S | 4/2003 | Spence, Jr. |
| 6,543,096 | B2 | 4/2003 | Settelmayer et al. |
| 6,547,218 | B2 | 4/2003 | Landy |
| 6,547,289 | B1 | 4/2003 | Greenheck et al. |
| 6,550,592 | B1 | 4/2003 | Godshaw et al. |
| 6,554,327 | B1 | 4/2003 | Riley |
| D474,649 | S | 5/2003 | Spence, Jr. |
| 6,574,983 | B2 | 6/2003 | Smith et al. |
| 6,585,090 | B2 | 7/2003 | Harvey |
| D477,916 | S | 8/2003 | Nykoluk |
| D478,782 | S | 8/2003 | Li |
| 6,612,411 | B2 | 9/2003 | Nykoluk et al. |
| 6,619,448 | B1 | 9/2003 | Wang |
| D481,293 | S | 10/2003 | Ayrest |
| 6,637,077 | B2 | 10/2003 | Doty |
| 6,637,562 | B2 | 10/2003 | Oh |
| D482,593 | S | 11/2003 | Wolf |
| 6,640,397 | B1 | 11/2003 | Gipson |
| 6,646,864 | B2 | 11/2003 | Richardson |
| D484,004 | S | 12/2003 | Lee |
| 6,658,903 | B1 | 12/2003 | McShane et al. |
| 6,679,358 | B2 | 1/2004 | Be |
| 6,679,359 | B2 | 1/2004 | Pfeiffer |
| 6,691,451 | B1 | 2/2004 | Keenan |
| D487,348 | S | 3/2004 | Fenton et al. |
| 6,698,608 | B2 | 3/2004 | Parker et al. |
| 6,718,559 | B1 | 4/2004 | Davidson |
| D489,531 | S | 5/2004 | Oh |
| D489,595 | S | 5/2004 | Gleichauf et al. |
| 6,736,265 | B2 | 5/2004 | Kipper et al. |
| D490,980 | S | 6/2004 | Concari |
| D491,797 | S | 6/2004 | Eriksson |
| D492,184 | S | 6/2004 | Parker et al. |
| 6,755,448 | B2 | 6/2004 | Jackson et al. |
| D493,286 | S | 7/2004 | Concari |
| 6,757,942 | B2 | 7/2004 | Matsui et al. |
| 6,761,366 | B1 | 7/2004 | Klemmensen et al. |
| 6,779,681 | B2 | 8/2004 | Doerfler et al. |
| 6,789,692 | B2 | 9/2004 | Prezelin |
| 6,793,096 | B1 | 9/2004 | Seok |
| D497,480 | S | 10/2004 | Drew et al. |
| D498,053 | S | 11/2004 | Nordstrom et al. |
| D498,054 | S | 11/2004 | Moon |
| 6,821,019 | B2 | 11/2004 | Mogil |
| D500,598 | S | 1/2005 | Ramos |
| 6,877,189 | B2 | 4/2005 | Simonson et al. |
| 6,883,208 | B1 | 4/2005 | Huang |
| D505,011 | S | 5/2005 | Einav |
| 6,895,789 | B2 | 5/2005 | Masseth, Jr. et al. |
| D508,376 | S | 8/2005 | Bhavnani |
| 6,929,145 | B2 | 8/2005 | Shepler |
| 6,955,381 | B2 | 10/2005 | Parker et al. |
| 6,981,780 | B2 | 1/2006 | Einav |
| 6,983,946 | B2 | 1/2006 | Sullivan et al. |
| D515,362 | S | 2/2006 | Chan |
| D517,947 | S | 3/2006 | Hollingworth et al. |
| 7,017,740 | B2 | 3/2006 | Itzkovitch |
| 7,028,730 | B2 | 4/2006 | Pace et al. |
| D520,237 | S | 5/2006 | Cheng |
| 7,040,115 | B1 | 5/2006 | Lopez et al. |
| D522,751 | S | 6/2006 | Irwin et al. |
| D522,811 | S | 6/2006 | Martinez et al. |
| D523,242 | S | 6/2006 | Hardigg et al. |
| D523,634 | S | 6/2006 | Dost et al. |
| 7,066,311 | B2 | 6/2006 | O'Shea |
| D525,714 | S | 7/2006 | Ueda |
| 7,082,641 | B1 | 8/2006 | Jung et al. |
| 7,093,699 | B2 | 8/2006 | Yu |
| D528,800 | S | 9/2006 | Liu et al. |
| D530,095 | S | 10/2006 | Herzberg |
| 7,162,890 | B2 | 1/2007 | Mogil et al. |

(56) References Cited

U.S. PATENT DOCUMENTS

D537,251 S 2/2007 Musgrove
7,171,731 B1 2/2007 Borcherding
D539,543 S 4/2007 Wu
D540,540 S 4/2007 Szyf et al.
D540,651 S 4/2007 Wolf, V
D540,652 S 4/2007 Wolf, V
D544,211 S 6/2007 Herzberg
7,237,660 B2 7/2007 Wu
7,246,704 B2 7/2007 Brunson et al.
7,246,718 B2 7/2007 Einav et al.
D552,352 S 10/2007 Lin
D553,857 S 10/2007 Pendergraph et al.
7,284,393 B1 10/2007 Macmillan
7,284,763 B1 10/2007 King
D555,902 S 11/2007 Pendergraph et al.
7,296,434 B2 11/2007 Scroggs
7,306,243 B2 12/2007 Van Horn et al.
7,309,106 B2 12/2007 Stallman
D562,646 S 2/2008 Lown et al.
7,334,680 B2 2/2008 Cunningham et al.
7,334,802 B2 2/2008 Kaplan
D563,101 S 3/2008 Kuchler
7,344,028 B2 3/2008 Hanson
D566,479 S 4/2008 Kabalin
7,367,451 B2 5/2008 Pendergraph et al.
7,370,891 B1 5/2008 Schmitt et al.
D570,601 S 6/2008 Drew et al.
D570,603 S 6/2008 Wu et al.
7,387,350 B2 6/2008 Killinger et al.
D572,577 S 7/2008 Hatton
7,397,674 B2 7/2008 Schlack
D574,150 S 8/2008 Ross
D574,667 S 8/2008 Grabijas, III et al.
D575,059 S 8/2008 Cappiello et al.
7,415,794 B1 8/2008 Thompson
7,418,311 B1 8/2008 Lagassey et al.
D578,758 S 10/2008 Stevens et al.
D579,202 S 10/2008 Grenier et al.
7,434,410 B2 10/2008 Ford
7,441,641 B2 10/2008 Beakey
D581,161 S 11/2008 Tong
D582,678 S 12/2008 Rekuc et al.
7,458,481 B2 12/2008 Yuen
7,461,871 B2 12/2008 Vauchel
7,475,782 B2 1/2009 Lombardi
D587,902 S 3/2009 Yoneno
7,503,439 B2 3/2009 O'Shea et al.
D590,694 S 4/2009 Stuckey
7,516,520 B2 4/2009 Kelaher et al.
7,516,842 B2 4/2009 Gu
D591,511 S 5/2009 Wu
7,530,405 B2 5/2009 Kollath et al.
7,533,782 B2 5/2009 Parker et al.
7,540,364 B2 6/2009 Sanderson
7,549,652 B2 6/2009 Wu
D596,400 S 7/2009 Chu et al.
D597,652 S 8/2009 Tang
7,568,739 B2 8/2009 Lee
7,571,915 B1 8/2009 Simmons
D600,912 S 9/2009 Brunner
7,581,656 B2 9/2009 Gnepper et al.
D601,801 S 10/2009 Perez
D602,252 S 10/2009 Ehret
7,604,290 B1 10/2009 Giordano
7,607,540 B2 10/2009 Ballard
D603,165 S 11/2009 Losiewicz
D605,896 S 12/2009 Zalewski et al.
D607,697 S 1/2010 Whitlock et al.
D608,159 S 1/2010 Whitlock et al.
D608,601 S 1/2010 Whitlock et al.
D610,349 S 2/2010 Ehret
7,658,269 B2 2/2010 Wu
7,669,436 B2 3/2010 Mogil et al.
7,688,584 B1 3/2010 Becklin
D613,560 S 4/2010 Robichaud et al.
D614,404 S 4/2010 Brunner
7,703,588 B2 4/2010 Chiang
7,722,204 B1 5/2010 Sandberg
D617,561 S 6/2010 Salerno-Tortora
7,735,261 B2 6/2010 Sellati
D618,966 S 7/2010 Koehler et al.
D619,423 S 7/2010 Koehler et al.
D619,854 S 7/2010 Koehler et al.
D619,855 S 7/2010 Koehler et al.
7,748,232 B2 7/2010 Kang
D624,315 S 9/2010 Amatrudo
7,806,287 B2 10/2010 Rouns
D626,451 S 11/2010 Helwig et al.
D627,162 S 11/2010 Weng
D627,199 S 11/2010 Pruchnicki
7,841,207 B2 11/2010 Mogil et al.
D629,200 S 12/2010 Turella-Yuan et al.
7,854,321 B2 12/2010 Twig et al.
D630,435 S 1/2011 Brunner
D630,851 S 1/2011 Landau et al.
7,861,552 B1 1/2011 Hughes
7,861,834 B2 1/2011 Gorga et al.
7,874,047 B2 1/2011 Breeden
7,874,408 B2 1/2011 Suppancig
D633,300 S 3/2011 Fair
D634,545 S 3/2011 Fair
7,909,148 B1 3/2011 Miller et al.
D635,366 S 4/2011 Luburic
D636,292 S 4/2011 Brown
7,922,052 B2 4/2011 Podschus
D637,811 S 5/2011 Hong
7,937,884 B1 5/2011 Naylor et al.
7,959,194 B2 6/2011 Mahoney
D640,869 S 7/2011 Katz et al.
D642,379 S 8/2011 Buller
D643,624 S 8/2011 Hong
D643,629 S 8/2011 Sofy et al.
7,997,591 B2 8/2011 Arthur
D644,434 S 9/2011 Miles et al.
D644,435 S 9/2011 Weng
8,016,153 B2 9/2011 Boenig et al.
D646,528 S 10/2011 Stallman et al.
8,037,983 B2 10/2011 Leung
D648,538 S 11/2011 Reinhart et al.
D649,786 S 12/2011 Lipfert et al.
D650,585 S 12/2011 Jamison et al.
D651,860 S 1/2012 Nie
D652,216 S 1/2012 Fair
8,091,731 B2 1/2012 Kidd et al.
8,096,152 B2 1/2012 Wagh et al.
8,096,442 B2 1/2012 Ramundi
8,099,836 B2 1/2012 Breeden et al.
D654,694 S 2/2012 Wu
8,141,211 B2 3/2012 Weyer et al.
D659,395 S 5/2012 Sijmons
D660,000 S 5/2012 Peterson et al.
8,167,166 B2 5/2012 Kidd et al.
8,176,749 B2 * 5/2012 LaMere .................... F25D 3/08
62/457.7
8,191,747 B2 6/2012 Pruchnicki
8,210,353 B2 7/2012 Epicureo
8,214,972 B2 7/2012 Lai
D664,891 S 8/2012 Takeda
D665,166 S 8/2012 Khalifa et al.
D666,002 S 8/2012 Lai
8,245,868 B2 8/2012 Ikeda et al.
8,251,113 B2 8/2012 Baxter
8,251,245 B2 8/2012 DiPietro et al.
D666,831 S 9/2012 Kinskey et al.
D666,832 S 9/2012 Kinskey et al.
D667,697 S 9/2012 Shah
8,256,156 B1 9/2012 Burgoyne, Jr.
D668,049 S 10/2012 Buller
8,286,828 B2 10/2012 Schafer
8,287,009 B2 10/2012 Dane et al.
8,292,119 B2 10/2012 Kenneally
8,297,464 B2 10/2012 Grenier et al.
D670,502 S 11/2012 Wu
D673,024 S 12/2012 Caffin et al.

(56) References Cited

U.S. PATENT DOCUMENTS

| | | | |
|---|---|---|---|
| 8,328,247 | B2 | 12/2012 | Tonelli |
| 8,336,708 | B2 | 12/2012 | Potterfield et al. |
| D674,192 | S | 1/2013 | Li |
| 8,342,580 | B2 | 1/2013 | Cowie et al. |
| 8,378,323 | B1 | 2/2013 | Spann et al. |
| 8,382,171 | B2 | 2/2013 | Williams |
| D677,896 | S | 3/2013 | Wu |
| D678,749 | S | 3/2013 | Tung |
| D678,750 | S | 3/2013 | Tung |
| 8,424,930 | B2 | 4/2013 | Matsubara et al. |
| 8,430,284 | B2 | 4/2013 | Broadbent et al. |
| D681,337 | S | 5/2013 | Wu |
| 8,459,058 | B2 | 6/2013 | Mogil |
| 8,459,422 | B1 | 6/2013 | Efron |
| 8,459,487 | B2 | 6/2013 | Sharma et al. |
| 8,459,495 | B2 | 6/2013 | Koenig et al. |
| D685,186 | S | 7/2013 | Massaud |
| 8,474,098 | B1 | 7/2013 | Yang |
| 8,484,813 | B2 | 7/2013 | Taniguchi et al. |
| 8,490,413 | B2 | 7/2013 | Blackway et al. |
| 8,496,133 | B2 | 7/2013 | Mizukoshi et al. |
| D688,589 | S | 8/2013 | Hung et al. |
| 8,505,729 | B2 | 8/2013 | Sosnovsky et al. |
| 8,517,211 | B2 | 8/2013 | Brown et al. |
| D688,920 | S | 9/2013 | Manley et al. |
| D690,939 | S | 10/2013 | Lintz et al. |
| D691,808 | S | 10/2013 | Wu |
| 8,544,648 | B2 | 10/2013 | Cleveland et al. |
| 8,561,264 | B2 | 10/2013 | Hasegawa et al. |
| 8,561,269 | B2 | 10/2013 | LeCompte et al. |
| 8,567,631 | B2 | 10/2013 | Brunner |
| 8,567,796 | B2 | 10/2013 | Bar-Erez et al. |
| D692,657 | S | 11/2013 | Hyma et al. |
| 8,572,821 | B2 | 11/2013 | Hasegawa |
| 8,573,399 | B2 | 11/2013 | Ulmer et al. |
| 8,590,704 | B2 | 11/2013 | Koenig et al. |
| 8,590,724 | B2 | 11/2013 | Kreidler et al. |
| 8,596,485 | B2 | 12/2013 | Lindsay |
| 8,596,487 | B1 | 12/2013 | Su |
| 8,601,838 | B2 | 12/2013 | Hansen et al. |
| 8,616,600 | B2 | 12/2013 | Owen |
| D697,717 | S | 1/2014 | Santy |
| 8,622,235 | B2 | 1/2014 | Suchecki |
| 8,627,972 | B2 | 1/2014 | Thomas |
| D699,100 | S | 2/2014 | Moreau et al. |
| D699,438 | S | 2/2014 | Mathieu et al. |
| 8,640,937 | B2 | 2/2014 | Pruchnicki |
| 8,677,661 | B2 | 3/2014 | Michels et al. |
| 8,678,227 | B2 | 3/2014 | Patstone |
| D701,697 | S | 4/2014 | Sabbag et al. |
| D703,435 | S | 4/2014 | Wile et al. |
| 8,683,660 | B2 | 4/2014 | Hasegawa et al. |
| 8,689,396 | B2 | 4/2014 | Wolfe et al. |
| 8,708,351 | B2 | 4/2014 | Kinskey et al. |
| D704,935 | S | 5/2014 | Lintz et al. |
| 8,714,568 | B2 | 5/2014 | Allam et al. |
| 8,740,010 | B1 | 6/2014 | Page |
| 8,757,642 | B2 | 6/2014 | Arthur et al. |
| 8,757,643 | B2 | 6/2014 | Arthur et al. |
| 8,757,696 | B2 | 6/2014 | Schneider |
| D709,336 | S | 7/2014 | Liebenthal |
| D709,696 | S | 7/2014 | Wu |
| 8,763,848 | B2 | 7/2014 | Carey |
| 8,763,851 | B2 | 7/2014 | Jiang et al. |
| 8,770,426 | B2 | 7/2014 | Arnett et al. |
| 8,777,045 | B2 | 7/2014 | Mitchell et al. |
| D710,099 | S | 8/2014 | Horovitz et al. |
| D710,610 | S | 8/2014 | Sijmons et al. |
| D710,614 | S | 8/2014 | Meersschaert |
| D711,104 | S | 8/2014 | Lai |
| D711,646 | S | 8/2014 | Ke |
| D711,647 | S | 8/2014 | Chen |
| D711,648 | S | 8/2014 | Chen |
| D711,649 | S | 8/2014 | Chen |
| D712,143 | S | 9/2014 | Chehebar |
| D714,056 | S | 9/2014 | Weng |
| D714,057 | S | 9/2014 | Hou |
| D714,064 | S | 9/2014 | Kim |
| 8,844,749 | B2 | 9/2014 | Manahan et al. |
| 8,844,950 | B2 | 9/2014 | Greene et al. |
| 8,850,666 | B2 | 10/2014 | Hasegawa et al. |
| 8,851,282 | B2 | 10/2014 | Brunner |
| 8,851,289 | B2 | 10/2014 | Shi |
| 8,857,654 | B2 | 10/2014 | Mogil et al. |
| 8,863,975 | B2 | 10/2014 | McCanless |
| 8,864,185 | B2 | 10/2014 | Do |
| 8,864,189 | B2 | 10/2014 | Fournie et al. |
| D717,152 | S | 11/2014 | Weinerman et al. |
| D718,051 | S | 11/2014 | Frahm et al. |
| 8,875,877 | B2 | 11/2014 | Cottle et al. |
| 8,875,888 | B2 | 11/2014 | Koenig et al. |
| 8,875,934 | B2 | 11/2014 | Deka |
| 8,881,930 | B2 | 11/2014 | Banik |
| 8,887,515 | B2 | 11/2014 | Patstone |
| D718,936 | S | 12/2014 | Sanz et al. |
| D719,351 | S | 12/2014 | Hailwood |
| 8,905,412 | B2 | 12/2014 | Fux |
| 8,910,788 | B2 | 12/2014 | Roach et al. |
| 8,910,819 | B2 | 12/2014 | Seiders |
| 8,919,596 | B2 | 12/2014 | Carino |
| D720,536 | S | 1/2015 | Hsu |
| D720,599 | S | 1/2015 | Weinerman et al. |
| D720,928 | S | 1/2015 | Roncato |
| 8,925,752 | B2 | 1/2015 | Smith |
| D722,771 | S | 2/2015 | Wu |
| D722,860 | S | 2/2015 | Linares |
| 8,944,476 | B1 | 2/2015 | Henderson |
| 8,960,430 | B2 | 2/2015 | Roach et al. |
| 8,960,735 | B2 | 2/2015 | Michael et al. |
| D723,806 | S | 3/2015 | Salmon |
| D724,323 | S | 3/2015 | Wang |
| 8,979,100 | B2 | 3/2015 | Bensman et al. |
| 8,979,101 | B2 | 3/2015 | Primiano |
| 8,979,144 | B2 | 3/2015 | Paugh et al. |
| 8,985,326 | B2 | 3/2015 | Halsne et al. |
| 8,985,385 | B2 | 3/2015 | Parker et al. |
| D725,907 | S | 4/2015 | Yu |
| D727,620 | S | 4/2015 | Tonelli |
| 9,004,274 | B2 | 4/2015 | Thornberg |
| 9,004,548 | B2 | 4/2015 | Joret et al. |
| D728,933 | S | 5/2015 | Sanz et al. |
| D730,050 | S | 5/2015 | Hogan et al. |
| 9,027,751 | B2 | 5/2015 | Lee |
| D730,716 | S | 6/2015 | Weinerman et al. |
| D731,250 | S | 6/2015 | Butler et al. |
| D732,348 | S | 6/2015 | Seiders et al. |
| D732,349 | S | 6/2015 | Seiders et al. |
| D732,350 | S | 6/2015 | Seiders et al. |
| D732,823 | S | 6/2015 | Baron |
| D732,899 | S | 6/2015 | Seiders et al. |
| D732,923 | S | 6/2015 | Rechberg et al. |
| 9,045,264 | B2 | 6/2015 | Pils |
| 9,060,577 | B2 | 6/2015 | Farrelly et al. |
| 9,067,081 | B2 | 6/2015 | Roach et al. |
| D734,742 | S | 7/2015 | Fujioka |
| 9,079,595 | B2 | 7/2015 | Chen et al. |
| 9,085,403 | B2 | 7/2015 | Roach et al. |
| 9,101,186 | B2 | 8/2015 | Lai |
| 9,108,772 | B2 | 8/2015 | Hovatter |
| 9,113,686 | B1 | 8/2015 | Bishop |
| 9,114,909 | B2 | 8/2015 | Wagner |
| D738,702 | S | 9/2015 | Linares |
| 9,139,352 | B2 | 9/2015 | Seiders et al. |
| D740,557 | S | 10/2015 | Liao |
| D740,558 | S | 10/2015 | Liao |
| D741,064 | S | 10/2015 | Ramos |
| D741,600 | S | 10/2015 | Della Vecchia |
| 9,163,871 | B1 | 10/2015 | Costello |
| 9,169,678 | B2 | 10/2015 | Rozema |
| D743,171 | S | 11/2015 | Reinhart |
| 9,187,210 | B2 | 11/2015 | Zhu et al. |
| 9,193,060 | B2 | 11/2015 | Ben-Gigi |
| D744,750 | S | 12/2015 | Sabbag et al. |
| 9,198,492 | B2 | 12/2015 | Chehebar |

(56) References Cited

U.S. PATENT DOCUMENTS 9,199,370 B2 12/2015 Crull
9,199,657 B2 12/2015 Martin
9,204,699 B2 12/2015 Pickens et al.
9,205,551 B2 12/2015 Green et al.
9,211,040 B2 12/2015 Lane
9,215,918 B2 12/2015 Kao et al.
D747,639 S 1/2016 Linares
D747,950 S 1/2016 Jacobsen et al.
D747,951 S 1/2016 Jacobsen et al.
9,233,465 B2 1/2016 Lai
D748,452 S 2/2016 Jacobsen et al.
9,248,566 B2 2/2016 Horiyama et al.
9,254,901 B2 2/2016 Gill
9,259,090 B1 2/2016 Cronin
9,259,593 B2 2/2016 Roach et al.
9,259,828 B2 2/2016 Bermes
9,266,462 B2 2/2016 Miller
D750,953 S 3/2016 Jacobsen et al.
D752,344 S 3/2016 Green
9,272,820 B2 3/2016 Cowie
9,278,704 B2 3/2016 Cates
9,290,297 B2 3/2016 Overath
D752,862 S 4/2016 Riddiford et al.
9,307,840 B2 4/2016 Restrepo et al.
9,322,192 B2 4/2016 Burd
D755,518 S 5/2016 Sijmons
9,327,887 B2 5/2016 Farentinos et al.
9,340,224 B2 5/2016 Yoder et al.
9,341,003 B2 5/2016 Ely et al.
9,341,403 B2 5/2016 Conrad et al.
9,346,616 B2 5/2016 Foster
9,351,550 B2 5/2016 Arthur et al.
D759,971 S 6/2016 Riddiford et al.
9,359,798 B2 6/2016 Greenwood et al.
9,376,050 B1 6/2016 Gill
9,387,963 B2 7/2016 McBroom et al.
9,393,684 B2 7/2016 Christopher et al.
D762,471 S 8/2016 Green et al.
D762,977 S 8/2016 Xu
9,408,449 B1 8/2016 Tsai
9,415,787 B2 8/2016 Mericle
9,427,058 B2 8/2016 Boglione
D765,397 S 9/2016 Reinhart
D765,406 S 9/2016 Faibish
D765,407 S 9/2016 Reinhart
D765,408 S 9/2016 Reinhart
D765,409 S 9/2016 Reinhart
D765,410 S 9/2016 Reinhart
D765,411 S 9/2016 Reinhart
D765,973 S 9/2016 Tonelli et al.
D767,277 S 9/2016 Faibish
9,435,578 B2 9/2016 Calderon et al.
9,443,366 B2 9/2016 Rayner
D768,464 S 10/2016 Hatton
D768,985 S 10/2016 Morszeck
9,468,277 B2 10/2016 King
D770,179 S 11/2016 Menirom
D771,381 S 11/2016 Sosnovsky et al.
D772,577 S 11/2016 Muchin et al.
D773,821 S 12/2016 Reinhart
D773,901 S 12/2016 Marret
9,511,491 B2 12/2016 Brunner
D776,429 S 1/2017 Zagorski et al.
D776,932 S 1/2017 Reinhart
D776,934 S 1/2017 Braendle
D777,441 S 1/2017 Li
D777,530 S 1/2017 Marret
D778,054 S 2/2017 Li
D778,707 S 2/2017 Tonelli
D779,201 S 2/2017 Beilman et al.
9,566,704 B1 2/2017 Stoikos et al.
9,567,784 B2 2/2017 Defrance et al.
D780,523 S 3/2017 Jacobsen
D780,524 S 3/2017 Jacobsen
D780,525 S 3/2017 Jacobsen
D784,017 S 4/2017 Hsieh
9,622,547 B2 4/2017 Seader
D785,937 S 5/2017 Morszeck
D786,561 S 5/2017 Seiders et al.
9,637,294 B2 5/2017 Kinskey
9,655,418 B2 5/2017 Chien et al.
D788,460 S 6/2017 Morszeck
D788,461 S 6/2017 Tonelli
D789,690 S 6/2017 Foley et al.
D789,766 S 6/2017 Tod, Jr. et al.
9,669,986 B1 6/2017 Evans
D791,477 S 7/2017 Liu
D792,094 S 7/2017 Stoikos et al.
D792,105 S 7/2017 Reinhart
D792,708 S 7/2017 Tazawa
D793,089 S 8/2017 Jackson
D796,199 S 9/2017 Law
D796,838 S 9/2017 Sijmons et al.
D797,518 S 9/2017 Pavia, III
9,770,084 B1 9/2017 Shiekh
D802,924 S 11/2017 Mahanavanont
9,809,376 B2 11/2017 Mitchell et al.
D804,174 S 12/2017 Morszeck
D804,818 S 12/2017 Sadler
D804,819 S 12/2017 Faibish et al.
D805,772 S 12/2017 Oshima
D805,851 S 12/2017 Sullivan et al.
9,839,272 B2 12/2017 Licciardino
9,848,681 B1 12/2017 Chen
9,849,901 B2 12/2017 Jackman
D806,483 S 1/2018 Stanford et al.
D807,123 S 1/2018 Carey et al.
D807,124 S 1/2018 Carey et al.
D808,164 S 1/2018 Summers
D808,653 S 1/2018 Rayeski et al.
D808,655 S 1/2018 Seiders et al.
D808,730 S 1/2018 Sullivan et al.
9,876,522 B2 1/2018 Huang et al.
9,878,841 B2 1/2018 Holderness et al.
D809,293 S 2/2018 Virassamy et al.
D809,295 S 2/2018 Ehret
D810,432 S 2/2018 Ballou et al.
D810,433 S 2/2018 Ballou et al.
D810,434 S 2/2018 Xu
D811,084 S 2/2018 Ballou et al.
D811,090 S 2/2018 Karl
9,883,724 B2 2/2018 Woode
9,894,971 B2 2/2018 Scicluna et al.
9,901,153 B2 2/2018 Nash
D811,742 S 3/2018 Ballou et al.
D811,744 S 3/2018 Ballou et al.
D812,909 S 3/2018 Morszeck
9,913,518 B2 3/2018 Su
D814,187 S 4/2018 Caglar
D815,787 S 4/2018 Seiders et al.
D815,831 S 4/2018 Tonelli
D815,919 S 4/2018 DeFrancia
D816,337 S 5/2018 Cheng
D816,492 S 5/2018 Reinhart
D817,722 S 5/2018 Bradley
D818,712 S 5/2018 Fleming et al.
9,968,170 B2 5/2018 Morszeck
D819,331 S 6/2018 Ballou et al.
D820,049 S 6/2018 Ahlstrom et al.
9,999,284 B1 6/2018 Tan
D821,824 S 7/2018 Rane et al.
D821,825 S 7/2018 Sullivan et al.
D823,065 S 7/2018 Eichinger et al.
D824,168 S 7/2018 Morszeck
10,028,561 B2 7/2018 Vecellio
D824,674 S 8/2018 Seiders et al.
D824,731 S 8/2018 Sullivan et al.
10,058,151 B2 8/2018 Morszeck
D827,304 S 9/2018 Tao
D828,028 S 9/2018 Seiders et al.
D828,029 S 9/2018 Seiders et al.
D828,108 S 9/2018 Bowling
D828,112 S 9/2018 Furneaux et al.
D829,244 S 9/2018 Sullivan et al.

(56) References Cited

U.S. PATENT DOCUMENTS

| | | | |
|---|---|---|---|
| 10,080,412 | B2 | 9/2018 | Hartmann et al. |
| D830,132 | S | 10/2018 | Sullivan et al. |
| D830,133 | S | 10/2018 | Sullivan et al. |
| D830,134 | S | 10/2018 | Sullivan et al. |
| 10,086,745 | B2 | 10/2018 | Gill |
| 10,088,144 | B1 | 10/2018 | Sandberg |
| D832,653 | S | 11/2018 | Waskow et al. |
| 10,124,742 | B2 | 11/2018 | Martinez et al. |
| 10,138,048 | B2 | 11/2018 | Mitchell et al. |
| D834,819 | S | 12/2018 | Burek et al. |
| D835,470 | S | 12/2018 | Seiders et al. |
| D835,472 | S | 12/2018 | Seiders et al. |
| D835,473 | S | 12/2018 | Jacobsen |
| D835,946 | S | 12/2018 | Seiders et al. |
| 10,143,282 | B2 | 12/2018 | Seiders et al. |
| 10,159,312 | B2 | 12/2018 | Ito |
| 10,160,471 | B2 | 12/2018 | Yahav et al. |
| D836,993 | S | 1/2019 | Meda et al. |
| D836,996 | S | 1/2019 | Jacobsen |
| D836,997 | S | 1/2019 | Jacobsen |
| D836,998 | S | 1/2019 | Jacobsen |
| D836,999 | S | 1/2019 | Jacobsen |
| D837,001 | S | 1/2019 | Jacobsen |
| D837,515 | S | 1/2019 | Shpitzer |
| D837,611 | S | 1/2019 | Lane et al. |
| D838,208 | S | 1/2019 | Hirabayashi et al. |
| D838,983 | S | 1/2019 | Seiders et al. |
| D838,984 | S | 1/2019 | Seiders et al. |
| D839,094 | S | 1/2019 | Giraud et al. |
| D839,682 | S | 2/2019 | Jacobsen |
| D840,150 | S | 2/2019 | Seiders et al. |
| D840,194 | S | 2/2019 | Furneaux et al. |
| D842,048 | S | 3/2019 | Wells |
| D843,114 | S | 3/2019 | Sanz |
| 10,219,601 | B2 | 3/2019 | Selvi |
| D844,325 | S | 4/2019 | Nelson |
| D844,386 | S | 4/2019 | Ahlstrom et al. |
| 10,272,934 | B2 | 4/2019 | DeFrancia |
| D848,219 | S | 5/2019 | Munie et al. |
| D848,220 | S | 5/2019 | Munie et al. |
| D848,221 | S | 5/2019 | Munie et al. |
| D848,222 | S | 5/2019 | Munie et al. |
| D848,223 | S | 5/2019 | Munie et al. |
| D848,744 | S | 5/2019 | Axelbaum |
| D848,798 | S | 5/2019 | Munie et al. |
| D849,486 | S | 5/2019 | Munie et al. |
| 10,292,473 | B2 | 5/2019 | Meersschaert |
| D850,796 | S | 6/2019 | Ricca |
| D851,401 | S | 6/2019 | Zhang |
| 10,314,377 | B2 | 6/2019 | Stephens |
| D852,504 | S | 7/2019 | Ben-David |
| D853,729 | S | 7/2019 | Axelbaum |
| D854,826 | S | 7/2019 | Tonelli |
| 10,334,935 | B2 | 7/2019 | Chung |
| 10,350,746 | B2 | 7/2019 | Martinez et al. |
| 10,351,330 | B2 | 7/2019 | Smith et al. |
| 10,357,874 | B2 | 7/2019 | Engvall et al. |
| D857,386 | S | 8/2019 | Shpitzer |
| 10,376,031 | B1 | 8/2019 | Majhess |
| 10,378,569 | B2 | 8/2019 | Jensen et al. |
| D858,986 | S | 9/2019 | Shalgi |
| D859,842 | S | 9/2019 | Frank |
| D860,789 | S | 9/2019 | Rayeski et al. |
| 10,399,748 | B2 | 9/2019 | Reinhart |
| 10,401,075 | B2 | 9/2019 | Bond |
| D861,535 | S | 10/2019 | Venables |
| 10,443,918 | B2 | 10/2019 | Li et al. |
| D869,160 | S | 12/2019 | Seiders et al. |
| D869,244 | S | 12/2019 | Ellison et al. |
| D869,848 | S | 12/2019 | Wu |
| D871,767 | S | 1/2020 | Harrison |
| D872,478 | S | 1/2020 | Seiders et al. |
| D872,485 | S | 1/2020 | Seiders et al. |
| D873,020 | S | 1/2020 | Seiders et al. |
| D873,024 | S | 1/2020 | Usui |
| D874,139 | S | 2/2020 | Rubi et al. |
| D874,140 | S | 2/2020 | Rubio et al. |
| D874,141 | S | 2/2020 | Rubio et al. |
| 10,568,395 | B2 | 2/2020 | Hayashi |
| 10,568,400 | B2 | 2/2020 | Shechter et al. |
| D876,833 | S | 3/2020 | Brunner et al. |
| D876,835 | S | 3/2020 | Libman et al. |
| D878,054 | S | 3/2020 | Reinhart et al. |
| D878,929 | S | 3/2020 | Rubio et al. |
| 10,595,608 | B2 | 3/2020 | Korey et al. |
| D881,569 | S | 4/2020 | Rubio et al. |
| D881,578 | S | 4/2020 | Prommel et al. |
| D882,266 | S | 4/2020 | Prommel et al. |
| D882,267 | S | 4/2020 | Prommel et al. |
| D887,788 | S | 6/2020 | Meda et al. |
| D887,789 | S | 6/2020 | Seiders et al. |
| D893,876 | S | 8/2020 | Van Fossen |
| D899,083 | S | 10/2020 | Rubio et al. |
| D904,829 | S | 12/2020 | Nichols et al. |
| D907,445 | S | 1/2021 | Nichols et al. |
| D909,062 | S | 2/2021 | Qian et al. |
| D912,983 | S | 3/2021 | Newson |
| D915,069 | S | 4/2021 | Tonelli |
| D920,668 | S | 6/2021 | Bonnough et al. |
| D925,299 | S | 7/2021 | Nichols et al. |
| D925,911 | S | 7/2021 | Sun |
| D927,851 | S | 8/2021 | Chasseriaux et al. |
| D929,189 | S | 8/2021 | Pennington et al. |
| D942,812 | S | 2/2022 | Luo et al. |
| D944,299 | S | 2/2022 | Astle et al. |
| D946,279 | S | 3/2022 | Seiders et al. |
| D948,292 | S | 4/2022 | Peng |
| 2002/0024189 | A1 | 2/2002 | Chen |
| 2002/0038745 | A1 | 4/2002 | Lamming |
| 2002/0074332 | A1 | 6/2002 | Sagol |
| 2002/0148694 | A1 | 10/2002 | Tong |
| 2002/0162841 | A1 | 11/2002 | Shamir et al. |
| 2002/0185871 | A1 | 12/2002 | Straka |
| 2002/0195827 | A1 | 12/2002 | Jackson et al. |
| 2003/0019705 | A1 | 1/2003 | Lau |
| 2003/0038007 | A1 | 2/2003 | Han |
| 2003/0038142 | A1 | 2/2003 | Gee |
| 2003/0106821 | A1 | 6/2003 | Bar-Erez |
| 2003/0111476 | A1 | 6/2003 | Serio |
| 2003/0136702 | A1 | 7/2003 | Redzisz et al. |
| 2004/0007604 | A1 | 1/2004 | Plzak |
| 2004/0016854 | A1 | 1/2004 | Hart |
| 2004/0025306 | A1 | 2/2004 | Coffey |
| 2004/0040967 | A1 | 3/2004 | Eiskant et al. |
| 2004/0163910 | A1 | 8/2004 | Lee |
| 2004/0178208 | A1 | 9/2004 | Leba et al. |
| 2004/0238543 | A1 | 12/2004 | Askew |
| 2004/0246695 | A1 | 12/2004 | Schlack |
| 2004/0262319 | A1 | 12/2004 | Fisher |
| 2005/0023096 | A1 | 2/2005 | Tiramani |
| 2005/0099019 | A1 | 5/2005 | Hall et al. |
| 2005/0103813 | A1 | 5/2005 | Edwards |
| 2005/0139741 | A1 | 6/2005 | Yuen |
| 2005/0150892 | A1 | 7/2005 | Miller |
| 2005/0180835 | A1 | 8/2005 | Schneider |
| 2005/0183914 | A1 | 8/2005 | Lin |
| 2005/0199628 | A1 | 9/2005 | Van Handel et al. |
| 2005/0217071 | A1 | 10/2005 | Shinner |
| 2005/0258610 | A1 | 11/2005 | Stone et al. |
| 2005/0279123 | A1 | 12/2005 | Maldonado et al. |
| 2006/0011641 | A1 | 1/2006 | Sanderson |
| 2006/0017293 | A1 | 1/2006 | Tonelli |
| 2006/0037178 | A1 | 2/2006 | Sulhoff |
| 2006/0037824 | A1 | 2/2006 | Park et al. |
| 2006/0042897 | A1 | 3/2006 | Sanderson |
| 2006/0049640 | A1 | 3/2006 | Lee |
| 2006/0180422 | A1 | 8/2006 | Lin |
| 2006/0196218 | A1 | 9/2006 | Mogil et al. |
| 2006/0213736 | A1 | 9/2006 | Godshaw |
| 2006/0213941 | A1 | 9/2006 | Sweeney |
| 2006/0225981 | A1 | 10/2006 | Lin |
| 2006/0249412 | A1 | 11/2006 | Hernandez et al. |
| 2006/0249522 | A1 | 11/2006 | Ringo |
| 2006/0276768 | A1 | 12/2006 | Miller et al. |

(56) References Cited

U.S. PATENT DOCUMENTS

2007/0039957 A1 2/2007 Shulz et al.
2007/0101754 A1 5/2007 Maldonado
2007/0158157 A1 7/2007 Krulik et al.
2007/0175898 A1 8/2007 Craft et al.
2007/0235452 A1 10/2007 Killinger et al.
2007/0261977 A1 11/2007 Sakai
2008/0001373 A1 1/2008 Vaughn
2008/0029528 A1 2/2008 Mireault
2008/0042460 A1 2/2008 Fuchs
2008/0067095 A1 3/2008 Mueller
2008/0067206 A1 3/2008 Kuhn
2008/0078637 A1 4/2008 Su
2008/0078682 A1 4/2008 Clark et al.
2008/0110892 A1 5/2008 House
2008/0116215 A1 5/2008 Chuang
2008/0128428 A1 6/2008 Beckerman
2008/0156858 A1 7/2008 Perry et al.
2008/0170388 A1 7/2008 Greil
2008/0190940 A1 8/2008 Scott
2008/0196650 A1 8/2008 Fernung
2008/0230339 A1 9/2008 Pereira
2008/0245095 A1 10/2008 Schlipman et al.
2008/0257775 A1 10/2008 Randolph
2008/0264946 A1 10/2008 Moschella et al.
2009/0009039 A1 1/2009 Mayes, Jr.
2009/0014974 A1 1/2009 VanVorst et al.
2009/0033110 A1 2/2009 Fragale
2009/0049859 A1 2/2009 Moon
2009/0078593 A1 3/2009 Patstone
2009/0080809 A1 3/2009 Pham et al.
2009/0101460 A1 4/2009 Justham et al.
2009/0114646 A1 5/2009 Whalen
2009/0114653 A1 5/2009 Schenker
2009/0120126 A1 5/2009 Mew
2009/0158770 A1 6/2009 Cohrs et al.
2009/0173744 A1 7/2009 Hassell
2009/0194541 A1 8/2009 Mayo
2009/0277905 A1 11/2009 Gillan
2010/0001013 A1 1/2010 Sommerfeld
2010/0072215 A1 3/2010 Coon
2010/0078451 A1 4/2010 Mount
2010/0108556 A1 5/2010 Claffy
2010/0133132 A1 6/2010 Allan
2010/0200784 A1 8/2010 Turner
2010/0258576 A1 10/2010 Marquez
2010/0275642 A1 11/2010 Klettner
2011/0016911 A1 1/2011 Mosby
2011/0064332 A1 3/2011 Piazza et al.
2011/0114526 A1 5/2011 Neumann et al.
2011/0119986 A1 5/2011 Sellers
2011/0121002 A1 5/2011 Stiller
2011/0127264 A1 6/2011 Whalen
2011/0132046 A1 6/2011 Tonelli
2011/0181008 A1 7/2011 Bensman et al.
2011/0182532 A1 7/2011 Baltus
2011/0186396 A1 8/2011 Sheikh
2011/0186398 A1 8/2011 Sheikh
2011/0197625 A1 8/2011 Urban et al.
2011/0203328 A1 8/2011 Vilkomirski et al.
2011/0220531 A1 9/2011 Meether et al.
2011/0226003 A1 9/2011 Chaney et al.
2011/0226785 A1 9/2011 Sakell
2012/0024896 A1 2/2012 Scobey et al.
2012/0103740 A1 5/2012 Moussatche et al.
2012/0104012 A1 5/2012 Cowie et al.
2012/0168444 A1 7/2012 Shitrit et al.
2012/0193353 A1 8/2012 Cronin et al.
2012/0247897 A1 10/2012 Sheikh
2012/0267208 A1 10/2012 D'Angelo
2012/0273506 A1 11/2012 Adams et al.
2012/0286489 A1 11/2012 Bartholomew
2012/0312708 A1 12/2012 Roehm et al.
2013/0068579 A1 3/2013 Mathieu et al.
2013/0140120 A1 6/2013 Rasmussen
2013/0168196 A1 7/2013 Stanley
2013/0175130 A1 7/2013 Liang
2013/0175276 A1 7/2013 Gleichauf et al.
2013/0248390 A1 9/2013 Roehm et al.
2013/0284619 A1 10/2013 Daley
2013/0292220 A1 11/2013 Kerley
2013/0292221 A1 11/2013 Ryan et al.
2013/0307214 A1 11/2013 Groller et al.
2013/0313058 A1 11/2013 Yoshida
2014/0027454 A1 1/2014 Banik
2014/0062042 A1 3/2014 Wagner et al.
2014/0069832 A1 3/2014 Roehm
2014/0130310 A1 5/2014 Roth
2014/0137370 A1 5/2014 Lo et al.
2014/0138384 A1 5/2014 O'Brien
2014/0151388 A1 6/2014 Culeron et al.
2014/0158028 A1 6/2014 Adams
2014/0166516 A1 6/2014 Martinez et al.
2014/0197059 A1 7/2014 Evans et al.
2014/0251864 A1 9/2014 Voeller
2014/0252010 A1 9/2014 Miller
2014/0265197 A1 9/2014 Russell et al.
2014/0271095 A1 9/2014 Umans et al.
2014/0284158 A1 9/2014 Reid
2014/0284243 A1 9/2014 Tucker
2014/0311361 A1 10/2014 Wangler
2014/0311844 A1 10/2014 Meersschaert et al.
2014/0319147 A1 10/2014 Horovitz et al.
2015/0021132 A1 1/2015 Sijmons et al.
2015/0027835 A1 1/2015 Moon
2015/0034515 A1 2/2015 Monyak et al.
2015/0069962 A1 3/2015 Dietzel et al.
2015/0089903 A1 4/2015 Carey
2015/0090551 A1 4/2015 Sikka
2015/0114024 A1 4/2015 Grepper
2015/0129569 A1 5/2015 Miller
2015/0144448 A1 5/2015 Chen
2015/0150347 A1 6/2015 Scicluna
2015/0150348 A1 6/2015 Wax
2015/0175338 A1 6/2015 Culp et al.
2015/0189963 A1 7/2015 Lai et al.
2015/0190920 A1 7/2015 Karlsson et al.
2015/0208779 A1 7/2015 Tong
2015/0209226 A1 7/2015 Priebe et al.
2015/0233630 A1 8/2015 Bond
2015/0292840 A1 10/2015 Tobin
2015/0296945 A1 10/2015 Douglas
2015/0296948 A1 10/2015 Kung
2015/0315532 A1 11/2015 Bergbohm et al.
2015/0352709 A1 12/2015 Diamond
2015/0352711 A1 12/2015 Brunner
2015/0375558 A1 12/2015 Ben-Or
2015/0375918 A1 12/2015 Holderness et al.
2016/0023837 A1 1/2016 Furneaux et al.
2016/0046417 A1 2/2016 Kromer
2016/0052682 A1 2/2016 Gunnerson et al.
2016/0083186 A1 3/2016 Wright
2016/0084454 A1 3/2016 Svitak, Sr. et al.
2016/0091239 A1 3/2016 Beland
2016/0135563 A1 5/2016 Truong
2016/0138809 A1 5/2016 Colucci et al.
2016/0150862 A1 6/2016 Tonelli
2016/0166024 A1 6/2016 Lai
2016/0183651 A1 6/2016 Tonelli
2016/0244209 A1 8/2016 Hain
2016/0251124 A1 9/2016 Arnold et al.
2016/0279840 A1 9/2016 French et al.
2016/0286912 A1 10/2016 Morszeck
2017/0079398 A1 3/2017 Reh et al.
2017/0082342 A1 3/2017 Weinberg et al.
2017/0108260 A1 4/2017 Ansted et al.
2017/0127782 A1 5/2017 Korey et al.
2017/0165829 A1 6/2017 Damberg
2017/0173781 A1 6/2017 Damberg
2017/0196332 A1 7/2017 Tong
2017/0215537 A1 8/2017 Yu
2017/0290400 A1 10/2017 Thomas
2017/0347765 A1 12/2017 Jackson et al.
2018/0035774 A1 2/2018 Pelatti
2018/0035775 A1 2/2018 Haimoff

(56) References Cited

U.S. PATENT DOCUMENTS

| | | | |
|---|---|---|---|
| 2018/0037394 A1 | 2/2018 | Seiders et al. |
| 2018/0078008 A1 | 3/2018 | Sturm |
| 2018/0087819 A1 | 3/2018 | Triska et al. |
| 2018/0087955 A1 | 3/2018 | Lu |
| 2018/0141718 A1 | 5/2018 | Ahlstrom et al. |
| 2018/0186547 A1 | 7/2018 | Morine et al. |
| 2018/0194533 A1 | 7/2018 | Bramwell |
| 2018/0325230 A1 | 11/2018 | Morszeck |
| 2018/0335241 A1 | 11/2018 | Li et al. |
| 2018/0339820 A1 | 11/2018 | Reinhart et al. |
| 2018/0354687 A1 | 12/2018 | Seiders et al. |
| 2019/0008254 A1 | 1/2019 | Newson |
| 2019/0092530 A1 | 3/2019 | Seiders et al. |
| 2019/0170422 A1 | 6/2019 | Dexter |
| 2019/0234671 A1 | 8/2019 | Stanford et al. |
| 2019/0256119 A1 | 8/2019 | Brilhante et al. |
| 2019/0271433 A1 | 9/2019 | Tonelli |
| 2020/0029664 A1 | 1/2020 | Tonelli |
| 2020/0037719 A1 | 2/2020 | Jaworski et al. |
| 2020/0039056 A1 | 2/2020 | Damberg |
| 2020/0060400 A1 | 2/2020 | Glaser |
| 2020/0061802 A1 | 2/2020 | Samsel et al. |
| 2020/0062454 A1 | 2/2020 | Duong et al. |
| 2020/0086905 A1 | 3/2020 | Yao et al. |
| 2020/0196725 A1 | 6/2020 | Tonelli |
| 2020/0214407 A1 | 7/2020 | Nichols et al. |
| 2020/0216224 A1 | 7/2020 | Nichols et al. |
| 2020/0217576 A1 | 7/2020 | Guan et al. |
| 2021/0102409 A1 | 4/2021 | Seiders et al. |
| 2022/0114853 A1 | 4/2022 | Emde et al. |

FOREIGN PATENT DOCUMENTS

| | | | |
|---|---|---|---|
| BR | 202015031355 U2 | 6/2017 |
| CA | 60997 A | 8/1898 |
| CA | 72336 A | 7/1901 |
| CA | 72337 A | 7/1901 |
| CA | 72338 A | 7/1901 |
| CA | 73327 A | 10/1901 |
| CA | 77273 A | 9/1902 |
| CA | 81456 A | 6/1903 |
| CA | 152411 A | 12/1913 |
| CA | 175930 A | 3/1917 |
| CA | 175939 A | 3/1917 |
| CA | 2624994 A1 | 5/2000 |
| CA | 89737 A | 6/2000 |
| CA | 2483772 A1 | 4/2005 |
| CA | 2633223 A1 | 12/2009 |
| CA | 2635328 A1 | 12/2009 |
| CA | 2782668 A1 | 12/2013 |
| CH | 365631 A | 11/1962 |
| CN | 2073459 U | 3/1991 |
| CN | 2132145 Y | 5/1993 |
| CN | 1112819 A | 12/1995 |
| CN | 2515999 Y | 10/2002 |
| CN | 2549792 Y | 5/2003 |
| CN | 1457237 A | 11/2003 |
| CN | 2664452 Y | 12/2004 |
| CN | 3498732 | 1/2006 |
| CN | 3498735 | 1/2006 |
| CN | 2813823 Y | 9/2006 |
| CN | 300690540 | 9/2007 |
| CN | 300690541 | 9/2007 |
| CN | 201076126 Y | 6/2008 |
| CN | 300854008 | 12/2008 |
| CN | 300856959 | 12/2008 |
| CN | B00918117 | 5/2009 |
| CN | 301150817 | 3/2010 |
| CN | 301189065 | 5/2010 |
| CN | 201691232 U | 1/2011 |
| CN | 301548656 | 5/2011 |
| CN | 301620134 | 7/2011 |
| CN | 201919912 U | 8/2011 |
| CN | 201938601 U | 8/2011 |
| CN | 301711528 | 11/2011 |
| CN | 301808188 | 1/2012 |
| CN | 301950501 | 6/2012 |
| CN | 102626271 | 8/2012 |
| CN | 302115731 | 10/2012 |
| CN | 102805467 A | 12/2012 |
| CN | 202722894 U | 2/2013 |
| CN | 102948946 A | 3/2013 |
| CN | 202760445 U | 3/2013 |
| CN | 302365993 | 3/2013 |
| CN | 202874104 U | 4/2013 |
| CN | 302425923 | 5/2013 |
| CN | 302448361 | 6/2013 |
| CN | 203182247 U | 9/2013 |
| CN | 203283617 U | 11/2013 |
| CN | 302631183 | 11/2013 |
| CN | 203439475 U | 2/2014 |
| CN | 302811286 | 5/2014 |
| CN | 302868078 | 7/2014 |
| CN | 203789329 U | 8/2014 |
| CN | 203814784 U | 9/2014 |
| CN | 204032607 | 12/2014 |
| CN | 104433073 | 3/2015 |
| CN | 204245396 U | 4/2015 |
| CN | 303154464 | 4/2015 |
| CN | 303186110 | 4/2015 |
| CN | 303221245 | 5/2015 |
| CN | 204409860 U | 6/2015 |
| CN | 303228513 | 6/2015 |
| CN | 303228514 | 6/2015 |
| CN | 303242426 | 6/2015 |
| CN | 303251869 | 6/2015 |
| CN | 303324038 | 8/2015 |
| CN | 303333672 | 8/2015 |
| CN | 201530103483 | 8/2015 |
| CN | 303381343 | 9/2015 |
| CN | 303390870 | 9/2015 |
| CN | 303499903 | 12/2015 |
| CN | 303514839 | 12/2015 |
| CN | 303546215 | 1/2016 |
| CN | 201530438676 | 2/2016 |
| CN | 201530438792 | 2/2016 |
| CN | 105473462 A | 4/2016 |
| CN | 303630971 | 4/2016 |
| CN | 303680031 | 5/2016 |
| CN | 303680054 | 5/2016 |
| CN | 303687108 | 6/2016 |
| CN | 205521292 U | 8/2016 |
| CN | 303783877 | 8/2016 |
| CN | 303799176 | 8/2016 |
| CN | 201630123602 | 8/2016 |
| CN | 303904119 | 11/2016 |
| CN | 303918135 | 11/2016 |
| CN | 205831341 U | 12/2016 |
| CN | 303973165 | 12/2016 |
| CN | 303982382 | 12/2016 |
| CN | 303982387 | 12/2016 |
| CN | 304000494 | 1/2017 |
| CN | 304036742 | 2/2017 |
| CN | 304036750 | 2/2017 |
| CN | 304050612 | 2/2017 |
| CN | 304068469 | 3/2017 |
| CN | 304076890 | 3/2017 |
| CN | 106551485 A | 4/2017 |
| CN | 304172638 | 6/2017 |
| CN | 107125891 A | 9/2017 |
| CN | 107173938 A | 9/2017 |
| CN | 107307551 A | 11/2017 |
| CN | 107467837 A | 12/2017 |
| CN | 206702967 | 12/2017 |
| CN | 304411331 | 12/2017 |
| CN | 304411334 | 12/2017 |
| CN | 304411336 | 12/2017 |
| CN | 304411337 | 12/2017 |
| CN | 304411389 | 12/2017 |
| CN | 304417314 | 12/2017 |
| CN | 304423206 | 12/2017 |
| CN | 304423258 | 12/2017 |
| CN | 304423259 | 12/2017 |
| CN | 304423260 | 12/2017 |

(56) References Cited

FOREIGN PATENT DOCUMENTS

| | | | |
|---|---|---|---|
| CN | 304423317 | | 12/2017 |
| CN | 206880270 | U | 1/2018 |
| CN | 304461798 | | 1/2018 |
| CN | 107668874 | A | 2/2018 |
| CN | 304532315 | | 3/2018 |
| CN | 304532317 | | 3/2018 |
| CN | 304532318 | | 3/2018 |
| CN | 304532319 | | 3/2018 |
| CN | 304539046 | | 3/2018 |
| CN | 304555895 | | 3/2018 |
| CN | 304562598 | | 4/2018 |
| CN | 304569073 | | 4/2018 |
| CN | 304569074 | | 4/2018 |
| CN | 108078109 | A | 5/2018 |
| CN | 304645055 | | 5/2018 |
| CN | 207428627 | U | 6/2018 |
| CN | 304653754 | | 6/2018 |
| CN | 304660325 | | 6/2018 |
| CN | 304660327 | | 6/2018 |
| CN | 304660329 | | 6/2018 |
| CN | 304660332 | | 6/2018 |
| CN | 304692146 | | 6/2018 |
| CN | 304701684 | | 6/2018 |
| CN | 304749390 | | 7/2018 |
| CN | 304764980 | | 8/2018 |
| CN | 108495572 | A | 9/2018 |
| CN | 108497660 | A | 9/2018 |
| CN | 304823694 | | 9/2018 |
| CN | B04823685 | | 9/2018 |
| CN | 108608804 | A | 10/2018 |
| CN | 207949211 | U | 10/2018 |
| CN | 304836888 | | 10/2018 |
| CN | 304854893 | | 10/2018 |
| CN | 304862165 | | 10/2018 |
| CN | 304862166 | | 10/2018 |
| CN | 108741519 | A | 11/2018 |
| CN | 108783799 | A | 11/2018 |
| CN | 108835813 | A | 11/2018 |
| CN | 108835814 | A | 11/2018 |
| CN | 304877452 | | 11/2018 |
| CN | 304900938 | | 11/2018 |
| CN | 108945792 | | 12/2018 |
| CN | 109043770 | A | 12/2018 |
| CN | 208192442 | U | 12/2018 |
| CN | 208192487 | U | 12/2018 |
| CN | 304970790 | | 1/2019 |
| CN | 304995265 | | 1/2019 |
| CN | 305641119 | | 1/2019 |
| CN | 109303399 | A | 2/2019 |
| CN | 305019548 | | 2/2019 |
| CN | 109431028 | A | 3/2019 |
| CN | 109497673 | A | 3/2019 |
| CN | 208581902 | U | 3/2019 |
| CN | 305050777 | | 3/2019 |
| CN | 305078423 | | 3/2019 |
| CN | 305078424 | | 3/2019 |
| CN | 305111950 | | 4/2019 |
| CN | 305181543 | | 5/2019 |
| CN | 305181544 | | 5/2019 |
| CN | 305184266 | | 5/2019 |
| CN | 305184268 | | 5/2019 |
| CN | 305191726 | | 6/2019 |
| CN | 305219344 | | 6/2019 |
| CN | 305242412 | | 7/2019 |
| CN | 305242413 | | 7/2019 |
| CN | 305283238 | | 8/2019 |
| CN | 209403814 | U | 9/2019 |
| CN | 305344781 | | 9/2019 |
| CN | 305347993 | | 9/2019 |
| CN | 305359134 | | 9/2019 |
| CN | 305359135 | | 9/2019 |
| CN | 209528183 | U | 10/2019 |
| CN | 305398498 | | 10/2019 |
| CN | 209563672 | U | 11/2019 |
| CN | 209628893 | U | 11/2019 |
| CN | 305424085 | | 11/2019 |
| CN | 305424089 | | 11/2019 |
| CN | 305437133 | | 11/2019 |
| CN | 305437134 | | 11/2019 |
| CN | 305437137 | | 11/2019 |
| CN | 110605939 | A | 12/2019 |
| CN | 209719155 | U | 12/2019 |
| CN | 209719159 | U | 12/2019 |
| CN | 209732871 | U | 12/2019 |
| CN | 209788810 | U | 12/2019 |
| CN | 305476163 | | 12/2019 |
| CN | 305488622 | | 12/2019 |
| CN | 305499080 | | 12/2019 |
| CN | 305506675 | | 12/2019 |
| CN | 305518862 | | 12/2019 |
| CN | 209931762 | U | 1/2020 |
| CN | 209965461 | U | 1/2020 |
| CN | 305527333 | | 1/2020 |
| CN | 305533439 | | 1/2020 |
| CN | 305533533 | | 1/2020 |
| CN | 305533534 | | 1/2020 |
| CN | 305533538 | | 1/2020 |
| CN | 305533539 | | 1/2020 |
| CN | 305540311 | | 1/2020 |
| CN | 305547763 | | 1/2020 |
| CN | 305547764 | | 1/2020 |
| CN | 305547961 | | 1/2020 |
| CN | 305556652 | | 1/2020 |
| CN | 305563596 | | 1/2020 |
| CN | 305571758 | | 1/2020 |
| CN | 305571764 | | 1/2020 |
| CN | 305577923 | | 1/2020 |
| CN | 305577960 | | 1/2020 |
| CN | 305578103 | | 1/2020 |
| CN | 210076793 | U | 2/2020 |
| CN | 210114130 | U | 2/2020 |
| CN | 305584094 | | 2/2020 |
| CN | 305584095 | | 2/2020 |
| CN | 305584098 | | 2/2020 |
| CN | 305605578 | | 2/2020 |
| CN | 305614805 | | 2/2020 |
| CN | 305621592 | | 2/2020 |
| CN | 305621593 | | 2/2020 |
| CN | 305629332 | | 2/2020 |
| CN | 305635594 | | 3/2020 |
| CN | 305636583 | | 3/2020 |
| CN | 305639489 | | 3/2020 |
| CN | 305642338 | | 3/2020 |
| CN | 305642339 | | 3/2020 |
| CN | 305642418 | | 3/2020 |
| CN | 305657621 | | 3/2020 |
| CN | 305748162 | | 5/2020 |
| CN | 305873337 | | 6/2020 |
| DE | 74708 | C | 4/1894 |
| DE | 2020368 | A1 | 11/1971 |
| DE | 7502524 | U | 9/1975 |
| DE | 2939826 | A1 | 4/1980 |
| DE | 3344410 | A1 | 6/1985 |
| DE | 8620597 | U1 | 9/1986 |
| DE | 9012845 | U1 | 10/1990 |
| DE | 4042245 | A1 | 7/1991 |
| DE | 9105033 | U1 | 3/1992 |
| DE | 4418429 | A1 | 12/1994 |
| DE | 9408707 | U1 | 9/1995 |
| DE | 29516306 | U1 | 2/1997 |
| DE | 29815666 | U1 | 11/1998 |
| DE | 19755532 | A1 | 6/1999 |
| DE | 20312950 | U1 | 10/2003 |
| DE | 20313077 | U1 | 1/2004 |
| DE | 202004007996 | U1 | 7/2004 |
| DE | 202004012191 | U1 | 12/2004 |
| DE | 202004015475 | U1 | 1/2005 |
| DE | 202004016959 | U1 | 2/2005 |
| DE | 202005006105 | U1 | 6/2005 |
| DE | 202005014773 | U1 | 11/2005 |
| DE | 202006001888 | U1 | 4/2006 |
| DE | 402010002800-0008 | | 6/2010 |
| DE | 402010002800-0001 | | 7/2010 |
| DE | 402010002800-0002 | | 7/2010 |

(56) References Cited

FOREIGN PATENT DOCUMENTS

| | | | |
|---|---|---|---|
| DE | 402010002800-0003 | | 7/2010 |
| DE | 402010002800-0004 | | 7/2010 |
| DE | 402010002800-0007 | | 7/2010 |
| DE | 402010002800-0009 | | 7/2010 |
| DE | 402010002800-0010 | | 7/2010 |
| DE | 402010002800-0011 | | 7/2010 |
| DE | 402010002800-0012 | | 7/2010 |
| DE | 202012006671 | U1 | 8/2012 |
| DE | 102012025617 | A1 | 10/2013 |
| DE | 102013004590 | A1 | 9/2014 |
| DE | 102013114520 | A1 | 6/2015 |
| DE | 202016004315 | U1 | 8/2016 |
| DE | 102015217545 | B3 | 12/2016 |
| DE | 202015106823 | U1 | 3/2017 |
| DE | 102017122609 | A1 | 3/2019 |
| EM | 000134804-0001 | | 6/2004 |
| EM | 001606468-0001 | | 9/2009 |
| EM | 001606468-0002 | | 9/2009 |
| EM | 001682428-0001 | | 4/2010 |
| EM | 001682428-0002 | | 4/2010 |
| EM | 001682428-0003 | | 4/2010 |
| EM | 001682428-0004 | | 4/2010 |
| EM | 001682428-0005 | | 4/2010 |
| EM | 001682428-0006 | | 4/2010 |
| EM | 001781865-0001 | | 12/2010 |
| EM | 001781865-0006 | | 12/2010 |
| EM | 001781865-0007 | | 12/2010 |
| EM | 001781865-0008 | | 12/2010 |
| EM | 001781899-0006 | | 2/2011 |
| EM | 001781899-0009 | | 2/2011 |
| EM | 002215897-0001 | | 8/2013 |
| EM | 002277574-0001 | | 8/2013 |
| EM | 002277574-0002 | | 8/2013 |
| EM | 002325209-0001 | | 11/2013 |
| EM | 002325209-0002 | | 11/2013 |
| EM | 002569467-0001 | | 11/2014 |
| EM | 002569467-0002 | | 11/2014 |
| EM | 002569467-0003 | | 11/2014 |
| EM | 002569467-0004 | | 11/2014 |
| EM | 002576728-0013 | | 11/2014 |
| EM | 002646935-0001 | | 3/2015 |
| EM | 002978569-0001 | | 2/2016 |
| EM | 003261668-0002 | | 7/2016 |
| EM | 003743905-0006 | | 2/2017 |
| EM | 004100048-0001 | | 9/2017 |
| EM | 004100048-0002 | | 9/2017 |
| EM | 004385409-0001 | | 10/2017 |
| EM | 004168789-0001 | | 11/2017 |
| EM | 004662039-0002 | | 3/2018 |
| EM | 004662039-0003 | | 3/2018 |
| EM | 005609583-0001 | | 8/2018 |
| EM | 005625977-0006 | | 9/2018 |
| EM | 005500311-0002 | | 10/2018 |
| EM | 005500311-0003 | | 10/2018 |
| EM | 005804747-0001 | | 10/2018 |
| EM | 005804762-0001 | | 10/2018 |
| EM | 005804770-0001 | | 10/2018 |
| EM | 005805140-0001 | | 10/2018 |
| EM | 005805199-0001 | | 10/2018 |
| EM | 006453072-0001 | | 5/2019 |
| EM | 006618583-0001 | | 10/2019 |
| EM | 006618583-0002 | | 10/2019 |
| EM | 006618583-0003 | | 10/2019 |
| EM | 006618583-0004 | | 10/2019 |
| EM | 007064233-0002 | | 11/2019 |
| EM | 007145461-0012 | | 11/2019 |
| EM | 007449095-0001 | | 1/2020 |
| EM | 007576806-0001 | | 2/2020 |
| EM | 007719141-0001 | | 3/2020 |
| EP | 0069419 | A1 | 1/1983 |
| EP | 0530067 | A1 | 3/1993 |
| EP | 0587451 | A1 | 3/1994 |
| EP | 0221215 | B1 | 6/1995 |
| EP | 0670791 | A1 | 9/1995 |
| EP | 1000865 | A1 | 5/2000 |
| EP | 1059239 | A1 | 12/2000 |
| EP | 1080656 | A1 | 3/2001 |
| EP | 1442845 | A1 | 8/2004 |
| EP | 1475008 | A1 | 11/2004 |
| EP | 1880948 | A2 | 1/2008 |
| EP | 1921009 | A1 | 5/2008 |
| EP | 2024218 | A2 | 2/2009 |
| EP | 2107982 | A1 | 10/2009 |
| EP | 2236428 | A1 | 10/2010 |
| EP | 2330939 | A1 | 6/2011 |
| EP | 2344000 | A1 | 7/2011 |
| EP | 2387906 | A1 | 11/2011 |
| EP | 2412493 | A2 | 2/2012 |
| EP | 2441340 | A1 | 4/2012 |
| EP | 2522248 | A1 | 11/2012 |
| EP | 2543481 | A1 | 1/2013 |
| EP | 2745727 | A2 | 6/2014 |
| EP | 2826394 | A1 | 1/2015 |
| EP | 2829484 | A1 | 1/2015 |
| EP | 2829485 | A1 | 1/2015 |
| EP | 2904926 | A1 | 8/2015 |
| EP | 3013176 | A1 | 5/2016 |
| EP | 3027078 | A1 | 6/2016 |
| EP | 3073852 | A1 | 10/2016 |
| EP | 3216363 | A1 | 9/2017 |
| EP | 3351130 | A1 | 7/2018 |
| EP | 3403521 | A1 | 11/2018 |
| EP | 3581059 | A1 | 12/2019 |
| EP | 3402720 | B1 | 12/2020 |
| FR | 1198768 | A | 12/1959 |
| FR | 2179844 | A1 | 11/1973 |
| FR | 2223248 | A1 | 10/1974 |
| FR | 2638950 | A1 | 5/1990 |
| FR | 2689100 | A1 | 10/1993 |
| FR | 2711044 | A1 | 4/1995 |
| FR | 2712257 | A1 | 5/1995 |
| FR | 2809690 | A1 | 12/2001 |
| FR | 2870692 | A1 | 12/2005 |
| FR | 2912997 | A1 | 8/2008 |
| GB | 854540 | A | 11/1960 |
| GB | 1041392 | A | 9/1966 |
| GB | 2023550 | A | 1/1980 |
| GB | 2023551 | A | 1/1980 |
| GB | 2032814 | A | 5/1980 |
| GB | 2047073 | A | 11/1980 |
| GB | 2023549 | A | 9/1992 |
| GB | 2278874 | A | 12/1994 |
| GB | 2291042 | A | 1/1996 |
| GB | 2045135 | A | 2/1996 |
| GB | 2308803 | A | 7/1997 |
| GB | 2289713 | B | 12/1997 |
| GB | 2421713 | A | 7/2006 |
| GB | 2438189 | A | 11/2007 |
| GB | 2459111 | A | 10/2009 |
| GB | 4036176 | | 7/2014 |
| GB | 4037039 | | 10/2014 |
| GB | 9005804-0001 | | 10/2018 |
| GB | 9006576138-0004 | | 6/2019 |
| GB | 90066075520006 | | 7/2019 |
| GB | 2575671 | A | 1/2020 |
| ID | D0000002662-0001 | | 1/2003 |
| IL | 55179 | A | 7/1981 |
| IN | 266778 | | 5/2015 |
| IN | 266779-0001 | | 5/2015 |
| IN | 276720 | | 2/2016 |
| JP | S4628827 | Y1 | 10/1971 |
| JP | S57-150175 | U | 9/1982 |
| JP | S60-164570 | A | 8/1985 |
| JP | H03-066374 | U | 6/1991 |
| JP | H0574275 | A | 3/1993 |
| JP | H07-102842 | A | 4/1995 |
| JP | H08-093298 | A | 4/1996 |
| JP | 2569734 | B2 | 1/1997 |
| JP | 2976179 | B2 | 11/1999 |
| JP | H11309011 | A | 11/1999 |
| JP | 2001-107621 | A | 4/2001 |
| JP | 3177720 | B2 | 6/2001 |
| JP | 3191248 | B2 | 7/2001 |
| JP | 3197227 | B2 | 8/2001 |

(56) References Cited

FOREIGN PATENT DOCUMENTS

| | | | |
|---|---|---|---|
| JP | 2001-262907 | A | 9/2001 |
| JP | 3211023 | B2 | 9/2001 |
| JP | D1121506 | | 9/2001 |
| JP | 3225244 | B2 | 11/2001 |
| JP | D2001-10753 | | 6/2002 |
| JP | D1193948 | | 1/2004 |
| JP | 2004136941 | A | 5/2004 |
| JP | 2006122067 | A | 5/2006 |
| JP | D1312168 | | 10/2007 |
| JP | D2007-16058 | | 5/2008 |
| JP | D2007-16059 | | 5/2008 |
| JP | D1338388 | | 8/2008 |
| JP | D1382214 | | 3/2010 |
| JP | D1382215 | | 3/2010 |
| JP | D1397219 | | 9/2010 |
| JP | D1397346 | | 9/2010 |
| JP | D1408819 | | 3/2011 |
| JP | D1408988 | | 3/2011 |
| JP | 2014184051 | A | 10/2014 |
| JP | 3208907 | U | 2/2017 |
| JP | 6206200 | B2 | 10/2017 |
| JP | 6226662 | B2 | 11/2017 |
| JP | 2019119506 | A | 7/2019 |
| JP | 1671282 | S | 11/2020 |
| KR | 100395931 | B1 | 8/2003 |
| KR | 3020030024985 | | 9/2003 |
| KR | 200362331 | Y1 | 9/2004 |
| KR | 20070101643 | A | 10/2007 |
| KR | 20070103598 | A | 10/2007 |
| KR | 3020070008850 | | 12/2007 |
| KR | 300492699.0000 | | 5/2008 |
| KR | 20090074289 | A | 7/2009 |
| KR | 100921297 | B1 | 10/2009 |
| KR | 101267451 | B1 | 5/2013 |
| KR | 300740505.0000 | | 4/2014 |
| KR | 300831147.0000 | | 12/2015 |
| KR | 300887228.0000 | | 12/2016 |
| KR | 300908948.0000 | | 6/2017 |
| KR | 300908949.0000 | | 6/2017 |
| KR | 300915252.0000 | | 7/2017 |
| KR | 20180037090 | A | 4/2018 |
| KR | 300968949.0000 | | 8/2018 |
| KR | 300982867.0000 | | 11/2018 |
| KR | 300983257.0000 | | 12/2018 |
| KR | 300990244.0000 | | 1/2019 |
| KR | 300990253.0000 | | 1/2019 |
| KR | 300996066.0000 | | 3/2019 |
| KR | 102054504 | B1 | 12/2019 |
| KR | 301037245.0000 | | 12/2019 |
| KR | 301037251.0000 | | 12/2019 |
| KR | 301050842.0000 | | 3/2020 |
| KR | 301541440002 | | 4/2020 |
| NL | 7504291 | A | 10/1975 |
| NL | 8903105 | A | 7/1991 |
| NL | 1032860 | C1 | 11/2006 |
| RU | 00100422 | U1 | 12/2010 |
| TR | 201708307-0001 | | 2/2018 |
| TW | M310869 | U | 5/2007 |
| WO | 9400034 | A1 | 1/1994 |
| WO | D032061-005 | | 4/1995 |
| WO | D035637-003 | | 2/1996 |
| WO | D036648-008 | | 6/1996 |
| WO | 9631140 | A1 | 10/1996 |
| WO | 9748613 | A1 | 12/1997 |
| WO | 0041937 | A1 | 7/2000 |
| WO | 0168477 | A1 | 9/2001 |
| WO | 02064445 | A1 | 8/2002 |
| WO | 03041529 | A1 | 5/2003 |
| WO | 2004076291 | A2 | 9/2004 |
| WO | 2006019314 | A1 | 2/2006 |
| WO | 2006037302 | A1 | 4/2006 |
| WO | 2008001029 | A1 | 1/2008 |
| WO | 2008034603 | A1 | 3/2008 |
| WO | 2009028960 | A1 | 3/2009 |
| WO | 2011035559 | A1 | 3/2011 |
| WO | 2011135559 | A1 | 11/2011 |
| WO | 2012000497 | A1 | 1/2012 |
| WO | 2012029119 | A1 | 3/2012 |
| WO | D078390-004 | | 11/2012 |
| WO | 2013014670 | A1 | 1/2013 |
| WO | D080557-001 | | 4/2013 |
| WO | 2013126851 | A1 | 8/2013 |
| WO | 2014131214 | A1 | 9/2014 |
| WO | 2014193073 | A1 | 12/2014 |
| WO | 2015040526 | | 3/2015 |
| WO | 2015087357 | A1 | 6/2015 |
| WO | 2016072912 | A1 | 5/2016 |
| WO | 2016091570 | A1 | 6/2016 |
| WO | 2017034992 | A1 | 3/2017 |
| WO | 2017088278 | A1 | 6/2017 |
| WO | 2017091899 | A1 | 6/2017 |
| WO | 2017191628 | A1 | 11/2017 |
| WO | 2017192694 | A1 | 11/2017 |
| WO | 2018012675 | A1 | 1/2018 |
| WO | 2018086193 | A1 | 5/2018 |
| WO | 2018169478 | A1 | 9/2018 |
| WO | 2019238228 | A1 | 12/2019 |
| WO | 2020030766 | A1 | 2/2020 |
| WO | 2020206312 | A2 | 10/2020 |

OTHER PUBLICATIONS

Sep. 2, 2022—(CN) Second Office Action—App. No. 202080008216.6 .

Nordstrom.com, Rimowa Original Cabin 22-Inch Wheeled Carry-On, Oldest review dated Apr. 14, 2019, https://www.nordstrom.com/s/ rimowa-original-cabin-22-inch-wheeled-carry-on/5102644 (Year: 2019).

Youtube.com, Site visited Sep. 28, 2022, "Carl Friedrik 'The Carry-On' First Look," published by Bo Ismono on Jun. 21, 2020 features the Carl Friedrik carry on, https://youtu.be/XYCU00WAIO4 (Year: 2020).

Amazon.com, site visited Sep. 29, 2022, SureSeal by FireKing Waterproof Fireproof Safe Chest, first available Aug. 10, 2012, https:// www.amazon.com/dp/B008VXQ721 (Year: 2012).

phphotovideo.com, site visited Sep. 29, 2022, Nanuk 935 Wheeled Hard Utility Case, oldest review dated Jul. 1, 2014, https://www.bhphotovideo.com/c/product/1504694-REG/nanuk_935_6005_935_waterproof_hard_case.html (Year: 2014).

Amazon.Ca, Site visited Sep. 28, 2022, Delsey Titanium Spinner Luggage, First available Oct. 27, 2014, https://www.amazon.ca/Delsey-Luggage-Titanium-Spinner-Trolley/dp/B00MQF0QTM?th=1 (Year: 2014).

Amazon.Ca, Site visited Sep. 28, 2022, Nanuk Waterproof Hard Case, First available Nov. 13, 2019, https://www.amazon.ca/Nanuk-Waterproof-Hard-Case-Wheels/dp/B07YXLQX4Z (Year: 2019).

Sep. 27, 2022—(JP) Office Action—App. No. 2021-559258.

Oct. 18, 2021—(WO) International Search Report & Written Opinion—PCT/US21/023632.

www.amazon.com; website visited Oct. 6, 2021; Pelican 1510 Case with Foam; Date First Available Oct. 2, 2001; https://www.amazon.com/Pelican-1510-Case-Foam-Black/dp/B0002SKHIK/ref=sr_1_123?dchild=1&keywords=wheeled+tool+box+for+flying&qid=16%E2%80%A6 (Year: 2001).

Halliburton Pursuit Aluminum Continental Carry-on Case, Site visited on Oct. 6, 2021; website captured on May 20, 2020 via wayback: https://web.archive.org/web/20200520103816/https://zerohalliburton.com/collections/luggage (Year: 2020).

Jun. 3, 2022—(WO) International Search Report and Written Opinion—PCT/US2022/063684.

Apr. 7, 2021—(CN) First Office Action—App. No. 202030815015.X.

Aug. 3, 2022—(EP) Extended Search Report—App. No. 22162500.7.

Aug. 29, 2022—(AU) Examination Report No. 1—App. No. 2020256255.

Amazon.Ca, Site visited Dec. 28, 2021, Samsonite Centric, First available Sep. 20, 2017, https://www.amazon.ca/Samsonite-Ce 1ntric-Hardside-Expandable-Luggage/dp/B074VJYRZN (Year: 2017).

(56) References Cited

OTHER PUBLICATIONS

Whereintheworldisnina.com, Site visited Dec. 28, 2021, "Choosing the Best Hard Shell Luggage for your Trip" by Nina Ragusa published on Apr. 29, 2019 Features the Maxlite, Timberland, and Level8 luggage cases with compression straps, https://whereintheworldisnina.com/best-hard-shell-luggage/ (Year: 2019).
Nytimes.com, Site visited Dec. 28, 2021, "Are Away Carry-Ons Worth the Hype" by Kit Dillon published on May 19, 2020 Features the Muji Carry-on with compression strap, https://www.nytimes.com/wirecutter/reviews/are-away-carry-ons-worth-the-hype/ (Year: 2020).
Amazon.Ca, Site visited Dec. 28, 2021, Bamboo Wolf Hard Shell Luggage, First available May 29, 2020, https://www.amazon.ca/Aluminum-Magnesium-Hardside-Suitcase-Zipperless-Business/dp/B085M1CB6J (Year: 2020).
Dec. 2020—(CN) First Office Action—App. No. 201880036572.1.
WIPO, available at https://www3.wipo.int/designdb/en/index.jsp (Year: 2022).
May 2, 2022—(CA) Office Action—Appl. No. 200171.
May 2, 2022—(CA) Office Action—Appl. No. 200172.
amazon.com, "Top Shelf Custom Injection Molded ABS Saddlebag Organizer Tray, 2014—Current H-D ABS Hard Bags, LFT by Advanced Accessory Concepts LLC," visited Oct. 16, 2019 and revisited Jan. 6, 2020 at https://www.amazon.com/Custom-Injection-Molded-Saddlebag-Organizer/dp/B01MQWBM40/ref=sr_1_38?keywords=luggage+hard+removable+liner&qid=1571270714&sr=8-38.
amazon.com, "Pelican Air 1615 Travel Case—Suitcase Luggage (Blue) by Pelican," visited Oct. 16, 2019 and revisited Jan. 6, 2020 at https://www.amazon.com/Pelican-Air-1615-Travel-Case/dp/B07XGHDK66?ref_=ast_sto_dp.
amazon.com, "Pelican 015100-0050-110 Protector Carry-On Case Black w/TrekPak Insert: Camera & Photo," visited Oct. 16, 2019 and revisited Jan. 6, 2020 at https://www.amazon.com/Pelican-1510TP-Carry-TrekPak-Divider/dp/B01E4E1BFK/ref=sr_1_48?crid=3CJLVWN9DJ62R&keywords=carry+on+organizer+insert&qid=1571270299&sprefix=carry+on+organizer%2Caps%2C143&sr=8-48.
amazon.com, "Samsonite F'Lite GT 31" Hardside Wheeled Luggage (Vivid Blue)," visited Dec. 16, 2019 and revisited Jan. 7, 2020 at <https://www.amazon.com/Samsonite-Flite-Spinner-Black-Size/dp/B01LTG2XVC?th=1>Samsonite F'Lite GT 31" Hardside Wheeled Luggage (Vivid Blue).
alibaba.com, "Removable Spinner Wheels for Suitcase Replacement Suitcase Luggage," visited Dec. 16, 2019 and revisited Jan. 7, 2020 at https://www.alibaba.com/product-detail/Removable-Spinner-Wheels-For-Suitcase-Replacement_605641600.
amazon.com, "Lockable Tackle Box Fishing Waterproof Fly Fishing Box Double Sided Ice Fishing Tackle Case Box Storage Waterproof: 360 Degree Rubber Gasket, Durable Plastic Construction Double Sided Triangle-Cut for," visited Dec. 16, 2019 and revisited Jan. 7, 2020 at <https://www.amazon.com/Lockable-Tackle-Fishing-Waterproof-Storage/dp/B07MFF6S6N>.
yankodesign.com, "Vacuum Packed Suitcase," visited Dec. 16, 2019 and revisited Jan. 7, 2020 at <https://www.yankodesign.com/2011/11/28/vacuum-packed-suitcase/>.
alibaba.com, "Portable Luggage Wheels for Luggage Trolley Bags & Suitcase," visited Dec. 16, 2019 and revisited Jan. 7, 2020 at https://www.alibaba.com/product-detail/Portable-Luggage-Wheels-for-luggage-Trolley_1854722793.html.
Pelican Elite 50 Quart Cooler, available Nov. 9, 2016, [online], [site visited Mar. 31, 2018]. Available from internet, <URL: https://www.amazon.com/Pelican-Elite-Quart-Cooler-White/product-reviews/B01G7KG5PA/ref=cm_cr_getr_d_paging_btm_5?ie=UTF8&reviewerType=all_reviews&sortBy=recent&pageNumber-5 (Year:2016).
Pelican Storm Waterproof Case, available Jul. 27, 2009, [online], [site visited Mar. 31, 2018]. Available from internet, <URL: https://www.amazon.com/dp/B002JB07D8?aaxitk=EqSpVoa9QpKAGqst7rmxMA&pd_rd_i=B002JB07D8&pf_rd_m=ATVPDKIKX0DER&pf (Year: 2009).
Outdoor Products Small Watertight Dry Box, Blue, available May 31, 2016, [online], [site visited Mar. 31, 2018]. Available from internet, <URL: https://www.walmart.com/ip/Outdoor-Products-Small-Watertight-Dry-Box-Blue/26674162 (Year: 2016).
Sep. 20, 2018—(WO) International Search Report and Written Opinion—App. PCT/US2018/037100.
yeti.com, Images of Loadout Bucket Web Page visited on Mar. 17, 2020, at https://www.yeti.com/en_US/buckets/loadout-5-gallon-bucket/YLOB5.html?dwvar_YLOB5_color=white&cgid=buckets#start=1 <https://www.yeti.com/en_US/buckets/loadout-5-gallon-bucket/YLOB5.html?dwvar_YLOB5_color=white&cgid=buckets>.
northerntool.com, "Dewalt 28in. Wheeled Toolbox, Model# DWST28100," visited on Apr. 6, 2020 at https://www.northerntool.com/shop/tools/product_200726534_200726534.
walmart.com, "Sterilite 151L Black Wheeled Industrial Tote," visited on Apr. 6, 2020 at https://www.walmart.ca/en/ip/sterilite-1511-black-wheeled-industrial-tote/6000195957310.
globalindustrial.com, "Contico UK3725-4 Rolling Pro Tuff Work Box," visited on Apr. 6, 2020 at https://www.globalindustrial.com/p/tools/tool-storage/Jo-Site/rolling-pro-tuff-work-box?infoParam.campaignId=T9F.
amazon.com, "Grey: Akro-Mils 33105 Akro-Grid Slotted Divider Plastic Tote Box," visited on Apr. 6, 2020 at https://www.amazon.in/Grey-Akro-Mils-Akro-Grid-Slotted-Divider/dp/B004C044VU.
globalindustrial.com, "Global Industrial™ Plastic Dividable Grid Container," visited on Apr. 6, 2020 at https://www.globalindustrial.com/p/storage/bins-totes-containers/dividable-grid/grid-wall-bin-stackable-1.
globalindustrial.com, "Straight Wall Container Solid," visited on Apr. 6, 2020 at https://www.globalindustrial.com/p/storage/bins-totes-containers/stacking-containers/straight-wall-container-12x7-2-5x5.
Lowe's, "Craftsman 37-in Black Plastic Wheels Lockable Tool Box," https://www.lowes.com/pd/CRAFTSMAN-37-in-Black-Plastic-Wheeled-Lockable-Tool-Box/1000578337.
Home Depot, "Husky 37 in. Rolling Tool Box Utility Cart Black," <https://www.homedepot.com/p/Husky-37-in-Rolling-Tool-Box-Utility-Cart-Black-209261/203668066>.
B&H, "Nanuk 960 Protective Rolling Case with Dividers and Organizer (Black)," https://www.bhphotovideo.com/c/product/1504703-REG/nanuk_960_6001_960_waterproof_hard_case.html.
Toolguyd, "Milwaukee Packout Tool Boxes and Storage System, in Photos," https://toolguyd.com/milwaukee-packout-tool-boxes-photo-introduction/.
May 12, 2020—(WO) Partial International Search—PCT/US2020/012404.
Jul. 6, 2020—(WO) International Search Report & Written Opinion—PCT/US2020/012404.
Aug. 13, 2020—(WO) Partial International Search—PCT/US2020/026655.
Oct. 7, 2020—(WO) ISR & WO—PCT/US2020/026655.
Oct. 8, 2022—(CN) OA—App No. 202110925931.2.
Newatlas.com, site visited Oct. 18, 2022, "The Survivor—Griffin's military grade iPhone 4 Case" published by Ben Coxworth on Feb. 23, 2011 features the Griffin Technology Survivor Extreme Duty Case, https://newatlas.com/survivor-military-grade-iphone-case/17956/ (Year: 2011).
Amazon.com, site visited Oct. 18, 2022, Ballistic Store Hard Core Case, first available Nov. 19, 2011, https://www.amazon.com/ Ballistic-Built-Screen-Protection-Holster/dp/B0069WKPRQ?th=1 (Year: 2011).
Bhphotovideo.com, Site visited Sep. 28, 2022, Pelican BA22 Elite Carry-On Luggage, Oldest review dated Sep. 23, 2017, https://www.bhphotovideo.com/c/product/1073813-REG/pelican_lg_ba22_gryblk_22_elite_carry_on_luggage. html/reviews (Year: 2017).
Apr. 19, 2022—(JP) Office Action—App. No. 2021-012889.
Jun. 28, 2022—(JP) Office Action—App. No. 2021539546.
Jun. 8, 2022—(MX) Notice of Allowance—App. No. MX/f/2021/000209.
Jun. 8, 2022—(MX) Notice of Allowance—App. No. MX/f/2021/000210.

(56) References Cited

OTHER PUBLICATIONS

Jun. 8, 2022—(MX) Notice of Allowance—App. No. MX/f/2021/000211.
May 10, 2022—(JP) Office Action—App. No. 2021-012890.
Jul. 6, 2022—(AU) Examination Report No. 1—App. No. 2020204740.
Jan. 18, 2023—(CA) Examination Report—App. No. 204257.
Jan. 6, 2023—(CA) Office Action—App. No. 204258.
May 13, 2022—(CN) Office Action—App. No. 202210270032.8.
9to5toys.com, Site visited Dec. 28, 21, “Review, Pelican’s Impressive Elite Luggage is built like a tank, but is it worth the price tag?” Published by Justin Kahn on May 29, 2016, https://9to5toys.com/2016/05/29/review-pelicans-impressive-elite-luggage-is-built-like-a-tank-but-is-it-worth-the-price-tag/ (Year: 2016).
Amazon.Ca, Site visited Dec. 27, 2021, Trolley Box Suitcase by Yadsheng, First available Sep. 23, 2019, https://www.amazon.ca/Suitcase-Universal-Portable-Hardshell-Business/dp/B07Y7R8RN1 (Year: 2019).
Amazon.Ca, Site visited Dec. 27, 2021, Bamboo Wolf Hardside Suitcase, First available May 29, 2020, https://www.amazon.ca/Aluminum-Hardside-Suitcase-Business-Travelling/dp/B085M1CB6J (Year: 2020).
Amazon.Ca, Site visited Dec. 28, 2021 , Rimowa Suitcase, First available Jan. 25, 2017, https://www.amazon.ca/Rimowa-Classic-Luggage-Multiwheel-Suitcase/dp/B01N6NEIIX (Year: 2017).
Amazon.Ca, Site visited Dec. 28, 2021 , Travelking Spinner Suitcase, First available May 4, 2017, https://www.amazon.ca/Multi-size-Aluminum-Luggage-Suitcase-TravelKing/dp/B06Y53X785 (Year: 2017).
Amazon.Ca, Site visited Dec. 28, 21 , LEVEL8 Gibraltar Suitcase, First available Jan. 24, 2019, https://www.amazon.ca/dp/B07MX224X5 (Year: 2019).
May 23, 2023—(CA) Office Action—App. No. 3063924.
Jan. 28, 2022—(JP) Office Action—App. No. 2019566933.
May 31, 2023—(AU) Examination Report No. 1—App. No. 2018284207.
May 10, 2023—(MX) Office Action—App. No. MX/a/2019/014178.

* cited by examiner

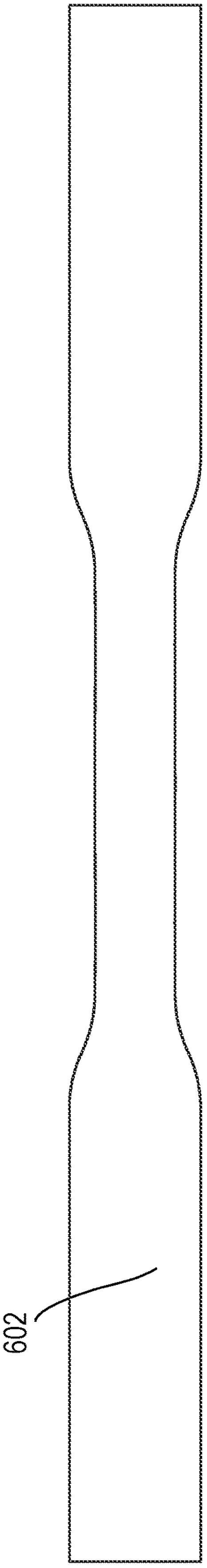
FIG. 35
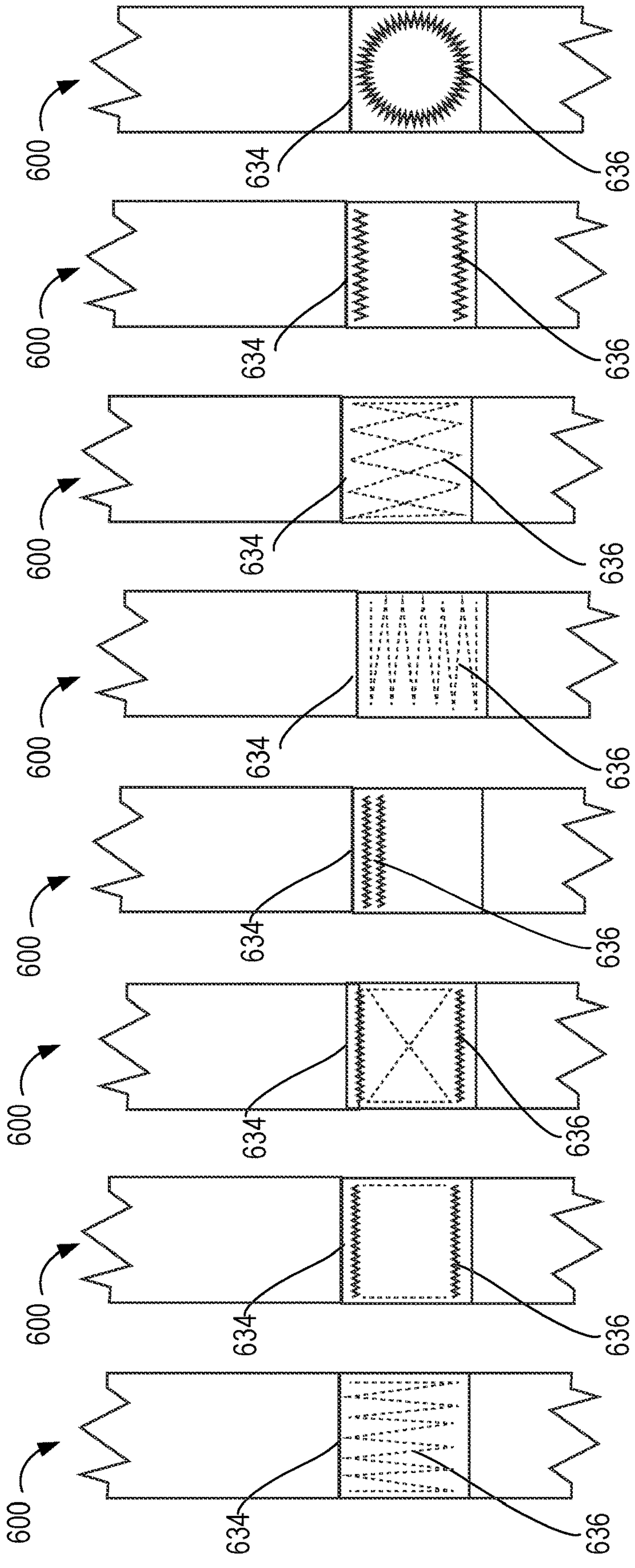
FIG. 36A
FIG. 36B
FIG. 36C
FIG. 36D
FIG. 36E
FIG. 36F
FIG. 36G
FIG. 36H

CONTAINER AND LATCHING SYSTEM

CROSS-REFERENCE TO RELATED APPLICATIONS

This application is a continuation-in-part of U.S. patent application Ser. No. 16/828,282 filed on Mar. 24, 2020, which is a continuation-in-part of U.S. patent application Ser. No. 16/006,344 filed on Jun. 12, 2018, which claims priority to U.S. Provisional Patent Application No. 62/518,358 filed on Jun. 12, 2017. This application is also a continuation-in-part of U.S. patent application Ser. No. 16/839,311 filed on Apr. 3, 2020, which is a continuation-in-part of U.S. patent application Ser. No. 16/735,013 filed on Jan. 6, 2020, which claims priority to U.S. Provisional Patent Application No. 62/788,886 filed on Jan. 6, 2019 and U.S. Provisional Patent Application No. 62/788,888 filed on Jan. 6, 2019. U.S. patent application Ser. No. 16/839,311 also claims priority to U.S. Provisional Patent Application No. 62/830,203 filed on Apr. 5, 2019. All of the above referenced applications are incorporated by reference in their entirety.

BACKGROUND

Various types of containers and latching systems exist. Containers may be used for food, beverages, and other materials or items. Latching systems exist to lock the containers in a closed configuration. However, conventional containers and latching systems are often not very durable and may not be easy to use. For instance, containers may not be strong enough to hold certain items and may not be strong enough to hold items on top of the container. Additionally, some latching systems may engage when a user does not want the system engaged and in other cases may not provide a sufficient lock between for the container. In such arrangements, these and other deficiencies may render the container and/or latching system virtually useless.

BRIEF SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

One aspect of this disclosure may relate to a container comprising: (a) a base including: (1) a sidewall structure having a first side, a second side opposite the first side, where the sidewall structure having a first end and a second end; (2) a bottom portion connected to a first end of the sidewall structure; (3) an opening formed at the second end of the sidewall structure, opposite the first end, where the opening being configured to allow access to an interior void of the container formed by the sidewall structure and the bottom portion; (4) a latch keeper extending from the sidewall structure, where the latch keeper having an upper surface, an inner surface and a lower surface; (b) a lid, the lid having an open configuration and a closed configuration, where the lid configured to cover the opening formed at the second end of the sidewall structure when the container is in the closed configuration; and (c) a latch assembly, where the latch assembly has a locked position and an unlocked position. The latch assembly may comprise: (1) a latch body pivotally engaged with the lid; (2) a locking member slidably engaged with the latch body, the locking member being slidable between at least a first position and an second position, the locking member configured to lock the lid in the closed configuration when the locking member is in the first position and configured to unlock the lid when the locking member is in the second position; (3) at least one biasing member engaged with the latch body and the locking member, the at least one biasing member biasing the locking member in the first position; and (4) an activating member engaged with the latch body and configured to move the locking member from the first position to the second position, the activating member comprising an activating barrel having a plurality of raised portions that are spaced apart from one another. The hook portion of the locking member may engage the latch keeper when the latch assembly is in the locked position. The at least one biasing member may be positioned laterally in between the plurality of raised portions. In some examples, the at least one biasing member may include two biasing members that are positioned laterally in between the plurality of raised portions. The locking member may have at least one engaging member that contacts a raised portion of the plurality of raised portions of the activating barrel. In addition, the at least one engaging member may include two engaging members that are spaced apart from each other creating an opening between the two engaging members. Each raised portion of the plurality of raised portions may have a substantially triangular shape. In some embodiments, the container may include a second latch assembly, wherein the second latch assembly may be located on an opposite side of the container as the latch assembly. As another option, the container may include a second latch assembly, wherein the second latch assembly may be located on an adjacent side of the container as the latch assembly.

Additional aspects of this disclosure may relate to a container comprising: (a) a base that includes: (1) a sidewall structure having a first side, a second side opposite the first side, a third side between the first side and the second side, and a fourth side opposite the third side, the sidewall structure having a first end and a second end; (2) a bottom portion connected to a first end of the sidewall structure; (3) an opening formed at the second end of the sidewall structure, opposite the first end, the opening being configured to allow access to an interior void of the container formed by the sidewall structure and the bottom portion; (4) a first latch keeper extending from the second side of the sidewall structure; (5) a kick out rib on the second side of the sidewall structure that extends outward beyond a front surface of the first latch keeper; and (6) a second latch keeper extending from the third side of the sidewall structure, the second latch keeper having an upper surface, an inner surface, and a lower surface; and (b) a lid pivotally connected to the base by a hinge, where the lid having an open configuration and a closed configuration. The lid may be configured to cover the opening formed at the second end of the sidewall structure when the container is in the closed configuration. The lid may have a plurality of latch assemblies that include a first latch assembly and a second latch assembly, where the first latch assembly and the second latch assembly each have a locked position and an unlocked position. The first latch assembly may engage the first latch keeper when the first latch assembly is in the locked position. When the lid is being moved to a closed position from an open position, the kick out rib may push the first latch assembly away from the base to prevent the first latch assembly from binding as the lid moves from the open configuration to the closed configuration. The kick out rib may have an upper ramped surface that extends outward and downward from sidewall structure and a lower ramped surface that converges toward the upper ramped surface. A rounded edge may extend between the upper ramped surface and the lower ramped surface. When the lid is in the closed configuration, the kick out rib may fit between a first raised portion of the sidewall structure and the first latch assembly. The base may also include a first ramped surface arranged adjacent a first end of the first latch keeper and a second ramped surface arranged a second end of the first latch keeper. The kick out rib comprises a first kick out rib that extends from the first ramped surface and a second kick out rib that extends from the second ramped surface.

Other aspects of this disclosure may relate to a container comprising: (a) a base that includes: (1) a sidewall structure having a first side, a second side opposite the first side, where the sidewall structure having a first end and a second end; (2) a bottom portion connected to a first end of the sidewall structure; (3) an opening formed at the second end of the sidewall structure, opposite the first end, where the opening being configured to allow access to an interior void of the container formed by the sidewall structure and the bottom portion; (4) a pair of wheels connected to the second side of the sidewall structure; and (5) a pull handle assembly connected to the first side of the sidewall structure; and (b) a lid connected to the base, where the lid has an open configuration and a closed configuration. The lid may be configured to cover the opening formed at the second end of the sidewall structure when the container is in the closed configuration. The pull handle assembly may include: (1) a pull handle pivotally attached to the first side of the sidewall structure, (2) a primary hinge plate pivotally attached to the pull handle, and (3) a secondary hinge plate pivotally attached to the primary hinge plate and the first side. The pull handle assembly may have an extended configuration that enables a user to pull the container and a nested configuration. The pull handle may be located within a recess on the first side of the sidewall structure in the nested configuration. When the pull handle assembly is in the nested configuration, an upper surface of the pull handle may be arranged substantially parallel to an outward facing surface of the first side. The pull handle may include a first handle end that is pivotally connected to the first side of the sidewall structure, a second handle end opposite the first handle end and a pull handle body extending between the first handle end and the second handle end. The primary hinge plate may be pivotally connected to the pull handle body at a location nearer the first handle end of the pull handle body than the second handle end. In addition, when the pull handle assembly is in the nested configuration, the secondary hinge plate may be positioned between the pull handle and the first side of the sidewall structure, and the secondary hinge plate may be located between the primary hinge plate and the first side of the sidewall structure. Additionally, when the pull handle assembly is in the nested configuration, the secondary hinge plate and the primary hinge plate may be substantially parallel with an upper surface of the pull handle. The sidewall structure may include a third side that extends between the first side and the second side, and a fourth side that is opposite the third side, where the third side includes a pair of tracks, and each track of the pair of tracks includes a hollow cavity. The sidewall structure may also a third side that extends between the first side and the second side, and a fourth side that is opposite the third side, where a first corner is formed at an intersection of the first side and the third side, and a first corner support may extend inwardly from the first corner. The first corner support may include a hollow cavity.

Additional aspects of this disclosure may relate to a container comprising: (a) a base that includes: (1) a sidewall structure with a first side, a second side opposite the first side, where the sidewall structure has a first end and a second end; (2) a bottom portion connected to a first end of the sidewall structure; (3) an opening formed at the second end of the sidewall structure, opposite the first end, the opening being configured to allow access to an interior void of the container formed by the sidewall structure and the bottom portion, and (b) a lid connected to the base, where the lid has an open configuration and a closed configuration. The lid may be configured to cover the opening formed at the second end of the sidewall structure when the container is in the closed configuration. A lid support member may be attached to the lid, where the lid support member may include: (1) a primary wall with a front surface and a rear surface opposite the front surface, (2) a perimeter wall that connects to the primary wall, and (3) a plurality of openings extending through the primary wall that are configured to receive a strap to secure an item to the lid support member. The primary wall may contact an interior surface of the lid in a plurality of locations, and the perimeter wall may contact the interior surface of the lid in a plurality of locations. As another option, the container may include a lid stay rod assembly that extends between base and the lid support member, where the lid stay rod assembly may be pivotally attached to the base and also pivotally attached to the lid support member. When the lid is in a fully open configuration, the lid stay rod assembly may prevent the lid from closing. In some examples, the lid support member may include: (1) a front surface with a grid-like shape formed from a plurality of front ribs that intersect each other in a generally perpendicular orientation; (2) a rear surface opposite the front surface, where a portion of the rear surface contacts an interior surface of the lid. A majority of the plurality of front ribs have an opening. The rear surface may have a grid-like shape and may be formed from a plurality of rear ribs that intersect each other in a generally perpendicular orientation. The lid support member may further include an opening support rib extending behind each elongated opening of the plurality of elongated openings. The lid support member may further comprise a plurality connecting members that are positioned between the front surface and the rear surface, and where each connecting member connects to and extends between neighboring front ribs of the plurality of front ribs.

Aspects of this disclosure may relate to a strap for lifting a container where the strap includes a base member having a first end, a second end opposite the first end, and an elongated member extending between the first end and the second end. The base member may be formed from a woven fiber material. The strap may have a first end portion located at the first end having a first engaging member, where the first engaging member includes a first layered portion, a second end portion located at the second end, where the second end portion includes a second engaging member that has a second engaging member, which includes a second layered portion. The strap may also have a carry handle that includes a first opening and a second opening, where the elongated member extends through the first opening and the second opening. The base member may include a pair of overlap regions arranged on both sides of the carry handle, where each overlap region includes a plurality of layers of the base member and stitching to join the plurality of layers together. The carry handle may be substantially centered along an entire length of the strap. Additionally, the first end portion and the second end portion both include stitching that joins the first layered portion and the second layered portion. The stitching of the first layered portion may be located a fixed distance from the first end defining an inboard portion and an outboard portion of the first layered portion, where the inboard portion has a first length defined as a distance from a centerline of the stitching to the first end of the base member and the outboard portion has a second length defined as a distance from the centerline of the stitching to an end of the outboard portion. The first length of the inboard portion may be less than the second length of the outboard portion. The base member may be a single unitary member, and in some examples, the strap may have a variable width along an overall length of the strap.

Other aspects of this disclosure may describe a system of a strap for lifting a container that include a container having a first side handle that includes a first elongated opening on a first side of the container and a second side handle having a second elongated opening on a second side of the container opposite the first side, where the first elongated opening has a first opening width and the second elongated opening has a second opening width. The strap may include a base member having a first end, a second end opposite the first end, and an elongated member extending between the first end and the second end, the base member having a strap width. The strap may also include a first end portion located at the first end having a first engaging member that includes a first layered portion, and a second end portion located at the second end, where the second end portion includes a second engaging member that has a second layered portion. The strap may also include a carry handle with a first opening and a second opening opposite the first opening, where the elongated member extends through the first opening and the second opening. The first end portion may extend through the first elongated opening and the second end may extend through the second elongated opening and secure the strap to the container using a friction fit. The strap width of the base member at the first end portion may be greater than the width of the first elongated opening of the container. The strap width may be within a range of 1 percent to 10 percent greater than the first opening width. The first engaging member may include stitching located a fixed distance from the first end to a centerline of the stitching defining an inboard portion and an outboard portion of the first end portion, where the inboard portion has a first length defined as a distance from the centerline of the stitching to the first end of the strap and the outboard portion has a second length defined as a distance from the centerline of the stitching to an end of the outboard portion, where the first length is less than the second length. The container may include a first recess offset below a first top surface of the first side handle, where the first recess has an inboard recess portion that extends toward an interior void of the container from the first elongated opening and an outboard recess portion that extends away from the first elongated opening in a direction extending away from the interior void of the container, and where an inboard portion of the first end portion is received in the inboard recess portion. A depth of the first recess may be greater than a thickness of the first end portion. A majority of the strap may extend below the first side handle.

Yet other aspects of this disclosure may relate to a method for installing a strap on a container that include: (a) opening a lid from a base of the container, where the lid is rotationally coupled to the base; (b) inserting a first end portion of the strap through a first elongated opening on a first handle of the base, where the first end portion is inserted at a first acute angle to a first top surface of the first handle; (c) rotating a first inboard portion of the first end portion onto the first top surface of the first handle; (d) rotating a first outboard portion of the first end portion onto the first top surface of the first handle; (e) inserting a second end portion of the strap into a second opening on a second handle of the base, where the strap is inserted at a second acute angle to a second top surface of the second handle; (f) rotating a second inboard portion of the second end portion onto the second top surface of the second handle; and (g) unfolding a second outboard portion of the second end onto the second top surface of the second handle. In some examples, the method may also include: (a) placing the first inboard portion into a first inboard recess, where the first inboard recess is offset below the first top surface of the first handle and extends toward an interior void of the container from the first elongated opening; (b) placing the first outboard portion into a first outboard recess, where the first outboard recess is offset below the first top surface of the first handle and extends away from the interior void of the container from the first elongated opening; (c) closing the lid onto the base; and (d) lifting the strap by a centrally located strap handle, where a base member of the strap extends around the first handle and contacts an outboard surface of the first handle. The first acute angle may be between 1 degree and 55 degrees. A width of the first end portion may be greater than a width of the first elongated opening.

According to another aspect, a container is disclosed. The container may comprise a molded base that includes a sidewall structure having a first side, a second side opposite the first side, a third side extending between an edge of the first side and an edge of the second side, and a fourth side opposite the third side, the sidewall structure having a first end and a second end; a bottom portion connected to a first end of the sidewall structure and configured to support the container on a surface, and an opening formed at a second end of the sidewall structure, opposite the first end, the opening being configured to allow access to an interior void of the container formed by the sidewall structure and the bottom portion. The base may further include a latch keeper extending from the sidewall structure, where the latch keeper has an upper surface, an inner surface and a lower surface. The container may also include a lid that is pivotal between an open configuration and a closed configuration, where the lid has a shape corresponding to a shape of the base and is configured to cover the opening formed at the second end of the sidewall structure when the container is in the closed configuration. A hinge may be configured to connect the lid to the base where the lid is rotatable from the closed configuration to the open configuration. The container may further include a latch assembly, where the latch assembly having a locked position and an unlocked position.

The latch assembly may include a latch body that is pivotally engaged with the lid and where the latch body having at least one engagement lug. The latch assembly may further include a locking member that is slidably engaged with the latch body, where the locking member is slidable between at least a downward position and an upward position. The locking member may be configured to lock the lid in the closed configuration when the locking member is in the downward position and configured to unlock the lid when the locking member is in the upward position. Still the latch assembly further includes a biasing member engaged with the latch body and the locking member, where the biasing member biases the locking member in a downward position; and an activating member pivotally engaged with the latch body and engaged with the locking member, where the activating member configured to move the locking member from the downward position to the upward position.

The latch assembly may only be moved from the unlocked position to the locked position when the locking member is in the upward position. Another aspect of the latch assembly is that the at least one engagement lug of the latch body may be engaged to the lower surface of latch keeper when the latch assembly is in the locked position; and that a hook portion of the locking member may engage the upper surface of the latch keeper when the latch assembly is in the locked position.

Other aspects of this disclosure may relate to the lid of the container being rotated from the closed configuration to the open configuration may include rotating the lid 90 degrees from the closed configuration. In addition, the latch keeper may further include a support rib that extends from an exterior surface of the base to the inner surface of the latch keeper, where the support rib may be centrally located relative to the upper surface of the latch keeper. The locking member may further comprise at least two hook portions, such that when the latch assembly is in the locked position, the support rib is positioned between the at least two hook portions of the locking member. The base may further comprise at least one ramped surface adjacent the latch keeper, such that the ramped surface extends downwardly at an angle away from an interface surface of the base. The at least one ramped surface forms an angle between 30 degrees and 60 degrees relative to the interface surface of the base. A gasket may be arranged in a recess formed in at least one of the base and the lid. As another feature, the base may further comprise a handle on each of the sides of the container, where each handle is integrally molded with the base. The handles may have a curved profile underneath an exterior surface of the handle, where the curved profile is formed by a plurality of ribs extending from one of the sides of the sidewall structure to an interior surface of the handle.

Other aspects of this disclosure may relate to a container comprising: a base that includes a sidewall structure having at least a first side and a second side opposite the first side, the sidewall structure having a first end and a second end; a bottom portion connected to a first end of the sidewall structure and configured to support the container on a surface; and an opening formed at a second end of the sidewall structure, opposite the first end, the opening being configured to allow access to an interior void of the container formed by the sidewall structure and the bottom portion. The base may also include a latch keeper extending from the sidewall structure, the latch keeper having an upper surface, an inner surface and a lower surface. The container may also comprise a lid that is pivotal between an open configuration and a closed configuration, where the lid has a shape corresponding to a shape of the base and is configured to cover the opening formed at the second end of the sidewall structure when the container is in the closed configuration. A hinge may be configured to connect the lid to the base and about which the lid is rotatable from the closed configuration to the open configuration, and a latch assembly that has a locked position and an unlocked position. The latch assembly may comprise a latch body pivotally engaged with the lid, where the latch body has an at least one engagement lug, a locking member that is engaged with the latch body, where the locking member is movable between a downward position and an upward position. The locking member may be configured to lock the lid in the closed configuration when the locking member is in the downward position and configured to unlock the lid when the locking member is in the upward position. The latch assembly may also have a biasing member engaged with the latch body and the locking member, where the biasing member biases the locking member in a downward position; and an activating member pivotally engaged with the latch body and engaged with the locking member, where the activating member is configured to move the locking member from the downward position to the upward position.

Additional aspects of this disclosure may relate to a base portion of the container that includes a plurality of tabs positioned along interior surfaces of the interior void. Each tab of the plurality of tabs may extend from one of the interior surfaces and comprise an upper support surface and an opening, where the opening of each tab has an elongated shape. The upper support surface may be located in an upper region of the interior void of the base or at a height that is greater than fifty percent of a height of the interior void. In addition, the base may include a pair of tracks are positioned on at least an interior surface of at least one sidewall, where the pair of tracks are positioned on at least an interior surface of at least two sidewalls. Similarly, the lid may comprise a plurality of clips positioned along an interior surface of the lid, where each clip includes an engaging member and an elongated opening, where the elongated opening of each tab of the plurality of tabs may have substantially the same width as the elongated opening of each clip. The container may also have a gasket arranged in a recess formed in at least one of the base and the lid and a channel integrally molded with an exterior surface of the base, where the channel extends around an entire exterior surface of the base.

Still other aspects of this disclosure may relate to a container that includes a base having a sidewall structure with at least a first side and a second side opposite the first side, the sidewall structure having a first end and a second end, a bottom portion connected to a first end of the sidewall structure and configured to support the container on a surface; and an opening formed at a second end of the sidewall structure, opposite the first end, where the opening being allows access to an interior void of the container formed by the sidewall structure and the bottom portion. The container may also have a lid that is pivotal between an open configuration and a closed configuration, where the lid has a shape corresponding to a shape of the base and is configured to cover the opening formed at the second end of the sidewall structure when the container is in the closed configuration. The container may also include a latch assembly that has a locked position and an unlocked position, where the latch assembly includes a latch body pivotally engaged with the lid, a locking member engaged with the latch body, where the locking member is movable between a downward position and an upward position. The locking member is configured to lock the lid in the closed configuration when the locking member is in the downward position and configured to unlock the lid when the locking member is in the upward position. An activating member may be pivotally engaged with the latch body and also engaged with the locking member, where the activating member moves the locking member from the downward position to the upward position.

Other aspects of the container described within this disclosure may include the latch assembly having a biasing member engaged with the latch body and the locking member, where the biasing member biases the locking member in a downward position. The locking member may be slidable between the downward position and the upward position, where the latch assembly may only be moved from the unlocked position to the locked position when the locking member is in the upward position. The latch body may include an inner surface and at least one engagement lug, where the base includes a latch keeper that comprises an upper surface, an inner surface and a lower surface. The at least one engagement lug of the latch body may engage the lower surface of latch keeper when the latch assembly is in the locked position; and where a lower surface of a hook portion of the locking member engages the upper surface of the latch keeper when the latch assembly is in the locked position.

BRIEF DESCRIPTION OF THE DRAWINGS

The present invention is illustrated by way of example and not limited in the accompanying figures in which like reference numerals indicate similar elements and in which:

FIG. 35 illustrates a top view of an alternate base member of the carry strap of FIG. 28 according to one or more aspects described herein.

FIGS. 36A-H illustrate top views of alternate stitching options for the carry strap of FIG. 28 according to one or more aspects described herein.

Further, it is to be understood that the drawings may represent the scale of different components of one single embodiment; however, the disclosed embodiments are not limited to that particular scale.

DETAILED DESCRIPTION

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Additionally, the term "plurality," as used herein, indicates any number greater than one, either disjunctively or conjunctively, as necessary, up to an infinite number. Nothing in this specification should be construed as requiring a specific three-dimensional orientation of structures in order to fall within the scope of this invention. Also, the reader is advised that the attached drawings are not necessarily drawn to scale.

In general, aspects of this invention relate to containers and latching assemblies for containers. According to various aspects and embodiments, the containers and latching assemblies described herein may be formed of one or more of a variety of materials, such as metals (including metal alloys), polymers, and composites, and may be formed in one of a variety of configurations, without departing from the scope of the invention. It is understood that the containers and latching assemblies may contain components made of several different materials. Additionally, the components may be formed by various forming methods. For example, metal components, may be formed by forging, molding, casting, stamping, machining, and/or other known techniques. Additionally, polymer components, such as elastomers, can be manufactured by polymer processing techniques, such as various molding and casting techniques and/or other known techniques.

The various figures in this application illustrate examples of containers and latching assemblies according to this invention. When the same reference number appears in more than one drawing, that reference number is used consistently in this specification and the drawings refer to the same or similar parts throughout.

Figure 1A:
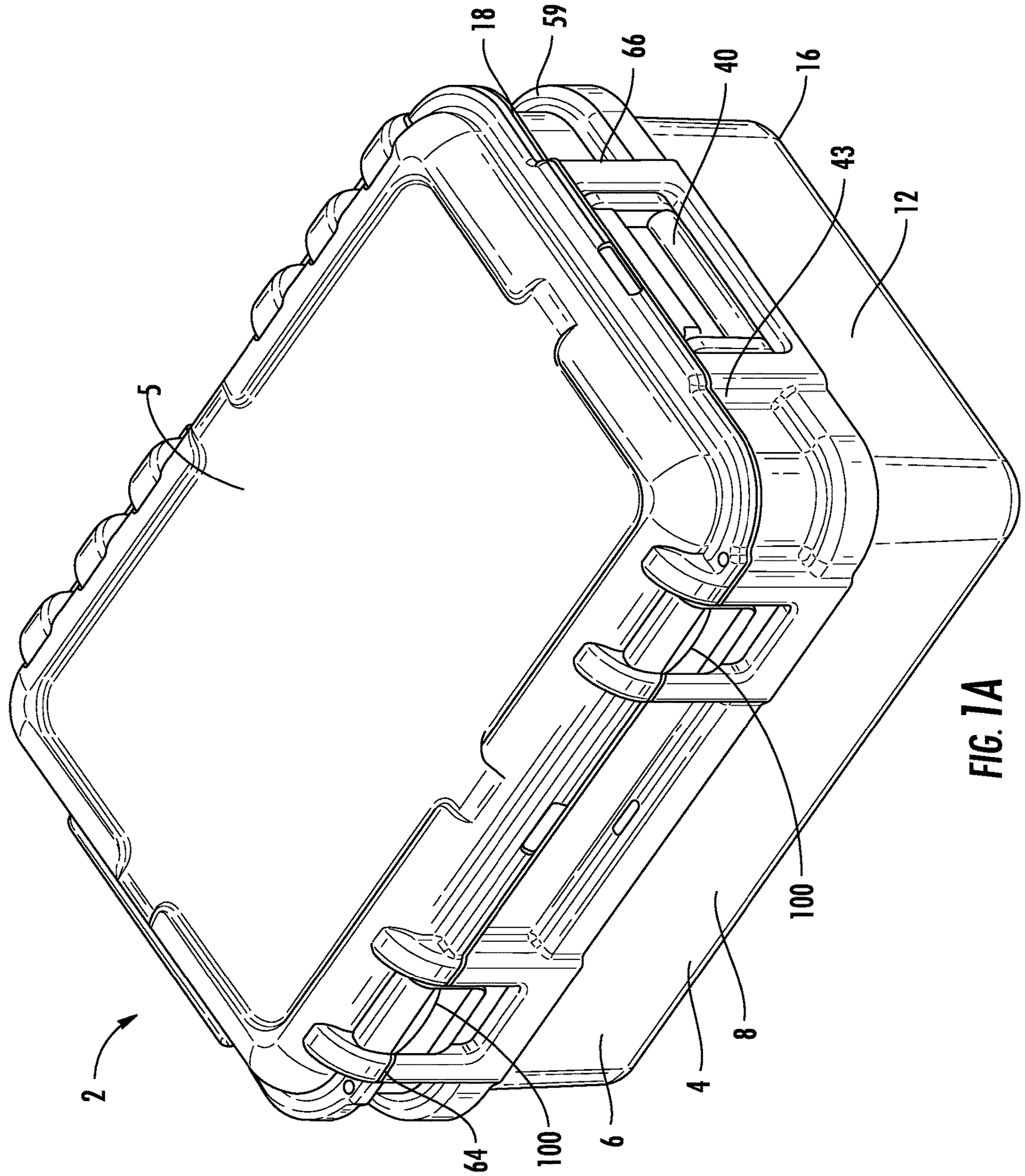
FIG. 1A is a top perspective view of a container according to one or more aspects described herein.
Figure 1B:
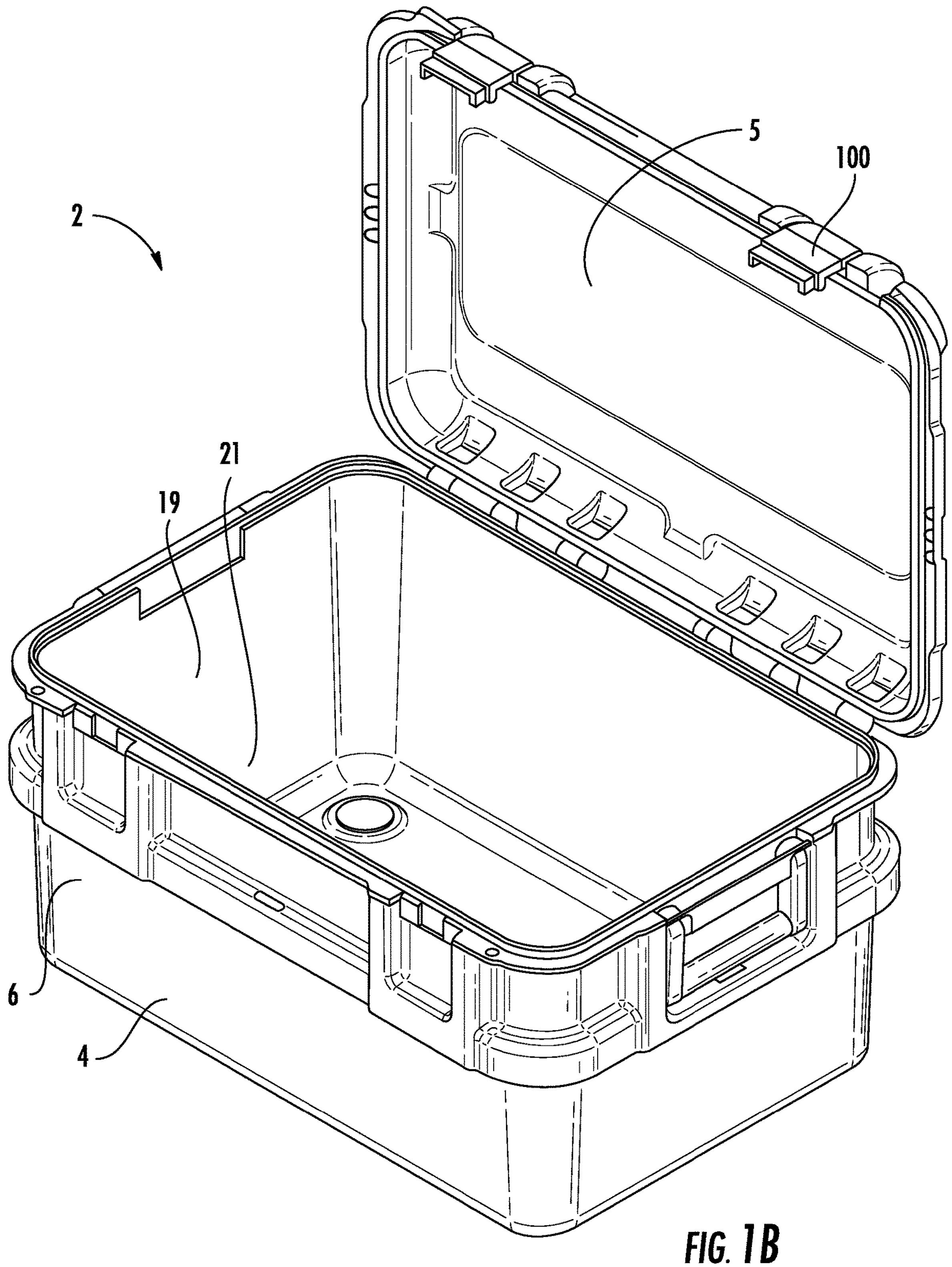
FIG. 1B is a top perspective view of the container of FIG. 1A with the lid in an open position according to one or more aspects described herein
Figure 2A:
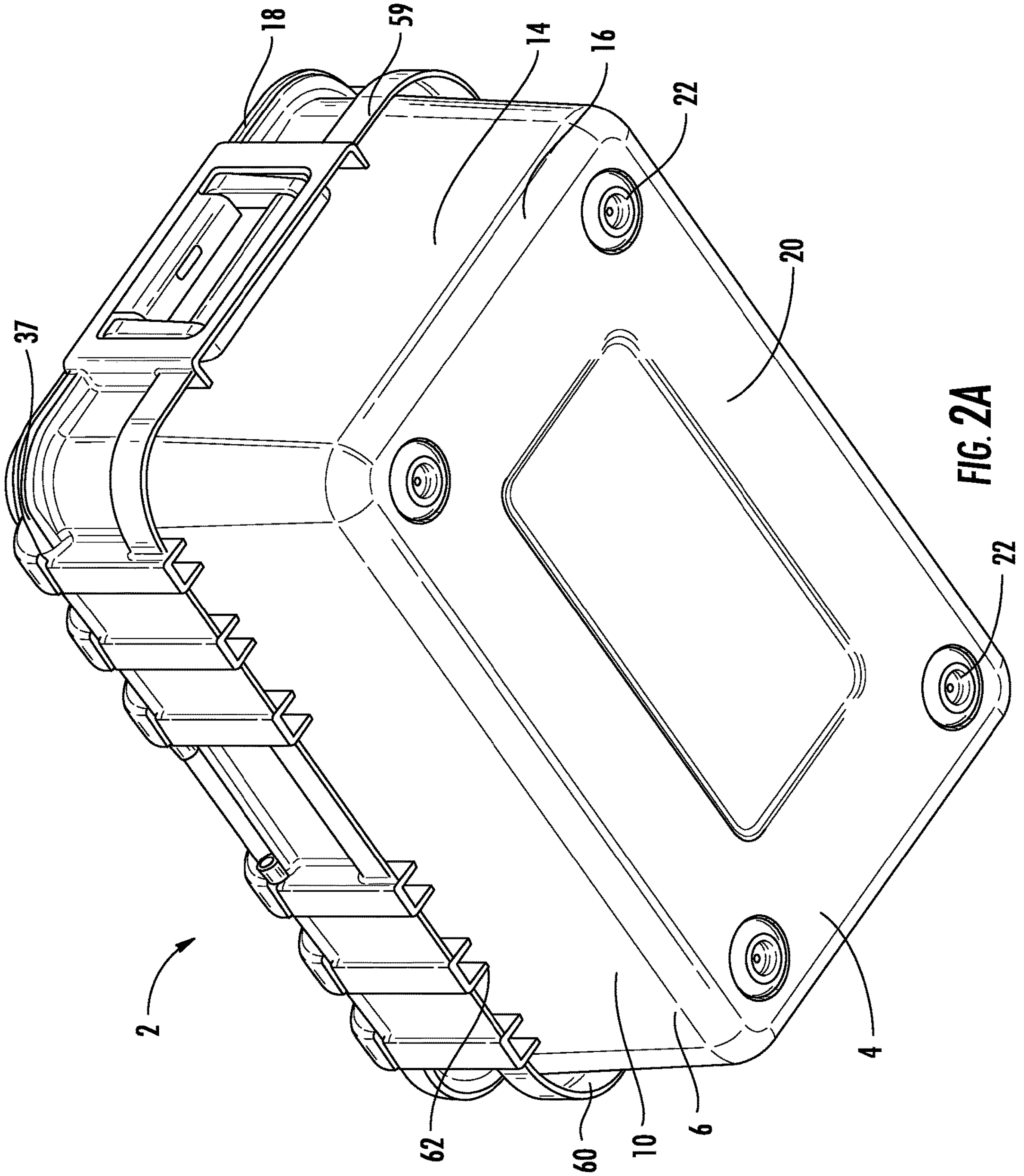
FIG. 2A is a bottom perspective view of the container of FIG. 1A according to one or more aspects described herein.
Figure 2B:
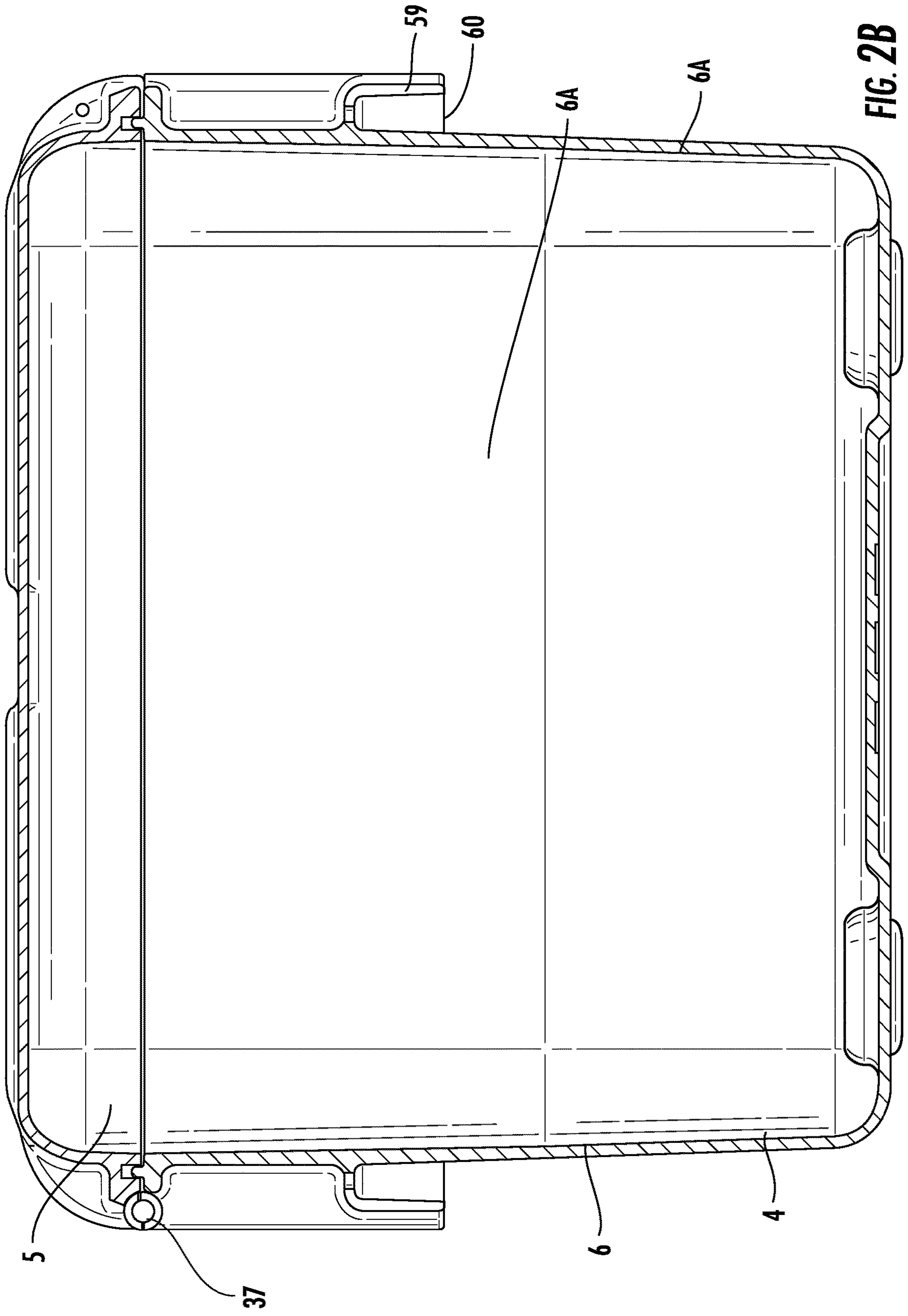
FIG. 2B is a side cross-sectional view of the container of FIG. 1A according to one or more aspects described herein.

FIGS. 1A, 1B, and 2A depict perspective views of a container 2. In one example, the container 2 may comprise a base portion 4 and a lid 5 that, in some examples, may be coupled, or in some examples may be non-destructively, removably coupled, thereto. The base portion 4 may be a structure forming a void for containing articles, as will be discussed more fully herein. In some examples, the base portion 4 may be cuboidal or substantially cuboidal in shape. In other examples, the base portion 4 may be prismoidal or substantially prismoidal (e.g., a pentagonal prism, hexagonal prism, heptagonal prism, or the like) in shape. In still other examples, the base portion 4 may be substantially cylindrical in shape or may have a substantially trapezoidal cross section. Various other shapes may be used without departing from the invention.

The base portion 4 may include a sidewall structure 6 having a first side 8, a second side 10 opposite the first side, a third side 12 extending between an edge of the first side and an edge of the second side, and a fourth side 14 opposite the third side. The sidewall structure 6 may also have a first end 16 and a second end 18. The sidewall structure 6 may also include a bottom portion 20 connected to a first end 16 of the sidewall structure 6 and configured to support the container on a surface such as a table, the ground, a vehicle bed, or the like. In some embodiments, the bottom portion 20 may also and/or alternatively include one or more feet 22 which may support the container 2 on a surface such as a table, the ground, a vehicle bed, or the like. The feet 22 may be integrally formed with the base 4 or may be attached to the base 4 after the base has been formed.

Figure 3:
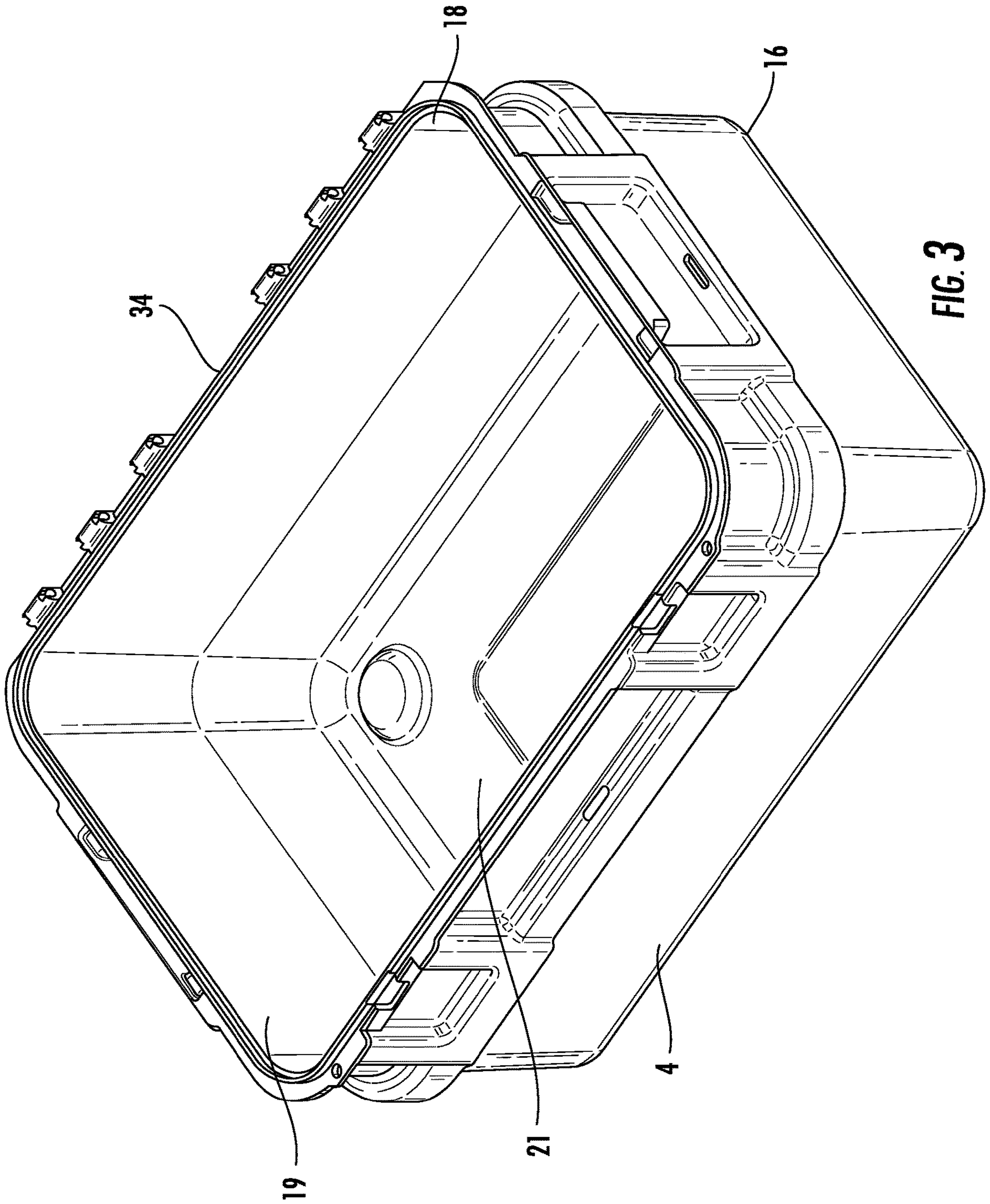
FIG. 3 is a top perspective view of the base portion of the container of FIG. 1A according to one or more aspects described herein.

The base portion 4 further includes a second end 18 defining an opening 19 (shown in FIG. 3). The opening 19 is configured to allow access to an interior void 21 of the container 2 formed by the sidewall structure 6 and the bottom portion 20.

The container 2 may include a lid 5. The lid 5 is pivotable between an open configuration and closed configuration. In some embodiments rotating the lid from the closed configuration to the open configuration includes rotating the lid about 90° from the closed configuration, or about 180° from the closed configuration, or about 270° from the closed configuration. As shown in FIG. 1, the opening 19 may be covered by lid 5, when the container is in use (e.g., when the container is in a closed configuration). In some arrangements, the lid 5 may connect to the base 4 in a closed configuration using a press fit. Additionally, or alternatively, other securing systems or devices may be used to secure the lid 5 to the base 4, as will be discussed more fully herein.

In some examples, the lid 5 may be hinged such that it is connected to (either removably or permanently) the base 4 at a hinge 37 and may be rotated about the hinge 37. The hinge 37 may be one of various types of hinges, including a continuous piano hinge, double hinge, ball joint hinge, living hinge, and the like. These and various other hinge arrangements may be discussed more fully herein. The hinge 37 may permit the lid 5 to be opened and rotated away from the base portion 4, to allow access to the void defined by the base portion 4 (e.g., via opening 19). That is, the hinge 37 may facilitate rotation of the lid 5 from a closed configuration of the container (e.g., when the lid is in place covering the void 21 formed by the base 4, as shown in FIG. 1A) to an open configuration (e.g., when the lid is not covering the void 21 formed by the base 4, as shown in FIG. 1B), and vice versa.

In addition, in some arrangements, the container 2 may include a gasket 30 or other sealing device. The gasket 30 may be arranged in either the lid 5 or the base 4 and may aid in sealing the lid 5 and base 4 when the lid 5 is in a closed configuration. For example, in one embodiment, the container 2 may be manufactured such that it is dust tight when tested for 8 hours and/or waterproof when tested for 30 minutes under 1 meter of water. In some embodiments, the container 2 may be capable of achieving an IP67 (as set forth by International Electrotechnical Commission) rating which specifies that there is no ingress of dust or complete protection from dust when tested for 8 hours and ingress of water in harmful quantities is not possible when the enclosure is immersed in water under defined conditions of pressure and time (up to 1 m of submersion). The IP67 dust test is 8 hours long and the enclosure is tested in a vacuum. The IP67 water test is 30 minutes long and the enclosure is tested with the lowest point of the enclosure 1000 mm below the surface of the water, or the highest point 150 mm below the surface whichever is deeper In some examples, (and as best shown in FIGS. 10A-11C) the gasket 30 may be seated in a recess 32 formed in at least one of the base 4 and the lid 5 and extending around a perimeter of the at least one of the base 4 or the lid 5. Additionally, in some example, the container 2 may include a ridge 34 in the opposite of the base 4 or the lid 5 and extending around a perimeter of the base 4 or the lid 5. The gasket 30 may be placed between the recess 32 and the ridge 34. The gasket 30 may aid in maintaining a seal between the interior of the container 2 and the outside environment, and in some examples may aid in maintaining the temperature of the articles contained within the container 2. One example gasket arrangement is shown in FIGS. 10A-11C, although this and various other gasket arrangements may be used with any of the containers described herein.

As shown, the gasket 30 is arranged in a recess or channel 32 in the lid 5. Alternatively, the gasket 30 may be arranged in a recess or channel formed in the base 4. When the lid 5 is in a closed configuration, the ridge 34 having a shape corresponding to recess 32 may contact the gasket 30 and compress the gasket 30 and aid in sealing the lid 5 and base 4 in the closed configuration. In some examples, the gasket 30 may be a traditional gasket having a substantially circular cross section. In other arrangements, the gasket 30 may include strategically placed cut-outs that may reduce or eliminate a need for a vent (e.g., a vent to prevent lid lock).

Figure 4B:
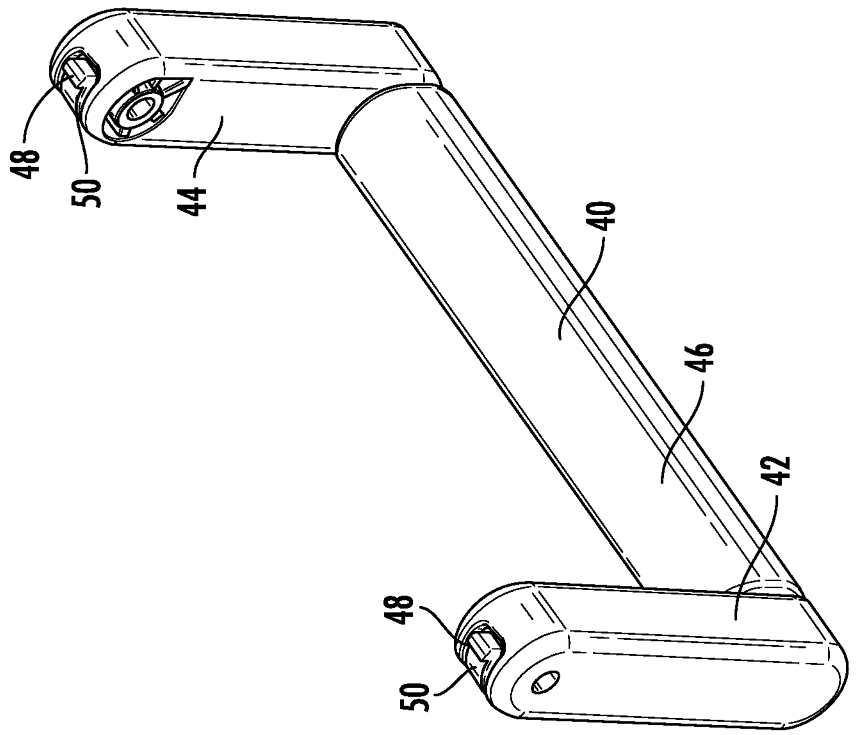
FIG. 4B is a top perspective view of a handle of the container of FIG. 1A according to one or more aspects described herein.
Figure 4A:
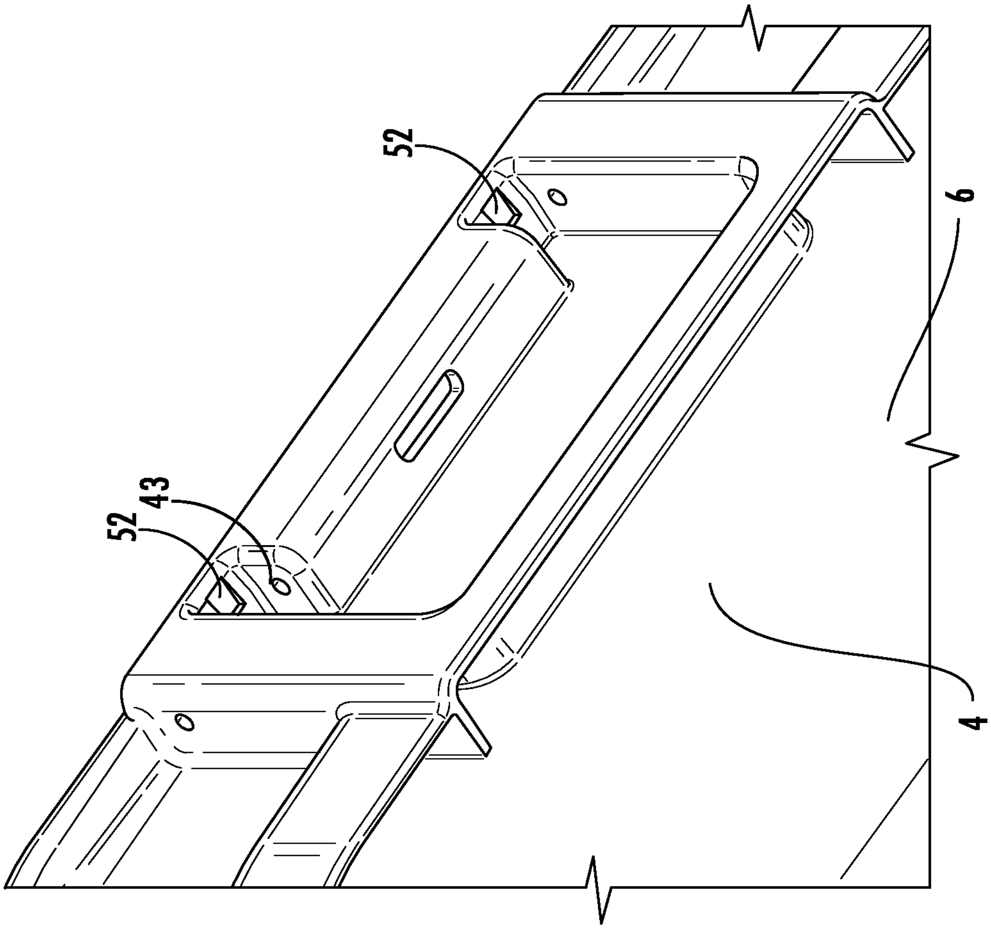
FIG. 4A is a bottom perspective view of a portion of the base portion of the container of FIG. 1A according to one or more aspects described herein.
Figure 4D:
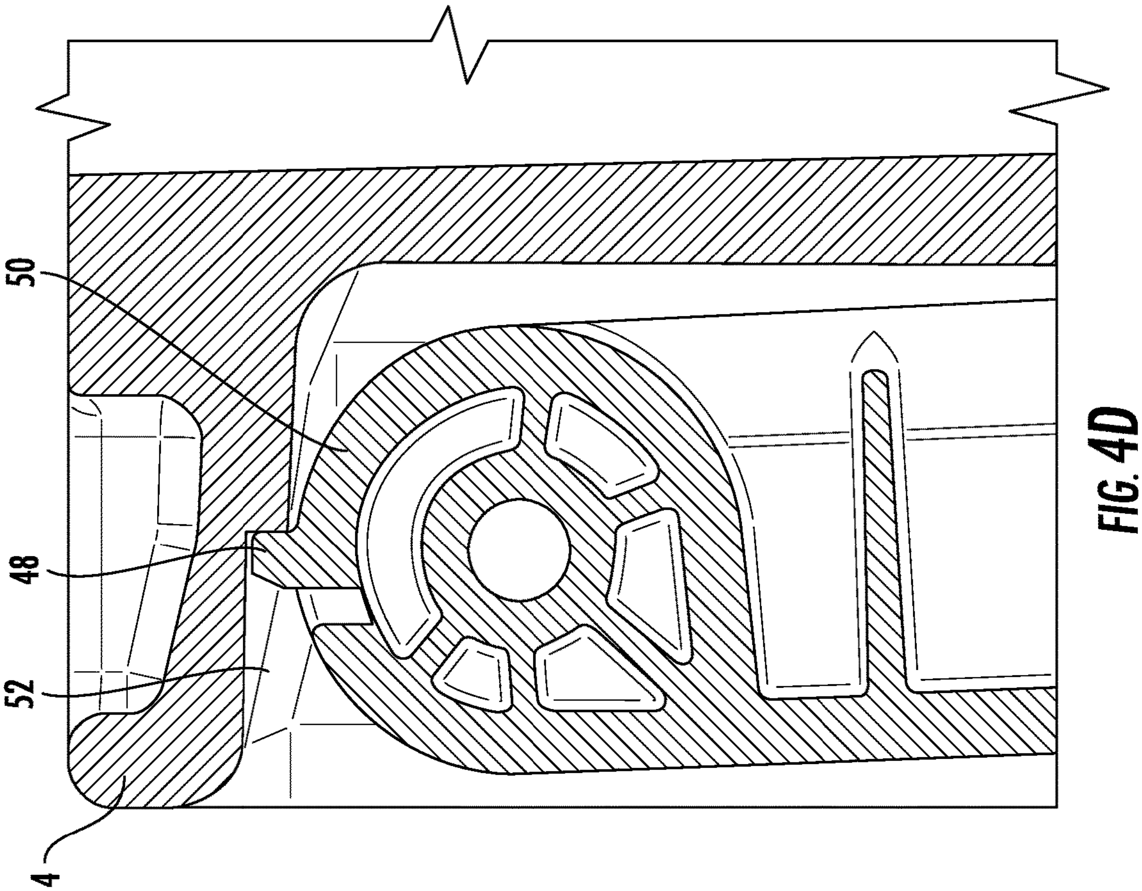
FIG. 4D is a side cross-sectional view of a portion of a handle and a container according to one or more aspects described herein.
Figure 4C:
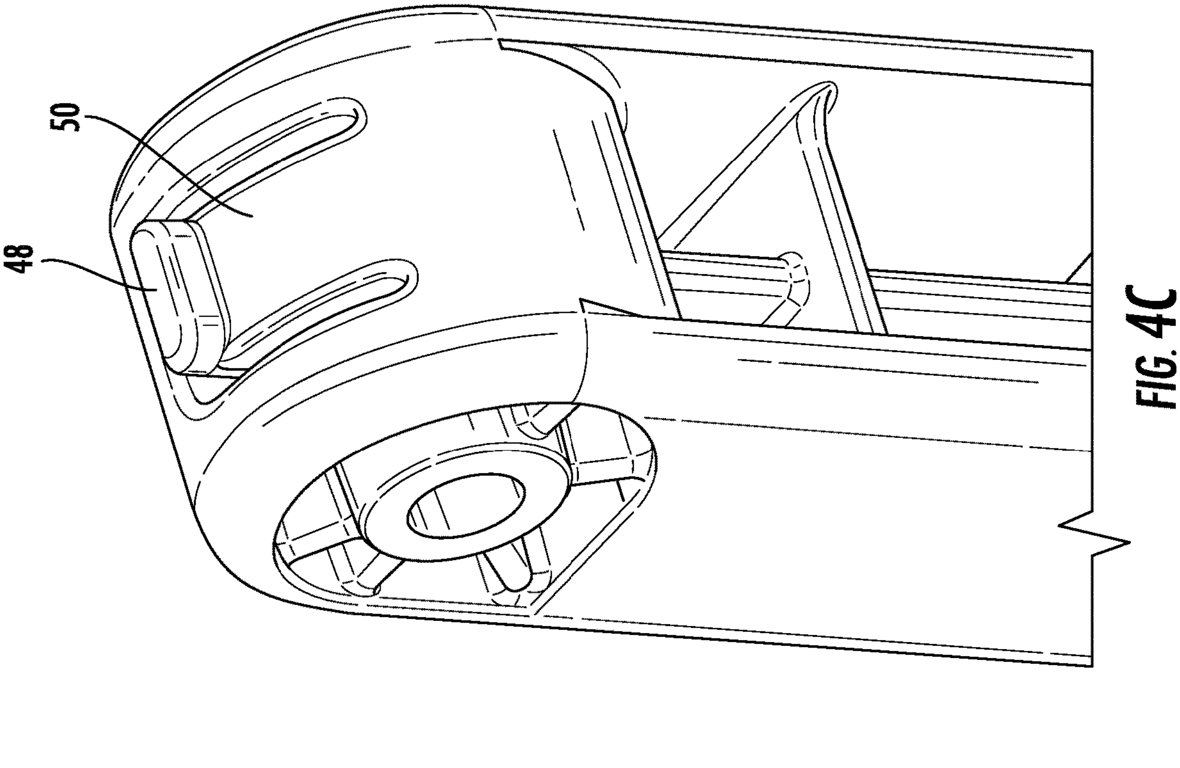
FIG. 4C is a top perspective view of portion of a handle according to one or more aspects described herein.

In some arrangements the container 2 may include additional features, such as one or more handles 40. The handles may be arranged on one or more portions of the sidewall structure 6, including on opposing sides, such as sides 12 and 14, as shown. As best shown in FIGS. 4A-4D the handles 40 may be constructed of first and second arms 42, 44 connected by a gripping member 46. The handle 40 may be pivotable about a hinge 43 passing through a portion of the sidewall structure 6 and through each of the first and second arms 42, 44. The handle 40 may also include features to reduce movement of, and possible rattling noise associated with, the handle when the handle is not in use. As shown in FIGS. 4A-4D, one or both of the arms 42, 44 may include a raised portion 48 at a distal end of the arm. In some embodiments the raised portion 48 may be attached to a resilient member 50. As best shown in FIGS. 4A and 4D, the container 2 may include a recessed portion 52. The raised portion 48 may be configured to be located within the recessed portion 52 of the sidewall structure 6 when the handle 40 is not in use. This may reduce movement of the handle 40 when the handle is not in use. However, when a user moves the handle 40 for use, the resilient member 50 may retract and allow the user to rotate the handle outward.

In other examples, as shown in FIGS. 14-16B and as will be discussed in more detail below, the handles 240 may be integrally molded with the base portion 204 and in some examples may generally be an undercut formed in the sidewall structure of the base 204. In some examples, the undercut forming the handle may include a recess extending along substantially all or a majority of the sidewall structure 6. This may provide ease of manufacturing the base 204 with the integrally molded handles 240. In some examples, the integrally molded handles 240 may be flush with an exterior surface of the base 204 in order to reduce the risk of breakage.

Figure 5B:
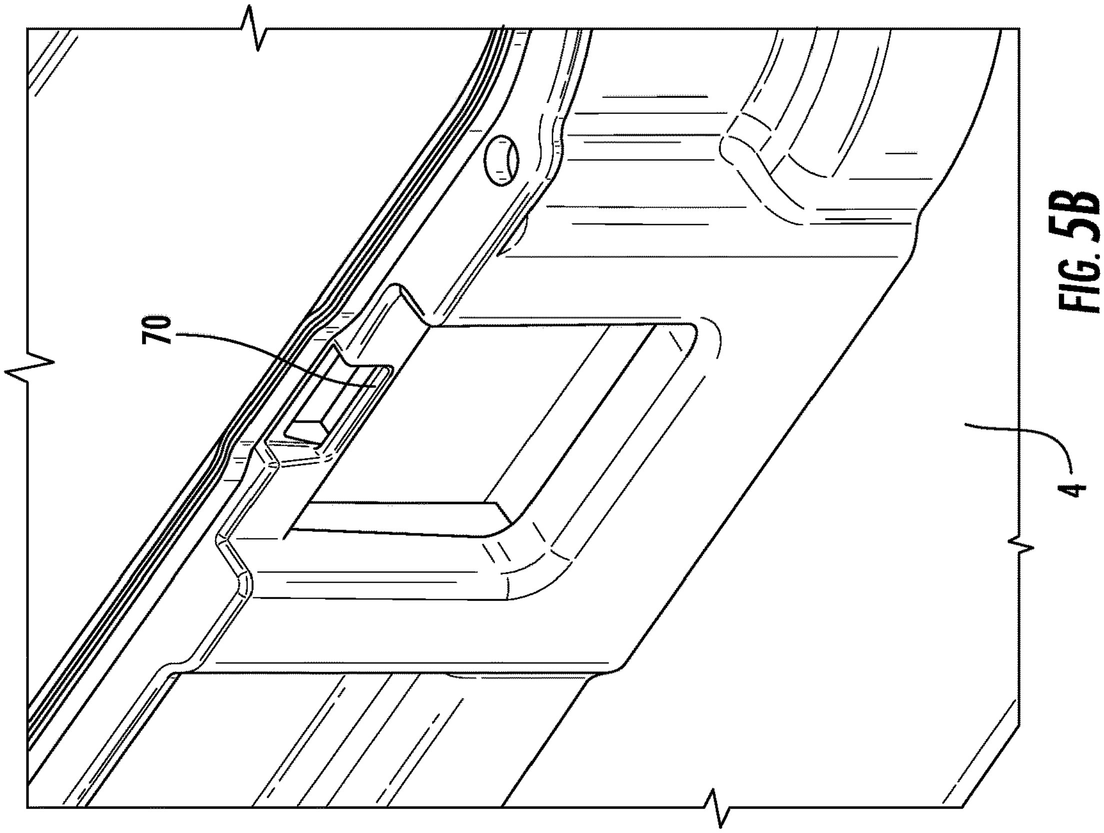
FIG. 5B is a top perspective view of a portion of the base portion of the container of FIG. 1A according to one or more aspects described herein.
Figure 5A:
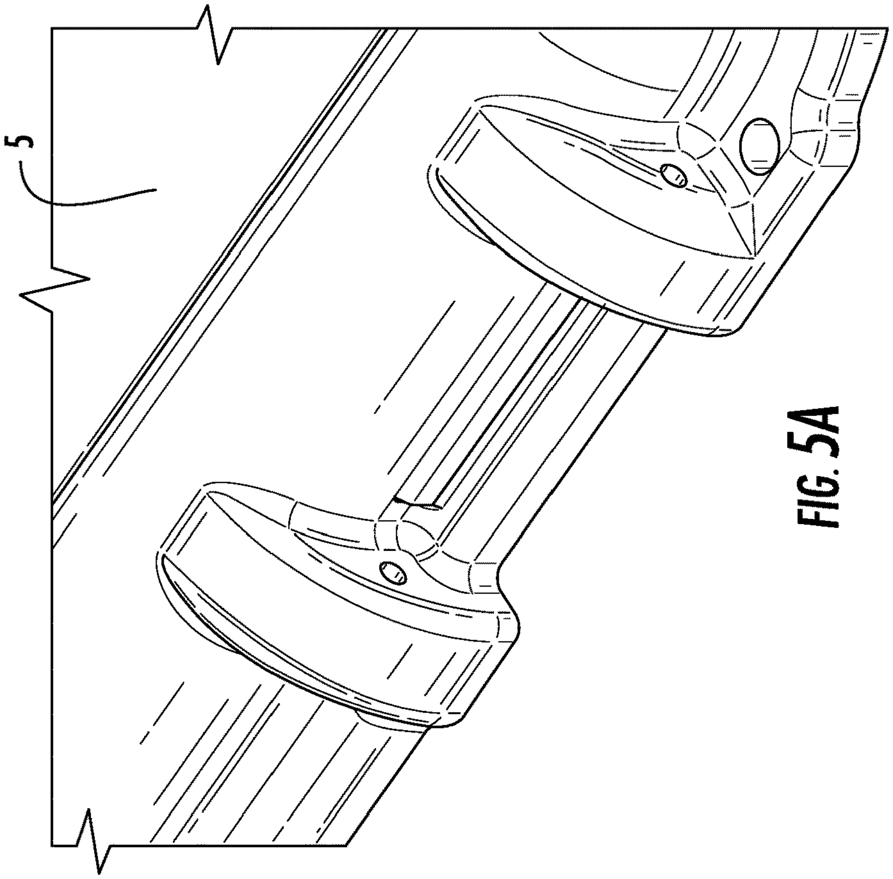
FIG. 5A is a top perspective view of a portion of the lid of the container of FIG. 1A according to one or more aspects described herein.
Figure 6B:
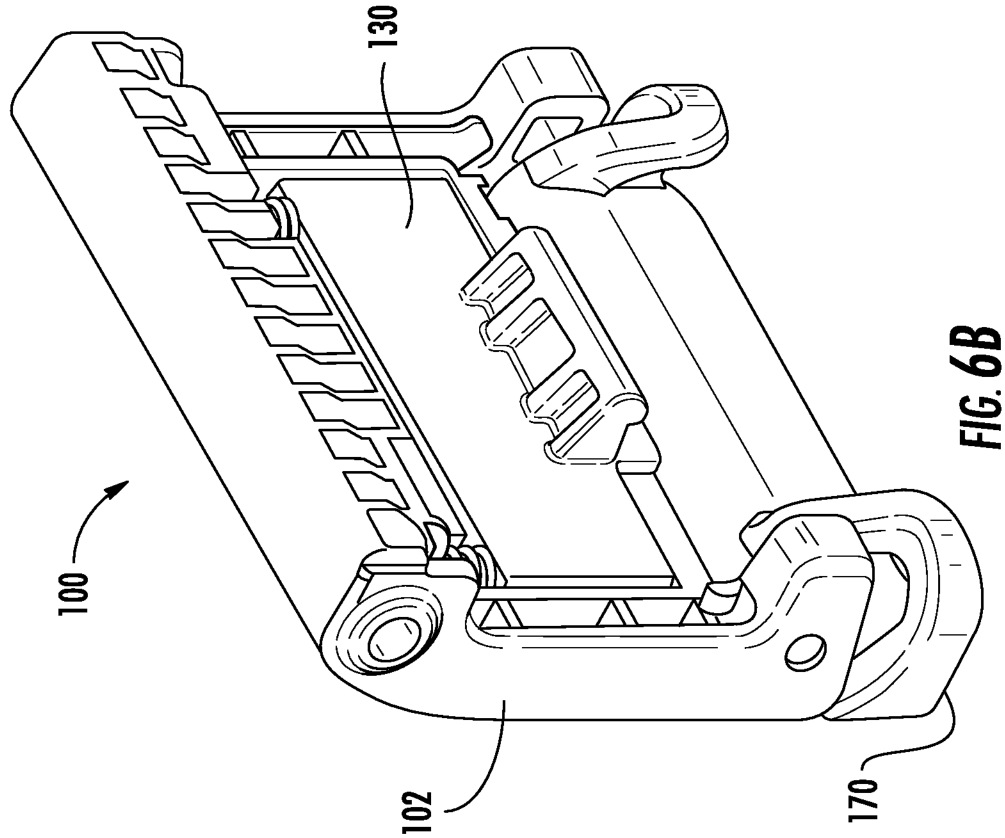
FIG. 6B is a top rear perspective view of a latch assembly according to one or more aspects described herein.
Figure 6A:
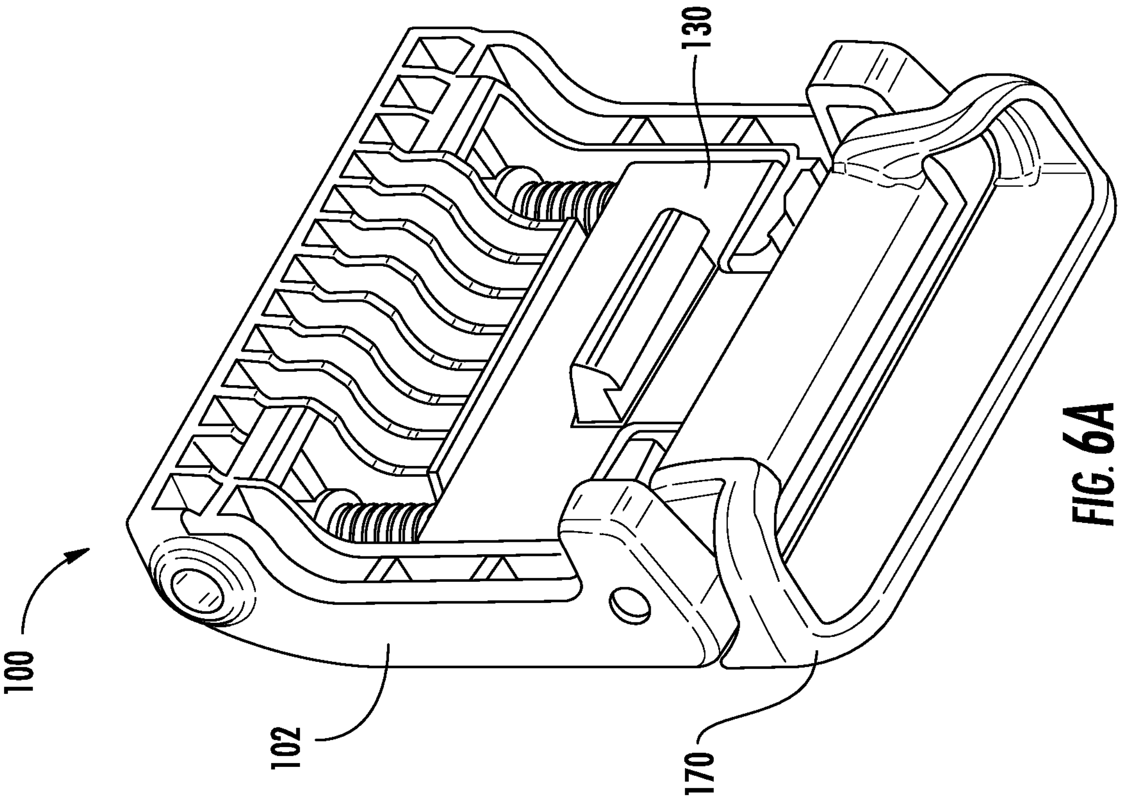
FIG. 6A is a bottom rear perspective view of a latch assembly according to one or more aspects described herein.
Figure 7B:
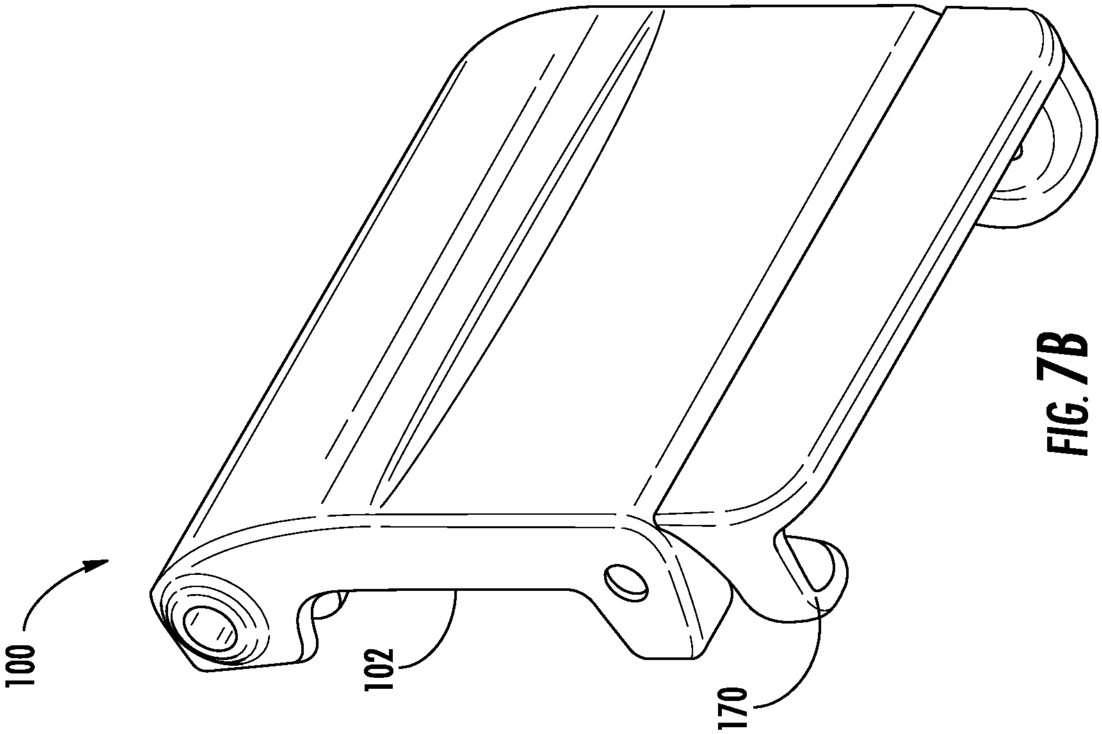
FIG. 7B is a bottom front perspective view of a latch assembly according to one or more aspects described herein.
Figure 7A:
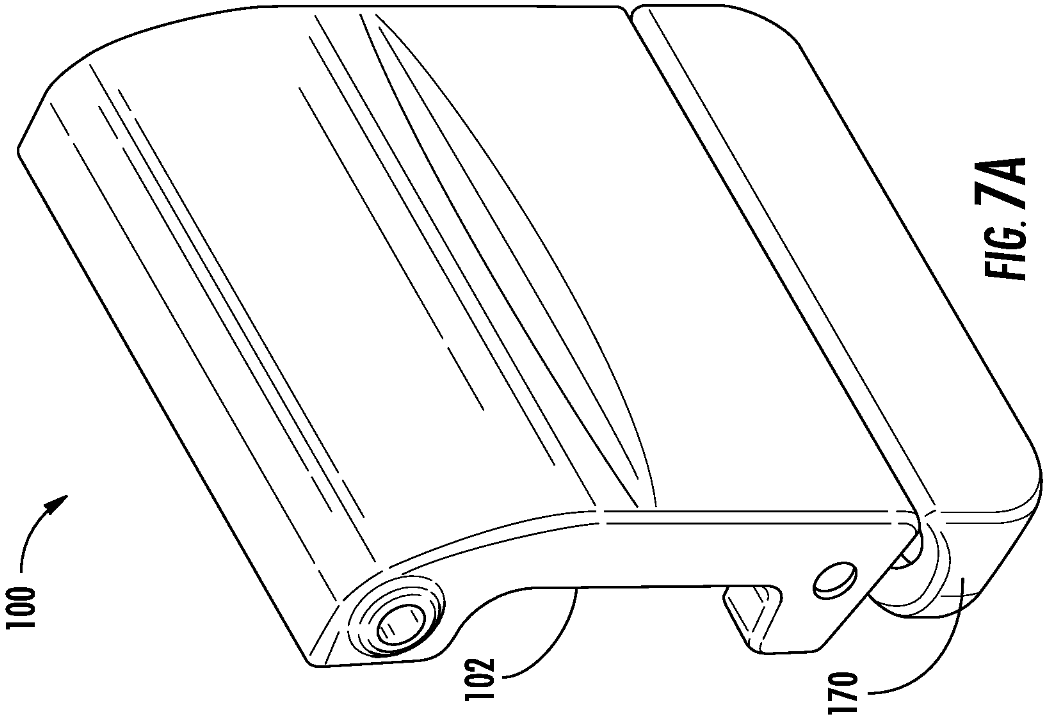
FIG. 7A is a top front perspective view of a latch assembly according to one or more aspects described herein.
Figure 9:
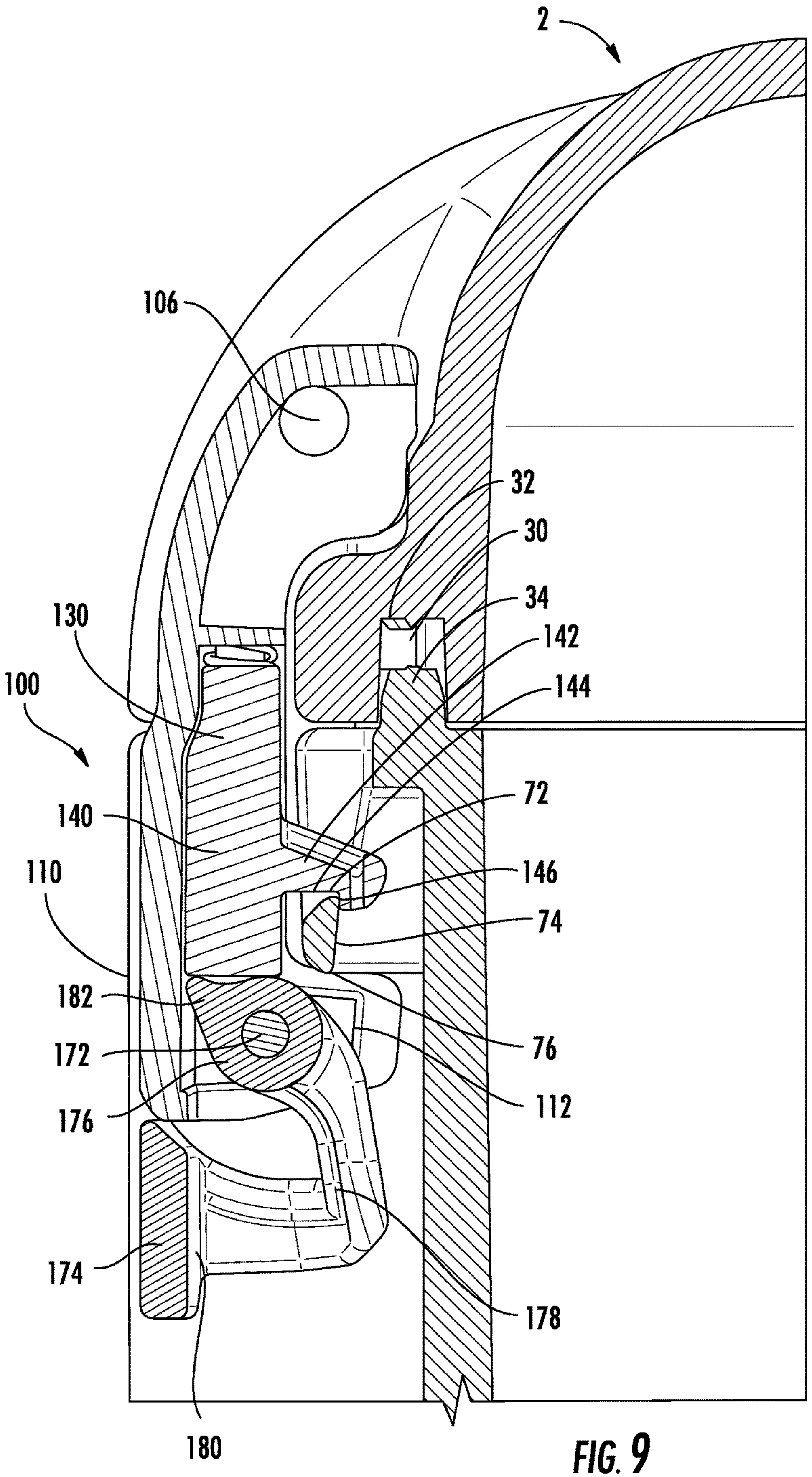
FIG. 9 is a side cross-sectional view of a latch assembly according to one or more aspects described herein.

In some arrangements, the container 2 may also include one or more latch assemblies 100. The latch assemblies 100 may have a locked position and an unlocked position and may be configured to lock the lid 5 when the lid 5 is in a closed configuration. The latch assemblies 100 may include one or more portions integrally formed with or otherwise attached to the container 2. As shown in FIGS. 5B and 9, the container 2 may include a latch keeper 70. The latch keeper 70 may extend from the sidewall structure 6 and may form a pocket within the container 2. The latch keeper 70 pocket has a shape configured to receive a portion of the locking member 130 as will be discussed in more detail below. The latch keeper may have an upper surface 72, an inner surface 74 and a lower surface 76. As will be discussed in greater detail below, the latch assemblies 100 may engage the latch keeper 70 to lock the lid 5 to the base 4 when the container 2 is in a closed configuration.

The container 2 may also include various features to improve the strength and/or functioning of the container 2. For example, the container may include various raised portions wherein certain portions of the base 4 and/or lid 5 extend further outward than other parts of the base 4 and/or lid. As best shown in FIGS. 1A, 1B, 2A, and 2B, the base 4 may include a J-shaped raised portion or wall 59 forming a channel 60, the raised wall 59 engaged with the sidewall structure 6. The channel 60 may surround the entire perimeter of the container 2. The channel 60 may also include strengthening members 62 at various locations within the channel. The channel 60 formed by the J-shaped wall 59 may increase the strength of the container 2, or the base 4. In some embodiments, and as shown for example in FIG. 2B, the J-shaped wall 59 may allow for the base 4 to be constructed such that the interior surfaces 6A of the sidewall structure 6 are substantially smooth throughout the interior portion of the container 2. Thus, for example, substantially all or all of the interior surface 6A of sidewall structure 6, including one or all of the first side 8, a second side 10 opposite the first side, a third side 12, may be substantially flat and/or smooth.

The container 2 may also include raised portions 64, 66 surrounding the latching assemblies 100 and handles 40 respectively. As shown in FIG. 4, the raised portions 64, 66 may exist on one or both of the base 4 or lid 5. The raised portions 64, 66 may be raised equal to or greater than the height of the latching assemblies 100 and handles 40 respectively, such that that latching assemblies 100 and/or handles 40 do not extend outward beyond the raised portions 64, 66 of the container 2. This may protect the latching assemblies 100 and/or handles 40 and reduce breakage of these components during use.

The container 2 may be configured to contain, store, carry, etc., items including food, beverages, or any other items. Additionally or alternatively, the container 2 may be configured to store materials in a solid or a gaseous state, or combinations thereof, without departing from the scope of the disclosure described herein.

The container 2 including the base 4 and lid 5 may be formed from various materials, such as one or more metals, alloys, polymers, ceramics, or fiber-reinforced materials. In some examples, the base 4 and lid 5 may be formed of a plastic material, such as polyethylene, that is molded to form both the base 4 and lid 5 portions. In some arrangements, the outer shells of the base 4 and lid 5 portions are formed using injection molding or roto-molding/rotational molding processes as would be understood by one of ordinary skill in the art (not shown). However, various other types of molding or other manufacturing processes (e.g., stamping, casting, forging, and the like) may be used to form the container 2 without departing from the invention.

In some arrangements herein, the base 4 and lid 5 may include an exterior surface or outer shell surrounding and enclosing an insulating portion (not shown), thus forming an insulating container. The outer shell may be typically formed from various materials, such as one or more metals, alloys, polymers, ceramics, or fiber-reinforced materials. In some examples, the outer shell may be formed of a plastic material, such as polyethylene, that is molded to form both the base 4 and lid 5 portions. In some examples, the insulating portion (not shown) may be formed of an insulating material that exhibits low thermal conductivity. For instance, the insulating portion may be formed of (or filled with) a polymer foam, such as polyurethane foam. Additional or other insulating materials may be used without departing from the invention, including for example, vacuum insulated panels. In some arrangements, the outer shells of the base 4 and lid 5 portions may be formed using an injection molding or roto-molding/rotational molding processes as would be understood by one of ordinary skill in the art (not shown). However, various other types of molding or other manufacturing processes (e.g., stamping, casting, forging, and the like) may be used to form the container without departing from the invention.

Figure 8:
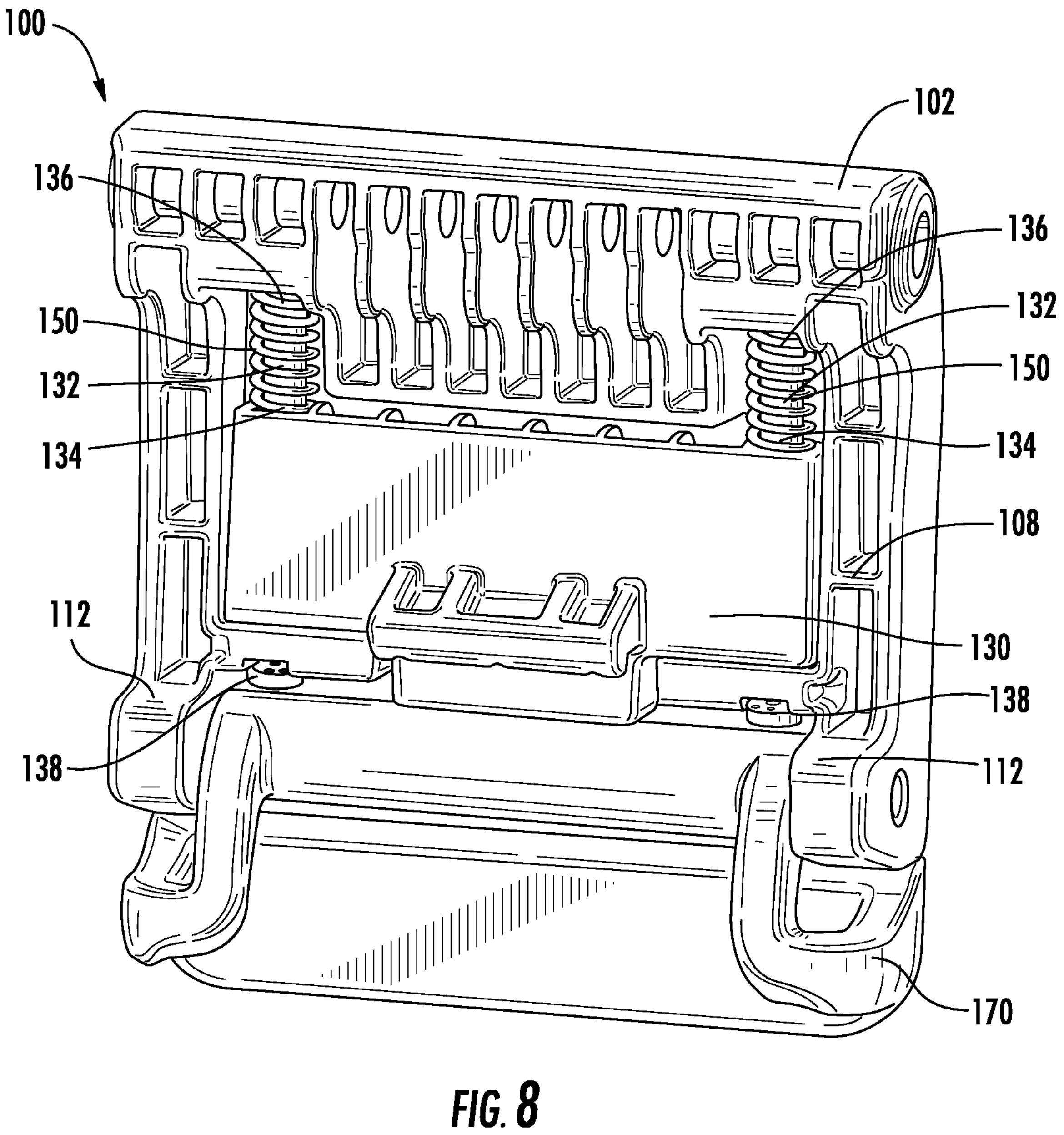
FIG. 8 is a rear perspective view of a latch assembly according to one or more aspects described herein.

Referring now more specifically to the latch assembly 100, as best shown in FIG. 8 and FIG. 9, the latch assembly 100 may include multiple components including a latch body 102, a locking member 130, a biasing member 150, and an activating member 170. As discussed above, the latch assembly 100 may include a locked position and an unlocked position.

The latch body 102 may be pivotally engaged with the lid 5. As shown in FIG. 9, the latch body may be pivotally engaged with the lid 5 using hinge 106, however, any suitable pivotal engagement may be used. In some embodiments, the hinge 106 may be removably engaged with the container 2. This hinge 106 may allow a user to easily remove and replace the latch assembly 100 if it becomes damaged. The latch body 102 may include an inner surface 108 and an outer surface 110. The outer surface may be curved and may generally follow the curve of the sidewall structure 6 of the container 2. As discussed above the outer surface 110 of the latch body 102 may, in some examples, not extend outward of the outer edge of the sidewall structure 6 of the container 2. The inner surface 108 may also be curved and may also include a number of different features. One exemplary feature that may be included on the latch body 102 may be one or more engagement lugs 112. As will be discussed in more detail below the engagement lugs 112 may engage the container base 4, or latch keeper 70, and may assist in compressing the lid 5 against the base 4 of the container 2.

The latch body 102 may also be engaged with the locking member 130. As shown in FIG. 8, the locking member 130 may be slidably engaged with the latch body 102 such that the locking member 130 may move between an upward position and a downward position in a substantially linear path. The locking member 130 may be configured to lock the lid 5 in a closed configuration when the locking member 130 is in the downward position and unlock the lid 5 when the locking member 130 is in the upward position.

As shown primarily in FIG. 8, the locking member 130 may be movably engaged with one or more guide members 132 such that the locking member 130 may slide up and down the guide members 132. In one embodiment, the locking member 130 may include apertures 134 passing through the locking member 130 and through which the guide members 132 may also pass. The guide members 132 may be engaged with the latch body 102 at a top end 136 and at a bottom end 138. As shown in FIG. 8 the guide members 132 are cylindrical rods but any suitable shape may be used that permits upward and downward movement of the locking member 130. For example, guide members 132 may be prismoidal or substantially prismoidal (e.g., a pentagonal prism, hexagonal prism, heptagonal prism, or the like) in shape. In still other examples, the latching assembly 100 may include other devices suitable for allowing generally linear movement between the locking member 130 and the latch body 102, including for example, rails.

As shown in FIG. 8, the latch assembly 100 may also include at least one biasing member 150 engaged with the latch body 102 and the locking member 130. As will be discussed in more detail below, the biasing member 150 is configured to bias the locking member 130 in a downward position. The biasing member 150 may be a compression spring as shown in FIG. 8, but may in alternative embodiments be any suitable device for biasing the locking member 130 in the downward position.

The locking member 130 may include a base portion 140 and a hook portion 142 extending inwards from the base portion 140. The hook portion 142 may include a lower surface 144 and an inward facing surface 146. As shown in FIG. 9, when the latch assembly 100 is in the locked position, the lower surface 144 of hook portion 142 of the locking member 130 may engage the upper surface 72 of the latch keeper 70 and the inward facing surface 146 of the hook portion 142 may engage the inner surface 74 of the latch keeper 70. Additionally, when the latch assembly 100 is in the locked position the upper surface of the engagement lugs 112 may engage the lower surface 76 of the latch keeper 70.

The latch body 102 may also be pivotally engaged with an activating member 170. The activating member 170 may also be engaged with the locking member 130 and may be configured to move the locking member 130 from the downward position to the upward position. As shown in FIGS. 8 and 9, the activating member 170 may be pivotally engaged to the latch body 102 by a hinge 172 extending through the latch body 102 and the activating member 170. The activating member 170 may include a grip portion 174, an activating barrel 176, and one or more arms 178 connecting the grip portion 174 and the activating barrel 176. As shown in FIG. 9, the grip portion 174 is spaced a distance from the sidewall structure 6 of the container 2. This distance may allow a user grip the back surface 180 of the grip portion 174 with their fingers placed between the sidewall structure 6 and the grip portion 174. As shown in FIG. 9, the activating barrel 176 of the activating member 170 may engage the locking member 130. The activating barrel 176 may include a raised portion 182. As will be discussed in greater detail below, a user may pull the grip portion 174 of the activating member 170 forward causing the raised portion 182 of the activating barrel 176 to rotate and lift up the locking member 130. This movement causes the latch assembly 100 to unlock and allows the lid 5 to be moved from the closed configuration to an open configuration.

Figure 10B:
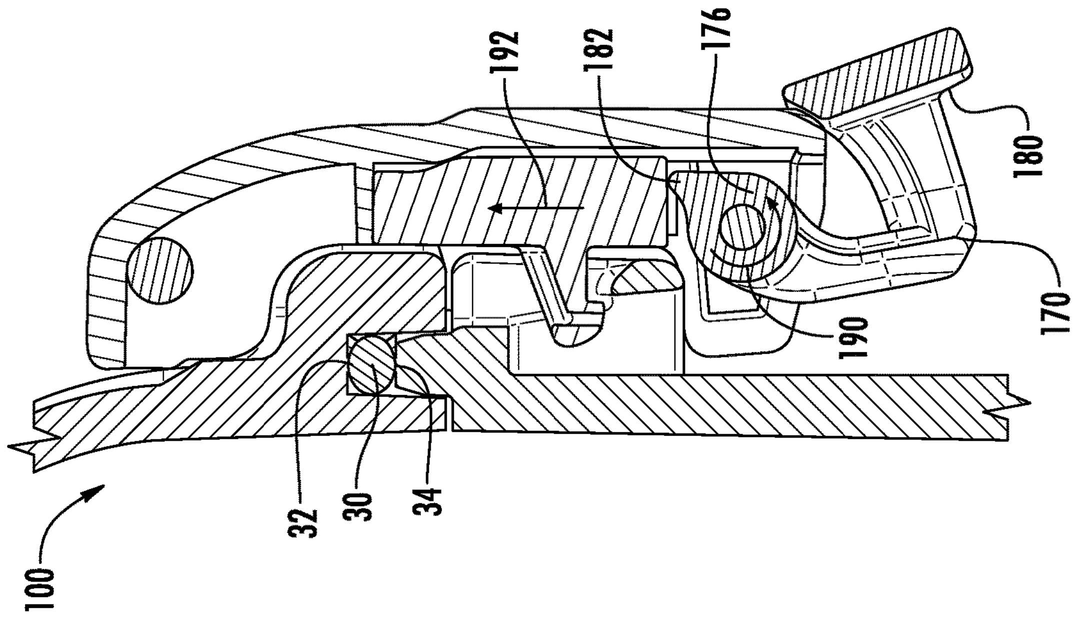
FIGS. 10A-10D illustrate side cross-sectional views of movement of a latch assembly from a locked position to an unlocked position according to one or more aspects described herein.
Figure 10A:
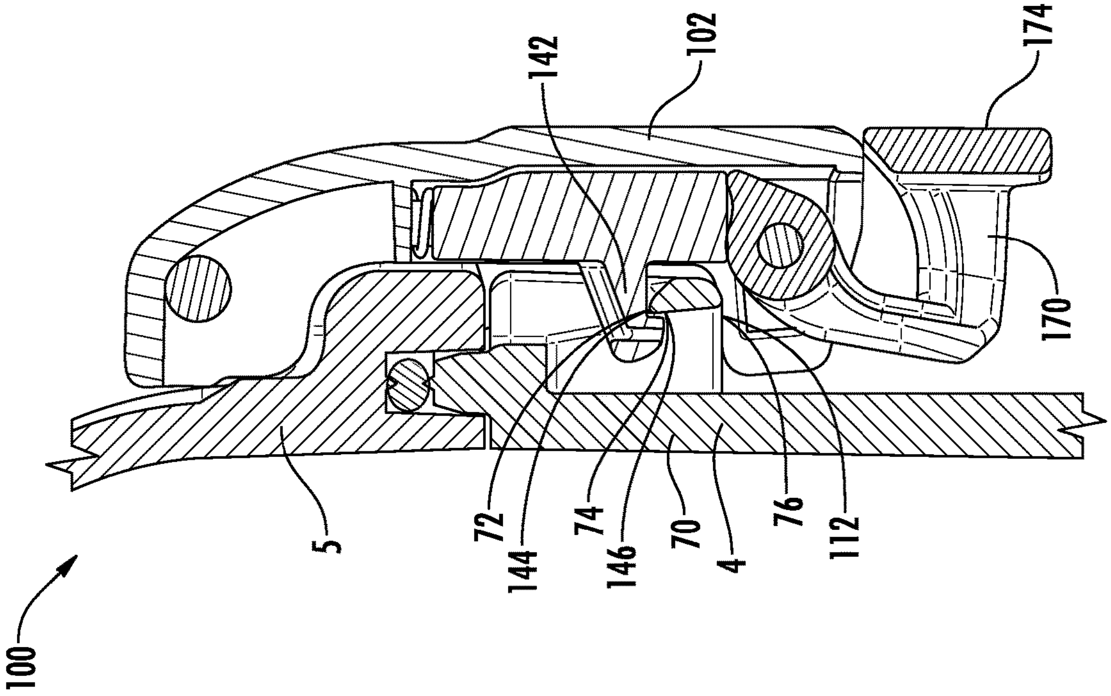
Figure 10D:
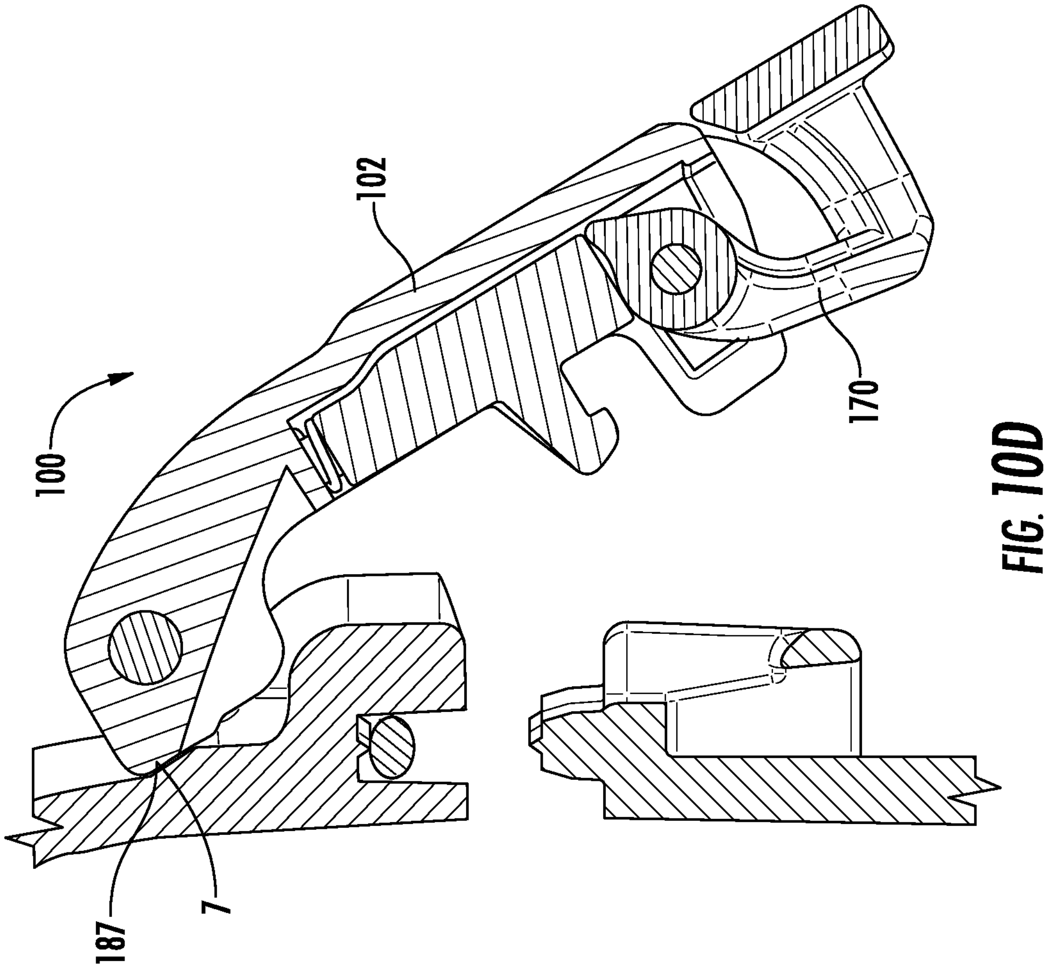
Figure 10C:
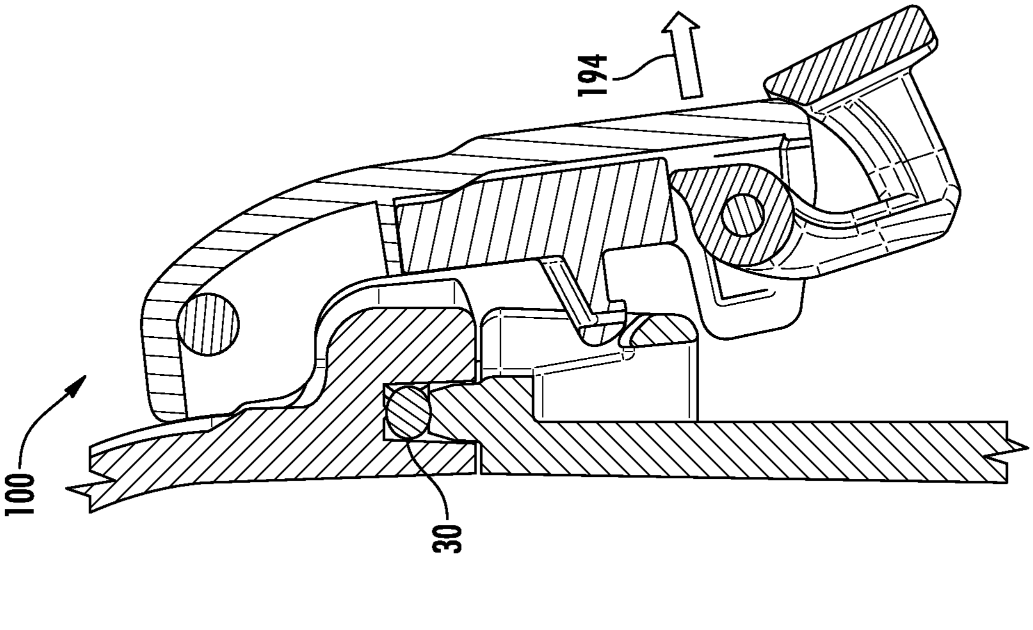

Referring now to FIGS. 10A-10D, a procedure for moving an embodiment of the latch assembly 100 from the locked position to an unlocked position is shown with side cross-sectional views of the latch assembly 100 and portions of the base 4 and lid 5. FIG. 10A depicts the latch assembly 100 in the locked position, FIG. 10B depicts the latch assembly 100 unlocking, FIG. 10C depicts the latch assembly 100 in an unlocked position, and FIG. 10D depicts the latch assembly 100 in an unlocked position and demonstrates an anti-rotation feature. As shown in FIG. 10A, in the locked position, the lower surface 144 of hook portion 142 is engaged with the upper surface 72 of the latch keeper 70; the inward facing surface 146 of the hook portion 142 is engaged with the inner surface 74 of the latch keeper 70; and the engagement lugs 112 are engaged with the lower surface 76 of the latch keeper 70.

As shown in FIG. 10B, the latching assembly 100 may be moved to the unlocked position by rotating the activating member 170 as shown with arrow 190. This rotation may be accomplished by a user pulling forward on back surface 180. As shown in FIG. 10B, as the activating barrel 176 rotates, the raised portion 182 engages the locking member 130 and raises the locking member 130. As shown in FIG. 10C, the latching assembly 100 is in an unlocked position. As the locking member 130 raises above latch keeper 70, the latch assembly 100 becomes unlocked and the latch body 102, including the locking member 130 and the activating member 170, may rotate forward as indicated by arrow 194.

FIG. 10D depicts an anti-rotation feature of the latch assembly 100 and container 2. As shown in FIG. 10D the latch assembly 100 is in the unlocked position and has been rotated further outward from the position shown in FIG. 10C. To restrict the rotation of the latch assembly 100, the latch body 102 may include a back surface 187 configured to engage an anti-rotation surface 7 of the lid once a user has rotated the latch assembly 100 a certain rotation away from the locked position. For example, the back surface 187 may be configured to engage the anti-rotation surface 7 when a user has rotated the latch assembly 100 at least 20 degrees from the locked position, or at least 30 degrees from the locked position, or at least 45 degrees from the locked position, or at least 90 degrees from the locked position. Advantageously this anti-rotation feature may also allow a user to utilize the latch assembly 100 as a handle to open the container 2.

Figure 11C:
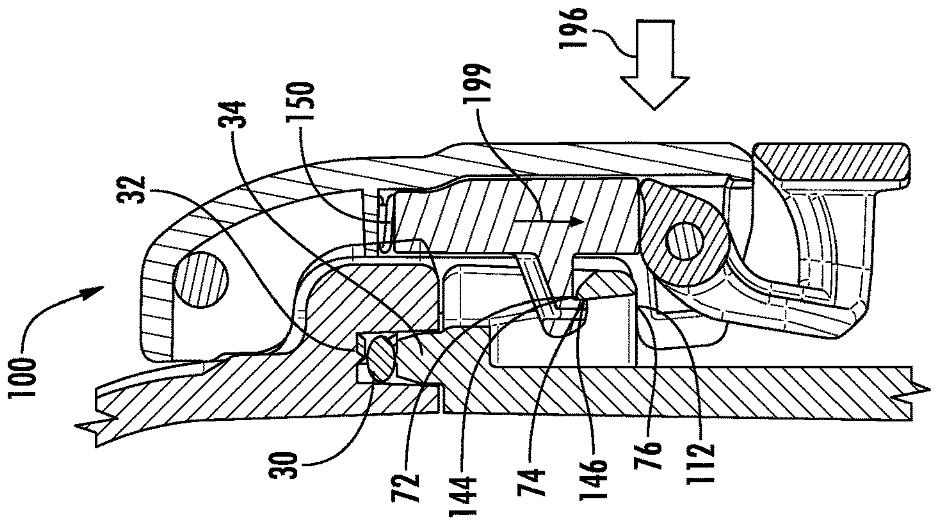
FIGS. 11A-11C illustrate side cross-sectional views of movement of the latch assembly of FIGS. 10A-10D from an unlocked position to a locked position according to one or more aspects described herein.
Figure 11B:
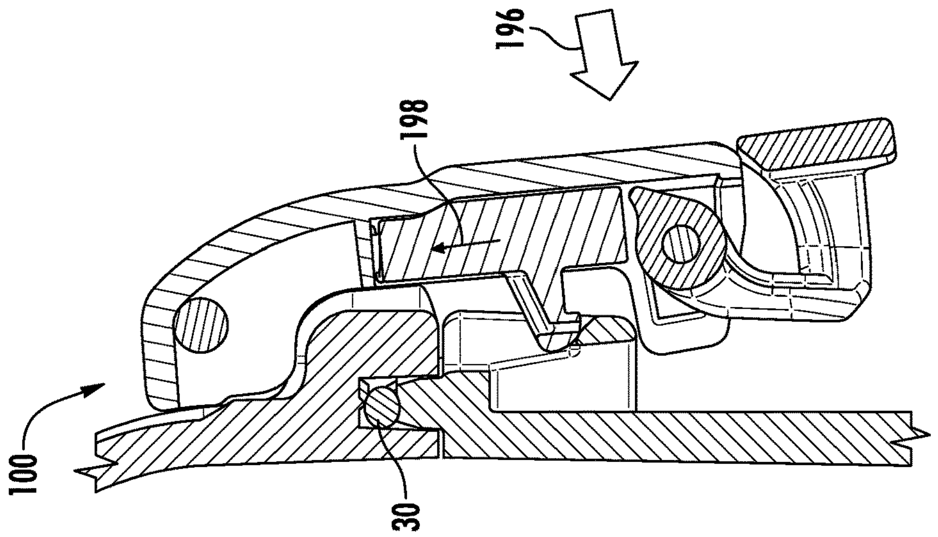
Figure 11A:
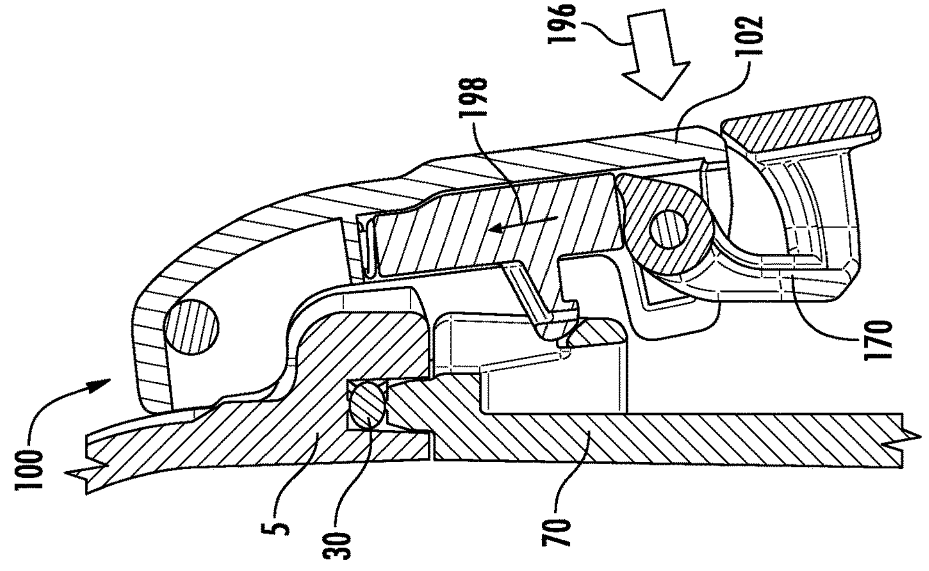

Referring now to FIGS. 11A-11C, a procedure for moving the latch assembly 100 from an unlocked position to locked position is shown with side cross-sectional views of the latch assembly 100 and portions of the base 4 and lid 5. FIG. 11A depicts the latch assembly 100 in an unlocked position, FIG. 11B depicts the latch assembly 100 locking, and FIG. 11C depicts the latch assembly 100 in locked position.

As shown in FIG. 11A, and as indicated by arrow 196, in one embodiment a user may return the latching assembly 100 to the locked position by pressing on latch body 102. As shown in FIG. 11B, as the latch body 102 is pressed inward, the locking member 130 may contact the latch keeper 70 which may cause the locking member 130 to raise upward as indicated by arrow 198. In other examples, in addition to pushing the latch body 102 inward, a user must also pull activating member 170 outward to move the latch assembly 100 to the locked position. In such an embodiment, the latch assembly 100 may advantageously only be moved from the unlocked position to the locked position when the locking member 130 is moved in the upward position by the activating member 170. This may reduce the possibility of accidently locking the container 2.

As shown in FIG. 11C, once the hook portion 142 has moved behind the raised portion of the latch keeper 70, the biasing members 150 may push the locking member 130 in a downward direction. As shown in FIG. 11C, the latch assembly 100 is in the locked position and the lower surface 144 of hook portion 142 is engaged with the upper surface 72 of the latch keeper 70; the inward facing surface 146 of the hook portion 142 is engaged with the inner surface 74 of the latch keeper 70; and the engagement lugs 112 are engaged with the lower surface 76 of the latch keeper 70. When in a closed position, the latching assembly 100 is positioned such that the lid 5 abuts the base 4 of the container 2, thus closing, securing, and/or sealing the container 2. Additionally, as the latch assembly moves from the unlocked position (FIG. 11A) to the locked position (FIG. 11C) the gasket 30 is compressed between the lid 5 and the base 4 of the container 2. Thus, when the latch assembly 100 is in a locked position the gasket 30 is more compressed than when the latch assembly 100 is in an unlocked position.

Figure 12C:
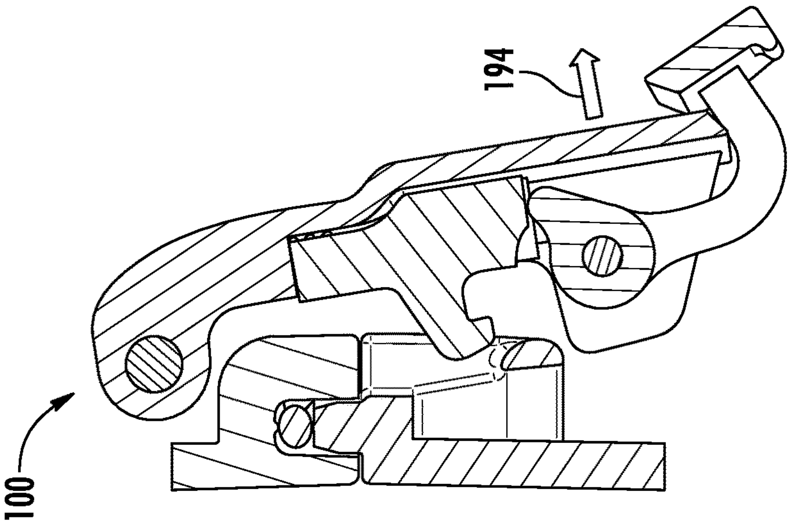
FIGS. 12A-12C illustrate side cross-sectional views of movement of a latch assembly from a locked position to an unlocked position according to one or more aspects described herein.
Figure 12B:
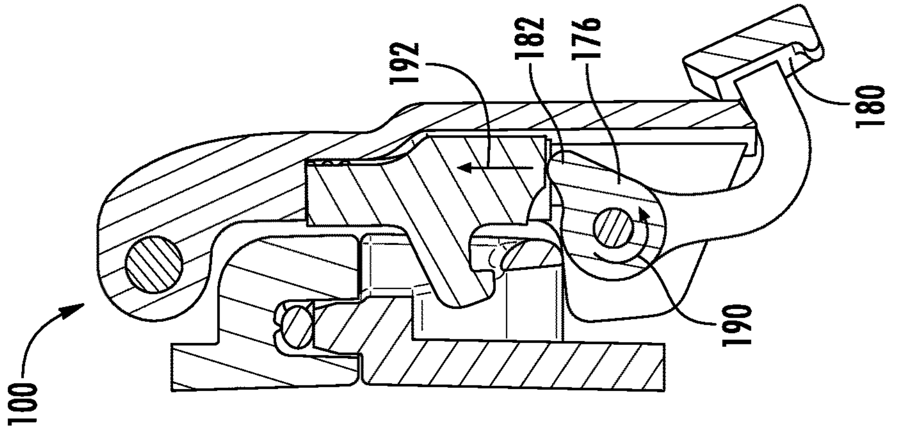
Figure 12A:
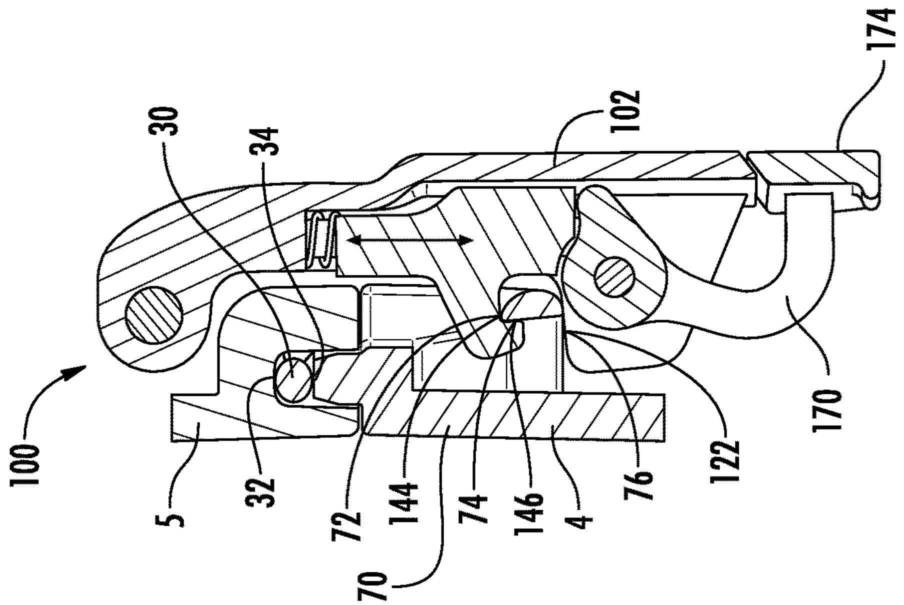
Figure 13C:
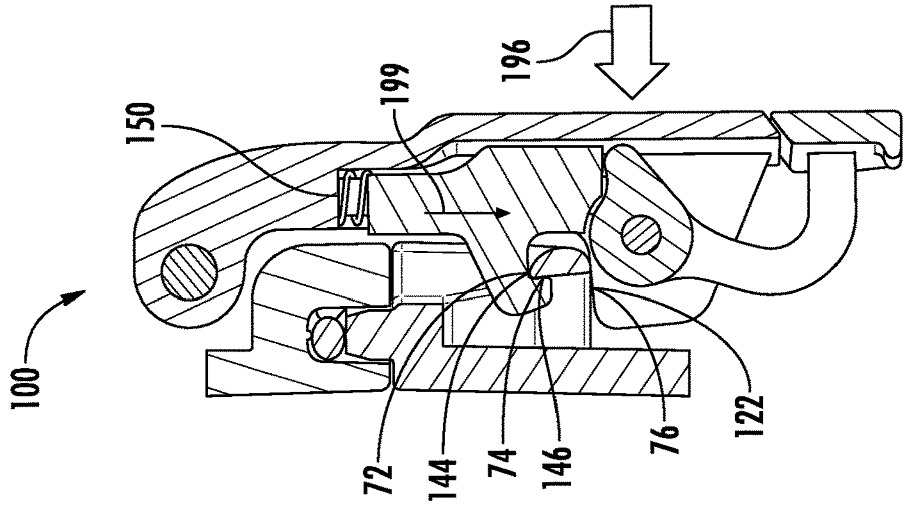
FIGS. 13A-13C illustrate side cross-sectional views of movement of the latch assembly of FIGS. 13A-13C from an unlocked position to a locked position according to one or more aspects described herein.
Figure 13B:
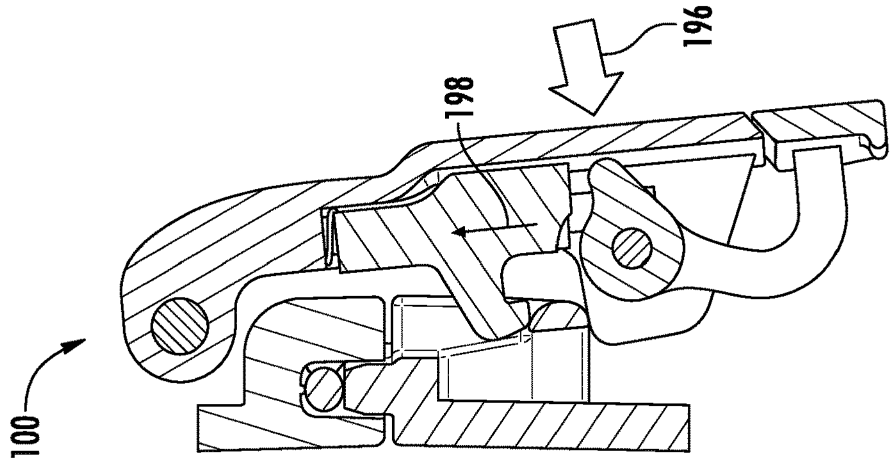
Figure 13A:
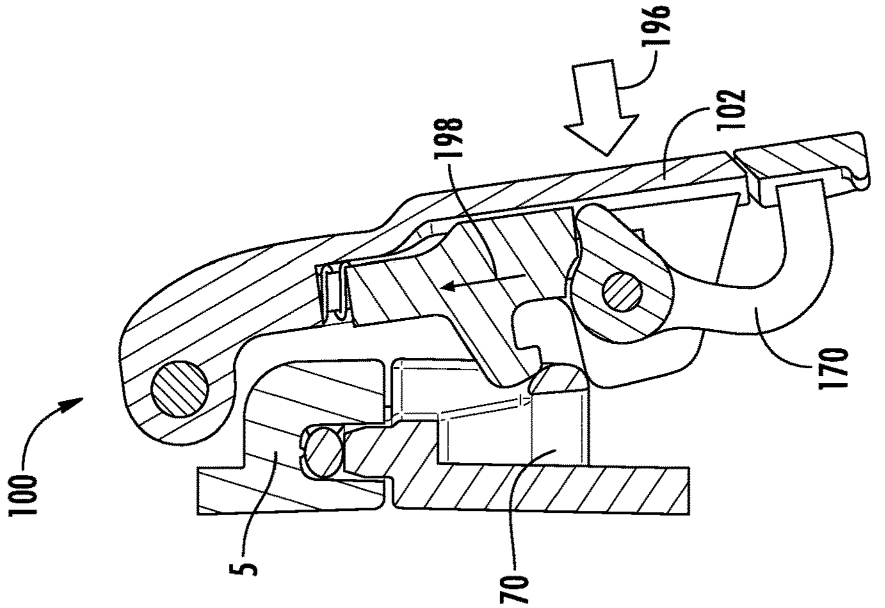
Figure 14:
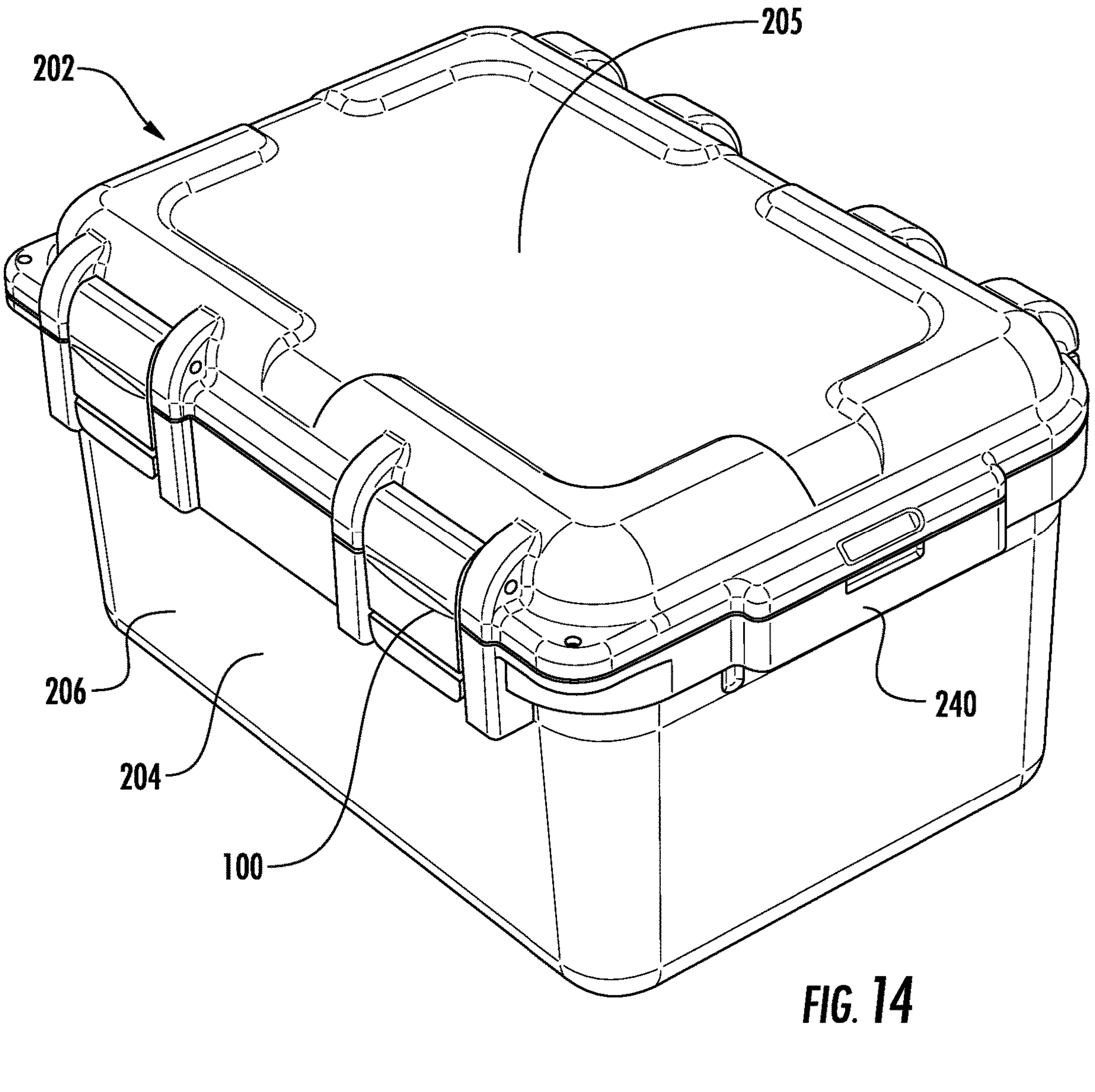
FIG. 14 is a top perspective view of a container according to one or more aspects described herein.
Figure 15:
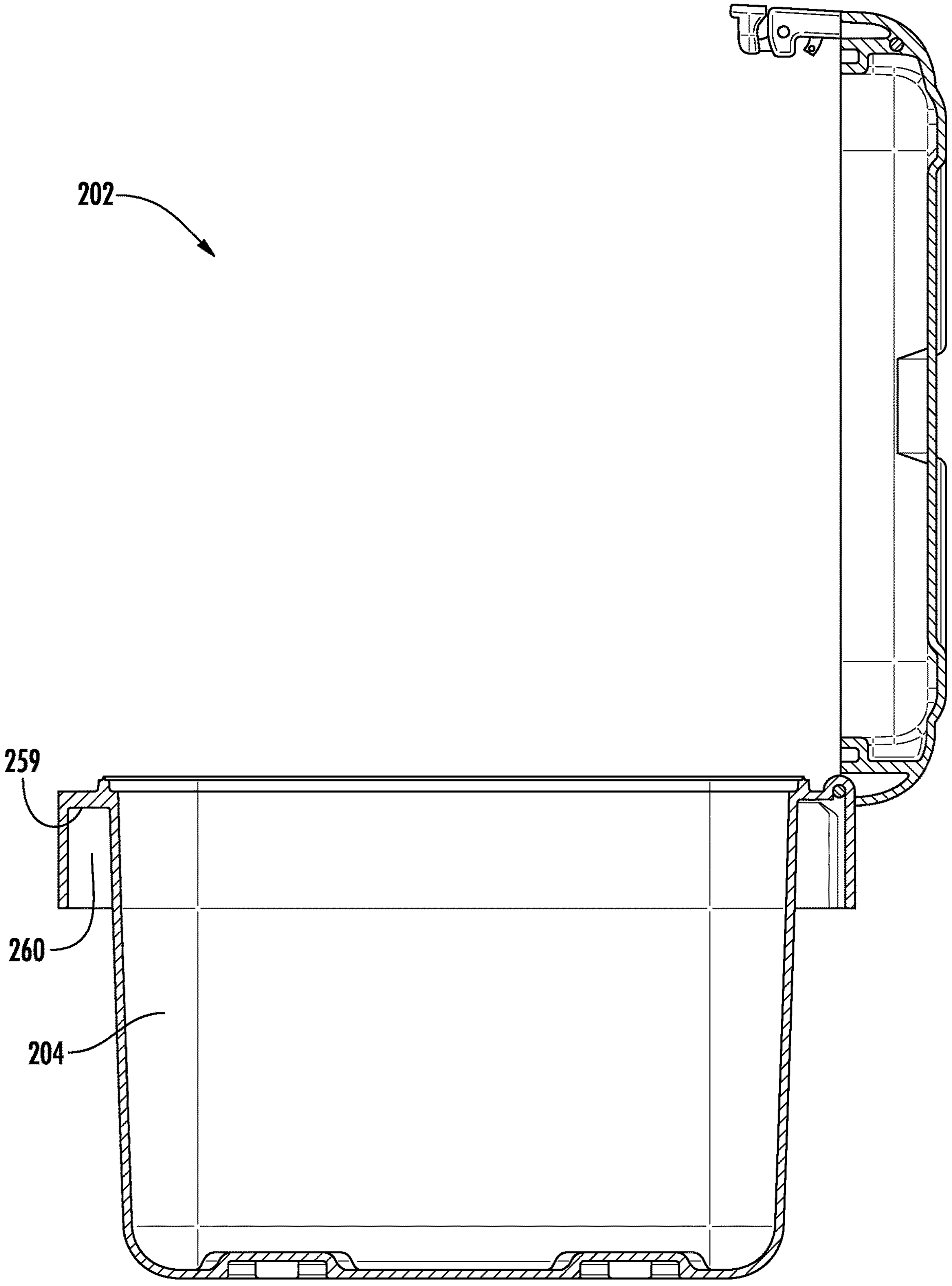
FIG. 15 is a side cross-sectional view of the container of FIG. 14 according to one or more aspects described herein.
Figure 16A:
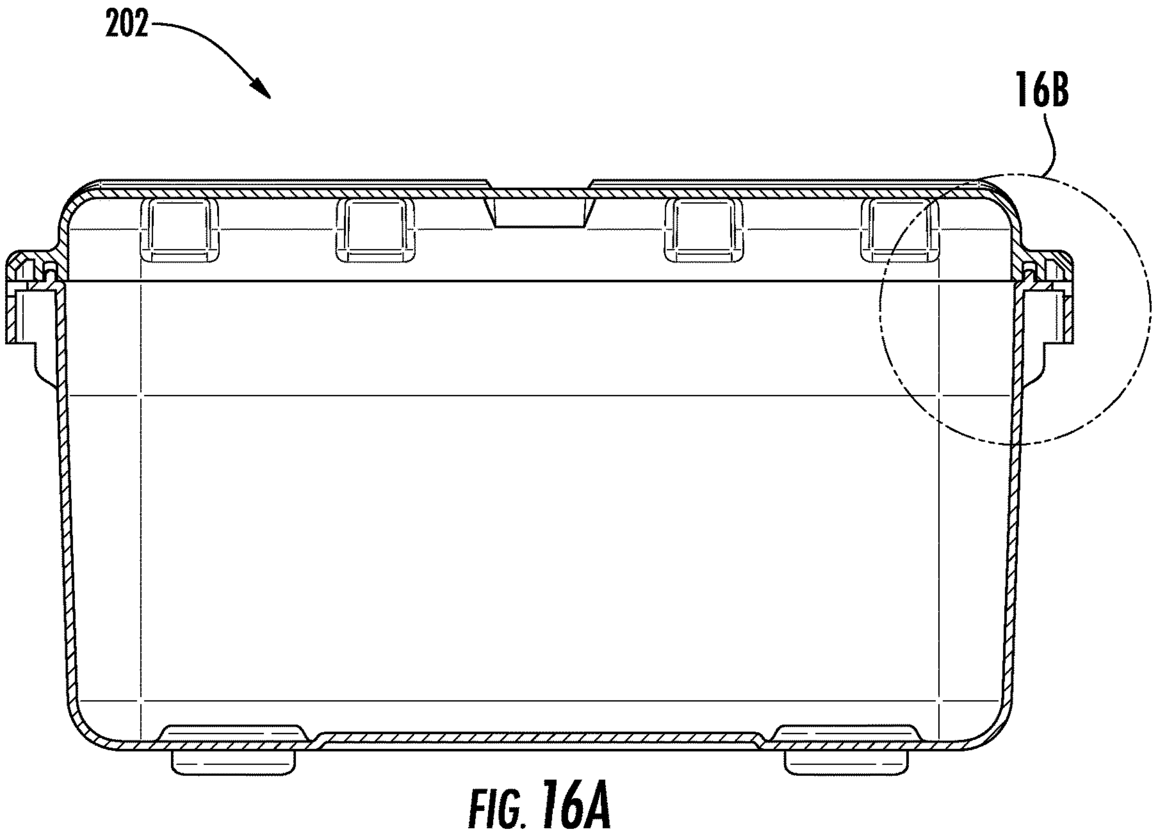
FIG. 16A is a side cross-sectional view of the container of FIG. 14 according to one or more aspects described herein.
Figure 16B:
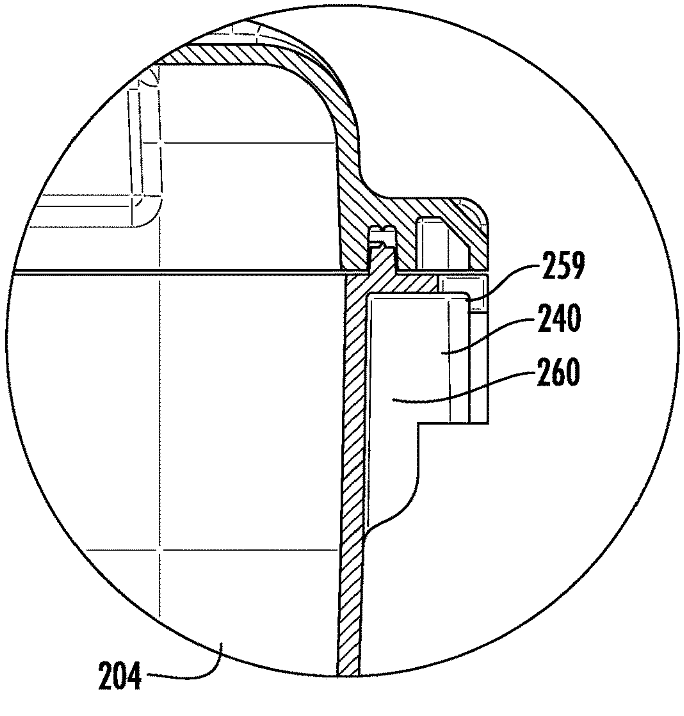
FIG. 16B is an enlarged view of a portion of the container shown in FIG. 16A according to one or more aspects described herein.

FIGS. 12A-12C depict a similar procedure to that shown in FIGS. 10A-10C for moving an embodiment of the latch assembly 100 from the locked position to an unlocked position and FIGS. 13A-13C depict a similar procedure to that shown in FIGS. 11A-11C for moving an embodiment of the latch assembly 100 from the locked position to an unlocked position. In some embodiments, as shown for example in FIGS. 10A-11C, the activating member 170 may automatically return to a downward position as shown in FIG. 10A after it has been rotated outward by a user. However, in other embodiments, the activating member 170 may only move to the downward position if it is manually pushed inward by a user. Additionally, in some embodiments, the activating member may extend further outward than the latch body 102 when the activating member is in the downward position.

The latch assembly 100, including the latch body 102, locking member 130, and activating member 170, may each be separately formed and may be formed of materials such as plastic materials or another suitable material which can be formed or molded into the desired shape. The latch assembly 100 may be made of sufficient size, thickness and materials of construction to withstand repeated cycles of stress as the latch is engage/disengaged with the latch keeper 70 over time. The containers described herein include various features that ensure easy and efficient manufacture of the containers, while providing durability and wear resistance.

FIGS. 14-16B depict another example container 202 having a latch assembly 100, wherein like reference numerals refer to the same or similar elements in container 2 but include 200 series reference numerals. Container 202 is substantially similar to container 2 and therefore similar aspects of container 202 are not discussed again herein. Container 202, however, may include some differences from container 2. Container 202, for example, includes handles 240 which may be integrally molded with the base portion 204 in the sidewall structure of the base 4. As shown in FIGS. 14-16B the integrally molded handles 240 may be formed of the J-shaped wall 259 and/or may comprise a portion of the J-shaped wall 259. Thus the integrally molded handles 240 may comprise a portion of the channel 260 extending around a perimeter of the container 202.

FIGS. 17A-26D depict another example container 302 having a latch assembly 400 discussed below, wherein like reference numerals refer to the same or similar elements in containers 2 and 202 but include 300 series reference numerals. Container 302 is substantially similar to containers 2 and 202 and therefore similar aspects of container 302 are not discussed again herein. Container 302, however, may include some differences from containers 2 and 202. Container 302, for example, includes handles 340 which may be integrally molded with the base portion 304 on each side 308, 310, 312, 314 of the sidewall structure 306 of base 304. In addition, container 302 may comprise a plurality of attachment points for locating and supporting various accessories that may connect to container 302. These attachment points will be described in more detail below.

Figure 17A:
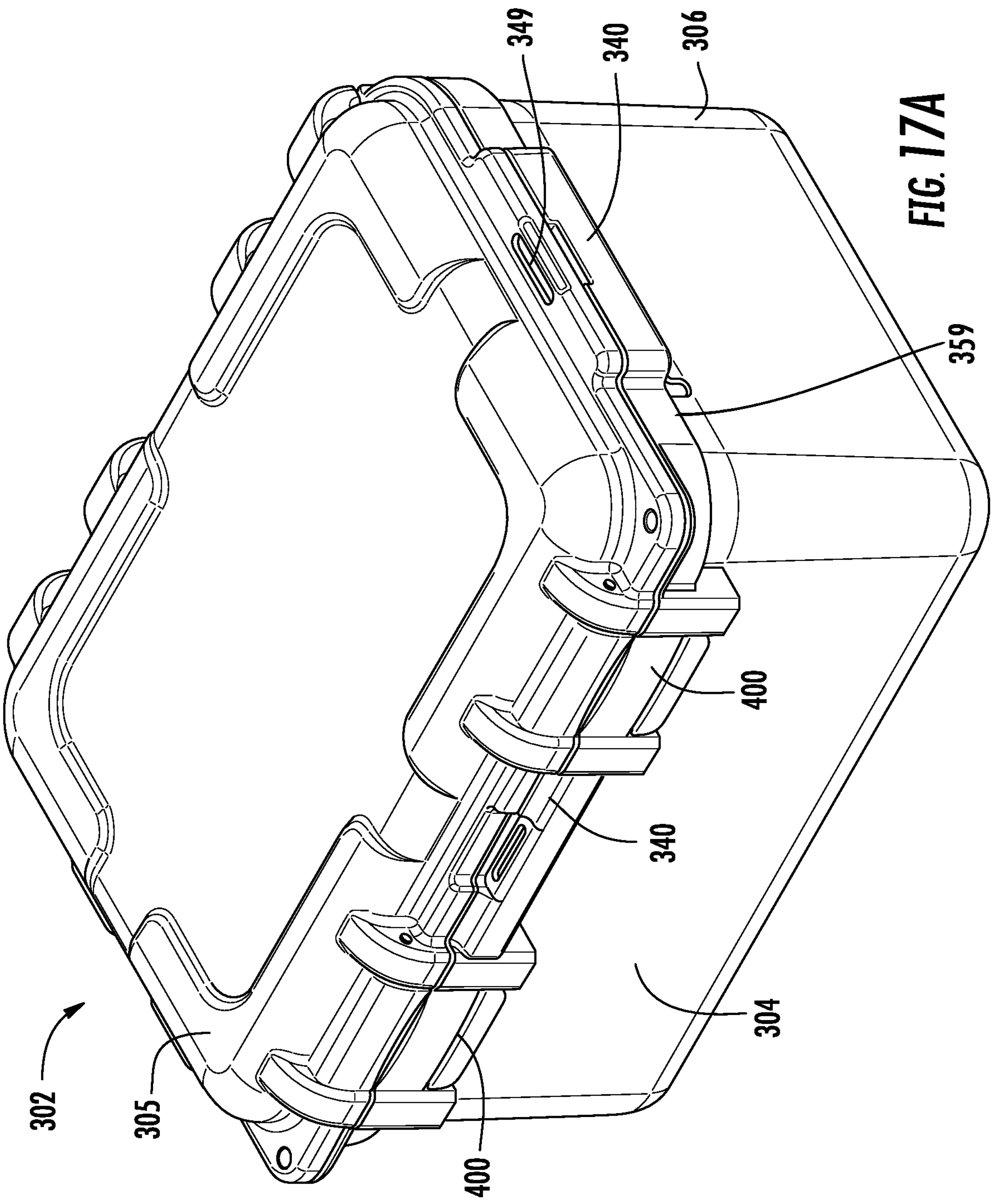
FIG. 17A illustrates a top perspective view of an alternate embodiment of the container of FIG. 1 with the lid in a closed position according to one or more aspects described herein.
Figure 17B:
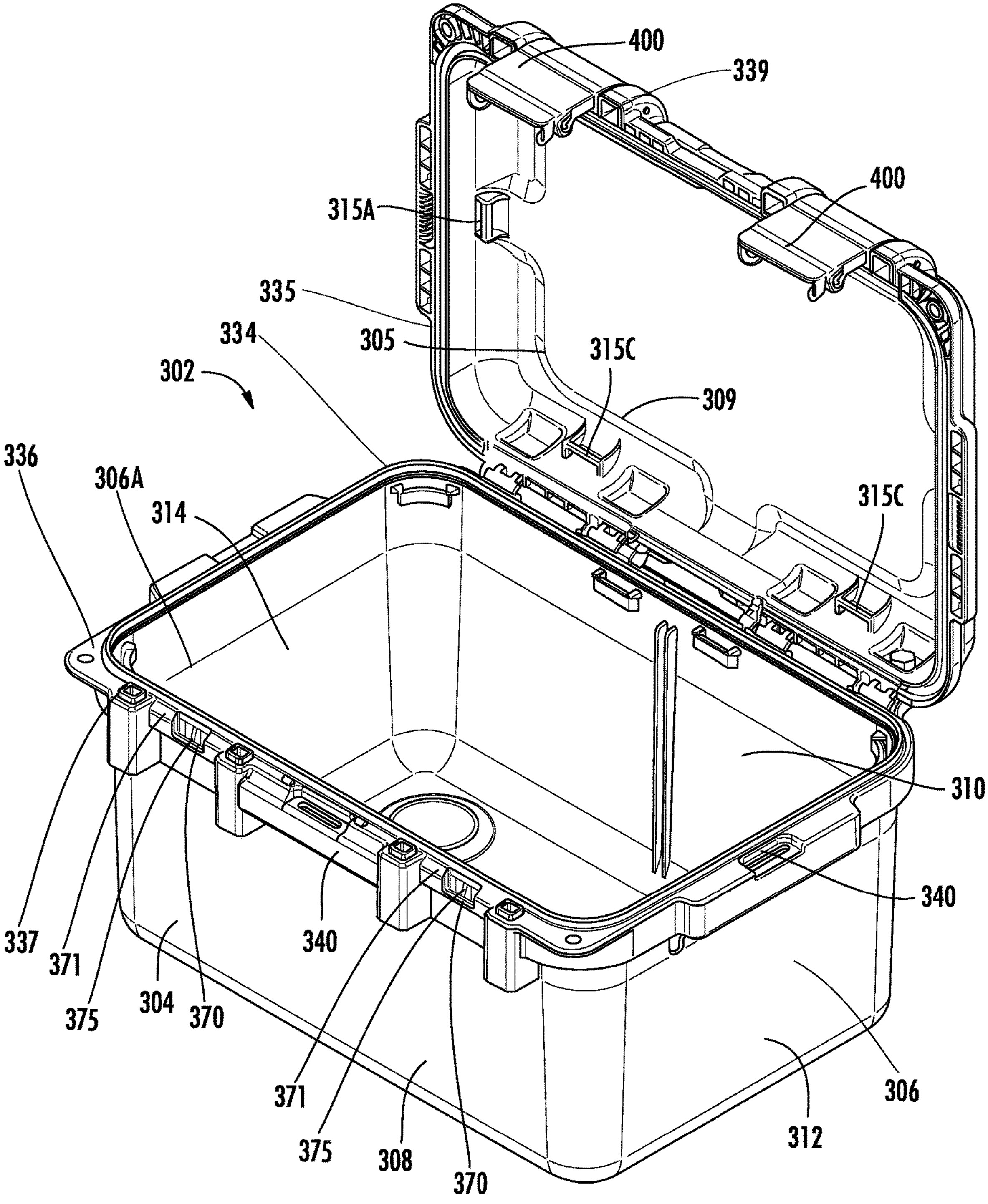
FIG. 17B illustrates a top perspective view of the container of FIG. 17A with the lid in an open position according to one or more aspects described herein.
Figure 18A:
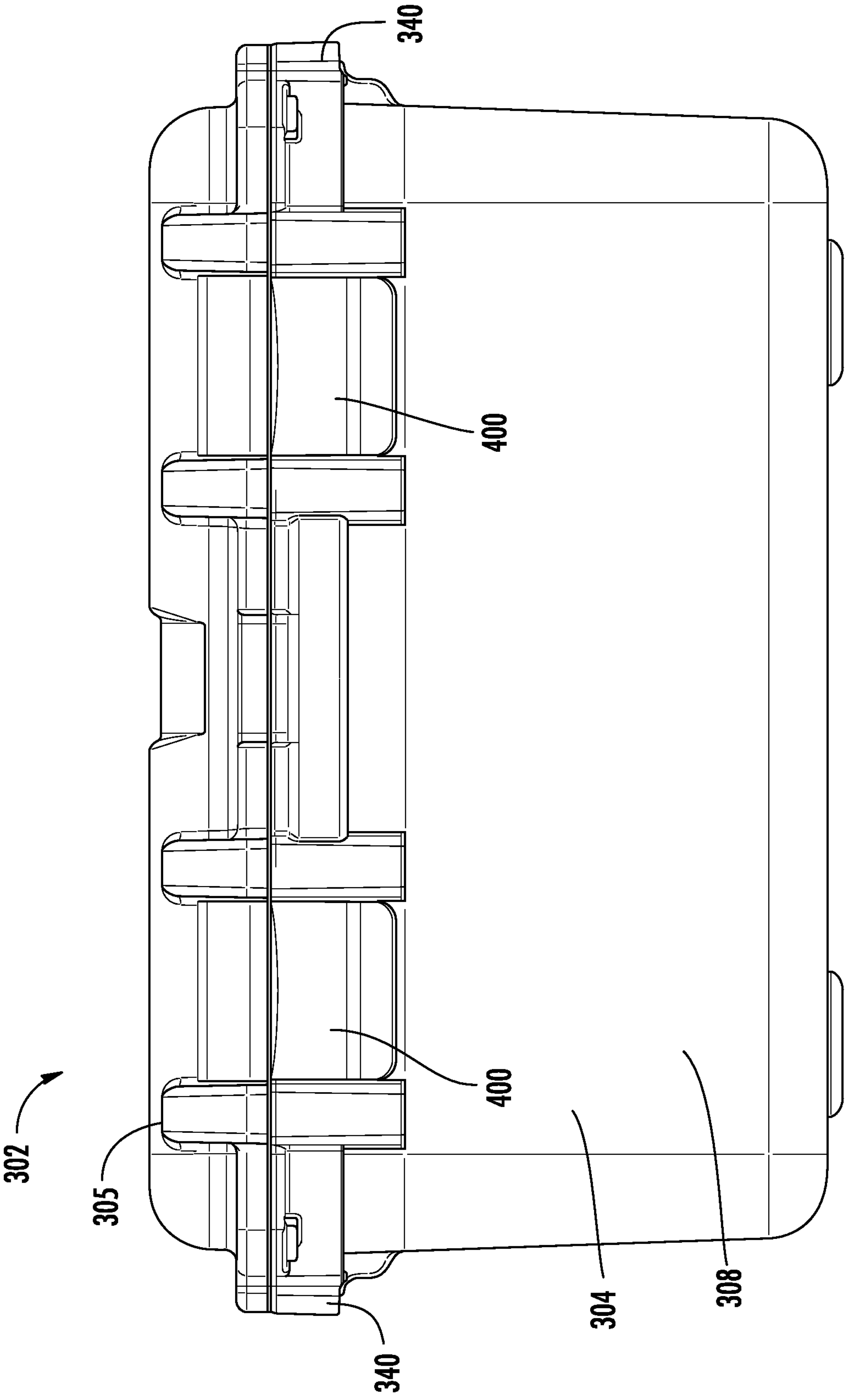
FIG. 18A illustrates a front view of the container of FIG. 17A with the lid in a closed position according to one or more aspects described herein.
Figure 18B:
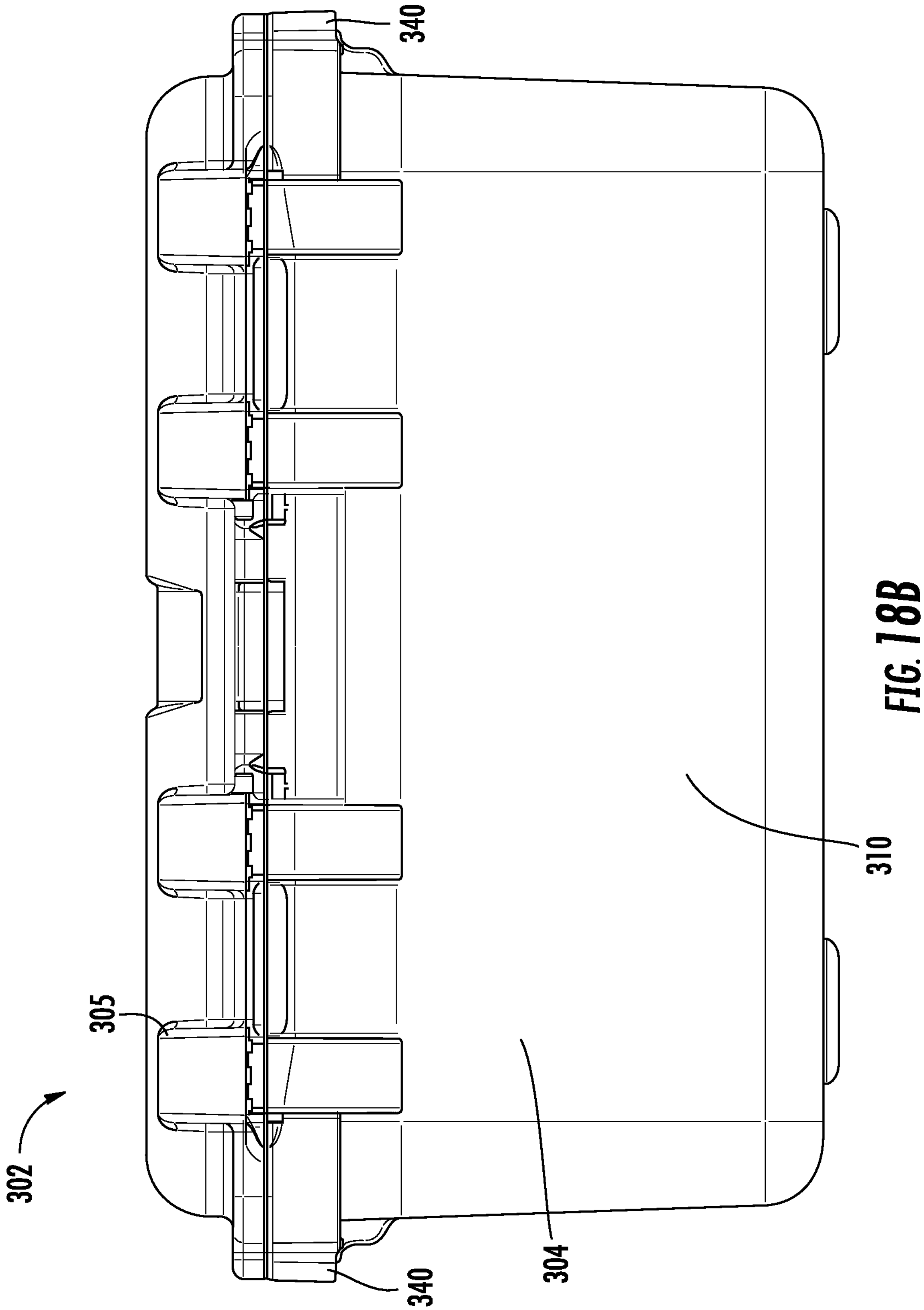
FIG. 18B illustrates a rear view of the container of FIG. 17A with the lid in a closed position according to one or more aspects described herein.
Figure 18C:
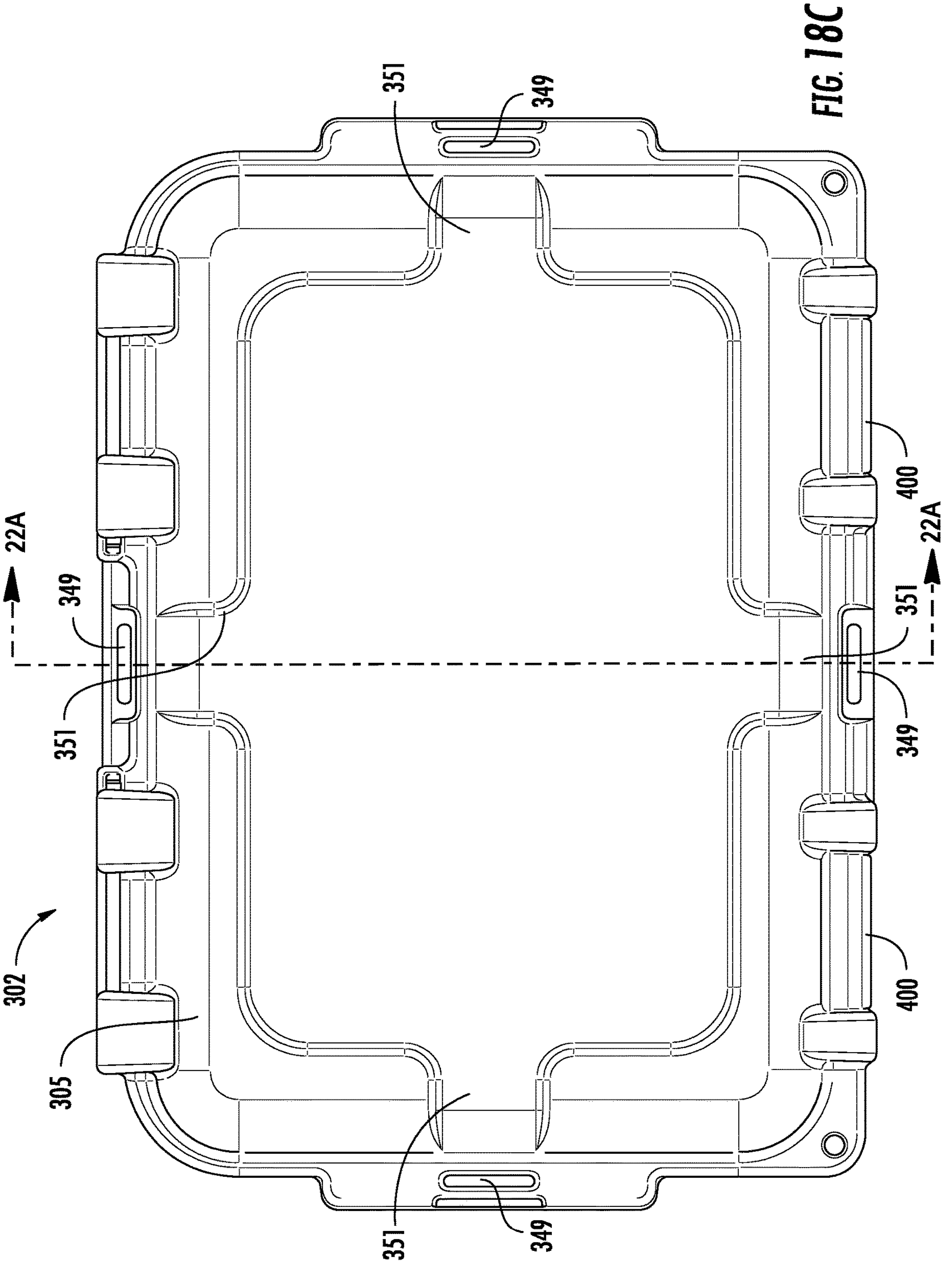
FIG. 18C illustrates a top view of the container of FIG. 17A with the lid in a closed position according to one or more aspects described herein.
Figure 18D:
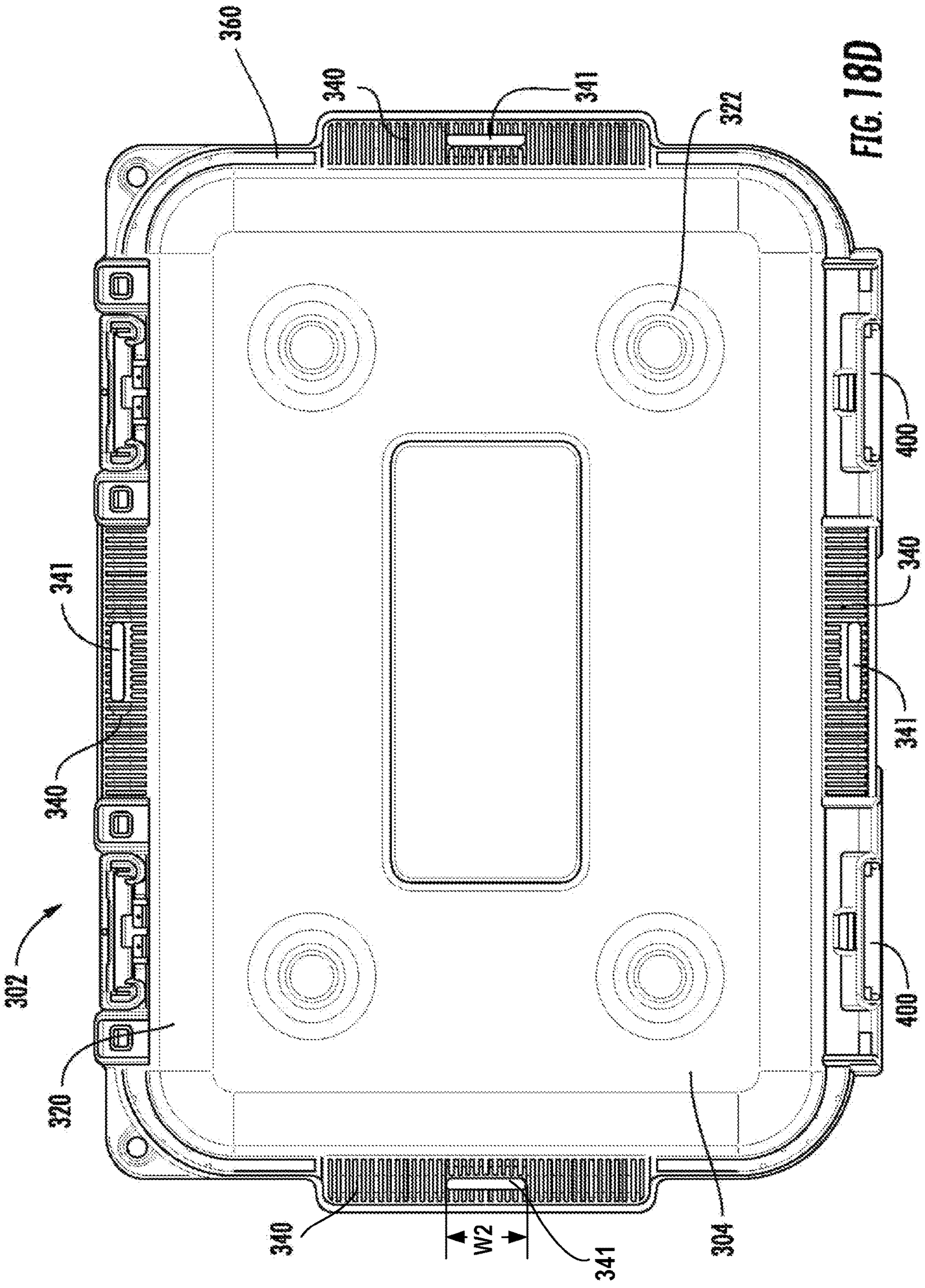
FIG. 18D illustrates a bottom view of the container of FIG. 17A with the lid in a closed position according to one or more aspects described herein.
Figure 18E:
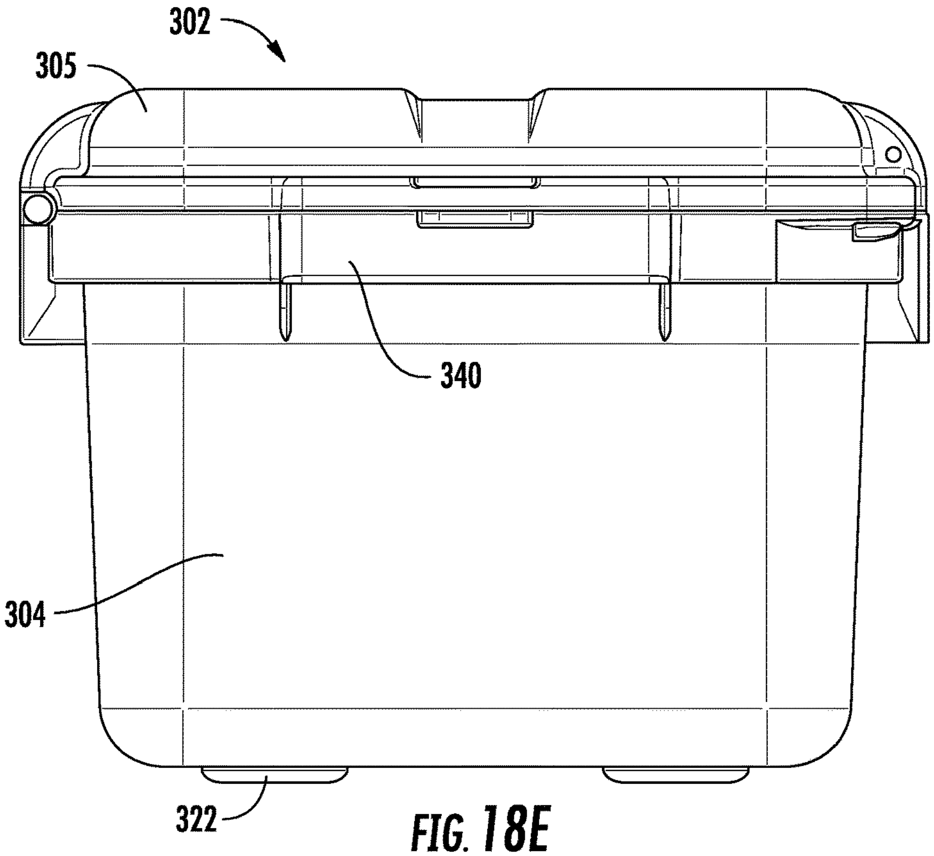
FIG. 18E illustrates a left side view of the container of FIG. 17A a closed position according to one or more aspects described herein.
Figure 18F:
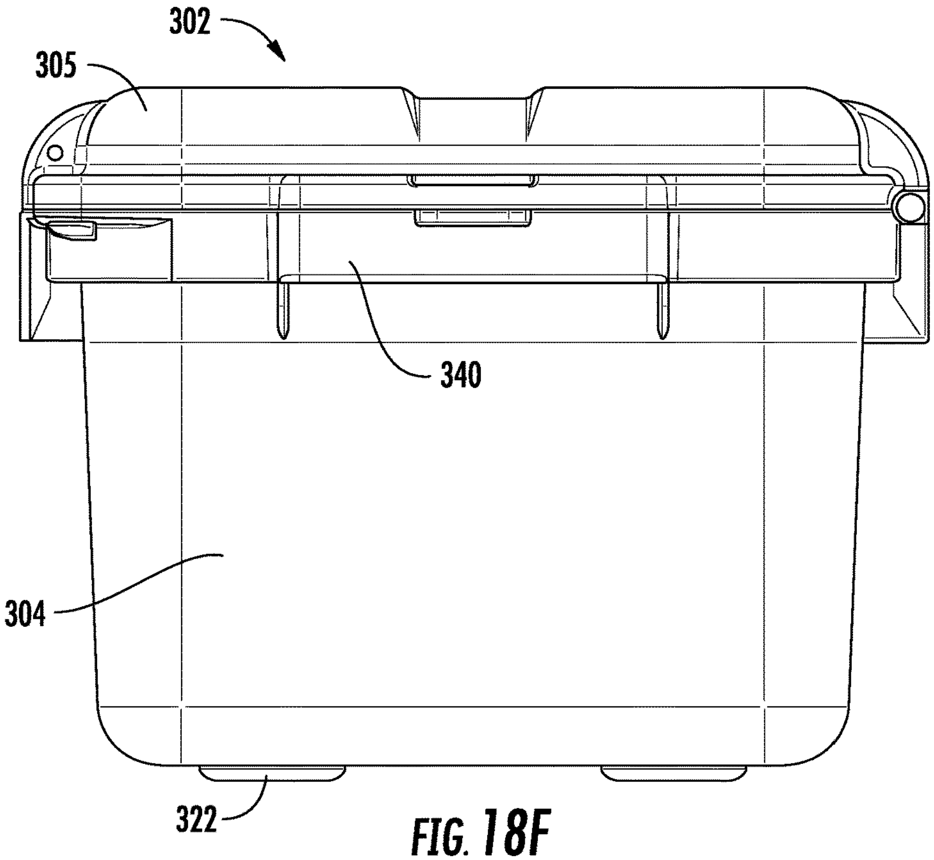
FIG. 18F illustrates a right side view of the container of FIG. 17A a closed position according to one or more aspects described herein.

As shown in FIG. 17B, along with 19A and 19B, the base 304 may include a latch keeper 370. The latch keeper 370 may extend from the sidewall structure 306 and may form a pocket within the base 304. The latch keeper 370 may have a shape configured to receive a portion of the locking member 430 as will be discussed in more detail below. The latch keeper 370 may have an upper surface 372, an inner surface 374, a rib 375, and a lower surface 376. The rib 375 may extend from the sidewall structure 306 to the lower surface 376 of the latch keeper 370. Optionally, the rib 375 may also connect to the upper surface 372 and the lower surface 376 or the inner surface 374 of the latch keeper 370. The rib 375 may be substantially centrally located along the latch keeper 370. The rib 375 may add structural support to the latch keeper 370 to improve the durability. As another option, the latch keeper 370 may include multiple ribs 375 that may be positioned one either side of the pocket formed by the latch keeper 370 to provide additional support to the latch keeper 370. As will be discussed in greater detail below, the latch assembly 400 may engage the latch keeper 370 to lock the lid 305 to the base 304 when the container 302 is in a closed configuration.

Figure 21:
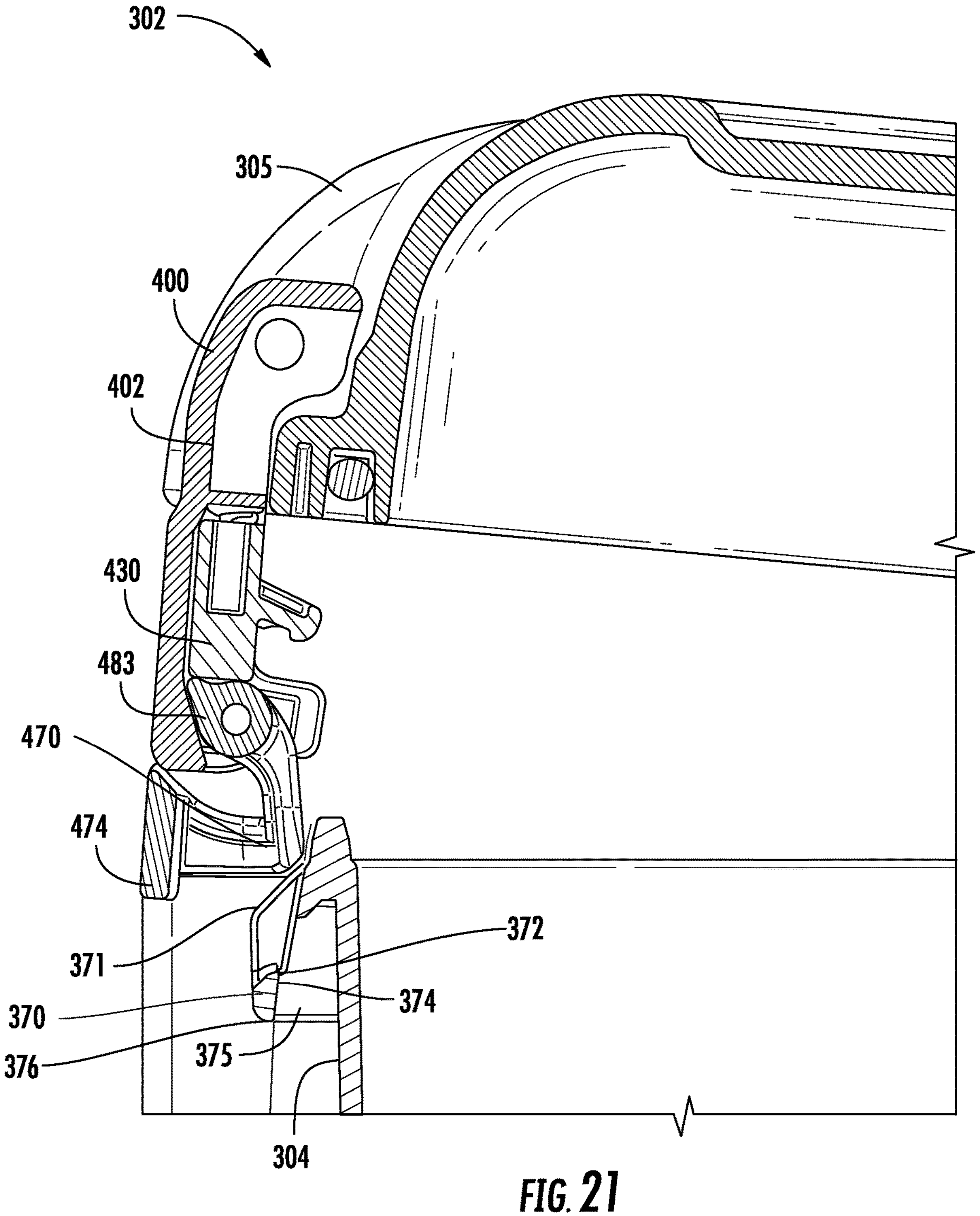
FIG. 21 illustrates a partial cross-sectional view of the latch assembly of FIG. 20A in an unlocked position according to one or more aspects described herein.

In addition, the base 304 may include a plurality of ramped or tapered surfaces 371 positioned on either side of the latch keeper 370. The ramped surfaces 371 may angle downward from the interface surface 336 of the base 304, where the interface surface 336 may be substantially flat and extend around on at least three sides of the perimeter of the base 304. The interface surface 336 of the base 304 may contact the interface surface 335 of the lid 305 when the container 302 is in the closed position. The ramped surface 371 may angle downward from the interface surface 336 approximately 45 degrees or within a range of 30 and 60 degrees, or within a range of 20 to 80 degrees. The ramped surface 371 may prevent the latch assembly 400 from getting stuck on the base 304 when closing the container 302 and may also contact the lower portion of the latch assembly 400 as the lid 305 is closed to push the latch assembly 400 out of the way of the base when the lid 305 is closed as shown in FIG. 21.

The base 304 may further include a plurality of engaging members 337 that extend from the interface surface 336 of the base 304. The engaging members 337 may be positioned outward of the ridge 334. The engaging members 337 may extend into recesses or cavities 339 on the lid 305. The interaction between the engaging members 337 and the recesses 339 may provide additional structural support to strengthen the joint between the lid 305 and the base 304 when the container 302 is in a closed position and when multiple containers are stacked or additional items are placed on top of the container 302. The base 304 may have any number of engaging members 337. For example, the exemplary embodiment illustrates four engaging members 337, but the base 304 may comprise two engaging members, three engaging members, five engaging members or greater. The number of recesses 339 on the lid 305 may be equal to the number of engaging members 337 and located on the lid 305 at a location that corresponds with each engaging member 337 of the base 304. The engaging members 337 in the exemplary embodiment have a substantially square cross-sectional shape, but may have any cross-sectional shape, like a circle, triangle, or other polygon. Each engaging member 337 may have a height that is less than or equal to the width of the engaging member 337. Additionally, while the engaging members 337 and the recesses 339 of the exemplary embodiment are located on the first side 308 of the container 302, the engaging members 337 and the recesses 339 may be on any side and may have embodiments where they are positioned on multiple sides.

Figure 19A:
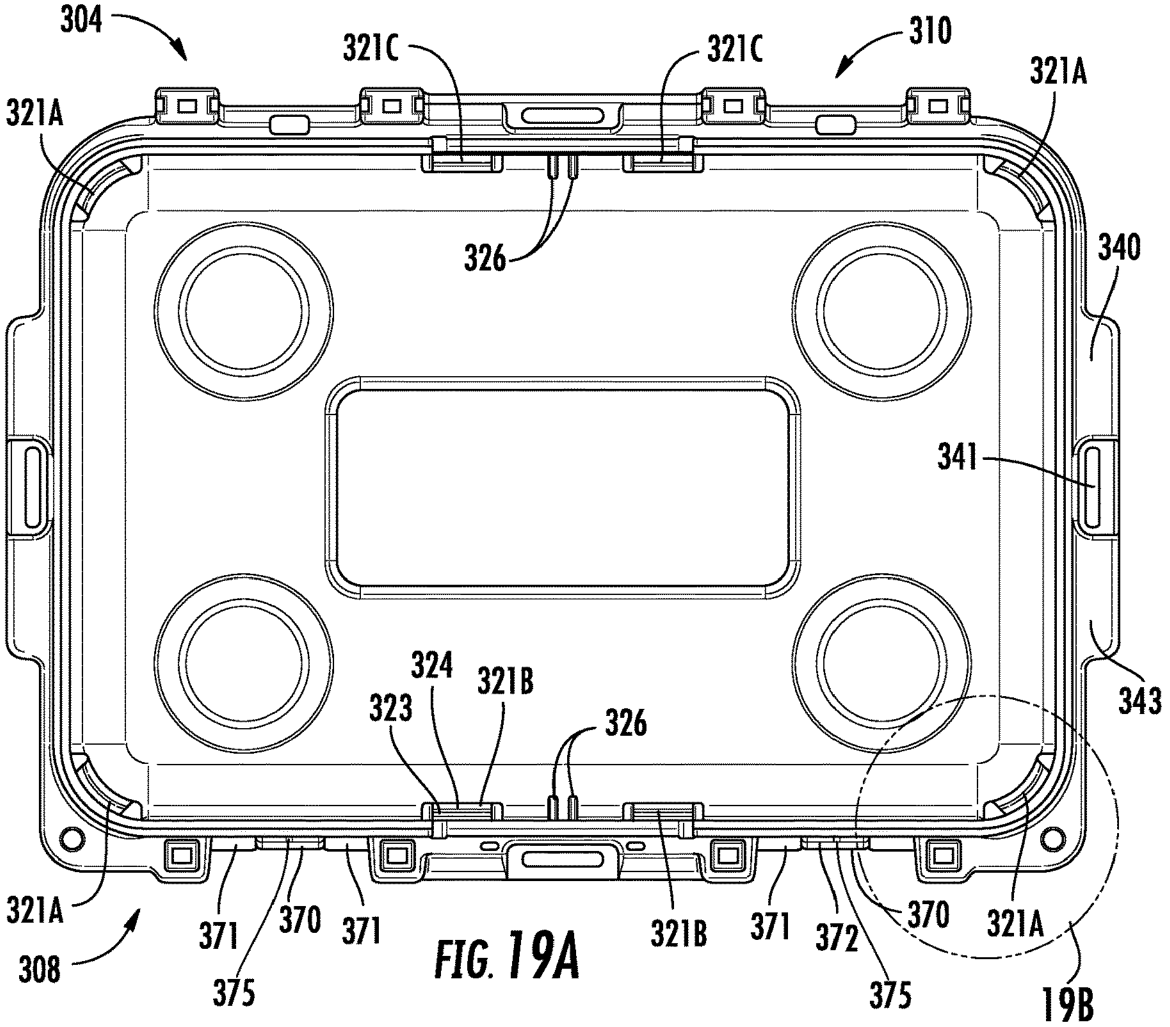
FIG. 19A illustrates a top view of the base portion of the container of FIG. 17A with the lid removed according to one or more aspects described herein.
Figure 19B:
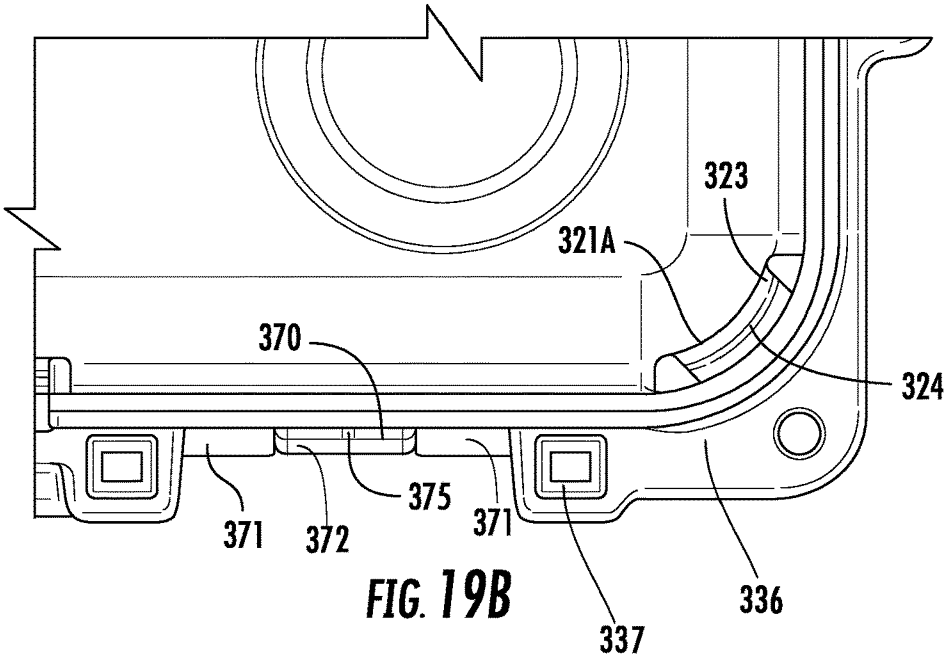
FIG. 19B illustrates an enlarged view of the base portion of the container shown in FIG. 19A according to one or more aspects described herein.

As another feature, base 304 may have a plurality of tabs 321 positioned along the interior surfaces 306A of the sidewall structure 306 of the base 304. For example, as shown in FIGS. 17B and 19A, the tabs 321A may be positioned in each of the corners of the sidewall structure 306. In addition, tabs 321B and 321C may be positioned along the interior surface of first side 308 and second side 310. Tabs 321B and 321C may be located opposite one another as illustrated in FIG. 19A such that they are aligned along a length of the first side 308. As shown in the exemplary embodiment of FIG. 19A, the interior portion may comprise eight tabs 321, with tabs 321A being located in each of the corners and tabs 321B and 321C being located along the interior surface of the sidewalls 308, 310. Tabs 321B and 321C may be generally centrally located such that at least one tab 321B, 321C may be placed on near a centerline of the container 302, but preferably located on either side of the centerline. As another option, the plurality of tabs 321 may not be aligned with a tab 321 on the opposite interior surface, but have a staggered arrangement. The tabs 321 may provide attachment locations for various accessories as discussed further below.

Each tab 321 may extend from the interior surfaces 306A of the sidewall structure 306 and include an upper support surface 323, an opening 324 extending through the upper support surface 323, and a pair of side surfaces on either end of the tab 321. The upper support surface 323 of each tab may provide an engaging surface to support various accessories within the interior of the container 302, like a tray 500 as discussed further below. The upper support surfaces 323 of the plurality of tabs 321 may be substantially coplanar with each other to allow the support surfaces 323 to hold an accessory that may extend across the base 304 and be supported by multiple tabs 321. The upper support surfaces 323 of the tabs 321 may be positioned in an upper region of the interior surfaces 306A at a height that is greater than fifty percent of the height of the interior portion of the base portion. As another option, the upper support surfaces 323 of the tabs 321 may be positioned at a height that is greater than sixty percent of the height of the interior portion of the base portion, or even greater than seventy percent of the height of the interior portion of the base portion. In order to minimize the impact to the interior space, each tab 321 may have a low profile such that each tab 321 may extend a distance of less than one inch from the interior surface, or less than 0.5 inches, or even less than 0.25 inches. Additionally, the openings 324 may have any shape, but may be preferably elongated in shape. The openings 324 may provide attachment points for straps or other attachment means to further support different accessories.

As another option a pair of tracks 326 may be positioned along at least two of the interior surfaces 306A of the sidewall structure 306. As shown in the exemplary embodiment, a pair of tracks may be positioned on each of the interior surfaces of first and second sides 308, 310. Each of the pair of tracks 326 may be centrally located such that they are aligned with the pair of tracks 326 on the opposing interior surface. Each of the tracks 326 may extend from the interior surfaces of the base 304 and have a height that extends along a majority of the height of the interior portion. In order to minimize the impact to the interior space, each track 326 may have a low profile such that each track 326 may extend a distance of less than one inch from the interior surface 306A, or less than 0.5 inches, or even less than 0.25 inches. The pairs of tracks 326 may support a removable divider wall 510, which may also serve as a cutting board, to separate the interior of the container into two portions to better organize the items being stored. Each of the tracks 326 may have a plurality of détentes or protrusions to securely hold the divider wall 510 to prevent it from moving and limit any vibration.

Similar to the example container 302 discussed above, the embodiment of FIGS. 17-26D may have integrally molded handles 340 that are positioned along each of the sidewalls 308, 310, 312, 314. Each of the integrally molded handles 340 may be formed of the J-shaped wall 359 and/or may comprise a portion of the J-shaped wall 359. Thus the integrally molded handles 340 may comprise a portion of the channel 360 extending around a perimeter of the container 302. Thus, the example container 302 may comprise four handles 340. The handles 340 may be integrally molded with the base portion 304. In some examples, each handle 340 may be formed with an undercut and include a recess extending along substantially all or a majority of the sidewall structure 306. This integrally molded handle 340 may simplify the manufacturing process for the base 304. In some examples, the integrally molded handles may be flush with an exterior surface of the base 304 in order to reduce the risk of breakage.

Figure 22A:
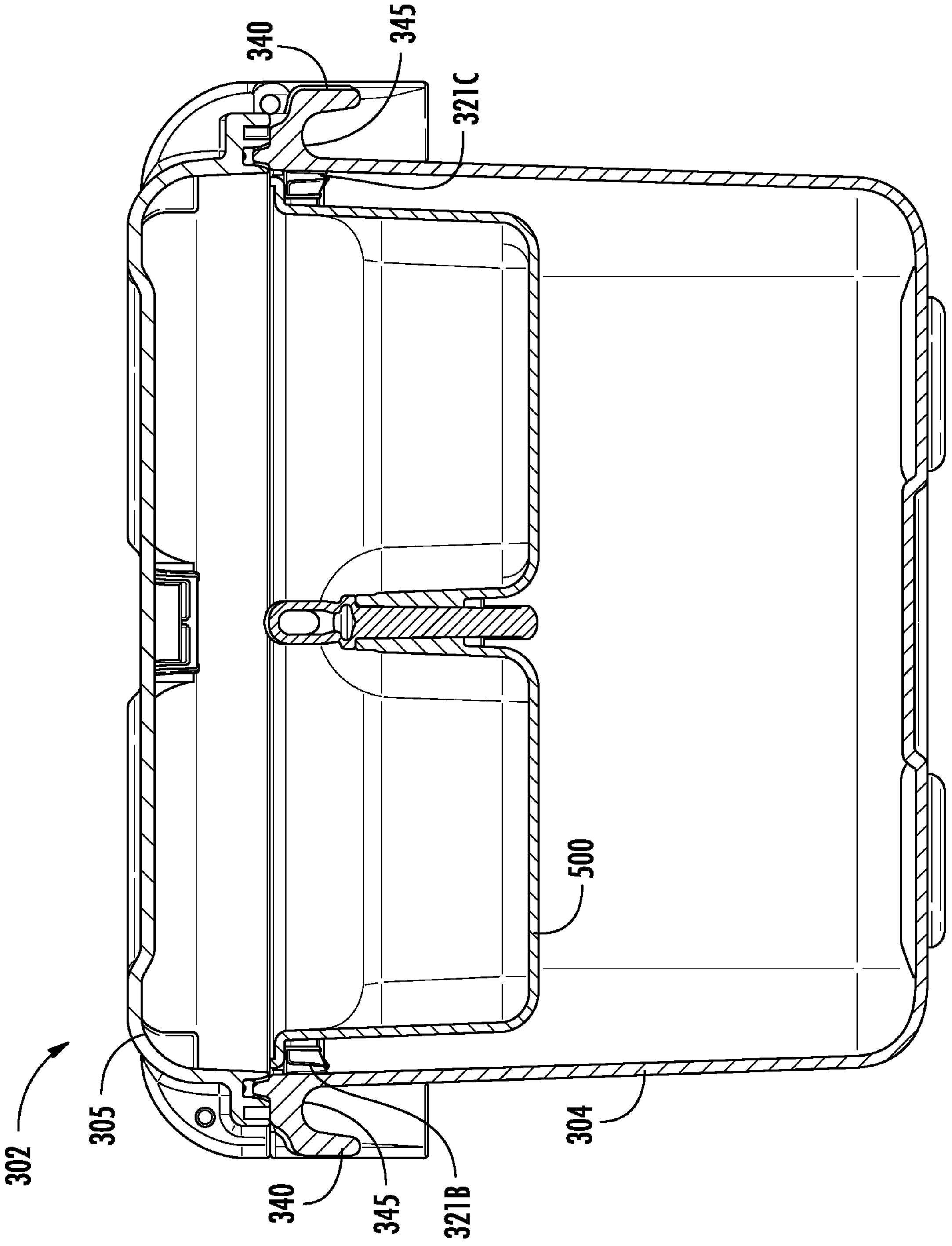
FIG. 22A illustrates a side cross-sectional view of the container of FIG. 17A according to one or more aspects described herein.
Figure 22C:
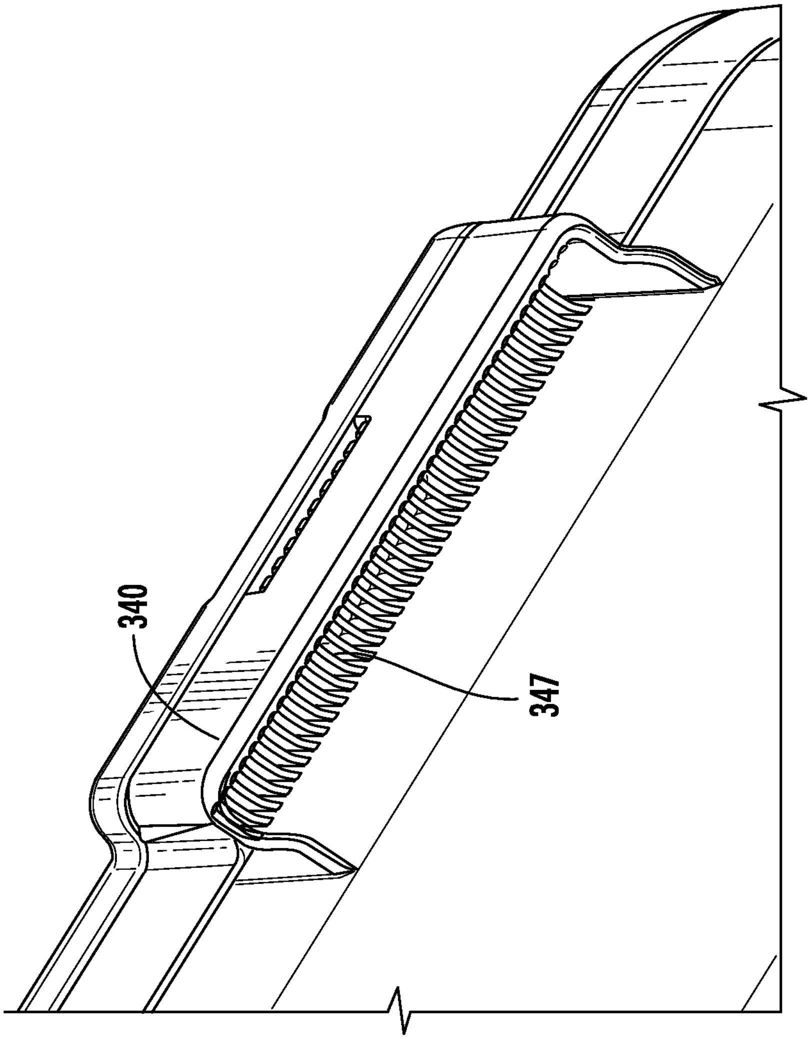
FIG. 22C illustrates a partial view of a bottom perspective view of the handle of the container of FIG. 17A according to one or more aspects described herein.
Figure 22B:
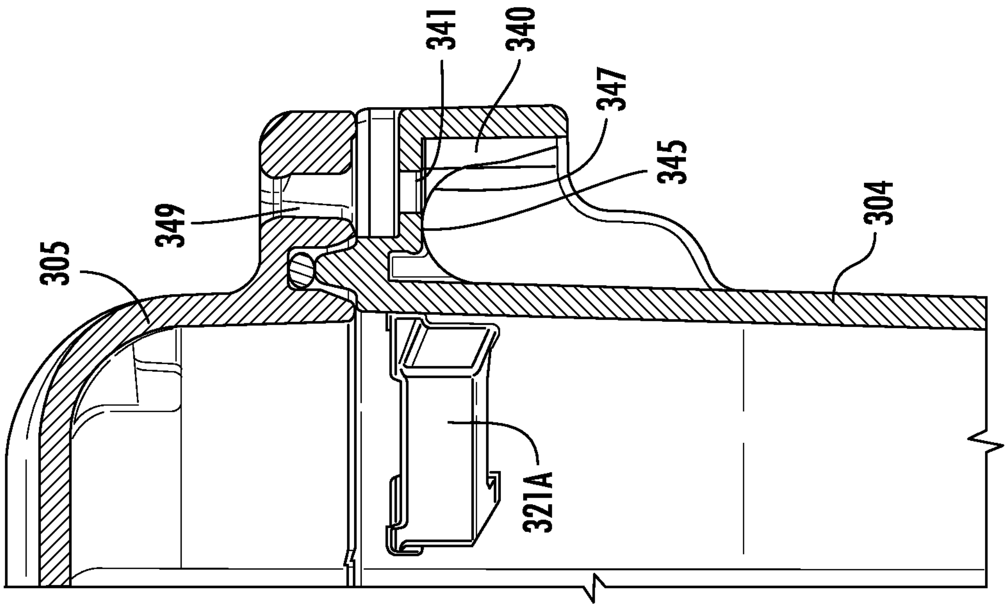
FIG. 22B illustrates enlarged side cross-sectional view through a handle of the container of FIG. 17A according to one or more aspects described herein.

As shown in FIGS. 22A through 22C, each handle 340 may have a curved interior profile 345 to provide an ergonomic and comfortable gripping surface for the user. The interior profile 345 of the handle may comprise a plurality of handle ribs 347 that extend from the sidewall to an interior surface of the handle 340, where each handle rib 347 may have a curved profile such that the plurality of ribs 347 that are spaced apart from each other form the curved interior profile 345 of the handle 340. Each rib 347 may have a spacing between the ribs 347 that is less than the width of each rib 347. Alternatively, each rib 347 may have a spacing between the ribs 347 that is equal to or greater than the width of each 347.

Figure 23A:
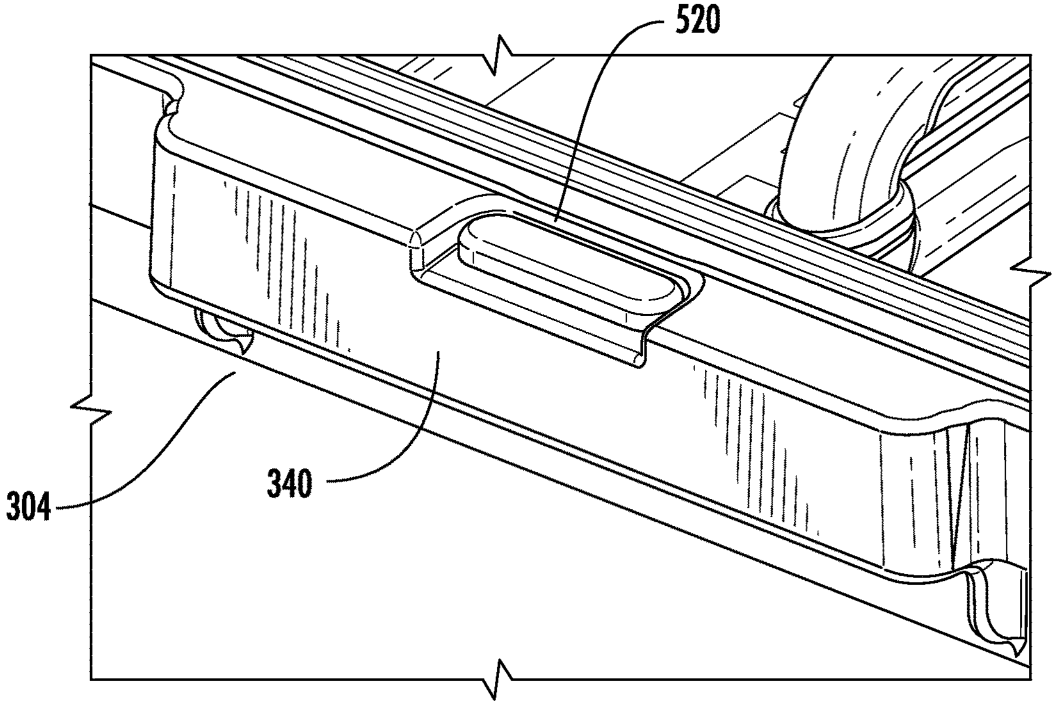
FIG. 23A illustrates a partial top perspective view of the base portion of the container of FIG. 17A according to one or more aspects described herein.
Figure 23B:
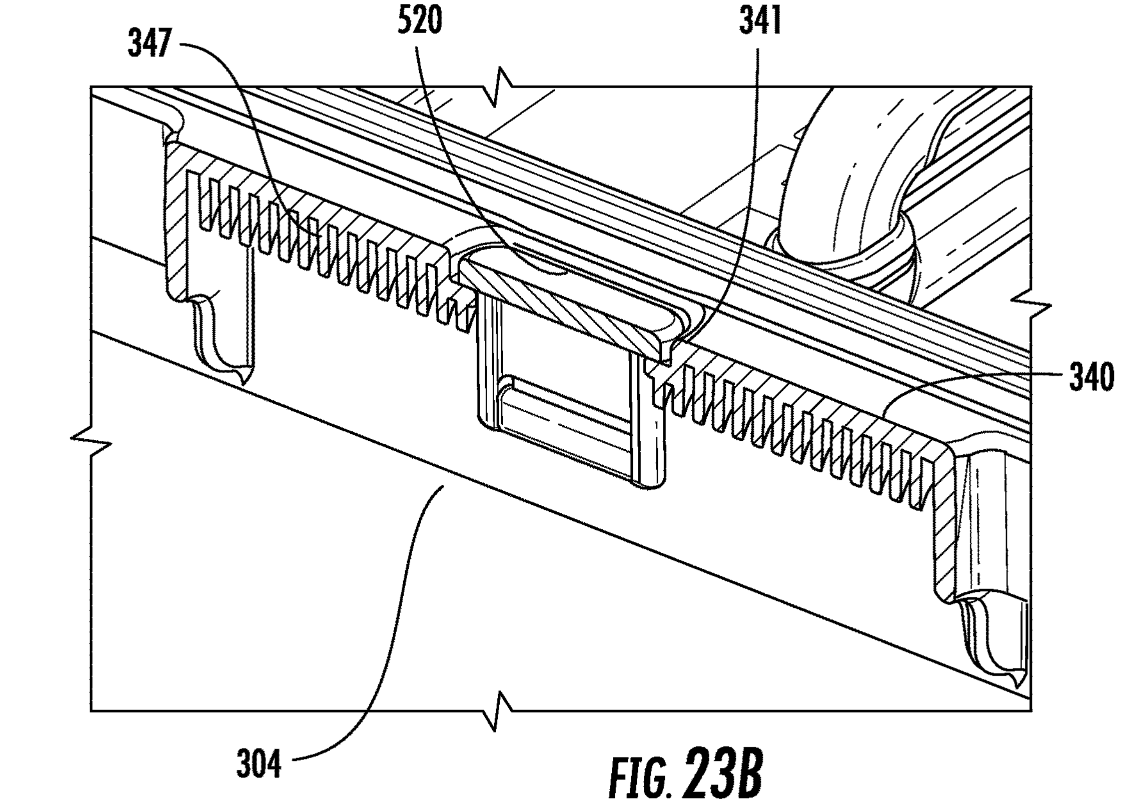
FIG. 23B illustrates a partial cross-sectional view of partial top perspective view of FIG. 23A illustrating the base portion of the container of FIG. 17A according to one or more aspects described herein.

Each handle 340 may have an opening 341 extending through the handle top surface 343 of the handle 340 where each opening 341 may align with an opening 349 of the lid 305. Thus, with the aligned openings 341 of the handle and openings 349 of the lid 305 allow locations for a strap or similar device to pass through the openings 341, 349 to anchor or tie down the container 302. Each opening 341, 349 may have an elongated shape and may all have substantially the same length and width. Thus, these openings 341, 349 may provide versatility to the user for other operations beyond just anchoring the container 302. To further assist with anchoring or securing the container 302, the lid 305 may have recesses or channels 351 that align with the openings 349 to provide guide surfaces for a strap to tie down the container 302. As another option, clips 520 may be inserted through the openings 341 to provide an additional location to use a hook and loop type connection to add further versatility of options to hold additional accessories as shown in FIGS. 23A and 23B.

Figure 24A:
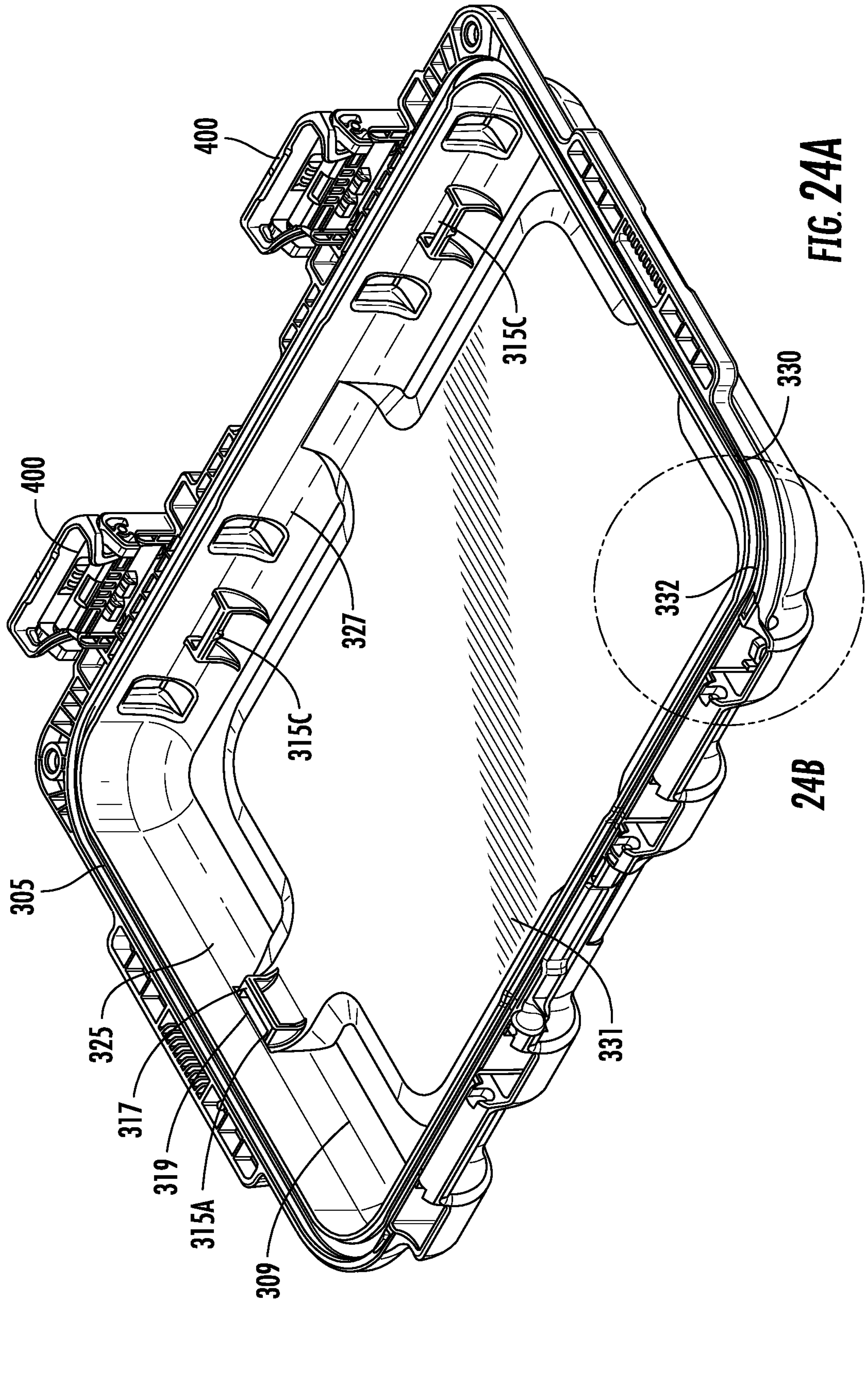
FIG. 24A illustrates a top perspective view of the interior of the lid of the container of FIG. 17A according to one or more aspects described herein.

The lid 305 of the container 302 may further comprise a plurality of clips 315 positioned along an interior surface 309 of the lid 305. For example, as shown in FIG. 24A, a clip 315A may centrally located on each of the interior surfaces 325 and while a pair of clips 315B and 315C may be evenly spaced along each of the interior surfaces 327, 329. Each of the clips 315 may also extend onto or contact the lower interior surface 331 of the lid 305. The clips 315B and 315C may be aligned to be located opposite one another. As shown in the exemplary embodiment of FIGS. 17B and 24A, the lid 305 may comprise six clips 315, although the lid 305 may comprise any number of clips 315. As another option, the plurality of clips 315 may not be located opposite one another on the interior surface of the sidewalls and have a staggered arrangement. The clips 315 may provide attachment locations for various accessories as such as a cargo net or bungie cord net 515, or straps 516 that include additional hitch points for securing any further items desired by the user.

Each clip 315 may extend from interior surfaces of the lid 305 and may include an engaging member 317 and an opening 319 extending through the engaging member 317. The openings 319 may be elongated in shape or alternatively may have any shape. In addition, the openings 319 of the clips 315 may have a similar width as the openings 324 of the tabs 321. These openings 319 may provide attachment points for straps or other attachment means to further support different accessories as shown in FIGS. 26B-26D.

Figure 24B:
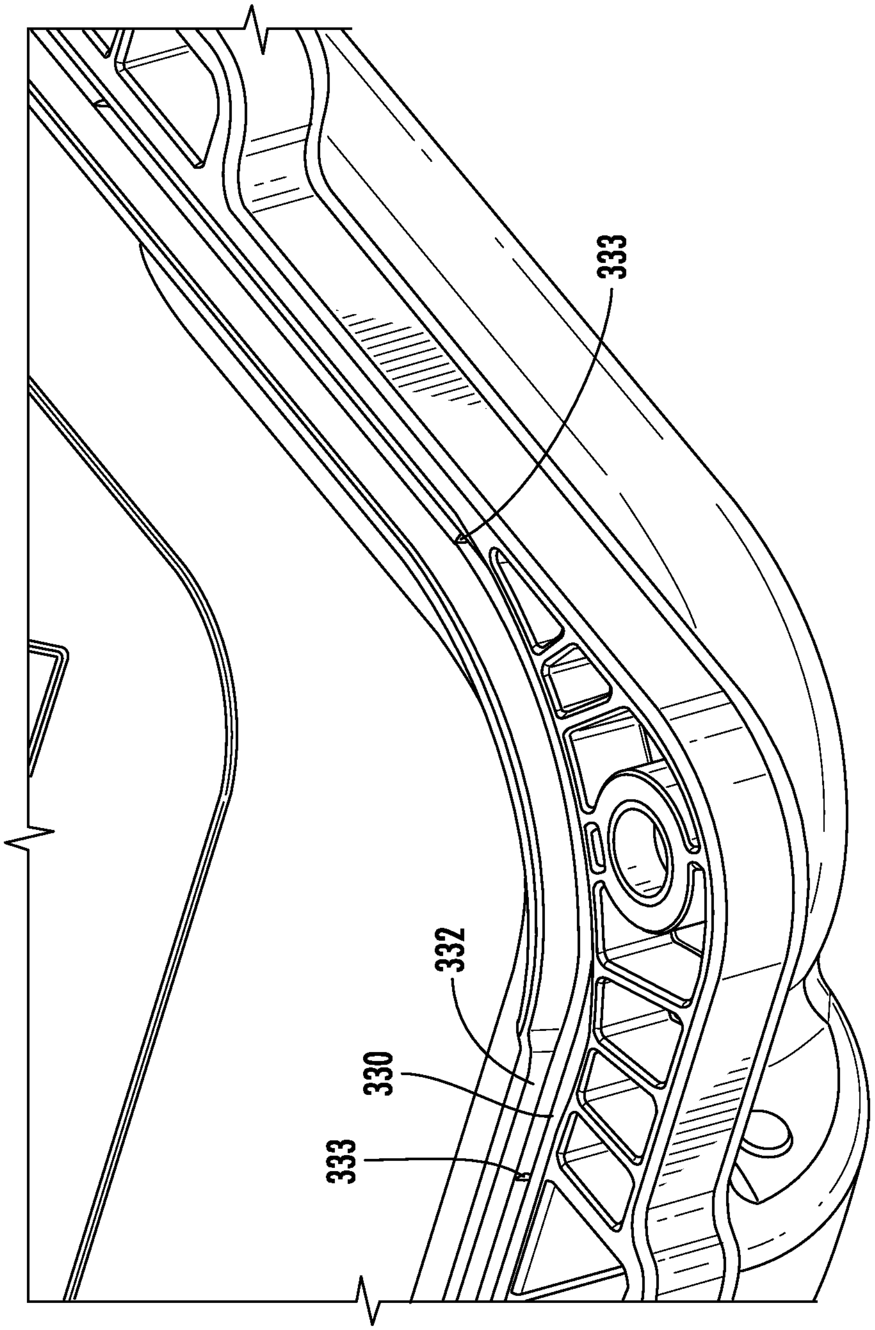
FIG. 24B illustrates an enlarged view of the top perspective view of FIG. 24A illustrating a portion of the lid of the container of FIG. 17A according to one or more aspects described herein.

As discussed above with respect to lid 5, lid 305 may include a recess 332 that may seat a gasket 330 where the recess 332 extends around a perimeter of the lid 305. The recess 332 may be positioned within the interface surface 335 of the lid 305. The recess 332 may include a plurality of retaining members 333 extending from the sides of the recess 332 as shown in FIG. 24B. The retaining members 333 may engage the gasket 330 in multiple locations around the perimeter of the recess 332 to secure the gasket 330 in the recess 332. Each retaining member 333 may include at least one tapered surface such that the retaining member 333 has a thickness near the top of the retaining member which is closer to the open end of the recess 332 than the thickness in a central portion of the retaining member 333. Additionally, in some example embodiments, the container 302 may include a ridge 334 in the base 304 opposite the recess 332 of the lid 305 extending around a perimeter of the base 304. The ridge 334 may be positioned on the interface surface 336 of the base 304. The gasket 330 may be placed between the recess 332 and the ridge 334 when the lid 305 engages the base 304.

Figure 25:
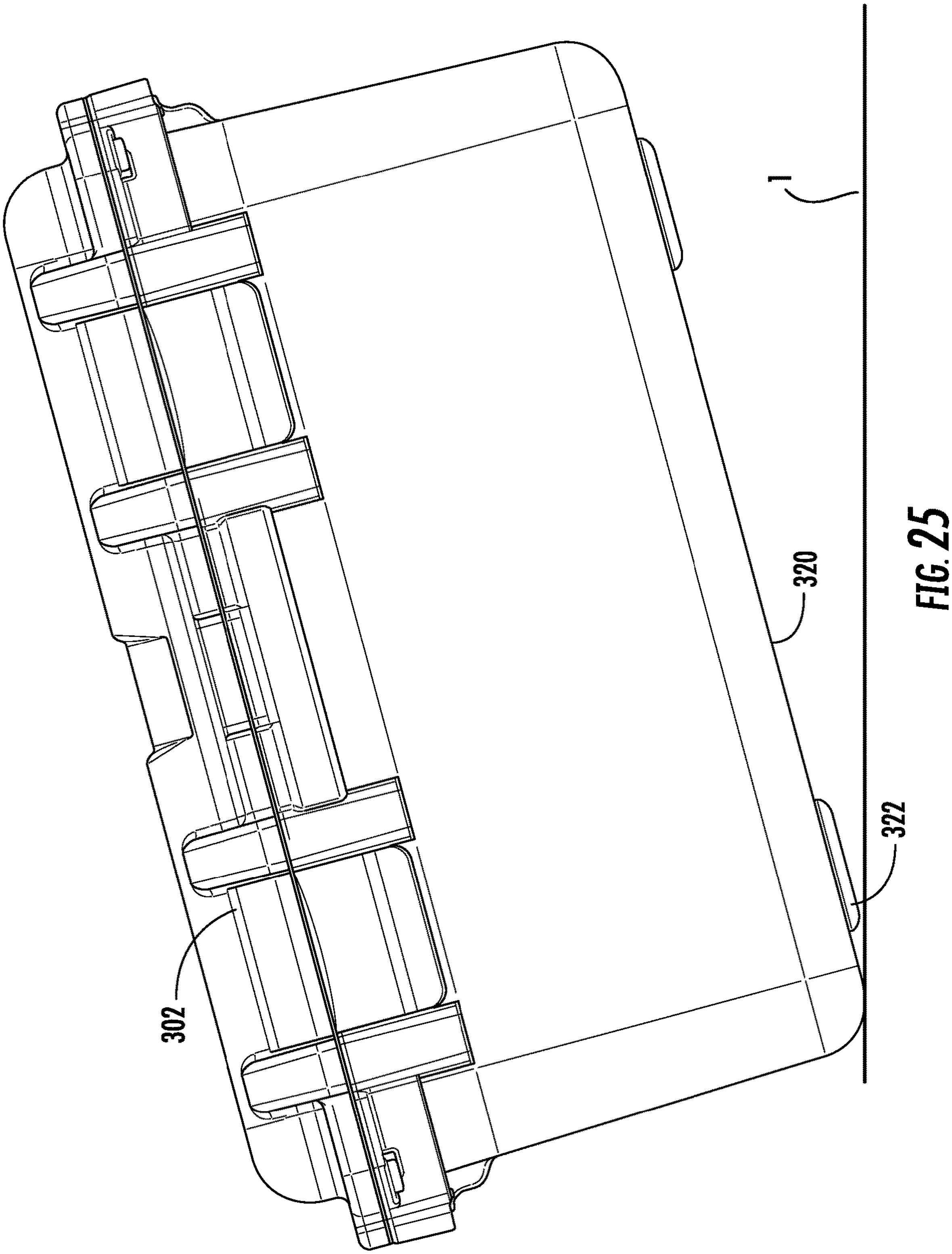
FIG. 25 illustrates a side view of the container of FIG. 17A according to one or more aspects described herein.

In some embodiments, the bottom portion 320 may also and/or alternatively include one or more feet 322, which may support the container 302 on a surface 1 such as a table, the ground, a vehicle bed, or the like. The feet 322 may be formed separately from a non-skid material like a rubber or elastomer and attached to the base 304 after being formed. The feet 322 may have a height that is considered "low profile" that allows the container 304 to be slid along one of its edges when the container 302 is tilted at an angle greater than 15 degrees relative to the surface 1 supporting the container 302 as shown in FIG. 25. Alternatively, the feet 322 may be integrally formed with the base 304.

Figure 20B:
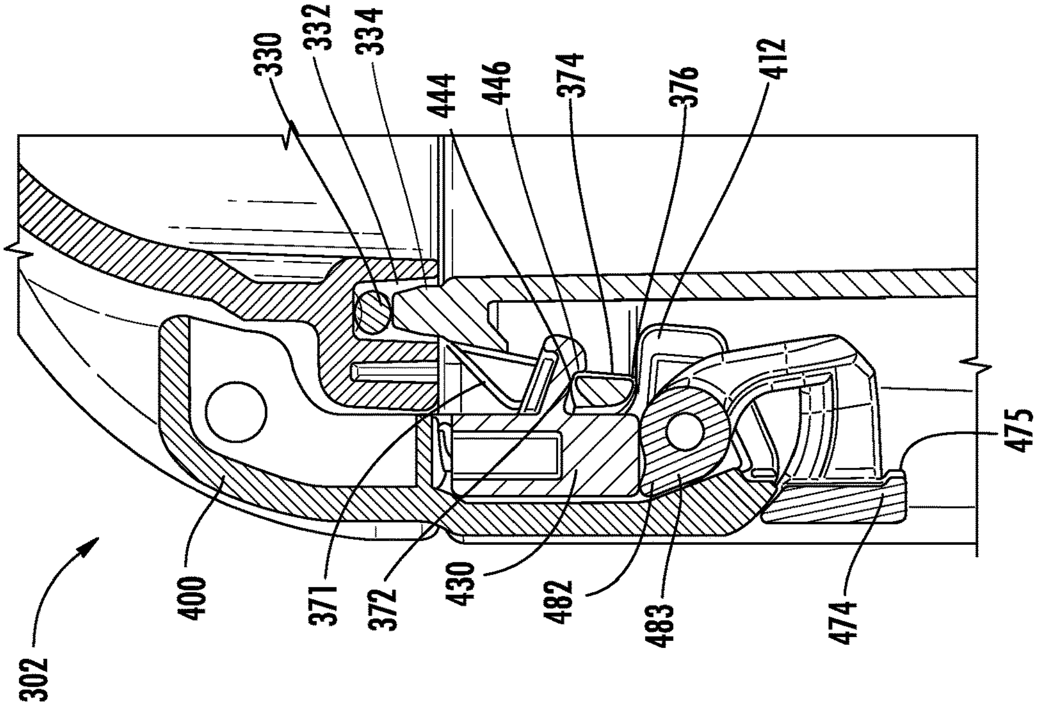
FIG. 20B illustrates a partial cross-sectional view of an alternate embodiment of the latch assembly of FIG. 20A in a locked position according to one or more aspects described herein.
Figure 20A:
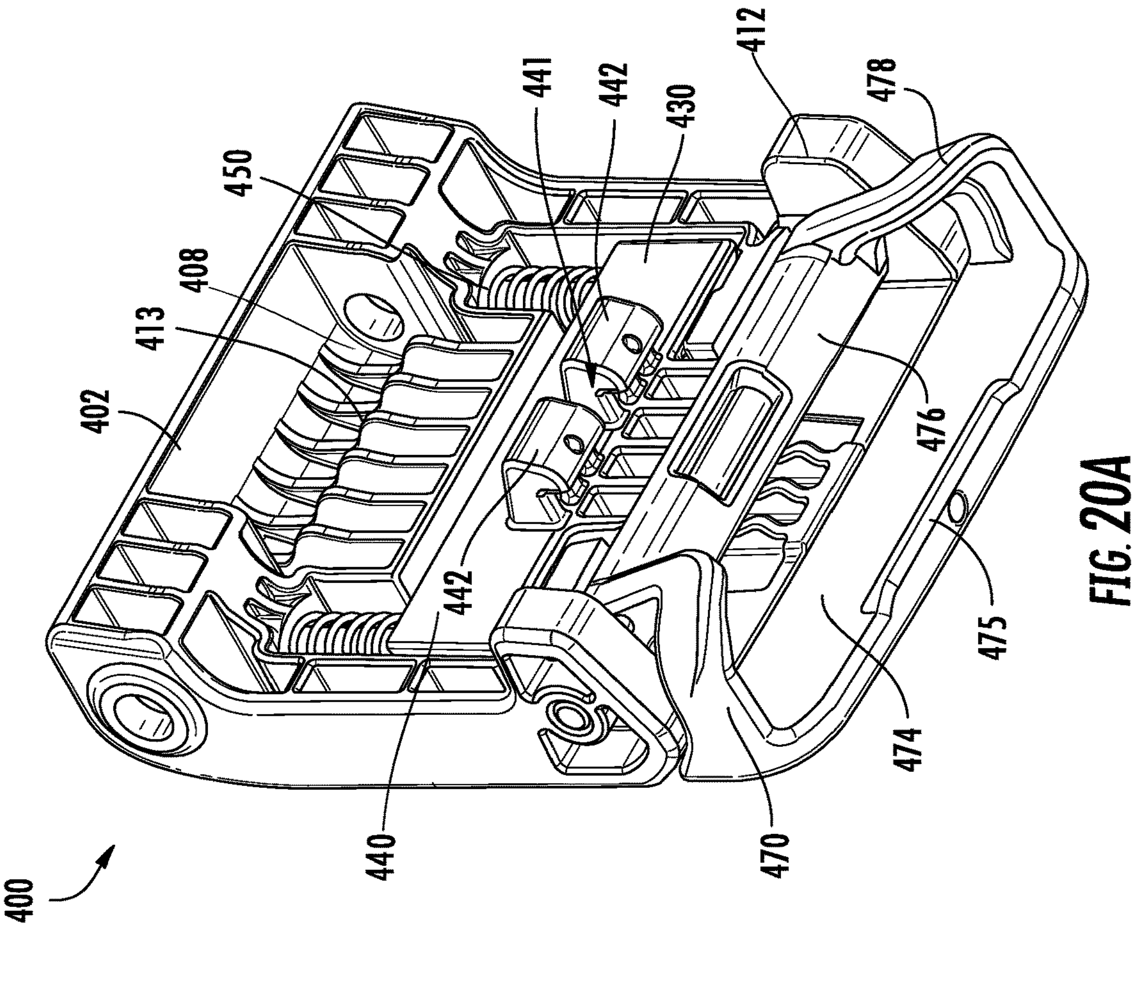
FIG. 20A illustrates a bottom rear perspective view of an alternate embodiment of a latch assembly according to one or more aspects described herein.

FIG. 20A through FIG. 21 depict an example latch assembly 400 where like reference numerals refer to the same or similar elements in latch assembly 100 but include 400 series reference numerals. Latch assembly 400 is substantially similar to latch assembly 100 and therefore similar aspects of latch assembly 400 are not discussed again herein. Latch assembly 400, as shown in FIG. 20A, may include multiple components including a latch body 402, a locking member 430, a biasing member 450, and an activating member 470. Similar to latch assembly 100 discussed above, the latch assembly 400 may include a locked position and an unlocked position.

Figure 20C:
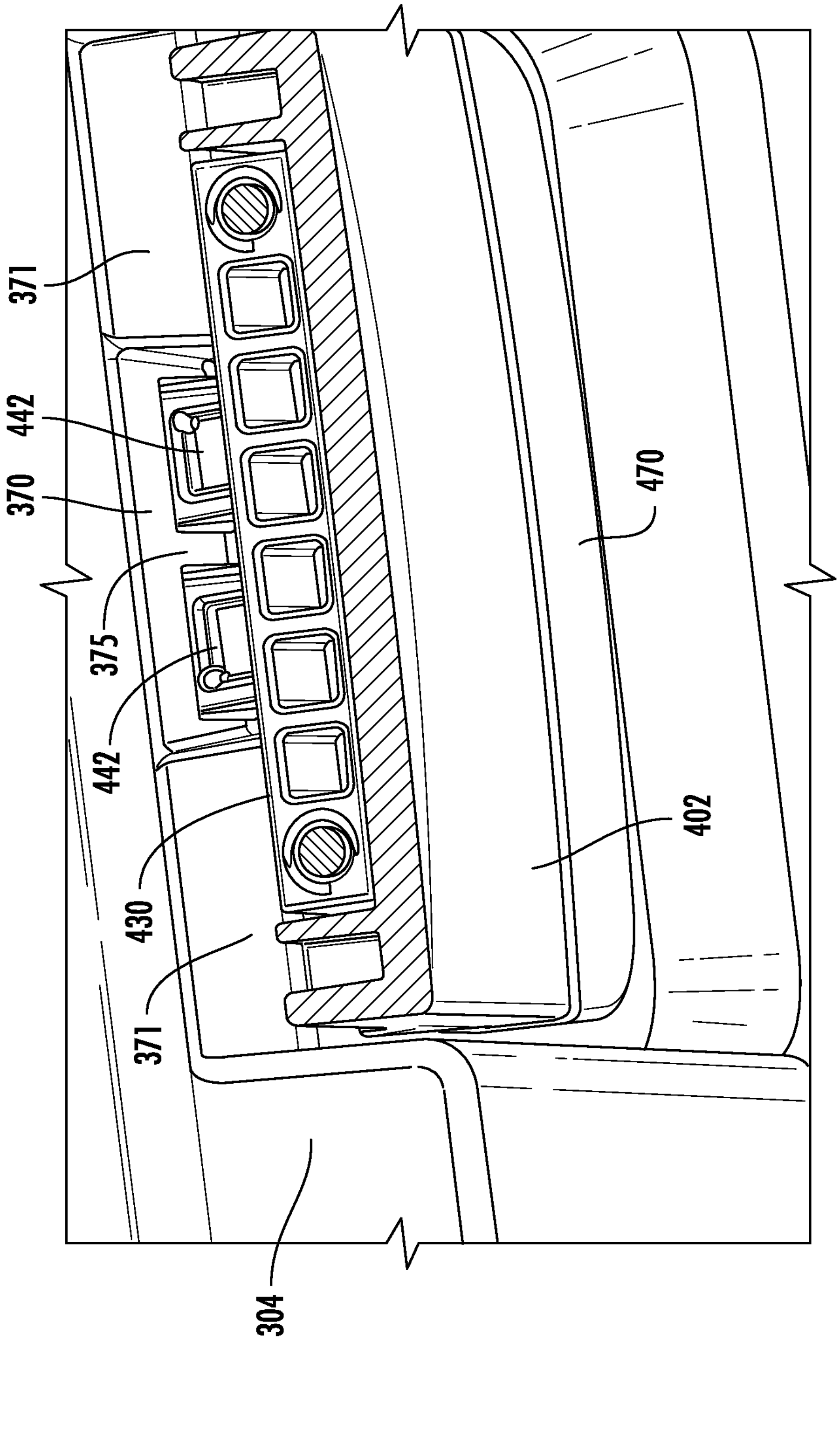
FIG. 20C illustrates a partial cross-sectional view of an alternate embodiment of a latch assembly of FIG. 20A in a locked position according to one or more aspects described herein.

The locking member 430 may include a base portion 440 and a plurality of hook portions 442 extending inward from the base portion 440. The plurality of hook portions 442 may be spaced apart from each other by a gap 441. Each hook portions 442 may each include a lower surface 444 and an inward facing surface 446. As shown in FIG. 20B, when the latch assembly 400 is in the locked position, the lower surface 444 of each hook portion 442 may engage the upper surface 372 of the latch keeper 370 and the inward facing surface 446 of each hook portion 442 may engage the inner surface 374 of the latch keeper 370. Further, the rib 375 of the latch keeper 370 may fit within the gap 441 between each of the hook portions 442 as shown in FIG. 20C. Additionally, when the latch assembly 400 is in the locked position the upper surface of the engagement lugs 412 may engage the lower surface 376 of the latch keeper 370.

The latch body 402 may include a plurality of ribs 413 along the inner surface 408 from the upper portion of the inner surface 408 towards the locking member 430. The ribs 413 may each have a contoured height such that each rib 413 has a lower height in an upper region than in the lower region as the rib extends toward the locking member 430. The ribs 413 help to strengthen the latch body 402 while reducing the overall weight of the latch assembly 400.

Similar to the latch assembly 100, the latch body 402 may also be pivotally engaged with an activating member 470. The activating member 470 may also be engaged with the locking member 430 and may be configured to move the locking member 430 from the downward position to the upward position. The activating member 470 may be pivotally engaged to the latch body 402 by a hinge 472 extending through the latch body 402 and the activating member 470. The activating member 470 may include a grip portion 474, an activating barrel 476, and one or more arms 478 connecting the grip portion 474 and the activating barrel 476 where the activating barrel 476 may include a raised portion 482. The raised portion 482 and activating barrel 476 may be joined together along a substantially flat contact surface 483. In order to adequately support the activating barrel 476, the interior surface 408 of the latch body 402 in that region may be substantially parallel to the contact surface 483 to support the contact surface 483 and thus assist in supporting the activating barrel 476 and keep the activating member 470 from rotating backward beyond the outer surface 410 of the latch body 402. As another option, the grip portion 474 may include a ridge 475 extending at least a portion of the length of the grip portion 474 to further assist a user in gripping the grip portion 474 without slipping.

As discussed above, the ramped surface 371 acts to both protect the latch assembly from getting stuck on the base 304 as well as acting to help position the latch assembly to properly engage the latch keeper 370.

Figure 26A:
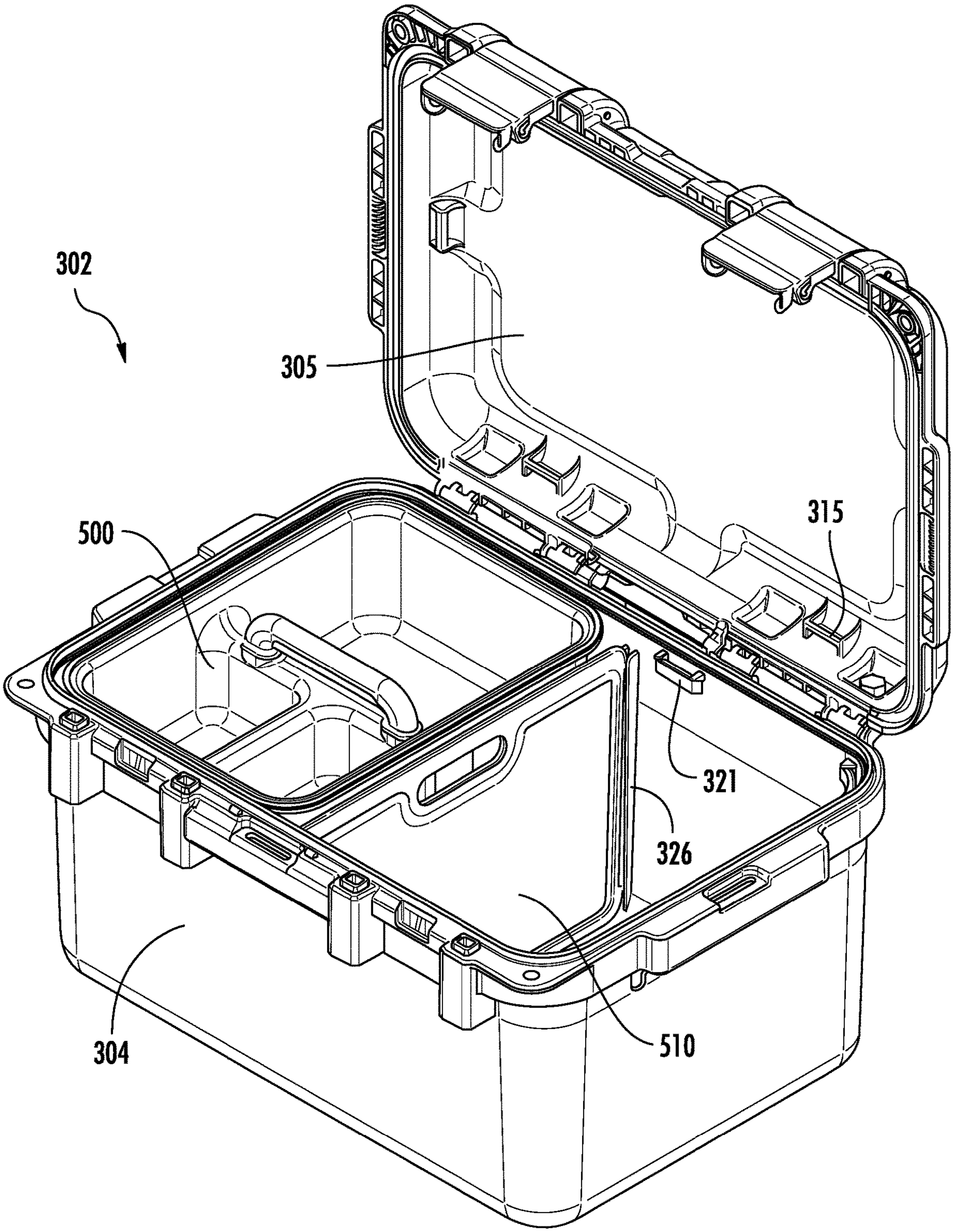
FIGS. 26A-26D illustrate a top perspective view of the container of FIG. 17A in an open position with various accessories installed according to one or more aspects described herein.
Figure 26B:
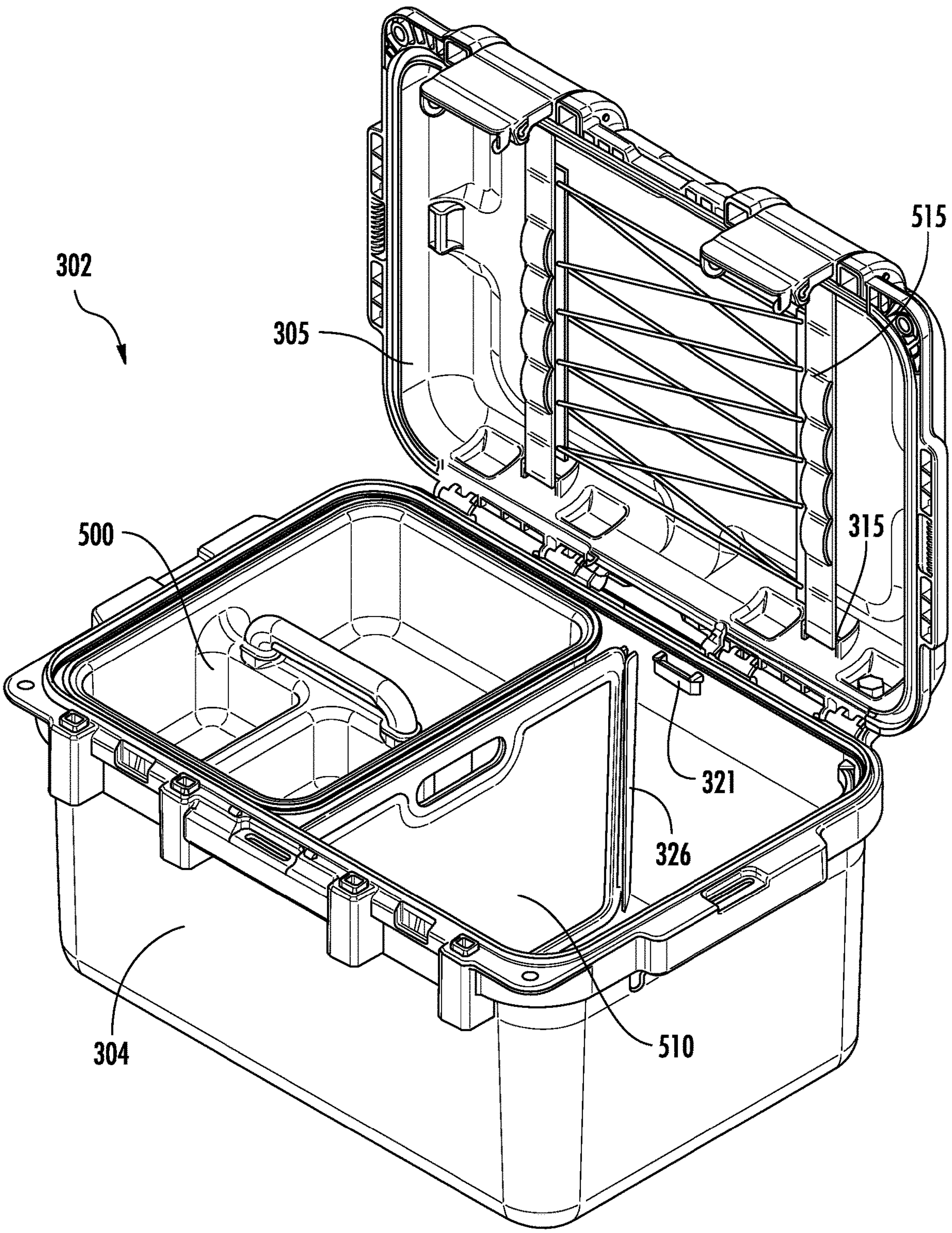
Figure 26C:
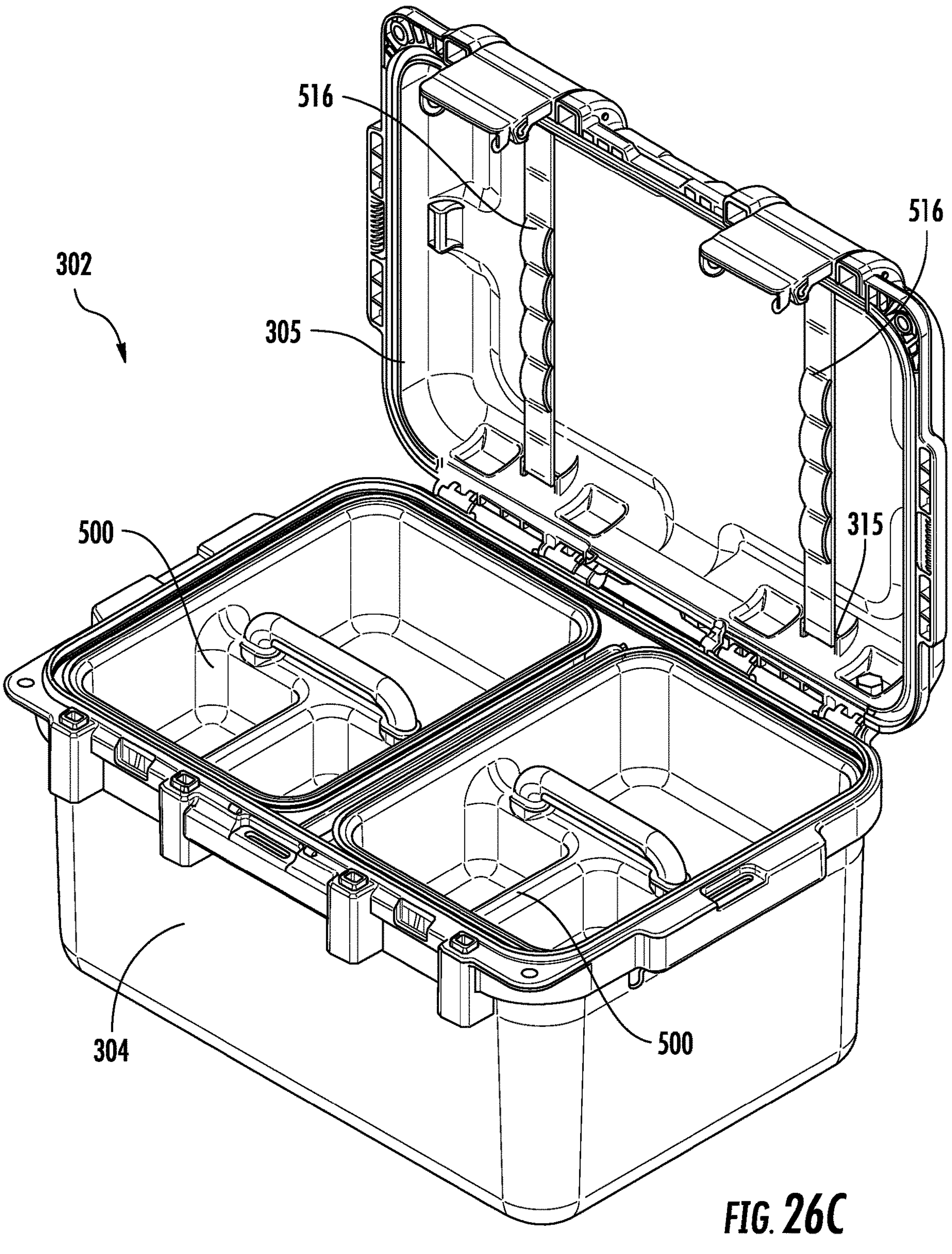
Figure 26D:
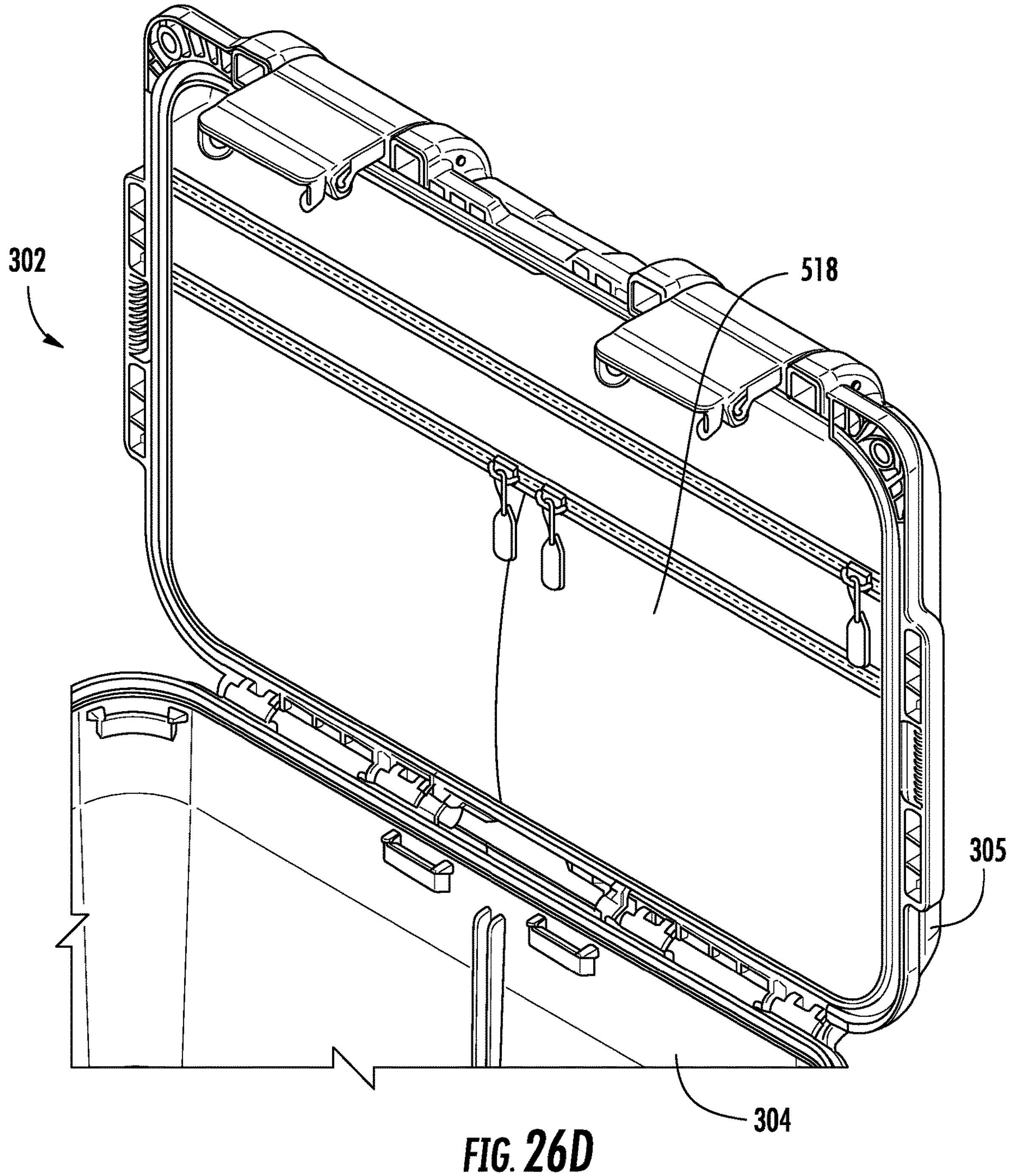

FIGS. 26A-26D illustrate the container 302 as described above that is configured with various accessories. For instance, FIG. 26A illustrates an embodiment of a storage system that includes the container 302 and a tray 500 installed where the tray 500 is supported by the plurality of tabs 321 as well as the divider wall 510 installed between the pair of tracks 326. FIG. 26B illustrates the system shown in FIG. 26A with a cargo net 515 attached to the clips 315 of the lid 305. As still another embodiment of the storage system is illustrated in FIG. 26C where the container 302 includes two trays 500 supported by the tabs 321 along with a pair of utility straps 516 connected to the clips 315 of the lid 305 to provide multiple locations for a user to attach and organize any desired items in the container 302. FIG. 26D illustrates another option where a soft sided storage bag 518 that includes a plurality of zippered storage compartments. As discussed above, by providing the multiple attachment points within the base and the lid, the container 302 may be equipped with a variety of options of accessories to provide a storage system to provide an organized storage solution for a user.

Figure 27B:
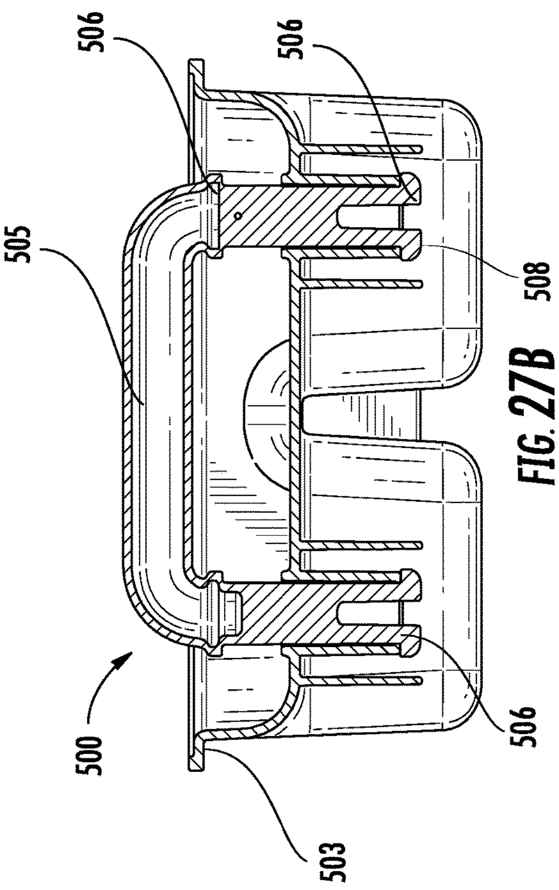
FIGS. 27B and 27C illustrate side cross-sectional views of the accessory of FIG. 27A according to one or more aspects described herein.
Figure 27C:
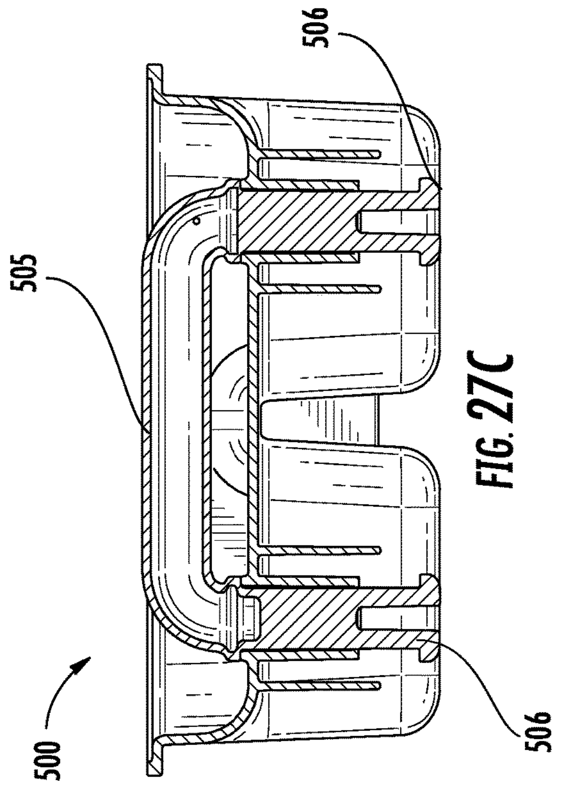
Figure 27A:
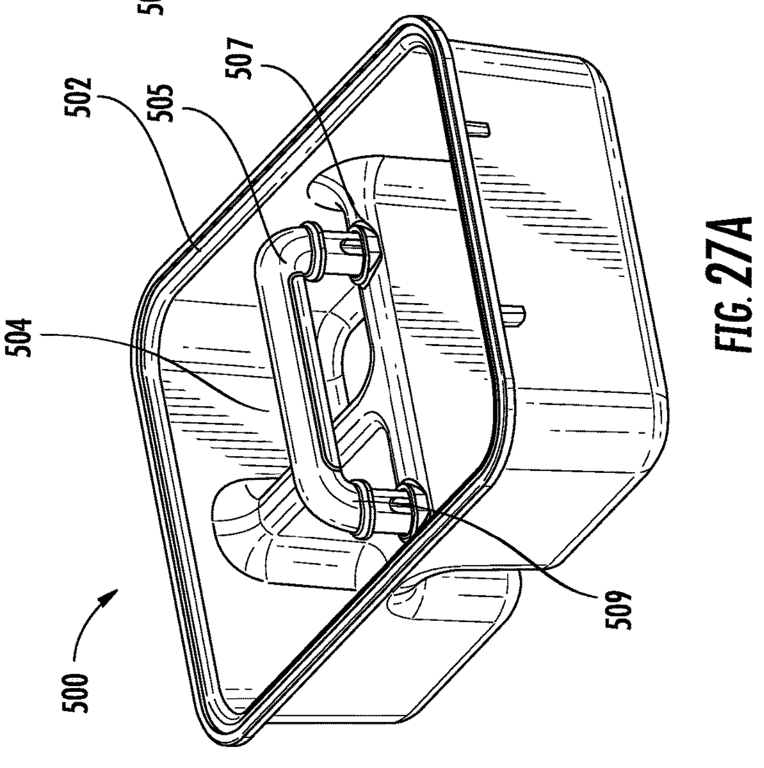
FIG. 27A illustrates a top perspective view of an accessory for the container of FIG. 17A according to one or more aspects described herein.

FIG. 27A-27C illustrate further details of the tray 500. The tray 500 may have a body 502 with a mounting surface 503 along with a plurality of storage cavities 504. The storage cavities 504 may have any size and may be configured to have any number of cavities 504. For instance, the exemplary embodiment shown in FIGS. 27A-27C comprises three cavities, where two of the cavities are smaller than the third cavity. As another feature of the tray 500, the tray 500 may include a movable handle 505. The handle 505 may move vertically from an extended position shown in FIG. 27B to a contracted or storage position shown in FIG. 27C. In the extended position, a user can easily lift the tray 500 out of the container 302 while in the contracted position, the tray 500 has a lower height profile or storage. The handle 505 may have a U-shaped tube-like structure with two ends 506 that engage into openings 507 in the body 502 of the tray. Each end 506 of the tube-like structure may have a tapered surface 508 that allows for installation into the openings 507 and a retaining surface 509 to keep the handle from being removed and also providing a positive stop to limit the vertical movement of the handle 505.

As another option, as illustrated in FIGS. 28-36-H, a carry strap 600 may attach to container 302 to allow a user to easily lift and carry the container 302. As shown, in FIGS. 28 and 29, carry strap 600 may be installed by inserting an end portion 616 of each end 604, 606 into openings 341 on opposing side handles 340 of base 304 of container 302. The carry strap 600 may include a base member 602 having a first end 604, a second end 606 opposite the first end 604, an elongated member 608 extending between the first end 604 and the second end 606, and a carry handle 610. The first end 604 and the second end 606 may each have an end portion 616 that includes an engaging member 618, which helps to secure the strap 600 to the handles 340 of the container 302 using a friction fit. As defined herein, the term “friction fit” may relate to a means that two components are secured to each other using only the mechanical interference or mechanical contact created by the two components when assembled together. The carry handle 610 may include openings 612 at each end 614 such that the elongated member 608 may extend through each opening 612.

Figure 28:
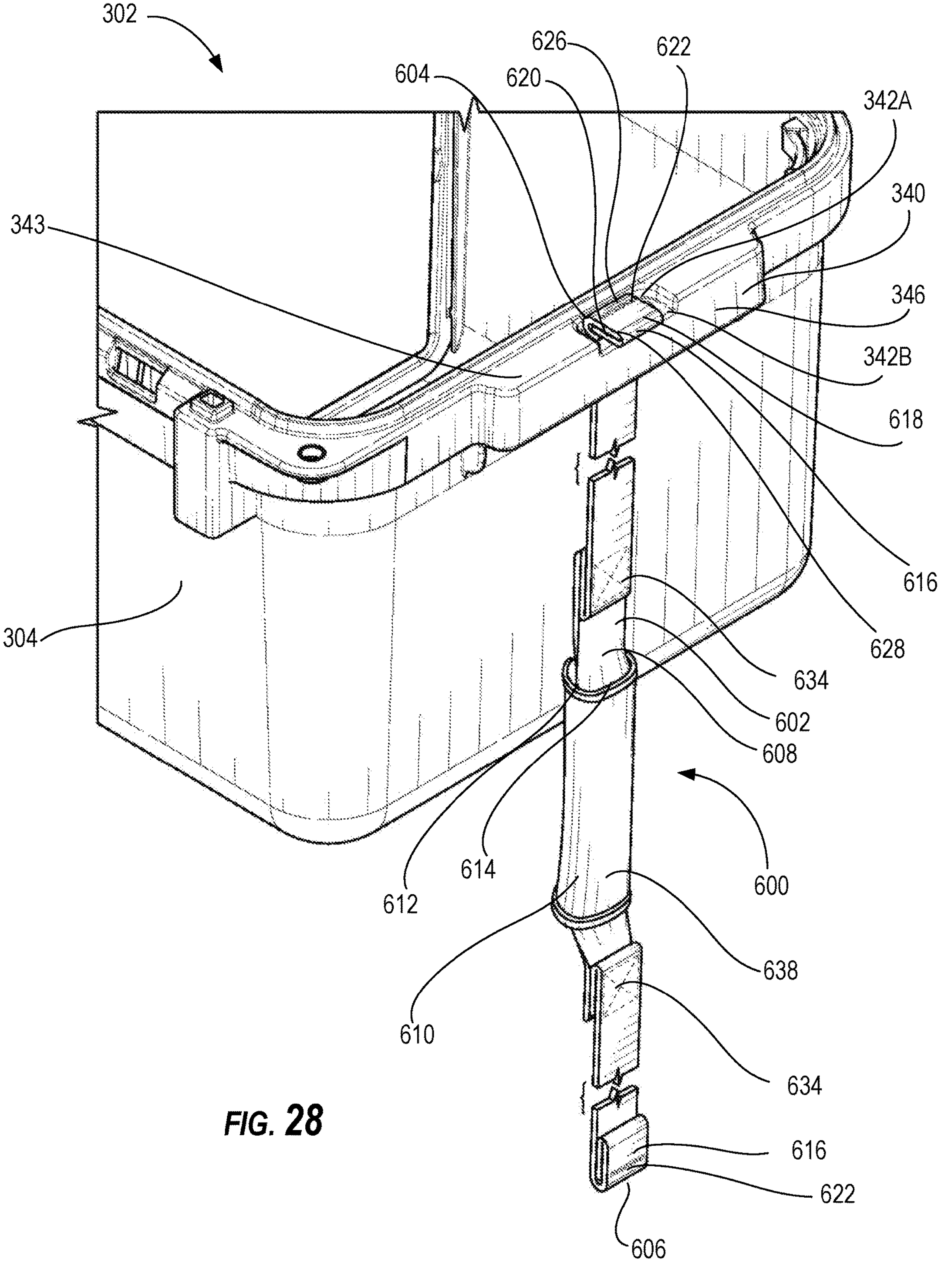
FIG. 28 illustrates a partial top front perspective view of a carry strap installed onto the container according to one or more aspects described herein.
Figure 29:
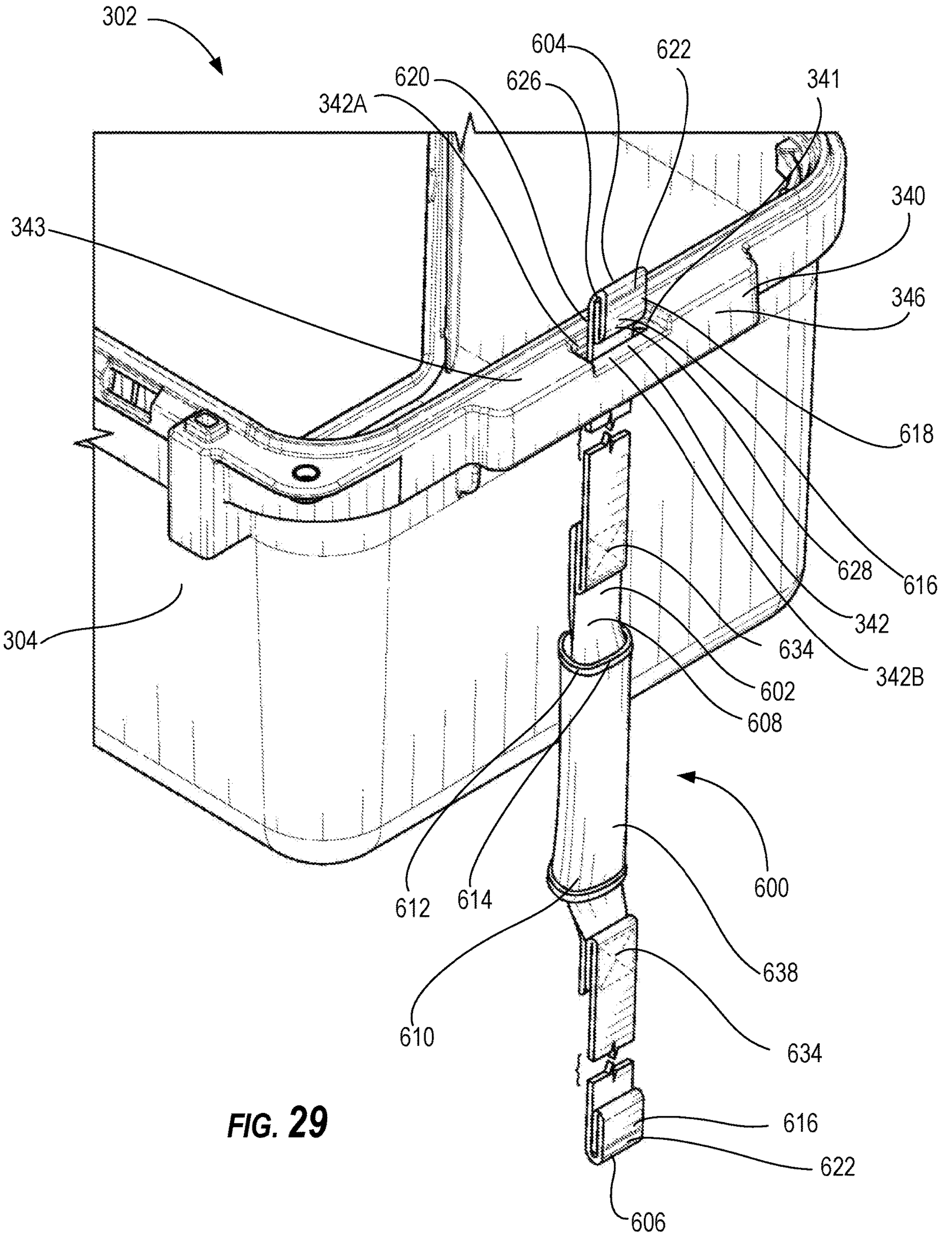
FIG. 29 illustrates a partial top front perspective view of a carry strap partially installed onto the container according to one or more aspects described herein.

As shown in FIGS. 28 and 29, the carry strap 600 may be installed onto the container 302 by inserting one of the end portions 616 through the opening 341 of the handle 340 from below the handle 340, where the end portion 616 may be rotated relative to the elongated member 608 onto the top surface 343 of the handle 340. As shown in the illustrated example, side handle 340 may include a recess 342 that is offset below the top surface 343 that receives the engaging member 618. The engaging member 618 of each end portion 616 may include a layered or folded portion 620. The elongated member 608 may be folded onto itself and joined together creating an inboard portion 626 and an outboard portion 628 of the engaging member 618. The folded portion 620 may include at least two layers of the elongated member 608 and have at least one fold. As shown in the illustrated examples, the folded portion 620 may include three layers of the elongated member 608 and three folds. In other examples, the folded portion 620 may have more than three layers and three folds. The folded portion 620 may be joined using a mechanical element 622 such as stitching, a grommet, or other means known to one skilled in the art to join the layers together. In the illustrated examples, the stitching 622 may be a bartack stitch, a lockstitch, or other stitching known to one skilled in the art. The stitching 622 may have a width of approximately 2 mm, or within a range of 1 mm and 3 mm to provide adequate strength to the joint. The stitching 622 may be located a fixed distance 624 from the respective end 604, 606 to a centerline 625 of the stitching 622 creating an inboard portion 626 and an outboard portion 628. The engaging member 618 may then be rotated relative to the elongated member 608 on either side of the stitching 622 to secure the strap 600 to the container 302. The bartack stitching 622 may also help to increase the strength of the joint. Alternatively, the folded portion 620 may be joined using an adhesive, tape, or other means known to one skilled in the art. The adhesive or tape may be used alone or in conjunction with the stitching 622. As shown in FIG. 28, once the end portion 616 of the strap 600 is extended through the top surface 343 of the handle 340, the engaging member 618 may be rotated along the stitching 622 such that the inboard portion 626 may be received in an inboard recess portion 342A of recess 342 and the outboard portion 628 may be received in an outboard recess portion 342B of recess 342. As discussed above, the stitching 622 may be located a fixed distance from the respective end 604, 606 such that the inboard portion 626 of the engaging member 618 has a smaller length than the length of the outboard portion 628. For example, the length of the inboard portion 626 may be within a range of 60 percent and 66 percent of the length of the outboard portion 628, or within a range of 55 percent and 70 percent of the length of the outboard portion 628. The length of the inboard portion 626 may be measured as the length of the engaging member 618 from a centerline of the stitching 622 of the engaging member 618 to its respective end. Similarly, the length of the outboard portion 628 may be measured as the length of the engaging member 618 from a centerline of the stitching 622 to an end 629 of the outboard portion 628 located at the fold on folded portion 620. For example, the length of the inboard portion 626 may be approximately 7 mm, or within a range of 5 mm to 10, and the length of the outboard portion 628 may be approximately 11 mm, or within a range of 9 mm and 16 mm.

Figure 30:
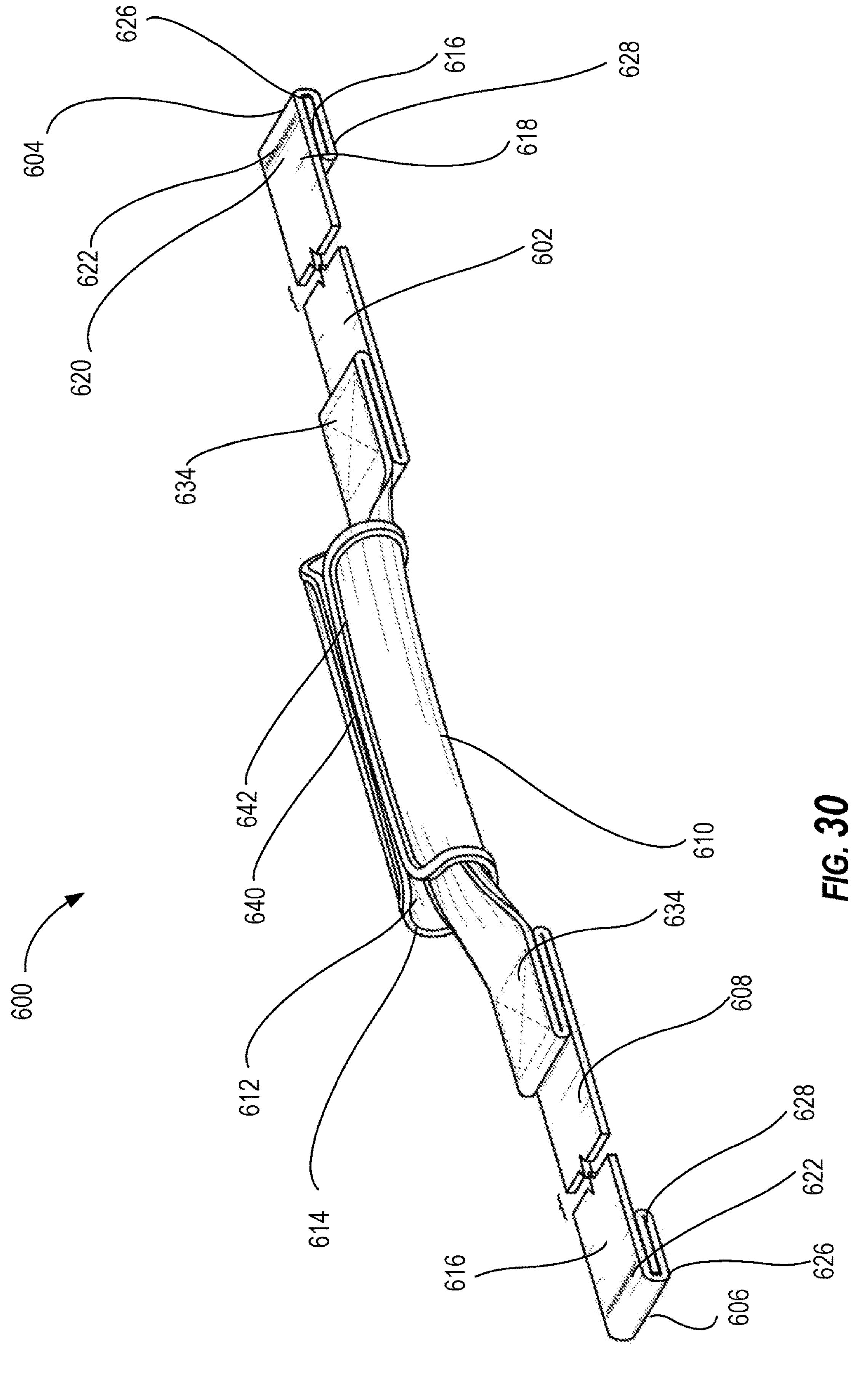
FIG. 30 illustrates a top front perspective view of the carry strap of FIG. 28 according to one or more aspects described herein.
Figure 31:
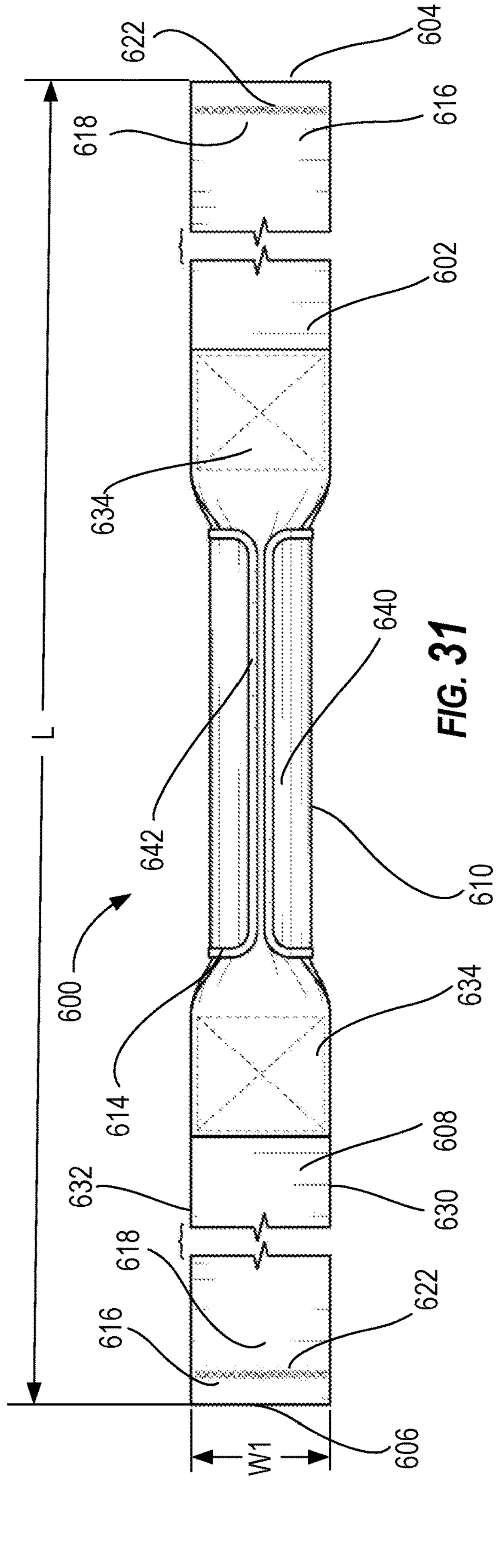
FIG. 31 illustrates a top view of the carry strap of FIG. 28 according to one or more aspects described herein.
Figure 32:
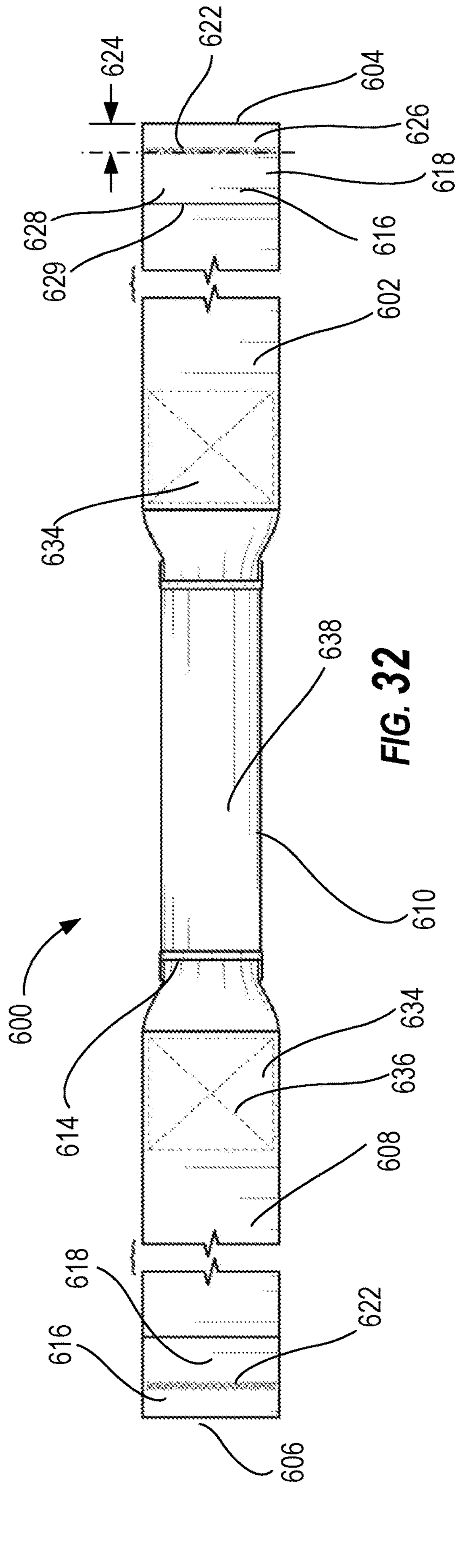
FIG. 32 illustrates a bottom view of the carry strap of FIG. 28 according to one or more aspects described herein.

To enhance the friction fit between the strap 600 and the openings 341, the elongated member 608 of strap 600 may have a width at each end portion 616 that is greater than the width of the opening 341 on the handle 340. The width, W1, of the elongated member 608 may be the distance from a first side 630 to a second side 632 of the elongated member 608, while the width, W2, of the opening 341 may be measured as the distance across the span between the smaller ends of the elongated opening 341. In some examples, the width, W1, of the base member 602 may be approximately 5 percent greater than the width, W2, of the opening 341, or may be within a range of 3 percent to 7 percent greater than the width, W2, of the opening 341. The width, W1, of the base member 602 may be a constant width, where the width, W1, may be approximately 38 mm or within a range of 35 mm to 41 mm, or alternatively, base member 602 may have a variable width where the width of the base member 602 may have a width that is less in a central region that extends through the carry handle 610 than the width of the base member 602 at the end portions 616 as shown in FIG. 35. In the illustrated examples, carry strap 600 has a base member 602 with a constant width, the elongated member 608 may curl or wrap along an interior surface of the carry handle 610 as shown in FIG. 30. This may cause the carry handle 610 to have a width that is less than the width of the base member 602 at the end portions 616. In some examples, the width of the handle 610 may be within a range of 60 to 75 percent of the width of the base member 602 at the end portions 616.

As shown in FIGS. 28 and 29, to install strap 600 to the container 302, the first end 604 of strap 600 may be inserted through an elongated opening 341 on the handle 340 that is located on a first side of the base 304 of the container 302. The end portion 616 may extend through the opening 341 above top surface 343 with the majority of the elongated member 608 still below handle 340. In some examples, the end portion 616 may be inserted at an angle through the opening 341 where the end portion 616 forms an acute angle with the top surface 343 of the handle 340 as it is being inserted into the opening 341. This acute angle may be within a range of 1 degree and 55 degrees. Next, the engaging member 618 may be rotated relative to the elongated member 608 such that the inboard portion 626 of the engaging member 618 lays flat within the inboard recess portion 342A of the recess 342 and the outboard recess portion 342B of the recess 342. The inboard recess portion 342A may be the portion of recess 342 that extends from the elongated opening 341 toward an interior void of the container 302, and an outboard recess portion 342B may be the portion of recess 342 that extends from the elongated opening 341 away from the interior void of the container 302. The depth of the recess 342 may be greater than the thickness of both the inboard portion 626 and the outboard portion 328. Once a first end 604 of the strap 600 is engaged with the handle 340 on a first side of the base 304, the process is repeated by attaching a second end 606 of the strap 600 to the handle 340 on the second side of the base 304 opposite the handle 340 with the first end 604 attached. For example, the second end 606 is inserted through an elongated opening 341 on the handle 340 that is located on a second side of the base 304 of the container 302 where the end portion 616 extends up above a top surface 343 and the majority of the elongated member 608 is below handle 340. Like installing the first end 604, the second end portion 616 at end 606 may be inserted where the end portion 616 forms an acute angle with the top surface 343 of the handle 340 as it is being inserted into the opening 341. This acute angle may be within a range of 1 degree and 55 degrees. Lastly, the second engaging member 618 may be rotated relative to the elongated member 608 such that the inboard portion 626 of the engaging member 618 lays flat within the inboard portion 342A of the recess 342 and the outboard portion 342B of the recess 342. The strap 600 is then secured at both ends 604, 606 to their respective handles 340 of the base 304. The container 302 may be closed, and the strap 600 may be grasped by a user by the strap handle 610 to lift the container 302. When the strap 600 is lifted, the elongated member 608 may wrap around an outer portion of the bottom of the handle 340 and contact the outer surface 346 of the handle 340.

As discussed above, the carry strap 600 may include a base member 602 having a first end 604, a second end, 606 and an elongated member 608 extending between the first end 604 and the second end 606, and a carry handle 610. The carry handle 610 may be located in a substantially centered position along the overall length, L, of the carry strap 600. In addition, the strap 600 may include a pair of overlap regions 634 arranged a fixed distance from ends 614 of the carry handle 610. The overlap regions 634 may include three layers of the elongated member 608 folded upon itself and then joined together. In some examples, the overlap regions 634 may include more than three layers. The overlap regions 634 may be permanently joined using stitching 636 such as a box-x stitch that extends near the perimeter of the overlap region 634 with a diagonal stitching region extending between the corners of the stitching. The stitching 636 may have a rectangular shape such that the box-x stitch may be approximately 30 mm in length or within a range of 28 to 32 mm and may have a width of approximately 34 mm, or within a range of 32 to 38 mm.

As an alternative to the stitching 636 shown in FIGS. 28-34, the stitching 636 may have a variety of shapes. For instance, the stitching 636 may be in several forms such as: (a) regular or irregular backstitching that is substantially parallel to the webbing such as in FIG. 36A; (b) a box stitch with bartack reinforcement on the ends closest to the fold as shown in FIG. 36B; (c) a box-s stitch with bartack reinforcement on the ends closest to the fold as shown in FIG. 36C; (d) a single bartack or a series of bartacks arranged substantially parallel to the fold as shown in FIG. 36D; (e) regular or irregular backstitching that is substantially perpendicular to the webbing such as in FIG. 36E; (f) a double W stitching pattern as shown in FIG. 36F; (g) a zig-zag stitching pattern as shown in FIG. 36G; and (h) a circular or pattern bartack as shown in FIG. 36H, where the patterned bartack may be any geometric shape, such as triangular, a quadrilateral, or shape containing more than 4 sides. In addition, the bartack pattern of FIG. 36H may include different geometric shapes, such as having rectangular and triangular bartacks together in a pattern.

In some examples, the overlap regions 634 may be joined using stitching alone, or may be joined using an adhesive, or may be joined using stitching in conjunction with an adhesive. These overlap regions 634 may provide additional strength for the carry strap 600 while also keeping the carry handle 610 in a substantially centered location along the length, L, of the carry strap 600. The overall length, L, of the carry strap 600 may have a length to enable the carry strap to clear either the front side 308 or rear side 310 of the container 302 to not inhibit a second container 302 being stacked on top of a first container 302.

Figure 33:
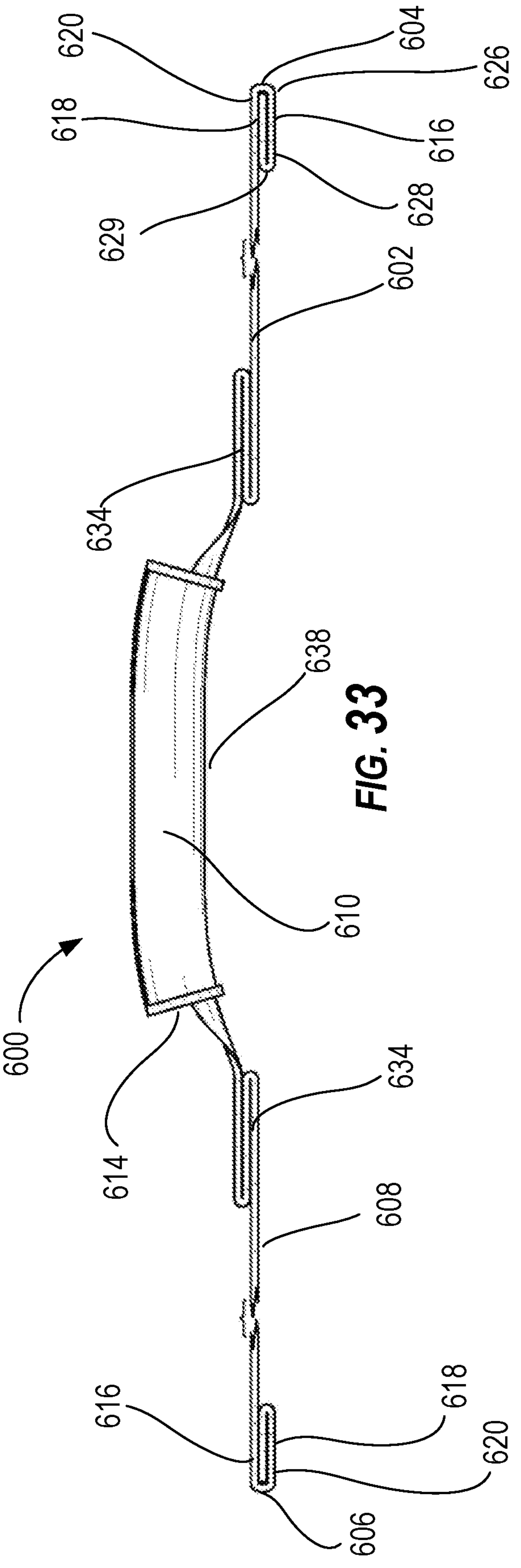
FIG. 33 illustrates a front view of the carry strap of FIG. 28 according to one or more aspects described herein.
Figure 34:
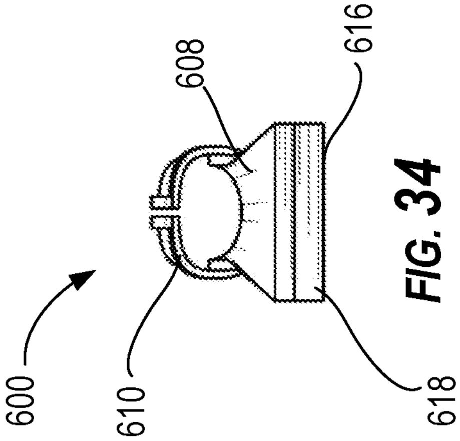
FIG. 34 illustrates a side view of the carry strap of FIG. 28 according to one or more aspects described herein.
Figure 37:
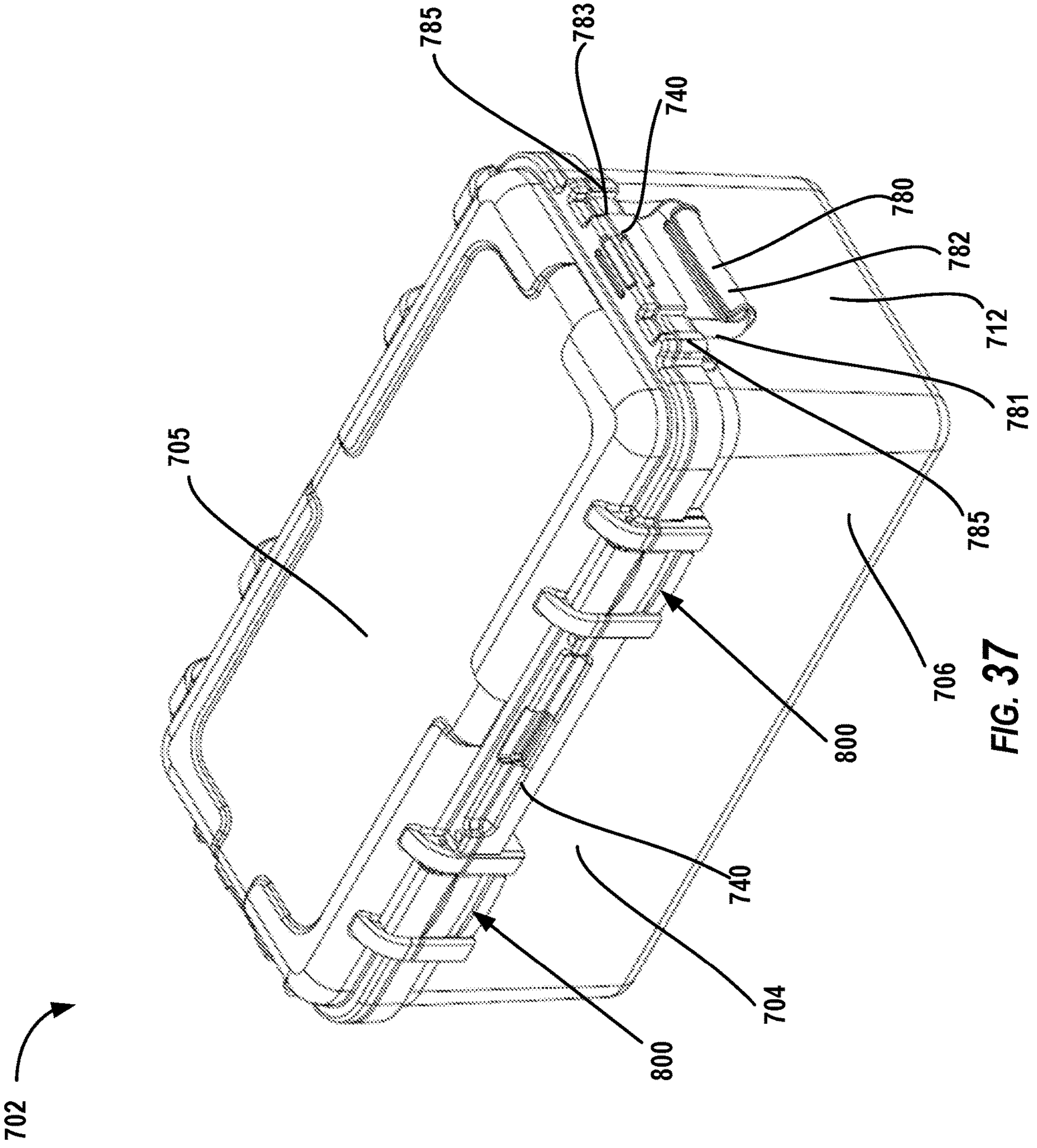
FIG. 37 illustrates a front, right perspective view of another exemplary container in a closed position according to one or more aspects described herein.
Figure 38B:
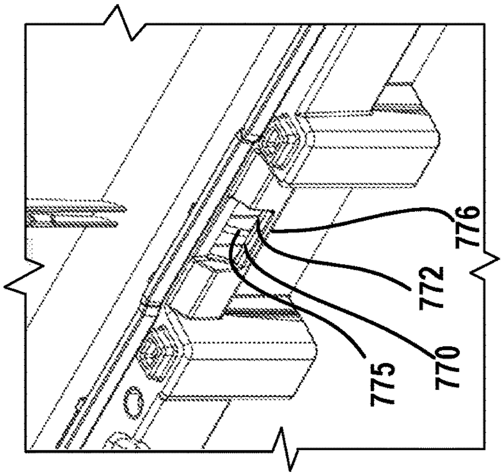
FIG. 38B illustrates an enlarged perspective view of FIG. 38A according to one or more aspects described herein.
Figure 38A:
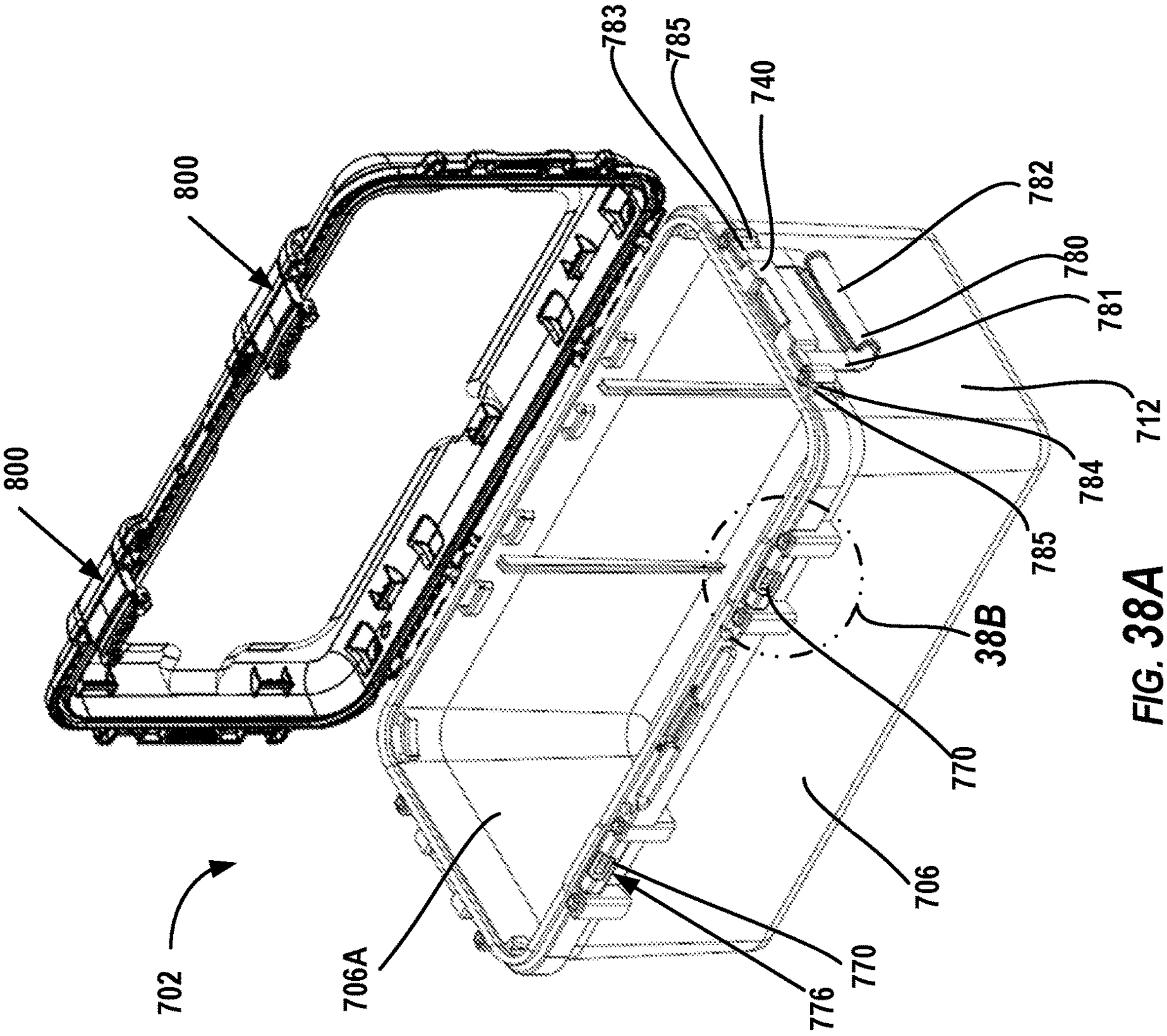
FIG. 38A illustrates a front, right perspective view of the container of FIG. 37 in an open position according to one or more aspects described herein.
Figure 39:
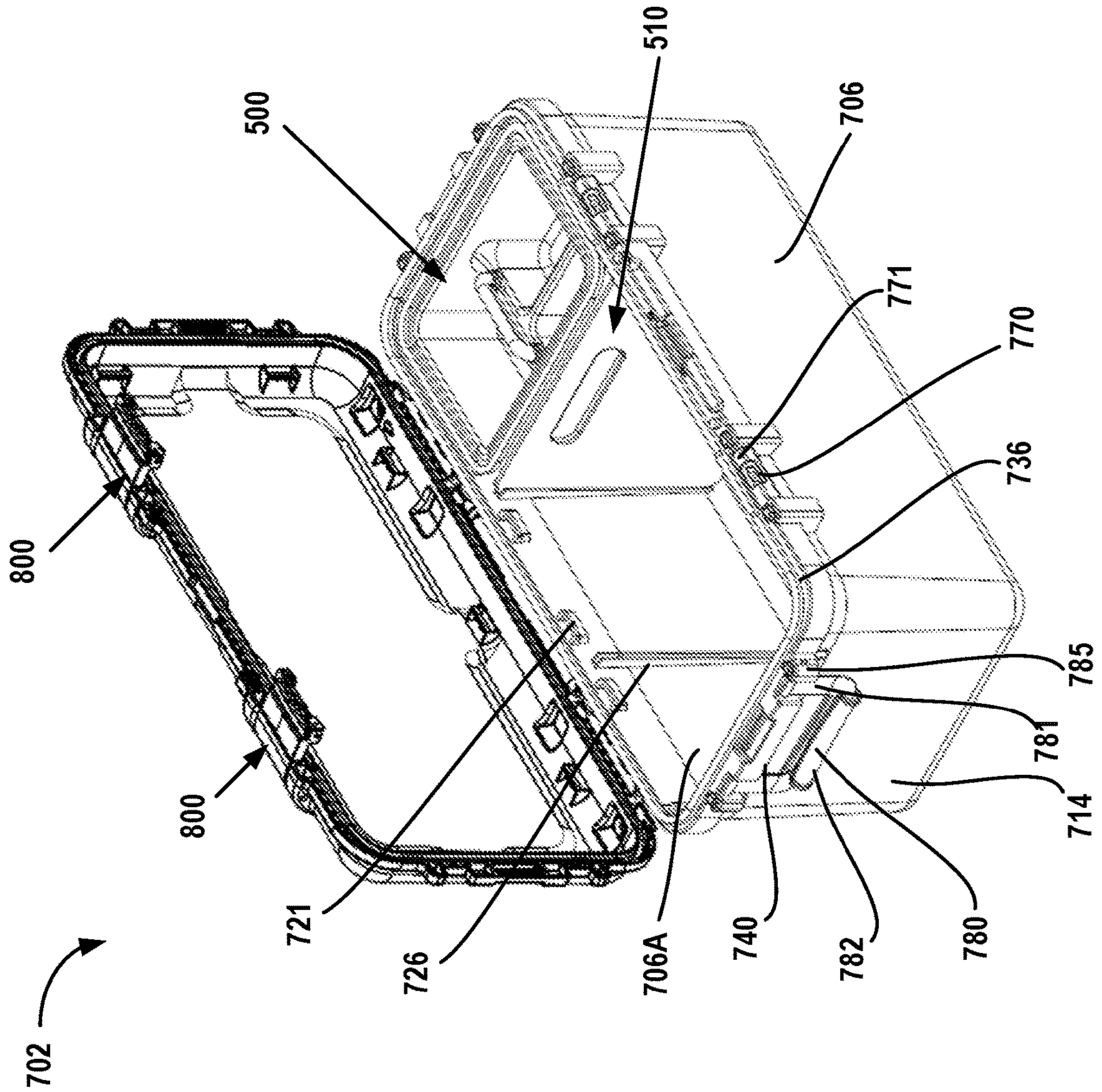
FIG. 39 illustrates a front, left perspective view of the container of FIG. 37 in an open position with various accessories installed according to one or more aspects described herein.

The carry handle 610 may be formed from a polymer wrap around the elongated member 608 forming a smooth surface along the bottom side 638 and also have a slot 640 extending an entire length of the handle 610 along the top side 642. The carry handle 610 may have a concave curvature on the bottom side 638 as shown in FIG. 33. The base member 602 may be formed from a woven fiber material or webbing. The woven fiber material or webbing may be a single unitary member that forms the base member 602 of the carry strap 600. In other example, the base member 602 may be formed by a plurality of webbing or fabric strips. The strap material may be formed from nylon, polypropylene, polyester, or other polymer based material. The woven fiber material or webbing may be solution dyed, piece dyed, greige, on undyed.

Additionally, the carry strap 600 as described above may mount similar to container 202 or may in an alternative example, the carry strap 600 may include a mechanical clip or similar mechanical structure to secure the carry strap 600 to any of containers described herein 2, 202, and 302.

Figure 40:
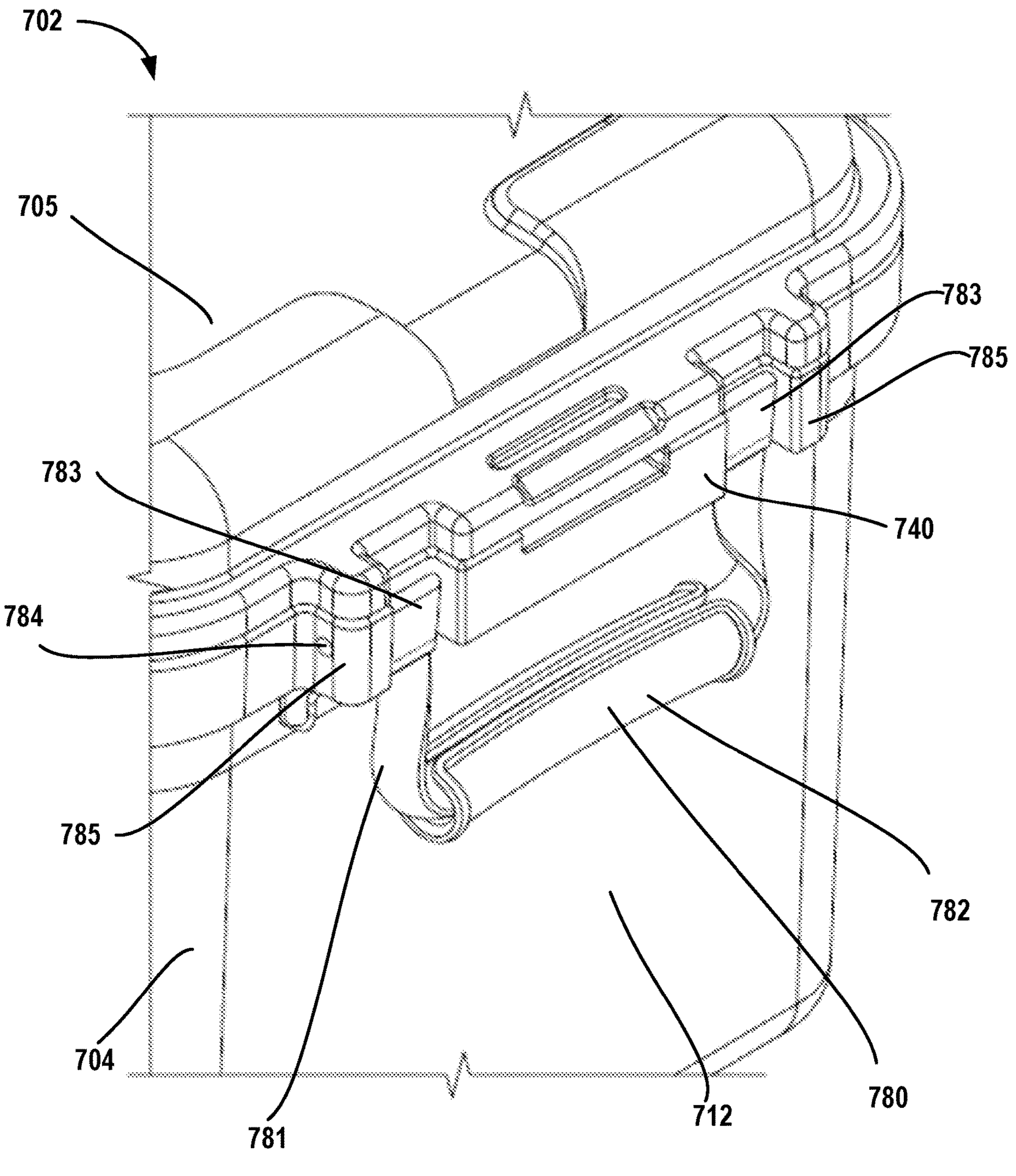
FIG. 40 illustrates an enlarged view of the container of FIG. 37 according to one or more aspects described herein.

FIGS. 37-44 depict another example container 702 having a latch assembly 800 discussed below, wherein like reference numerals refer to the same or similar elements in containers 2, 202, 302 but include 7XX series reference numerals. Container 702 is similar in many aspects to containers 2, 202, and 302, and therefore similar aspects of container 702 are not discussed again herein. Similar to other containers disclosed herein, lid 705 may be pivotally attached to base 704. Container 702, however, may include some differences from containers 2, 202, and 302. Container 702, for example, includes a strap handle 780 attached to each end of container 702 as shown in FIG. 40. Each strap handle 780 may attach to the handle 740 on each end of the container 702. In addition, container 702 may be larger than container 302 and may include a plurality of attachment points for locating and supporting various accessories that may be installed into container 702 similar to the accessories installed in container 302 shown in FIGS. 26A-26D.

Each strap handle 780 may provide a flexible interface to allow a user to lift and move container 702. Each strap handle 780 may include a strap portion 781 and a carry handle 782 where each end 783 of the strap portion 781 may have an overlap region that forms an opening to receive a pin 784. To secure the strap handle 780 to the container 702, pin 784 may extend through the opening in each end 783 of the strap portion 781 and be received in a clevis portion 785 arranged on either end of the handle 740. The strap portion 781 may be similar in material to the base member 602 and the carry handle 782 may be similar to carry handle 610 of the carry strap 600 described above.

Figure 41:
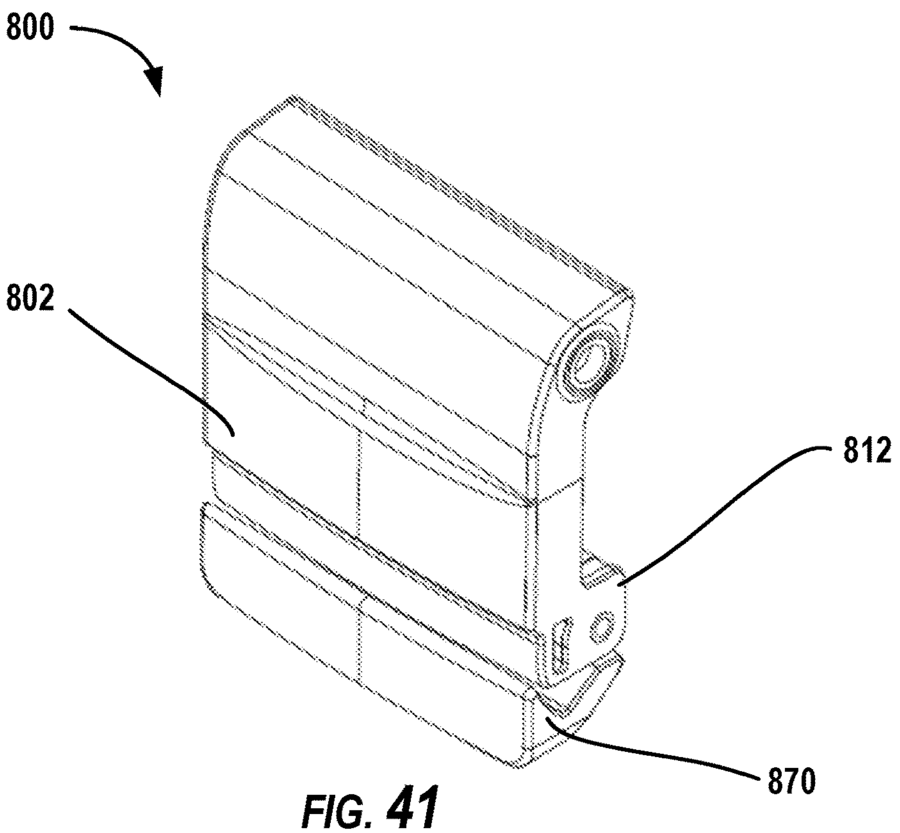
FIG. 41 illustrates a front perspective view of a latch assembly of the container of FIG. 37 according to one or more aspects described herein.
Figure 42:
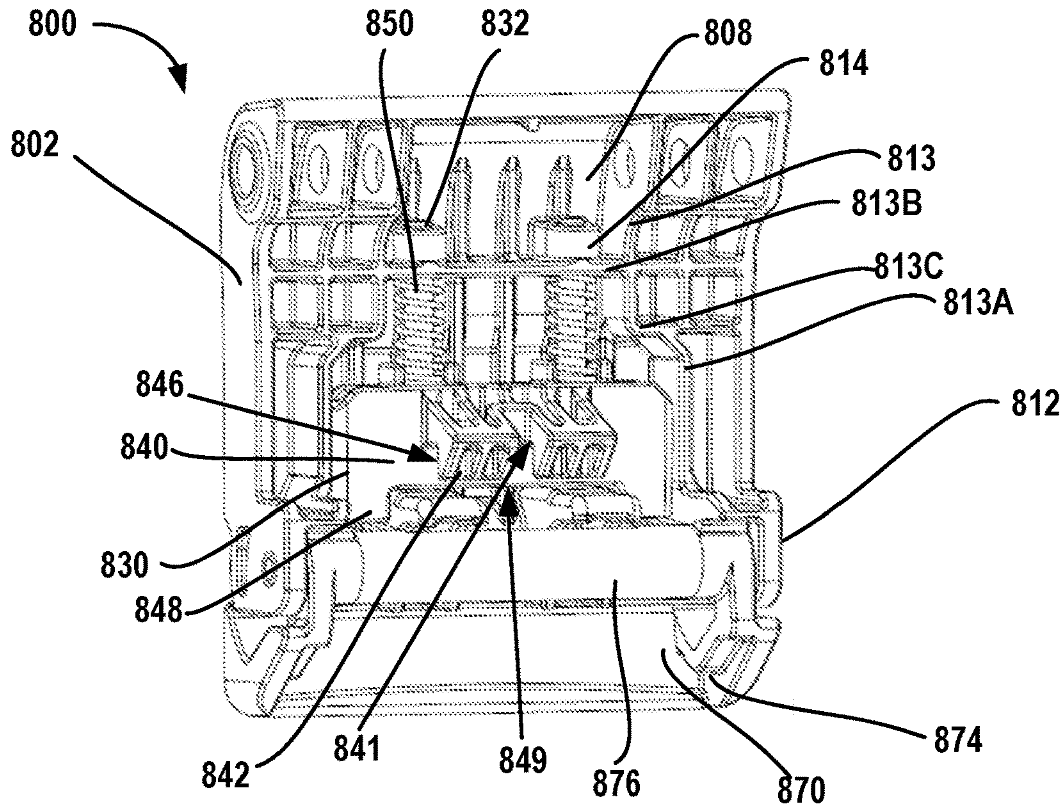
FIG. 42 illustrates a rear perspective view of the latch assembly of FIG. 41 according to one or more aspects described herein.

FIGS. 41-44 depict an example latch assembly 800 where like reference numerals refer to the same or similar elements to latch assemblies 100 and 400, but include 8xx series reference numerals. Latch assembly 800 is similar to latch assemblies 100 and 400, and therefore similar aspects of latch assembly 800 are not discussed again herein. Latch assembly 800, as shown in FIGS. 41 and 42, may include multiple components including a latch body 802, a locking member 830, a biasing member 850, and an activating member 870. Similar to latch assemblies 100 and 400 discussed above, the latch assembly 800 may include a locked position and an unlocked position. The locking member 830 may be slidably engaged with the latch body 802 such that the locking member 830 may move between an upward position or unlocked position and a downward position or unlocked position in a substantially linear path. The locking member 830 may be configured to lock the lid 705 in a closed configuration when the locking member 830 is in the downward position or locked position and unlock the lid 705 when the locking member 830 is in the upward position or unlocked position. Alternatively, the latch assembly 800 may be arranged in a manner that the slidably arranged locking member 830 may be configured such that the locking member 830 may move to an upward position that corresponds to a locked position and may move to a downward position that corresponds to an unlocked position.

The locking member 830 may include a base portion 840 and a plurality of hook portions 842 extending inward from the base portion 840. The plurality of hook portions 842 may be spaced apart from each other by a gap 841. Each hook portions 842 may each include a lower surface 844 and an inward facing surface 846. When the latch assembly 800 is in the locked position, the lower surface 844 of each hook portion 842 may engage the upper surface 772 of the latch keeper 770 and the inward facing surface 846 of each hook portion 842 may engage the inner surface of the latch keeper 770. Further, the rib 775 of the latch keeper 770 may fit within the gap 841 between each of the hook portions 842. Additionally, when the latch assembly 800 is in the locked position the upper surface of the engagement lugs 812 may engage the lower surface 776 of the latch keeper 770. Similar to base 304, base 704 may include a plurality of ramped or tapered surfaces 771 positioned on either side of the latch keeper 770. The ramped surfaces 771 may angle downward from the interface surface 736 of the base 704.

Figure 43:
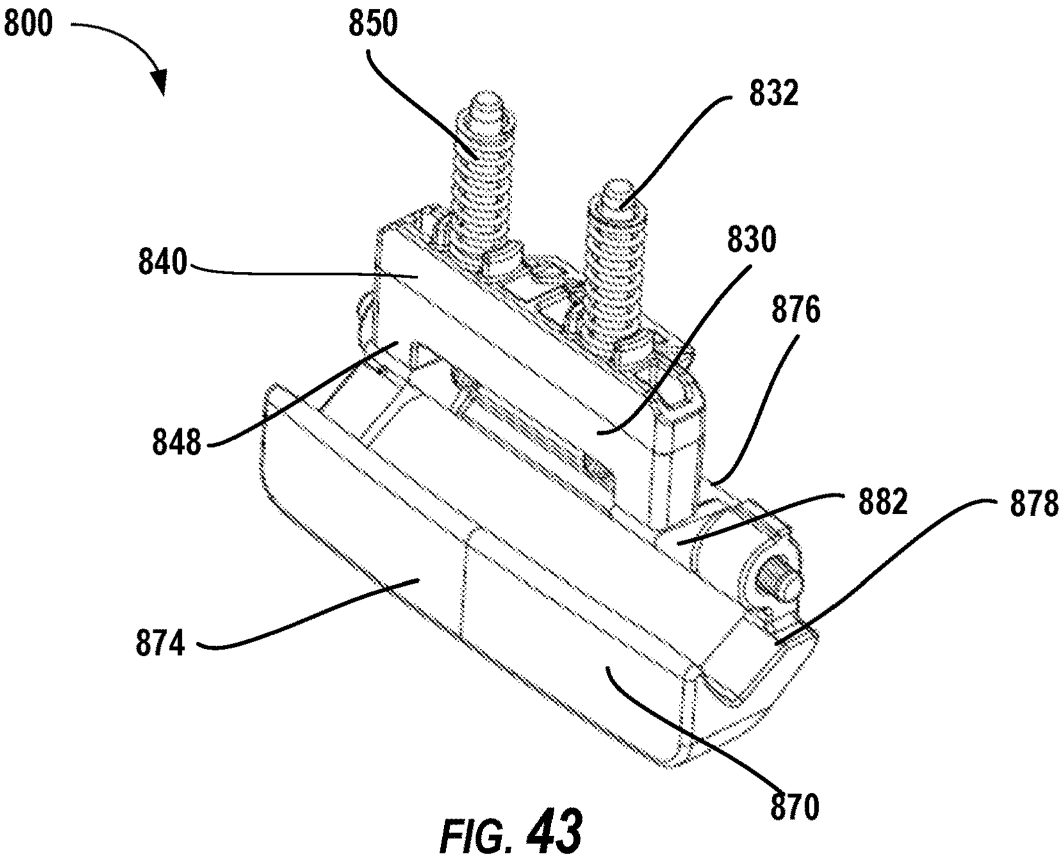
FIG. 43 illustrates a front perspective view of the latch assembly of FIG. 41 with some components removed according to one or more aspects described herein.
Figure 44:
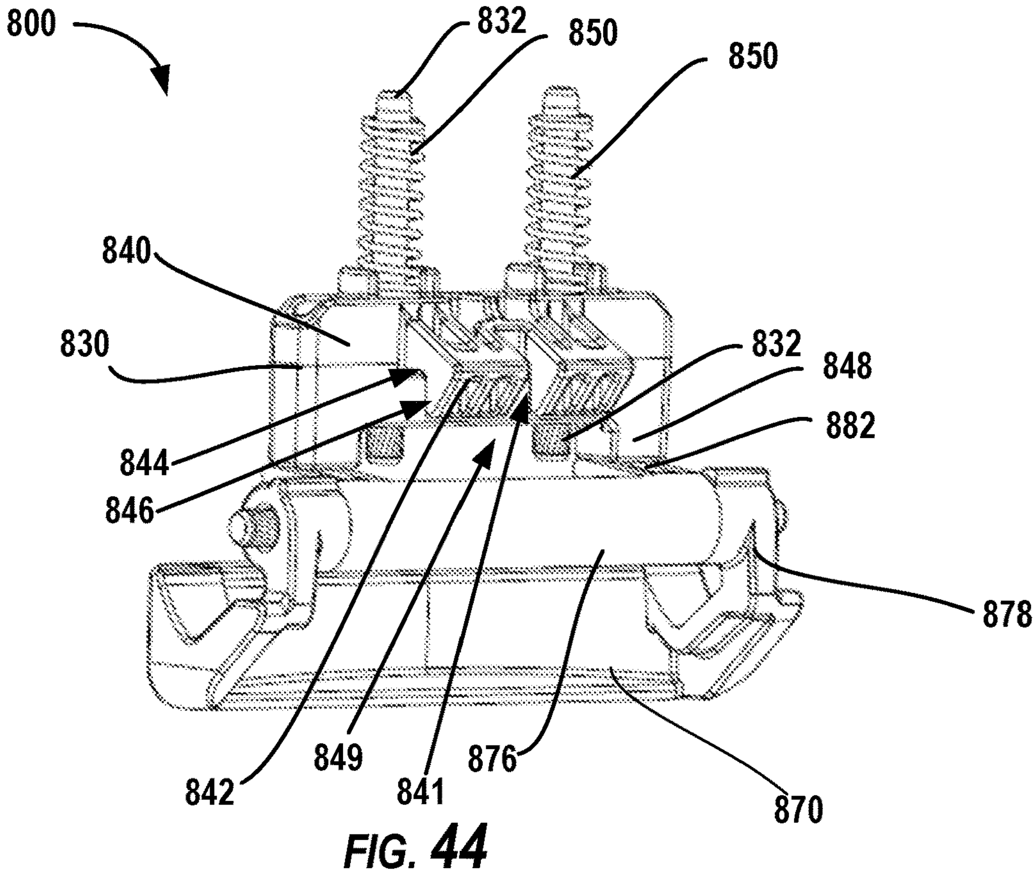
FIG. 44 illustrates a rear perspective view of the latch assembly of FIG. 41 with some components removed according to one or more aspects described herein.

As shown in FIG. 41, the latch body 802 may include a plurality of ribs 813 along the inner surface 808 and may include vertically oriented ribs 813A located adjacent the locking member 830. The ribs 813 may also include a horizontally oriented rib 813B that extends across a majority of the inner surface 808 or across the entire inner surface 808. In addition, rib 813C may be located below rib 813B and extend intermittently across the inner surface 808 to act as a vertical stop for locking member 830 when locking member 830 is moved upwards into an unlocked position. The ribs 813 may also help to strengthen the latch body 802 while reducing the overall weight of the latch assembly 800. Rib 813B may include a mount 814 that supports guide member 832, where guide member 832 may connect from the mount 814 to the base 840 of locking member 830. In some examples, the guide member 832 may extend through an opening in the base 840 of the locking member 830. A biasing member 850 may be arranged between the mount 814 of the latch body 802 and the base 840 of the locking member 830, and in some examples, a guide member 832 may cooperate with the biasing member 850 to allow for smooth movement of the locking member 830 relative to the latch body 802. As shown in the illustrated example of FIG. 41-44, the biasing member 850 may be a compression spring and a guide member 832 may have a cylindrical shape that extends through an opening of the biasing member 850. Similar to latch assemblies 100 and 400, biasing member 850 may be configured to bias the locking member 830 in a downward position or locked position. In alternative examples, the biasing member 850 may be any suitable device for biasing the locking member 830 in the downward position. As shown in FIGS. 42-44, each latch assembly 800 may include a pair of guide members 832 and a pair of biasing member 850.

Similar to the latch assemblies 100 and 400, the latch body 802 may also be pivotally engaged with an activating member 870. The activating member 870 may be engaged with the locking member 830 and be configured to move the locking member 830 from the downward or locked position to the upward or unlocked position. The activating member 870 may be pivotally engaged to the latch body 802 by a hinge 872 extending through the latch body 802 and the activating member 870. In some examples, the activating member 870 may be slidably engaged with the latch body 802. The activating member 870 may include a grip portion 874, an activating barrel 876, and one or more arms 878 connecting the grip portion 874. Activating barrel 876 may include a pair of raised portions 882, where each raised portion 882 may engage an engaging member 848 that extends from a bottom surface of the base 840 of the locking member 830. Each raised portion 882 may have a substantially triangular shape, or in other examples, may have a different geometric shape. Each engaging member 848 may be spaced apart from each other creating an opening 849 between the bottom surface of the base 840 and the activating barrel 876. In some examples, the distance between the engaging members 848 (distance across opening 849) may be within a range of 30 mm and 40 mm apart from each other. By spacing the engaging members 848 apart from one another, the latch 800 may be more robust and better able to stay closed during a high stress event such as a drop impact because the load path through the latch 800 may be improved. A portion of each guide member 832 may extend into opening 849 between the engaging members 848 of the locking member 830. As shown in FIGS. 43 and 44, the biasing members 850 and guide members 832 may be located laterally in between the pair of raised portions 882. This arrangement of raised portions 882 positioned outboard and spaced apart from each other may help to improve the durability of the latch assembly 800 to remain in the locked position when the latch assembly 800 is submitted to different environmental stresses such as large shock loads, such as being dropped on a corner of the container 702. Similar to the latch assemblies 100 and 400, as the activating barrel 876 rotates, the raised portions 882 contact and engage the engaging members 848 of the locking member 830, which raises the locking member 830. As the locking member 830 moves upward, the hook portions 842 disengage from the latch keeper 770 causing the latch assembly 800 to move from the locked position to the unlocked position.

FIGS. 45-56 illustrate another exemplary container 902 that may be similar in many aspects to containers 2, 202, 302, 702, but described with like reference numerals refer to the same or similar elements in containers 2, 202, 302, 702 but include 9XX series reference numerals. Since container 902 is similar in many aspects to containers 2, 202, 302, 702, and therefore similar aspects of container 902 are not discussed again herein. For examples, container 902 may include strap handle 980 on each end of the container similar to the strap handle 780. Container 902 may also include a plurality of latch assemblies 800, where the plurality of latch assemblies 800 may be located on adjacent sides of the container 902. For example, container 902 includes three latch assemblies 800 on a front side 908 and a single latch assembly 800 on each side 912, 914 adjacent the front side 908. The front side 908 may be longer than the right and left sides 912, 914. Container 902, however, may include some differences from containers 2, 202, 302, 702. In particular, container 902 may be larger than containers 2, 202, 302, 702 in both length, width, and volume. Optionally, in some examples, containers 2, 202, 302, 702, 902 may have a lid that is removably connected to the base, where the latches may be arranged along each side of the body and the lid, such that the lid may be removed by unlatching the latches on all of the latches, such as that latches are arranged on the front side 908, a rear side 910 opposite the front side 908, right side 912 and left side 914 opposite the right side 912.

Figure 45:
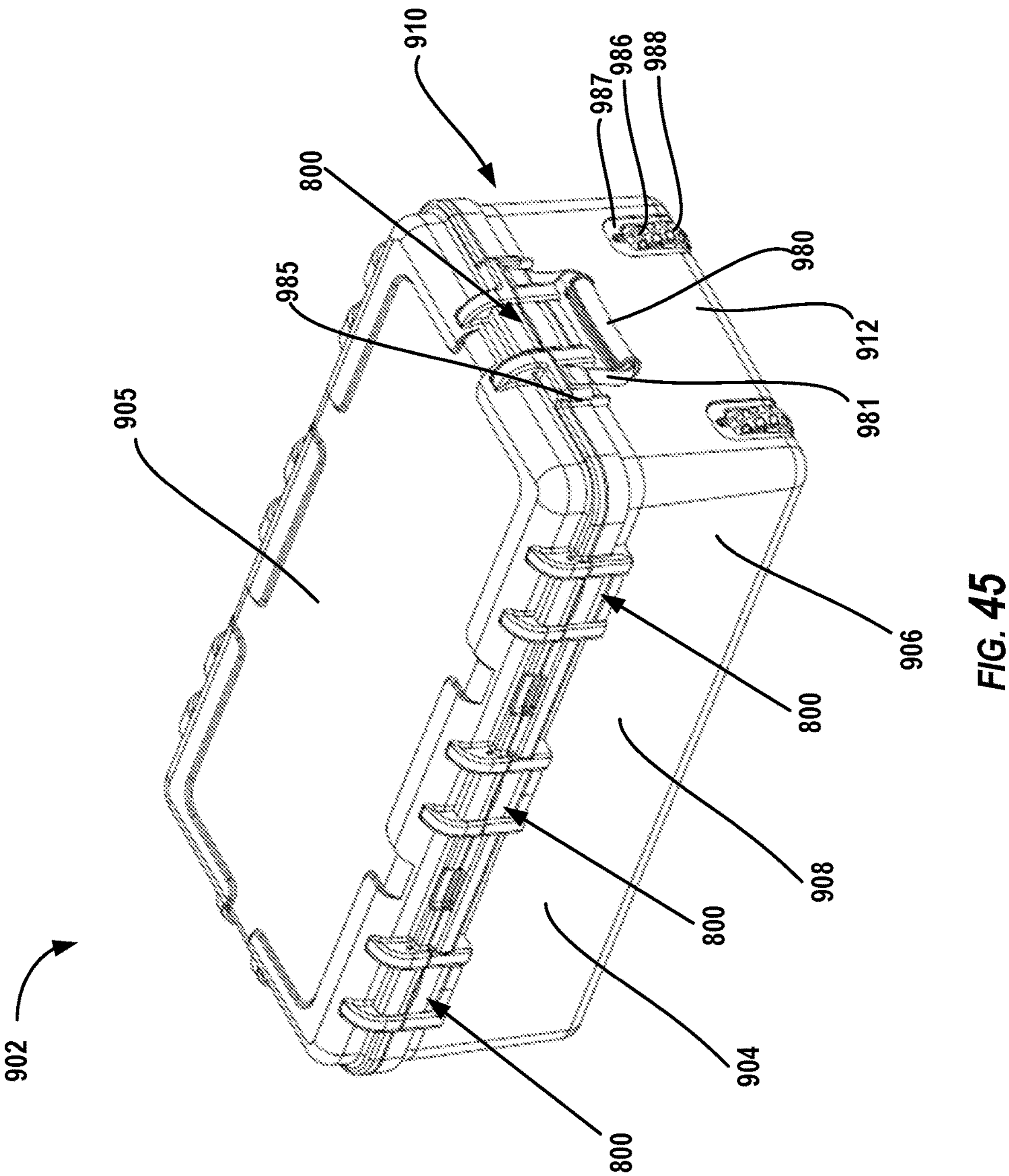
FIG. 45 illustrates a front, right perspective view of another exemplary container in a closed position according to one or more aspects described herein.
Figure 46:
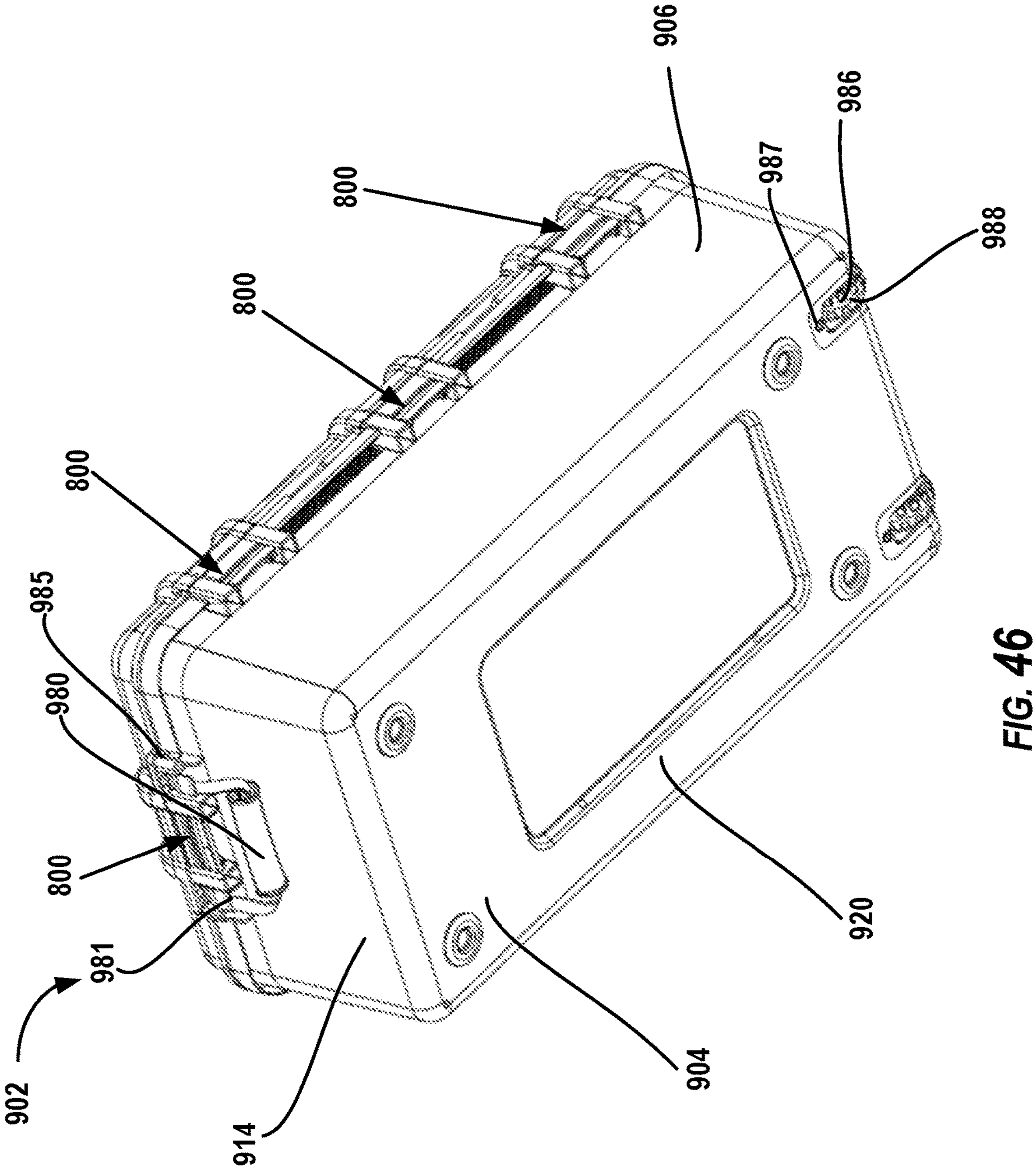
FIG. 46 illustrates a front, left bottom perspective view of the container of FIG. 45 in a closed position according to one or more aspects described herein.
Figure 47:
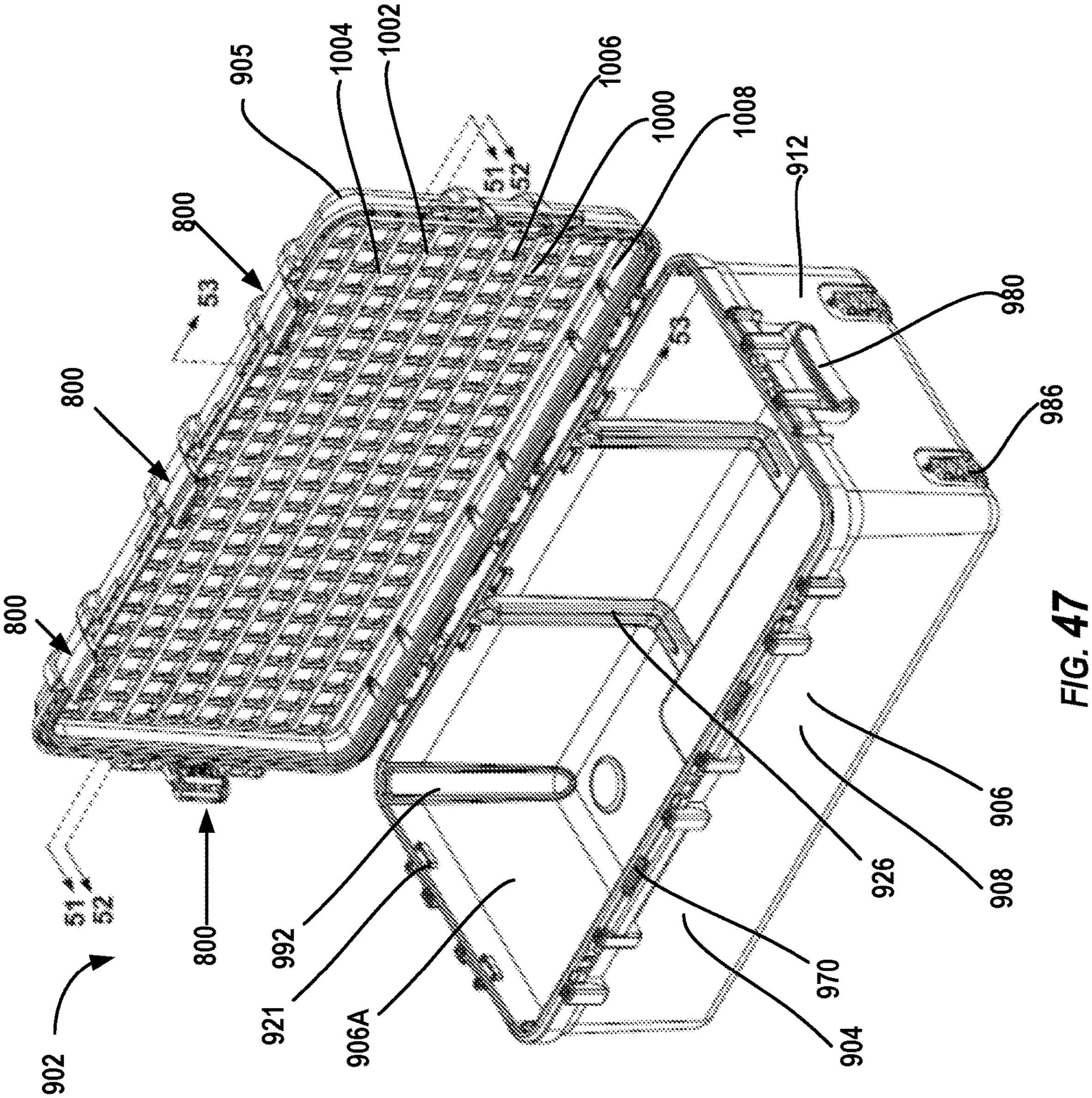
FIG. 47 illustrates a front, right perspective view of the container of FIG. 45 in an open position according to one or more aspects described herein.

Because of its larger size, container 902 may include a pair of wheel assemblies 986 to assist a user in easily moving it as shown in FIGS. 45 and 46. The wheel assemblies 986 may be attached to the bottom portion 920 of the base portion 904 or may be attached to both the bottom portion 920 and the right side 912 of the base portion 904. The wheel assemblies 986 may include a wheel housing 987 and a wheel 988, where the each wheel 988 may be mounted to the wheel housing 987 prior to the wheel housing 987 being mounted to the base portion 904. Each wheel assembly 986 may be secured into a wheel recess 989 on the base portion 904. Each wheel assembly 986 may be secured within the recess using at least one mechanical fastener.

Figure 48:
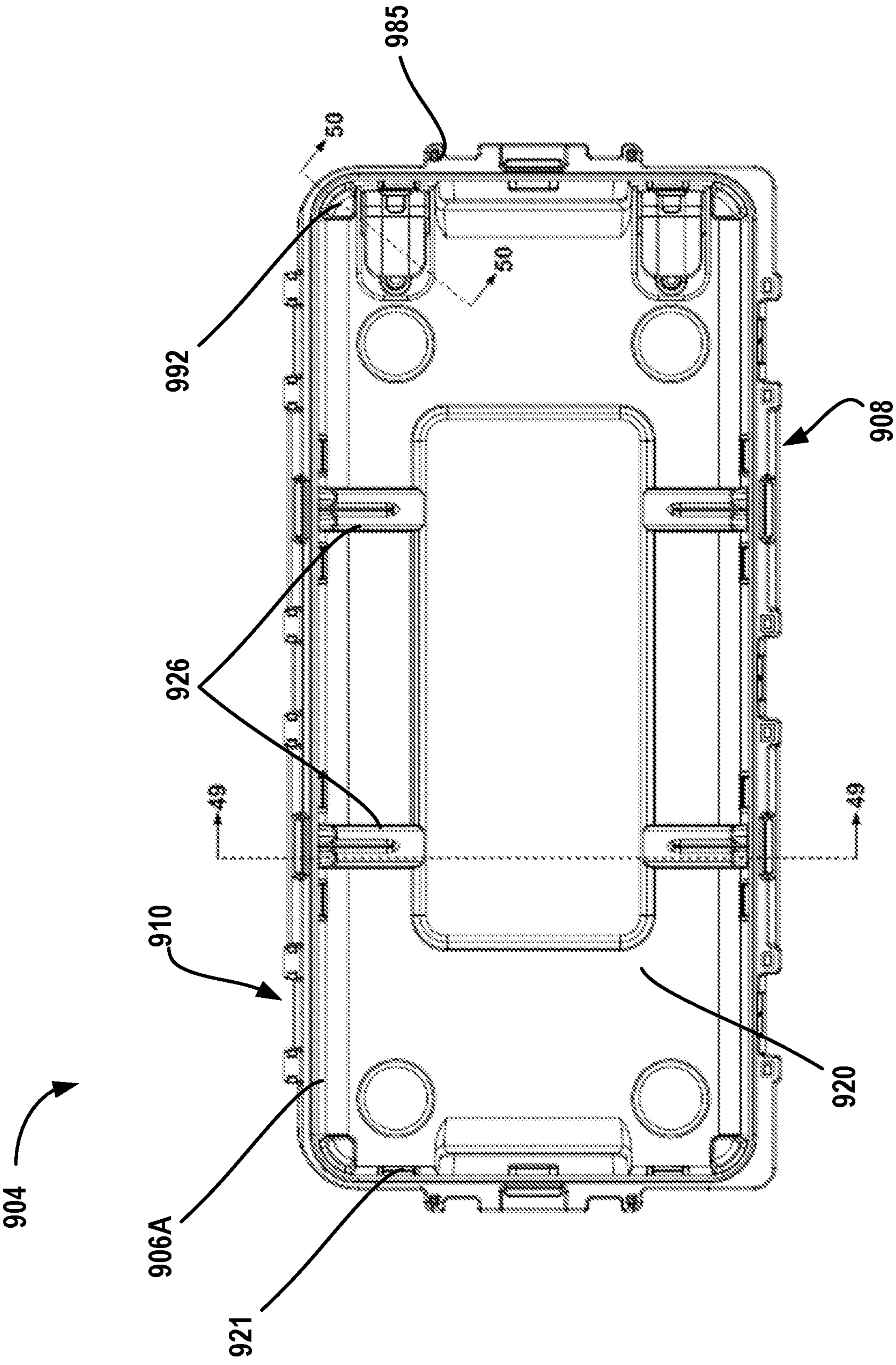
FIG. 48 illustrates a top view of the base of the container of FIG. 45 according to one or more aspects described herein.
Figure 49:
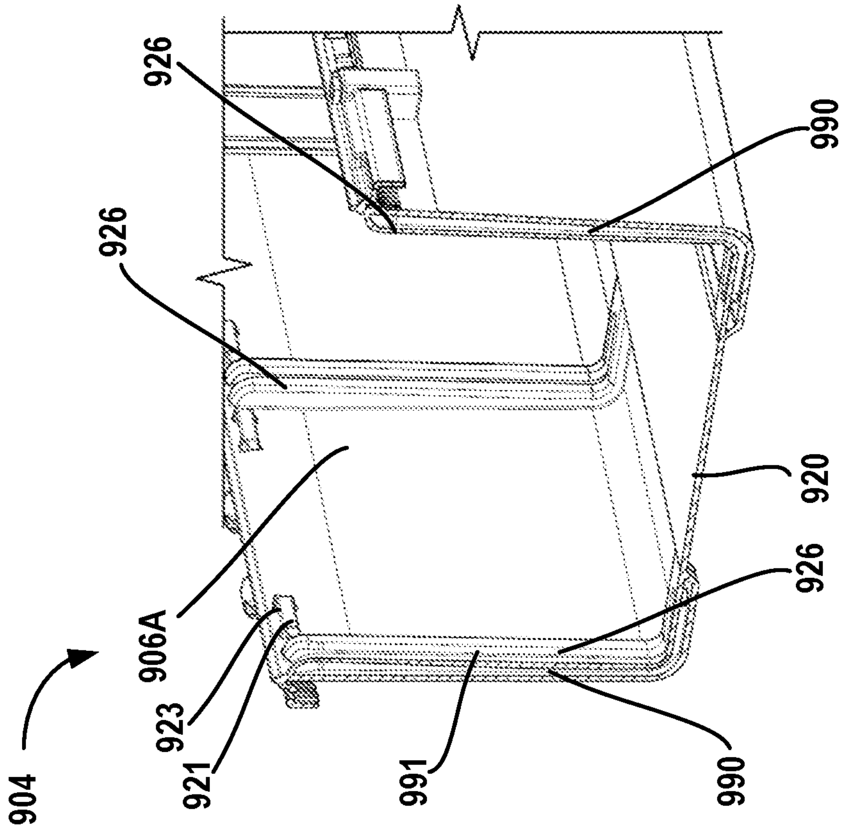
FIG. 49 illustrates a perspective cross-sectional view of the base along line 49-49 in FIG. 48 according to one or more aspects described herein.
Figure 52:
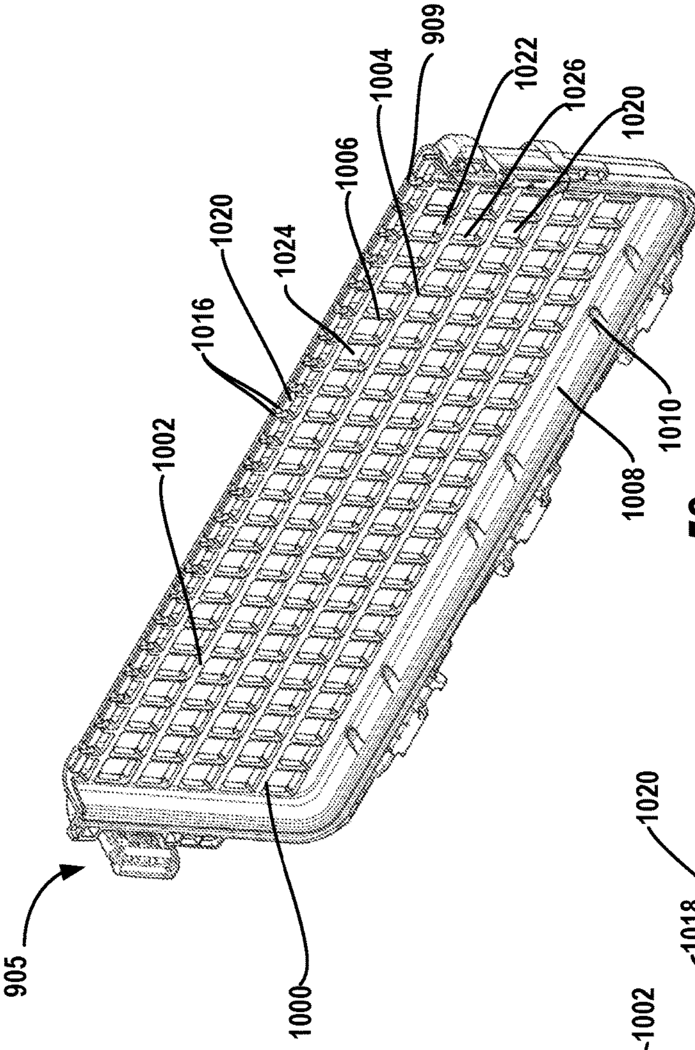
FIG. 52 illustrates a perspective cross-sectional view of the container of FIG. 47 along line 52-52 according to one or more aspects described herein.
Figure 51:
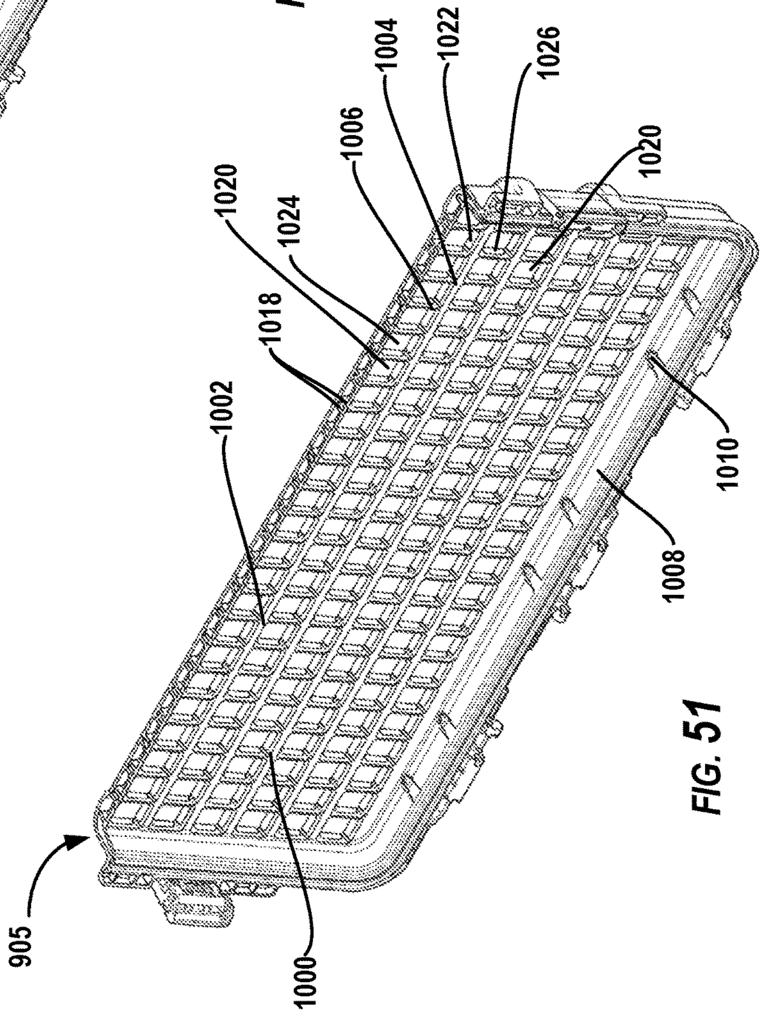
FIG. 51 illustrates a partial perspective cross-sectional view of the container of FIG. 47 along line 51-51 according to one or more aspects described herein.
Figure 53:
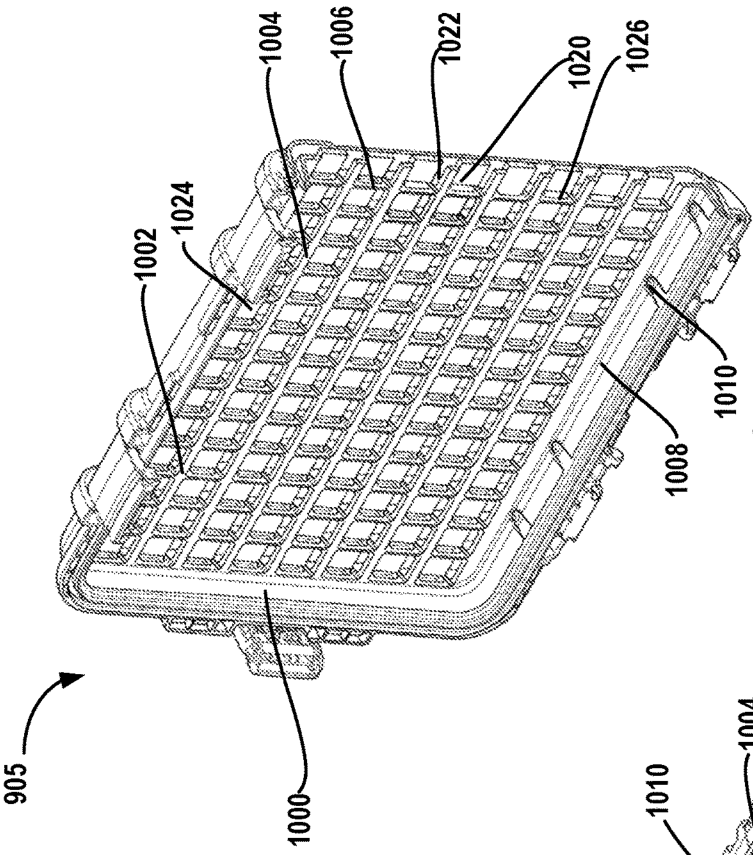
FIG. 53 illustrates a perspective cross-sectional view of the container of FIG. 47 along line 52-52 in FIG. 47 according to one or more aspects described herein.
Figure 54A:
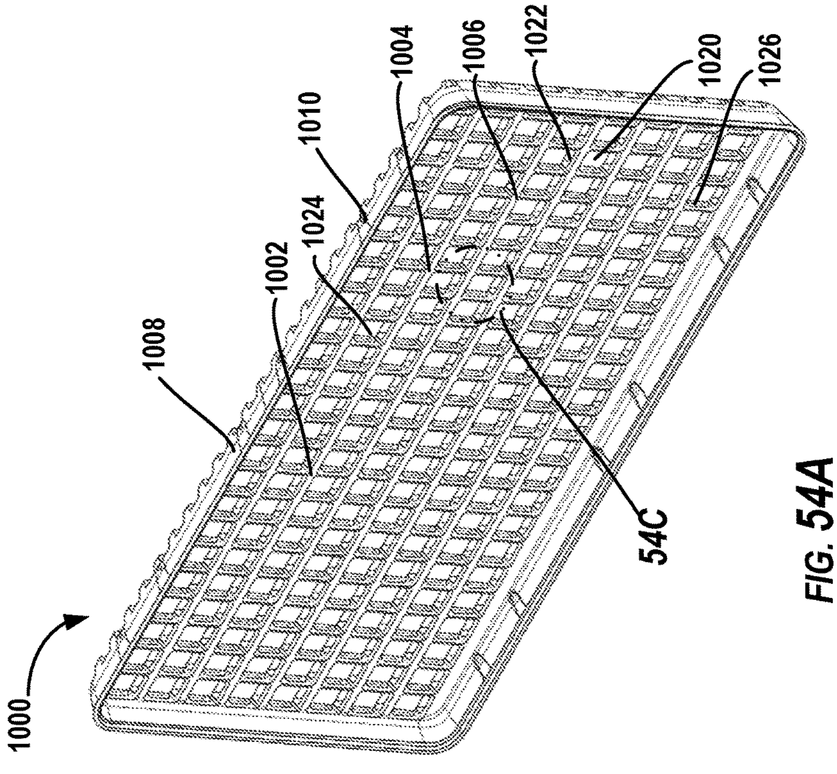
FIG. 54A illustrates a front perspective view of the lid support plate of the container of FIG. 47 according to one or more aspects described herein.
Figure 54C:
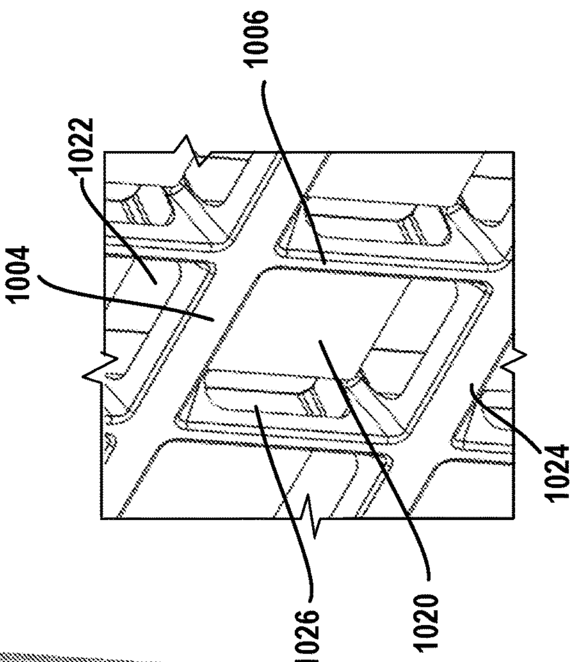
FIG. 54C illustrates an enlarged view of the lid support plate of FIG. 54A according to one or more aspects described herein.
Figure 54B:
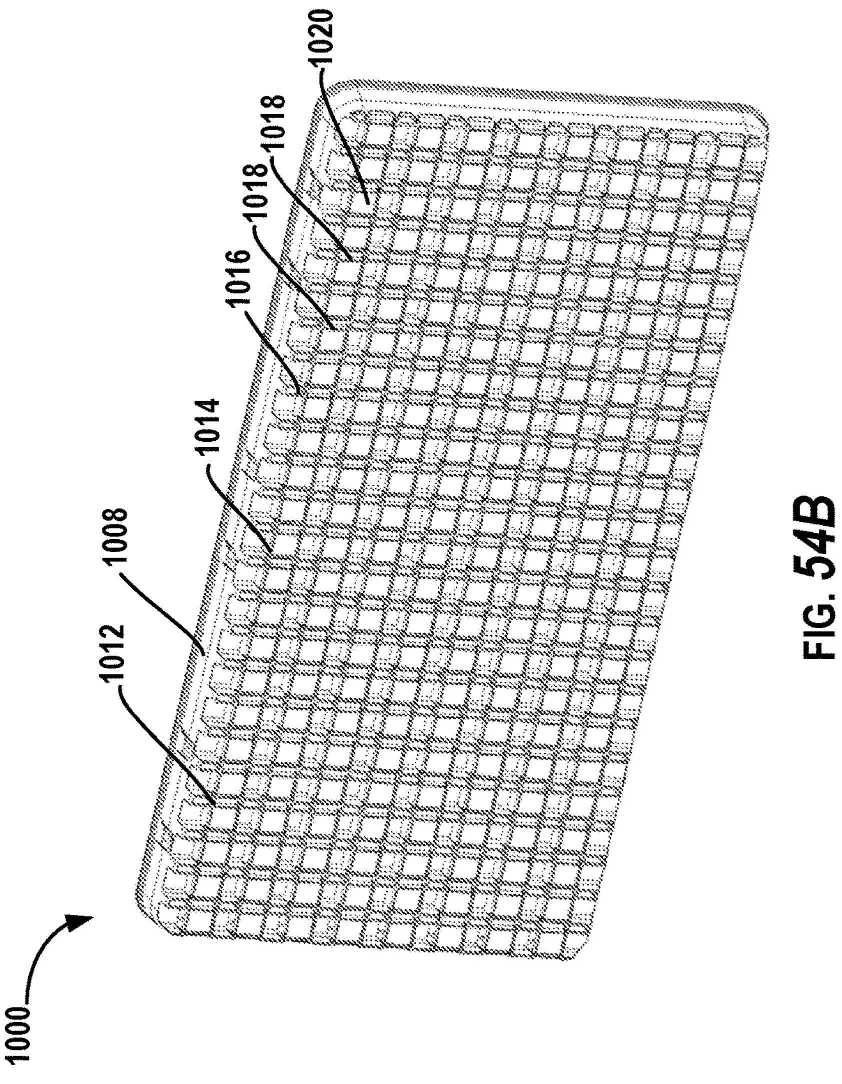
FIG. 54B illustrates a rear perspective view of the lid support plate of FIG. 54A according to one or more aspects described herein.

The base portion 904 of container 902 may include a pair of tracks 926 positioned along at least two of the interior surfaces 906A of the sidewall structure 906. As shown in the FIGS. 47-49, the interior surfaces 906A may include two pairs of tracks 926 arranged and aligned opposite each other on each of the interior surfaces of front and rear sides 908, 910. Each pair of tracks 926 may be spaced apart from each other, where each pair of tracks may receive a removable divider wall 525 shown in FIG. 57. The removable divider wall 525 for container 902 may be similar to divider wall 510, but larger to fit container 902. Each track 926 may also extend from the interior surfaces 906A of the sidewall structure 906 onto the interior surface of the bottom portion 920. In addition, as shown in FIG. 49, each track 926 may include a hollow cavity 990 between an outward facing surface 991 of each track 926 and the outward facing surface of the sidewall structure 906 and/or the outward facing surface of the bottom portion 920 of container 902. The hollow cavity 990 may be formed by a gas assist molding process when the base portion 904 is molded. The hollow cavity 990 may allow each track 926 to have a substantially constant wall thickness. In some examples, the hollow cavity 990 may have a length that is greater than a height, where the length is measured along the longest dimension of the container 902 and a height is measured in a top to bottom direction. The length of the hollow cavity 990 may be approximately 3 times greater than a wall thickness of each track 926 or within a range of 2 times and 4 times greater than the wall thickness of each track 926. The height of the hollow cavity 990 may be within 1.5 times and 2.5 times greater than the wall thickness of each track 926. As discussed above, the tracks 926 may receive a removable divider, but may also act as ribs to structurally reinforce the sidewall structure 906 of container 902.

Figure 50:
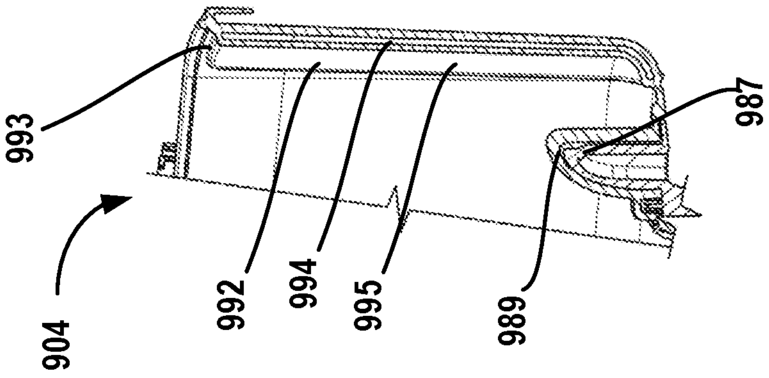
FIG. 50 illustrates a perspective cross-sectional view of the base along line 50-50 in FIG. 48 according to one or more aspects described herein.

Base 904 may also include a plurality of tabs 921 similar to tabs 321 discussed above positioned along the interior surfaces 906A of the sidewall structure 906. For example, as shown in FIG. 48, the tabs may be positioned along each interior surface 906A of sidewall structure 906. Pairs of tabs 921 may be located opposite one another in order to support a variety of accessories. As shown in the exemplary embodiment of FIG. 48, the interior surfaces 906A may include twelve tabs 921, however, the number of tabs 921 may be more or less than twelve. In addition, the base 904 may include a corner support 992 in each corner of the interior surfaces 906A. Each corner support 992 may protrude inward from the interior surfaces 906A toward the interior void of the container 902. The corner supports 992 may have an upper surface 993 that is substantially coplanar to an upper support surface 923 of each tab 921. These corner supports 992 may help support an accessory like tray 560 or other accessories as desired. As shown in FIG. 50, each corner support 992 may include a hollow cavity 994 between an outward facing surface 995 of the corner support 992 and the outward facing surfaces of the sidewall structure 906 and bottom portion 920. The hollow cavity 994 may be formed by a gas assist molding process when the base portion 904 is molded similar to hollow cavity 990. The hollow cavity 990 may allow each corner support 992 to have a substantially constant wall thickness. In addition, each corner support 992 may extend along a majority of the height of the base 904 and extend from the sidewall structure 906 onto the interior surface of the bottom portion 920. The corner supports 992 may also help to strengthen and stiffen the base 904.

In some examples, the tracks 926 and corner supports 992 may be formed with the sidewall structure 906 as a unitary member. Alternatively, the tracks 926 and corner supports 992 may be formed separately and permanently attached using a polymer welding technique, such as Emabond®, or attached using an adhesive or other permanent joining technique.

Figure 55:
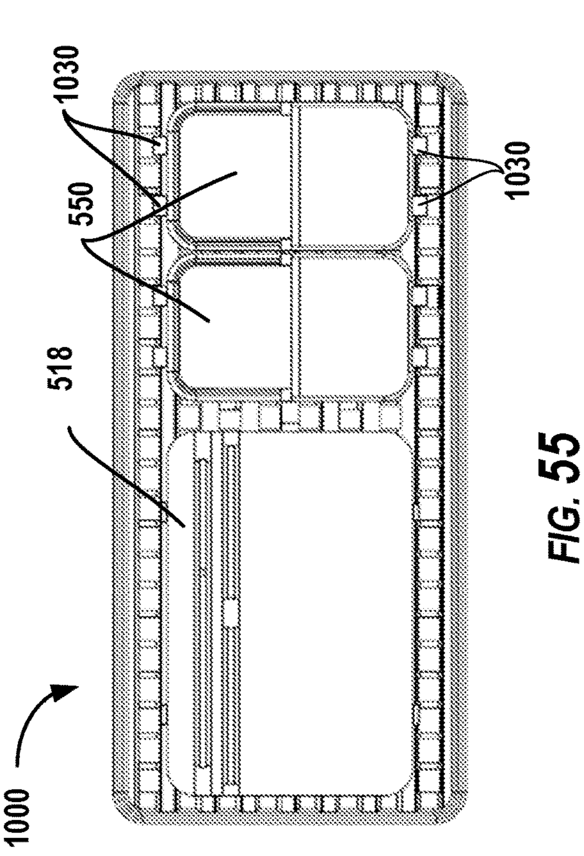
FIG. 55 illustrates a front view of the lid support plate with various accessories attached according to one or more aspects described herein.
Figure 56:
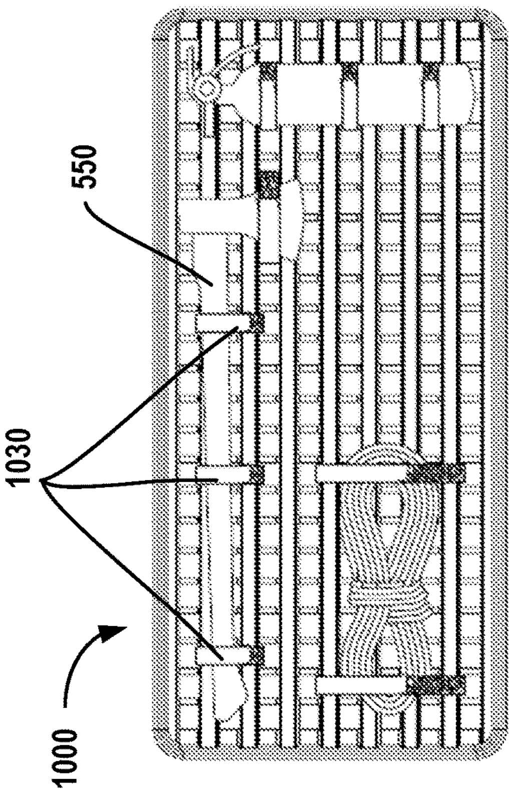
FIG. 56 illustrates a front view of the lid support plate with various accessories attached according to one or more aspects described herein.

Similar to the other containers disclosed herein, lid 905 may be pivotally attached to base 904. In some examples, lid 905 may also have a lid support member 1000. The lid support member 1000 may releasably or permanently attach to the interior surface 909 of the lid 905. Portions of the lid support member 1000 may contact an interior surface 909 of the lid 905 to provide additional flexural strength to lid 905 during loading, such as when heavy items are placed on top of the lid 905. In addition, the lid support member 1000 may act as a molle board to allow various accessories 550 or other items to be releasably connected to the lid support member 1000 to allow a user easy access to these items. The various accessories 550 may be secured to the lid support member 1000 using straps 1030 that extend through openings in the lid support member 1000. As shown in FIGS. 55-56, a variety of storage bags or other items may releasably attached to the lid support member 1000 using straps 1030.

As shown in FIGS. 51-56, the lid support member 1000 may include a primary wall 1001 with a front surface 1002 formed by a plurality of front lateral ribs 1004 and a plurality front longitudinal ribs 1006, where a majority of the front lateral ribs 1004 and front longitudinal ribs intersect each other in a generally perpendicular orientation forming a grid-like structure. The front surface 1002 may be substantially planar and have a grid-like shape where the frontal lateral ribs 1004 form wider portions on the front surface 1002 than the frontal longitudinal ribs 1006. The primary wall 1001 may connect to a perimeter wall 1008 where the perimeter wall 1008 may include apertures 1010 to receive mechanical fasteners to attach the lid support member 1000 to lid 905. The primary wall may also include a rear surface 1012 located opposite the front surface 1002, where the rear surface 1012 may be formed by a plurality of rear lateral ribs 1014 and a plurality of rear longitudinal ribs 1016. The rear surface 1012 may have a grid-like shape and may also be substantially planar and substantially parallel to the front surface 1002. In addition, the rear longitudinal ribs 1016 may be arranged in pairs 1018 that are spaced apart from each other with a larger space between the neighboring pair 1018 of rear longitudinal ribs 1016. A portion of the rear surface 1012 may contact the interior surface 909 of the lid 905 to help provide additional support to the lid 905 when needed. Alternatively, the lid support member 1000 may have a plurality of contact members that extend from the rear surface 1012 and contact the interior surface 909 of the lid 905 to help provide additional support to the lid 905 when needed. These contact members may be rear ribs and/or bosses that are releasably or permanently connected to the lid 905 using mechanical fasteners extending through the primary wall 1001. The mechanical fasteners may be equally spaced apart from each other, or may be arranged in an asymmetric pattern. A plurality of connecting members 1020 may be positioned between the front surface 1002 and the rear surface 1012. Each connecting member 1020 may connect to and extend between neighboring rear lateral ribs 1014 and neighboring pairs 1018 of rear longitudinal ribs 1016. Each connecting member 1020 may also connect to and extend between neighboring front lateral ribs 1004 and neighboring front longitudinal ribs 1006. Each of the front ribs 1004, 1006 may include a tapered region that extends from the front surface 1002 to the adjacent connecting member 1020. In the illustrated examples, the front and rear lateral ribs 1004, 1014 are oriented in a generally horizontal direction, while the front and rear longitudinal ribs 1006, 1016 are oriented in a generally vertical direction relative to the perimeter wall 1008. However, it is contemplated that the lateral ribs 1004, 1014 and the longitudinal ribs 1006, 1016 may be oriented at various angles relative to the edges of the perimeter wall 1008. Further, the lateral ribs 1004,

1014 may be oriented at various angles to their corresponding longitudinal ribs 1006, 1016, where in some examples, the front ribs 1004, 1006 may be oriented at a different angle to each other than the rear ribs 1014, 1016 are oriented to each other.

In addition, a majority of the front lateral ribs 1004 may have a lateral rib opening 1022 that extends through the rib 1004. The lateral rib opening 1022 may be located between the front surface 1002 and an outward facing surface 1024 of each connecting member 1020. In some examples, each of the front lateral ribs 1004 may have a lateral rib opening 1022. Each lateral rib opening 1022 may be elongated in shape and create a pathway to route a strap 1030 through the rib opening 1022 to secure an item to the lid support member 1000. Similarly, a majority of the front longitudinal ribs 1006 may have a longitudinal rib opening 1026 that extends through the rib 1006. The longitudinal rib opening 1026 may be located between the front surface 1002 and an outward facing surface 1024 of each connecting member 1020. In some examples, each of the front longitudinal ribs 1006 may have a longitudinal rib opening 1026. Each longitudinal rib opening 1026 may be elongated in shape and create a pathway to route a strap 1030 through the longitudinal rib opening 1026 to secure an accessory 550 to the lid support member 1000. The plurality of lateral and longitudinal rib openings 1022, 1026 create multiple pathways to receive a strap 1030 in either a longitudinal or a lateral direction to secure an accessory 550 to the lid support member 1000. To secure an accessory 550 to the lid support member 1000, a strap 1030 may be inserted into one of either the lateral or longitudinal rib openings 1022, 1026 and then the strap 1030 may be wrapped around a portion of the accessory desired to be attached and then secured to itself with a hook and loop type connector or other type of connection. Alternatively, the accessory 550 may have an integral or removable strap 1030 that may be routed through one of the rib openings 1022, 1026 to secure the accessory 550 to the lid support member 1000.

Figure 57:
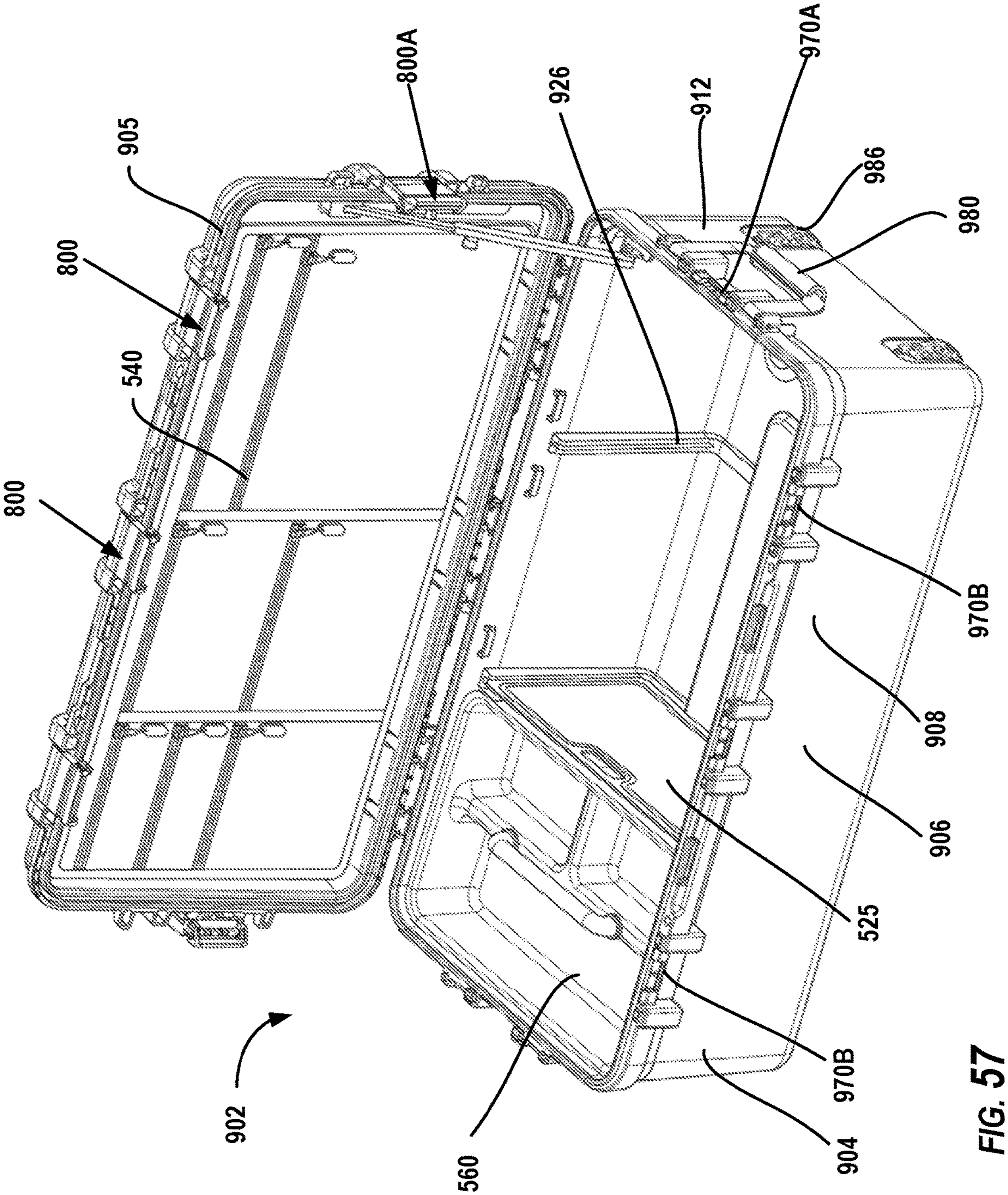
FIG. 57 illustrates a front, right perspective view of another exemplary container in an open position according to one or more aspects described herein.
Figure 58:
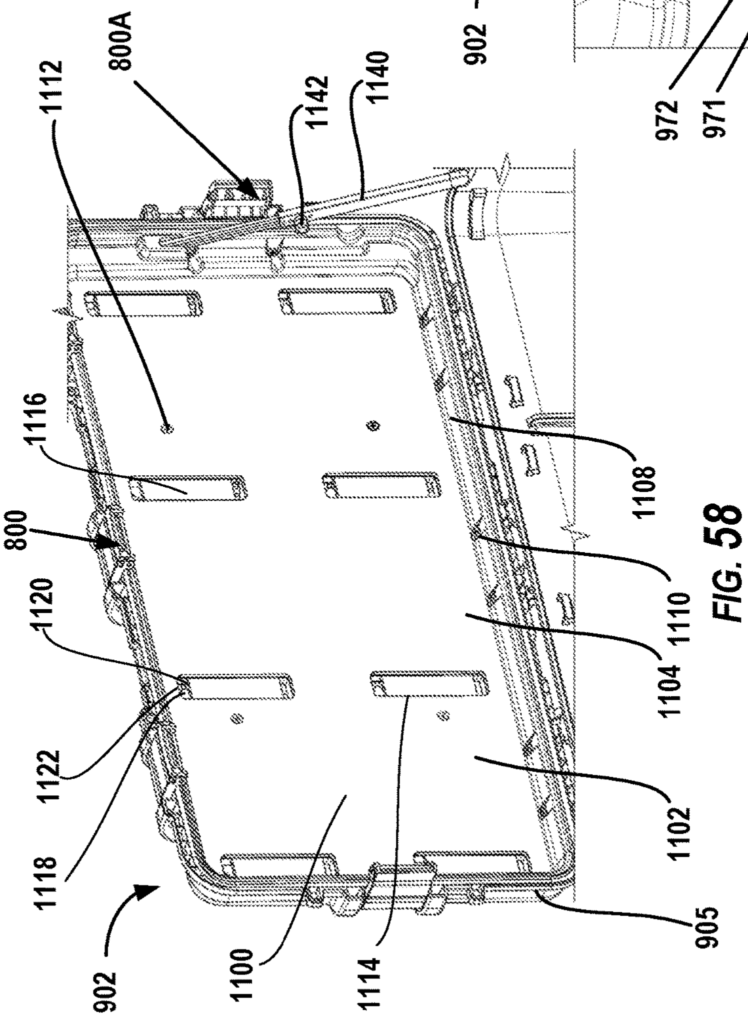
FIG. 58 illustrates a partial front, right perspective view of the exemplary container of FIG. 57 according to one or more aspects described herein.
Figure 59:
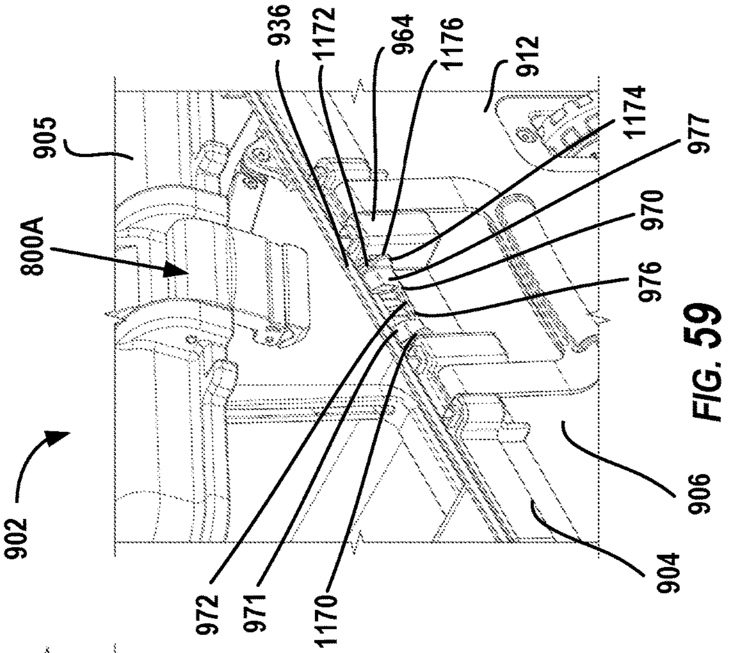
FIG. 59 illustrates a partial front, right perspective view of the exemplary container of FIG. 57 with some components removed according to one or more aspects described herein.

FIG. 57-59 illustrate another version of exemplary container 902 except with lid support member 1100 instead of lid support member 1000. In addition, container 902 of FIGS. 57-59 may include a lid stay rod assembly 1140 and kick out ribs 1170 described below. Similar to the other containers disclosed herein, lid 905 may be pivotally attached to base 904 with a hinge. In some examples, lid 905 may also have a lid support member 1100. The lid support member 1100 may releasably or permanently attach to the interior surface 909 of the lid 905. The lid support member 1100 may include a primary wall 1102 with a front surface 1104 and a rear surface opposite the front surface 1104. The primary wall 1102 may connect to a perimeter wall 1108, where the perimeter wall 1108 may include apertures 1110 to receive mechanical fasteners 1112 to attach the lid support member 1100 to lid 905. The primary wall 1102 may contact the interior surface 909 of the lid 905 in a plurality of locations. For example, the primary wall 1102 may include rear ribs or bosses that extend from the rear surface to contact the interior surface 909 of the lid 905 and help support the lid 905. These rear ribs and/or bosses may be releasably or permanently connected to the lid 905 using mechanical fasteners 1112 extending through the primary wall 1102. The mechanical fasteners 1112 may be equally spaced apart from each other as shown in FIG. 58, or may be arranged in an asymmetric pattern. The lid support member 1100 may provide additional flexural strength to lid 905 during loading, such as when heavy items are placed on top of the lid 905.

A plurality of openings 1114 extending through the primary wall 1102 that are configured to receive a strap or other member used to secure an item, such as a storage bag 540, to the lid support member 1100. The openings 1114 may have an elongated shape. In some examples, the openings 1114 may have a rectangular shape with a length that may be two times or three times the width. In addition, an opening support rib 1116 may extend across each opening 1114. The opening support rib 1116 may extend behind each opening 1114 and may be spaced a predetermined distance from the rear surface 1106 creating a gap 1118 between an edge 1120 of the opening support rib 1116 and an end 1122 of the opening 1114 to route a strap from an item attached to the lid support member 1100. The gaps 1118 may be arranged near both ends 1122 of the openings 1114. In addition, the lid support member 1100 may act to allow various accessories 550 shown in FIGS. 55-56 or other items such as storage bag 540 shown in FIG. 57.

As another option, container 902 may have a lid stay rod assembly 1140 that extends between base 904 and lid 905 to prevent the lid 905 from accidentally closing when the lid 905 is in a fully open configuration (i.e. lid 905 is oriented approximately perpendicular to the base 904). The lid stay rod assembly 1140 may be a telescoping assembly that automatically locks into a rigid structure when the lid 905 is opened to the fully open configuration. The lid stay rod assembly 1140 may require a user to activate a release mechanism 1142 to allow the lid 905 to close. The lid stay rod assembly 1140 may be pivotally attached to both the lid 905 and the base 904 to allow the rod assembly 1140 to fold into a storage configuration when the lid 905 is in the closed configuration. The lid stay rod assembly 1140 may be arranged near the right side 912 of the sidewall structure 906. Alternatively, the lid stay rod assembly 1140 may be arranged on left side 914 of the sidewall structure 906. While shown in container 902, a similarly arranged lid stay rod assembly 1140 may be included in any of the containers described herein.

As discussed above, container 902 may include a plurality of latch assemblies 800 that are positioned on the lid 905 to engage latch keepers 970 positioned on the front side 908 of the sidewall structure 906 and on the sides 912, 914 of the sidewall structure 906. When the lid 905 is pivotally connected to the base 904 with a hinge, the lid 905 may open with an arc-like movement as it pivots about the hinge. To ensure that the latch assemblies 800A arranged on the sides 912, 914 do not bind and/or inhibit the opening or closing of the lid 905, sides 912, 914 of the sidewall structure may include a kick out rib 1170. Similar to bases 304 and 704, base 904 may include a plurality of ramped or tapered surfaces 971 positioned on either side of the latch keeper 970. The ramped surfaces 971 may angle downward from the interface surface 936 of the base 904. Ramped surfaces 971 may include a first ramped surface 971 adjacent a first end of the latch keeper 970A and a second ramped surface 971 adjacent a second end of the latch keeper 970A. A kick out rib 1170 may extend from sides 912, 914 of the sidewall structure 906 or may extend from either or both of the ramped surfaces 971 that are positioned on either side of the latch keeper 970A as shown in FIG. 59. The kick out rib 1170 may be arranged on an outboard portion of the ramped surfaces 971. The kick out rib 1170 may push the latch assembly 800A away from the base 904 to prevent a latch assembly 800A from binding as the lid 905 moves from the open configuration to the closed configuration or as the lid 905 moves from the closed configuration to the open configuration.

As discussed above, each latch assembly 800 may be pivotally engaged with the lid 905 using a hinge or latch pin 806. Each latch assembly 800 may engage a latch keeper 970 when the latch assembly 800 is in the locked position. Each latch keeper 970A may be arranged on sides 912 and 914 of the sidewall structure 906 may include an upper surface 972, an inner surface, a lower surface 976. In some examples, the kick out rib 1170 may extend from the ramped surfaces 971 and may be arranged on opposite ends of the ramped surfaces 971. Ramped surfaces 971 may have the same properties as ramped surface 371 described above. As shown in the illustrated example, a kick out rib 1170 may extend from an upper portion of the ramped surface 971 or may extend from an edge of the interface surface 936 of the base 904. Each kick out rib 1170 may extend outward beyond a front surface 977 of the latch keeper 970. Each kick out rib 1170 may have an upper ramped surface 1172 that extends outward and downward in a diverging manner from the ramped surface 971 and a lower ramped surface 1174 that converges toward the upper ramped surface 1172. In some examples, the upper ramped surface 1172 may be substantially coplanar with the ramped surface 971. A rounded edge 1176 may extend between the upper ramped surface 1172 and the lower ramped surface 1174. In addition, when the lid 905 is in the closed configuration, the kick out rib 1170 may be positioned between the latch body 802 of the latch assembly 800 and the raised portion 964 of the sidewall structure 906.

When the lid 905 moves from the open configuration to the closed configuration, a kick out rib 1170 may contact the latch assembly 800 and push the latch assembly 800 away from sidewall structure 906 to prevent the latch assembly 800 from binding or preventing the lid 905 from closing. Similarly, as the lid 905 moves from the closed configuration to the open configuration, the latch assembly 800 may contact a kick out rib 1170 to prevent the latch assembly 800 from binding or preventing the lid 905 from opening. The kick out ribs 1170 may only be present on sides 912, 914 of the sidewall structure 906.

While the lid support members 1000, 1100, lid stay rod assembly 1140, and kick out ribs 1170 are described with respect to container 902, these features may be arranged on any of the containers described herein.

FIGS. 60-63 illustrates an alternate version of container 902 except instead of a strap handle 980, the container 902 includes a pull handle assembly 1050 that enables a user to ergonomically maneuver the container 902. The pull handle assembly 1050 may assist when the container 902 is tilted into a rolling position with the end opposite the wheels 988 off the container's resting surface. The pull handle assembly 1050 may be connected to side 914 of the sidewall structure 906, which is arranged opposite side 912 that includes the wheel assemblies 986. A user may grasp handle 1052 to raise side 914 upward, which shifts the weight of the container 902 onto the wheels 988 and allows the user to pull the container 902. The pull handle assembly 1050 may have an extended configuration that enables a user to pull the container 902 and a nested configuration where the pull handle assembly 1050 is located within a recess 996 on side 914. When the pull handle assembly 1050 is in the nested configuration, an upper surface 1058 of the pull handle 1052 may be substantially parallel an outward facing surface of side 914.

The pull handle assembly 1050 may include a pull handle 1052 pivotally attached to side 914, a primary hinge plate 1054 pivotally attached to the pull handle 1052, a secondary hinge plate 1056 pivotally attached to both the primary hinge plate 1054 and to side 914. The pull handle 1052 may include a first handle end 1060 that is pivotally connected to side 914 of the sidewall structure 906 and a second handle end 1062 opposite the first handle end 1060 and a pull handle body 1064 extending between the first handle end 1060 and the second handle end 1062. The first handle end 1060 may have a pair of engaging members 1066 that are received into the clevis portions 985 on either end of the handle 940. The engaging members 1066 may be pivotally connected to the clevis portions 985 using a pin. The primary hinge plate 1054 may be pivotally connected to the pull handle body 1064 at a location nearer the first handle end 1060 of the pull handle body 1064 than the second handle end 1062. The primary hinge plate 1054 and the secondary hinge plate 1056 may nest together such that when the pull handle assembly 1050 is in the nested configuration, the primary hinge plate 1054 is positioned between the pull handle 1052 and the secondary hinge plate 1056 and the secondary hinge plate 1056 is located between the primary hinge plate 1054 and side 914. A spring and damper may be connected between the primary hinge plate 1054 and the secondary hinge plate 1056 to bias the pull handle assembly 1050 into a nested position. Additionally, when the pull handle assembly 1050 is in the nested configuration, the secondary hinge plate 1056 and the primary hinge plate 1054 are substantially parallel with pull handle 1052. As previously discussed, when container 902 is equipped with the articulating pull handle assembly 1050, side 914 may include a recess 996 that extends a majority of the height of side 914 to allow the handle assembly 1050 to nest within the recess 996.

The pull handle body 1064 may include at least one grip opening 1068 that extend through the pull handle body 1064 to allow a user to easily grasp the pull handle 1052. In some examples, the pull handle body 1064 may include multiple grip openings 1068 to allow a user flexibility in where the pull handle body 1064 may be gripped. Each opening 1068 may extend across a majority of the length of the pull handle body 1064 and may have the same width or have different widths. As shown in the illustrated examples, each opening 1068 may be located nearer the first handle end 1060 than the second handle end 1062 on the pull handle body 1064. The primary hinge plate 1054 may be attached to the pull handle body 1064 aft of the opening 1068 (nearer the second handle end 1062 than opening 1068).

Figure 60:
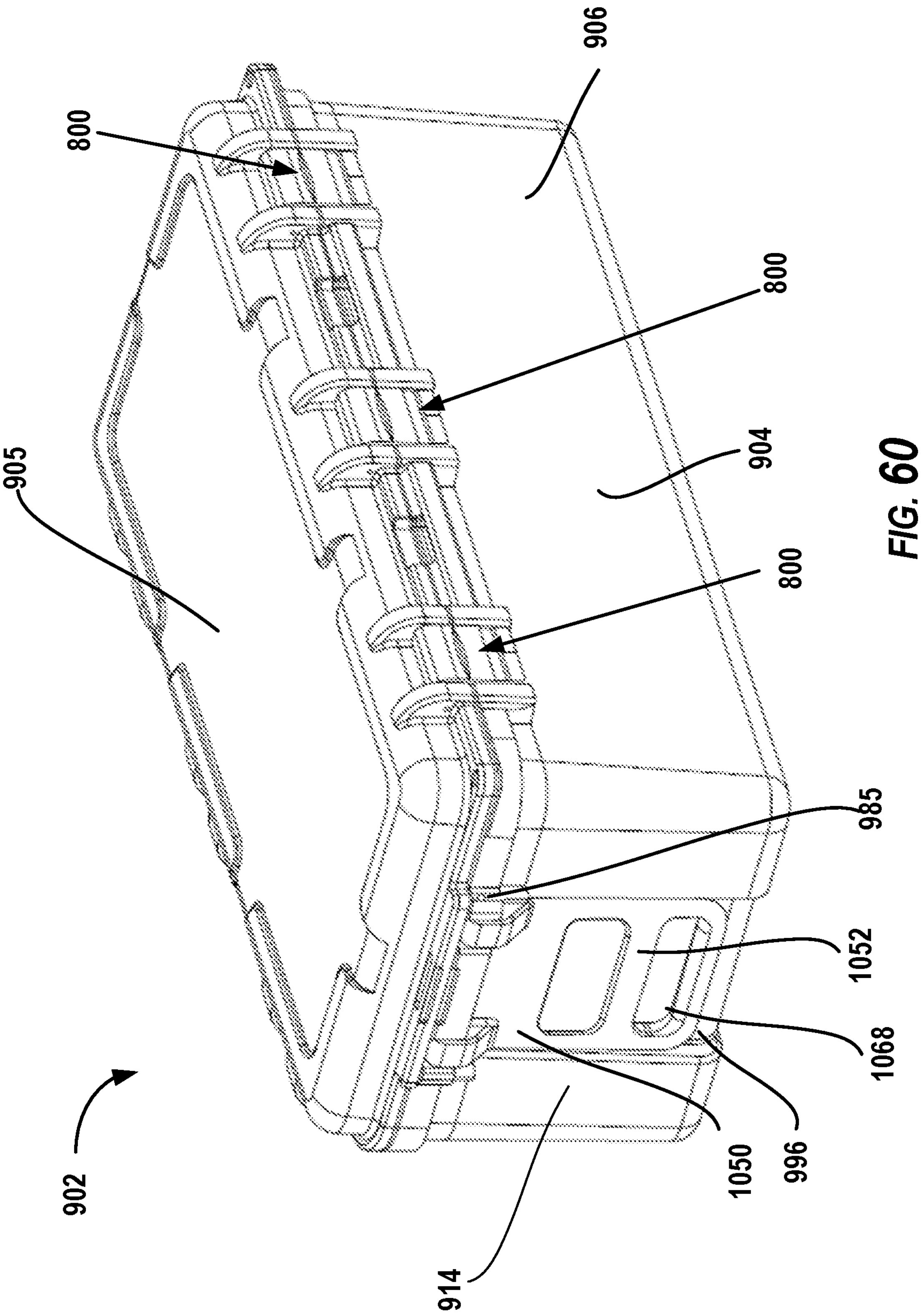
FIG. 60 illustrates a front, left perspective view of another exemplary container in a closed position according to one or more aspects described herein.
Figure 62:
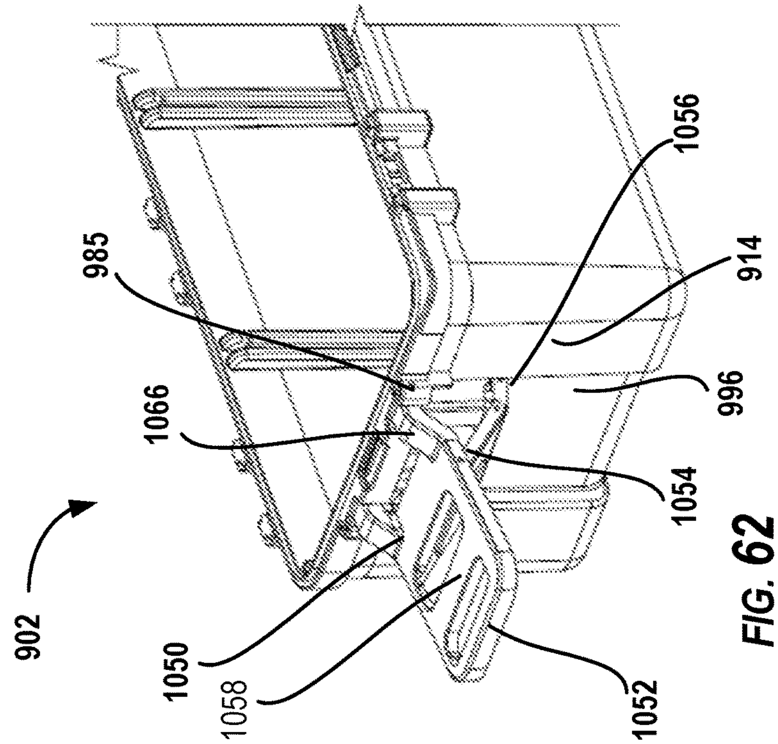
FIG. 62 illustrates a partial front left perspective view of the container of FIG. 60 with some components removed and with the handle in an extended position according to one or more aspects described herein.
Figure 61:
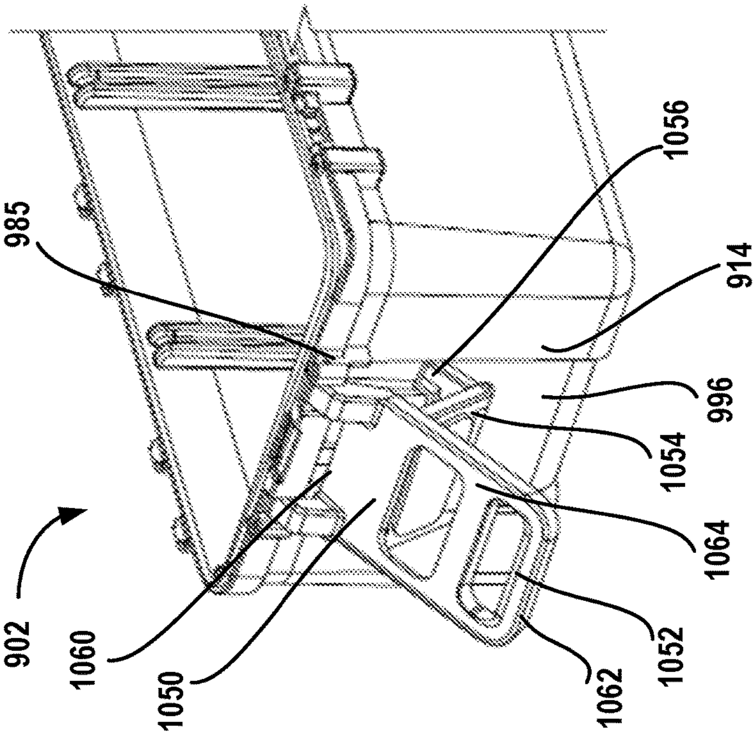
FIG. 61 illustrates a partial front left perspective view of the container of FIG. 60 with some components removed and with the handle in a partially extended position according to one or more aspects described herein.
Figure 63:
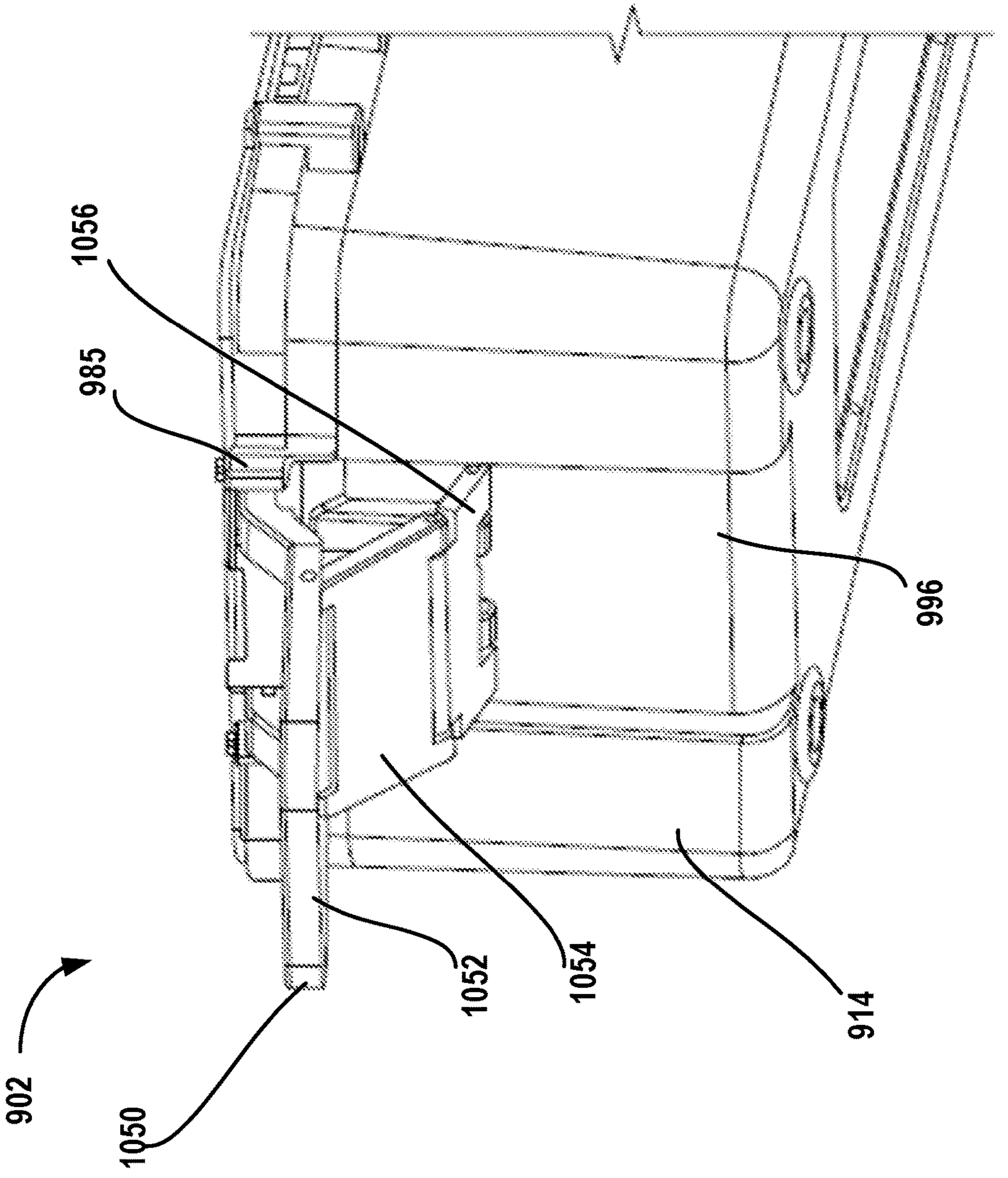
FIG. 63 illustrates a partial front left bottom perspective view of the container of FIG. 60 with some components removed and with the handle in an extended position according to one or more aspects described herein.

In addition, FIGS. 60-63 illustrate the pull handle assembly 1050 as it transitions from a nested configuration shown in FIG. 60 to an extended position in FIGS. 62-63. FIG. 61 illustrates the pull handle assembly 1050 in a partially extended condition where the pull handle 1052 is raised slightly and the primary hinge plate 1054 forms an acute angle with the secondary hinge plate 1056. FIGS. 62-63 illustrate the pull handle assembly 1050 in an extended configuration. When the pull handle 1052 is fully extended, the primary hinge plate 1054 may form an acute angle with the secondary hinge plate 1056. The hinge plates 1054, 1056 may act to limit the pull handle 1052 from over rotating while also provide additional strength to the pull handle assembly 1050.

The lid support member 1000 and pull handle assembly 1050 components may be formed from polymeric materials, which may be a filled or unfilled polymer. For example, the polymeric materials may be a PC-ABS, polyethylene, or other similar material. In addition, the lid support member 1000 and pull handle assembly 1050 components can be manufactured by polymer processing techniques, such as various molding and casting techniques and/or other known techniques. Alternatively or optionally, the lid support member 1000 and pull handle assembly 1050 may be formed of a metallic material such as an aluminum alloy, magnesium alloy, or other metallic material with a density below 3 g/cc. As another option, the container components such as the lid, body, lid support member and pull handle assembly may include a structural foam with a composite polymer material with a low density foamed core and a higher density polymer skin.

According to one aspect, a container is disclosed. The container may include a molded base including: a sidewall structure having a first side, a second side opposite the first side, a third side extending between an edge of the first side and an edge of the second side, and a fourth side opposite the third side, the sidewall structure having a first end and a second end; a bottom portion connected to a first end of the sidewall structure and configured to support the container on a surface; and an opening formed at a second end of the sidewall structure, opposite the first end, the opening being configured to allow access to an interior void of the container formed by the sidewall structure and the bottom portion. The container may also include a latch keeper extending from the sidewall structure, the latch keeper having an upper surface, an inner surface and a lower surface; a lid, the lid pivotal between an open configuration and a closed configuration, the lid having a shape corresponding to a shape of the base and configured to cover the opening formed at the second end of the sidewall structure when the container is in the closed configuration; a hinge configured to connect the lid to the base and about which the lid is rotatable from the closed configuration to the open configuration. The container may also include a latch assembly, the latch assembly having a locked position and an unlocked position, the latch assembly comprising; a latch body pivotally engaged with the lid, the latch body having at least one engagement lug; a locking member slidably engaged with the latch body, the locking member being slidable between at least a downward position and an upward position, the locking member configured to lock the lid in the closed configuration when the locking member is in the downward position and configured to unlock the lid when the locking member is in the upward position; a biasing member engaged with the latch body and the locking member, the biasing member biasing the locking member in a downward position; and an activating member pivotally engaged with the latch body and engaged with the locking member, the activating member configured to move the locking member from the downward position to the upward position. The latch assembly may only be moved from the unlocked position to the locked position when the locking member is in the upward position. The at least one engagement lug of the latch body may engage the lower surface of latch keeper when the latch assembly is in the locked position. The lower surface of the locking member engages the upper surface of the latch keeper when the latch assembly is in the locked position.

Rotating the lid from the closed configuration to the open configuration may include rotating the lid 90° from the closed configuration. The container may contain insulation within the sidewall structure. The container may include a second latch assembly. The container may include a gasket arranged in a recess formed in at least one of the base and the lid. The container may include a channel integrally molded with an exterior surface of the base. The channel may extend around an entire exterior perimeter of the base. The container may also include at least one handle. The handle may include a first arm and a second arm, and each of the first arm and second arm may include a raised portion at a distal end of the arm.

According to another aspect, a container is disclosed. The container may include a base including: a sidewall structure having at least a first side and a second side opposite the first side, the sidewall structure having a first end and a second end; a bottom portion connected to a first end of the sidewall structure and configured to support the container on a surface; an opening formed at a second end of the sidewall structure, opposite the first end, the opening being configured to allow access to an interior void of the container formed by the sidewall structure and the bottom portion; and a latch keeper extending from the sidewall structure, the latch keeper having an upper surface, an inner surface and a lower surface. The container may also include a lid, the lid pivotal between an open configuration and a closed configuration, the lid having a shape corresponding to a shape of the base and configured to cover the opening formed at the second end of the sidewall structure when the container is in the closed configuration; a hinge configured to connect the lid to the base and about which the lid is rotatable from the closed configuration to the open configuration; and a latch assembly, the latch assembly having a locked position and an unlocked position. The latch assembly may include a latch body pivotally engaged with the lid, the latch body having at least one engagement lug; a locking member engaged with the latch body, the locking member being movable between at least a downward position and an upward position, the locking member configured to lock the lid in the closed configuration when the locking member is in the downward position and configured to unlock the lid when the locking member is in the upward position; a biasing member engaged with the latch body and the locking member, the biasing member biasing the locking member in a downward position; and an activating member pivotally engaged with the latch body and engaged with the locking member, the activating member configured to move the locking member from the downward position to the upward position.

The locking member may be slidably engaged with the latch body, the locking member being slidable between the downward position and the upward position. The latch assembly may only be moved from the unlocked position to the locked position when the locking member is in the upward position. The at least one engagement lug of the latch body engages the lower surface of latch keeper when the latch assembly is in the locked position. The lower surface of the locking member may engage the upper surface of the latch keeper when the latch assembly is in the locked position. The container may also include a gasket arranged in a recess formed in at least one of the base and the lid. The container may also include a channel integrally molded with an exterior surface of the base, wherein the channel extends around the entire exterior surface of the base. The container may also include at least one handle with the handle having a first arm and a second arm, and wherein each of the first arm and second arm include a raised portion at a distal end of the arm.

According to another aspect, a latch assembly for a structure is disclosed. The structure may have an open configuration and a closed configuration, the structure comprising; and a first portion movable relative to a second portion; a latch keeper engaged with the first portion. The latch assembly, the latch assembly having a locked position and an unlocked position, the latch assembly may include a latch body pivotally engaged with the second portion; a locking member engaged with the latch body, the locking member being movable between at least a downward position and an upward position, the locking member configured to lock the lid in the closed configuration when the locking member is in the downward position and configured to unlock the lid when the locking member is in the upward position; and an activating member pivotally engaged with the latch body and engaged with the locking member, the activating member configured to move the locking member from the downward position to the upward position.

The latch assembly may also include a biasing member engaged with the latch body and the locking member, the biasing member biasing the locking member in a downward position. The locking member may be slidably engaged with the latch body, the locking member being slidable between the downward position and the upward position. The latch assembly may only be moved from the unlocked position to the locked position when the locking member is in the upward position.

The latch body may include an inner surface and the latch keeper may include an upper surface, an inner surface and a lower surface. The at least one engagement lug of the latch body may engage the lower surface of latch keeper when the latch assembly is in the locked position; and the lower surface of the locking member may engage the upper surface of the latch keeper when the latch assembly is in the locked position.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure.

We claim:

1. A container, comprising:

a base including:

a sidewall structure having a first side, a second side opposite the first side, the sidewall structure having a first end and a second end;

a bottom portion connected to a first end of the sidewall structure;

an opening formed at the second end of the sidewall structure, opposite the first end, the opening being configured to allow access to an interior void of the container formed by the sidewall structure and the bottom portion;

a latch keeper extending from the sidewall structure, the latch keeper having an upper surface, an inner surface and a lower surface;

a lid, the lid having an open configuration and a closed configuration, the lid configured to cover the opening formed at the second end of the sidewall structure when the container is in the closed configuration; and a latch assembly, the latch assembly having a locked position and an unlocked position, the latch assembly comprising;

a latch body pivotally engaged with the lid;

a locking member slidably engaged with the latch body, the locking member being slidable between at least a first position and a second position, the locking member configured to lock the lid in the closed configuration when the locking member is in the first position and configured to unlock the lid when the locking member is in the second position;

at least one biasing member engaged with the latch body and the locking member, the at least one biasing member biasing the locking member in the first position; and an activating member engaged with the latch body and configured to move the locking member from the first position to the second position, the activating member comprising an activating barrel having a plurality of raised portions that are spaced apart from one another, and wherein a hook portion of the locking member engages the latch keeper when the latch assembly is in the locked position.

2. The container of claim 1, wherein the at least one biasing member is positioned laterally in between the plurality of raised portions.

3. The container of claim 1, wherein the at least one biasing member comprises two biasing members that are positioned laterally in between the plurality of raised portions.

4. The container of claim 1, wherein the locking member has at least one engaging member that contacts a raised portion of the plurality of raised portions of the activating barrel.

5. The container of claim 4, wherein the at least one engaging member comprises two engaging members that are spaced apart from each other creating an opening between the two engaging members.

6. The container of claim 1, wherein each raised portion of the plurality of raised portions has a substantially triangular shape.

7. The container of claim 1, further comprising a strap handle attached to a third side of the sidewall structure, wherein the third side extends between the first side and the second side, wherein the strap handle comprises a strap portion and a carry handle.

8. The container of claim 7, wherein the strap portion includes an overlap region that forms an opening to receive a pin such that the pin extends through the opening of the strap portion and is received in a clevis portion arranged on an end of a handle that is also located on the third side of the sidewall structure.

9. A container, comprising:

a base including:

a sidewall structure having a first side, a second side opposite the first side, a third side extending between the first side and the second side, and a fourth side opposite the third side, wherein the sidewall structure also has a first end and a second end;

a bottom portion connected to a first end of the sidewall structure;

an opening formed at the second end of the sidewall structure, opposite the first end, the opening being configured to allow access to an interior void of the container formed by the sidewall structure and the bottom portion;

a handle on the third side;

a strap handle attached to the third side of the sidewall structure, wherein the strap handle comprises a strap portion and a carry handle; wherein the strap portion includes an overlap region that forms an opening to receive a pin such that the pin extends through the opening of the strap portion and is received in a clevis portion arranged on an end of the handle;

a latch keeper extending from the first side of the sidewall structure, the latch keeper having an upper surface, an inner surface and a lower surface;

a lid, the lid having an open configuration and a closed configuration, the lid configured to cover the opening formed at the second end of the sidewall structure when the container is in the closed configuration; and a latch assembly having a latch body pivotally engaged with the lid, the latch assembly having a locked position and an unlocked position; wherein the latch assembly comprises:

a locking member slidably engaged with the latch body, the locking member being slidable between at least a first position and a second position, the locking member configured to lock the lid in the closed configuration when the locking member is in the first position and configured to unlock the lid when the locking member is in the second position;

at least one biasing member engaged with the latch body and the locking member, the at least one biasing member biasing the locking member in the first position; and an activating member engaged with the latch body and configured to move the locking member from the first position to the second position, the activating member comprising an activating barrel having a plurality of raised portions that are spaced apart from one another, and wherein a hook portion of the locking member engages the latch keeper when the latch assembly is in the locked position.

* * * * *